(12) United States Patent
Yoshida et al.

(10) Patent No.: US 10,789,671 B2
(45) Date of Patent: Sep. 29, 2020

(54) APPARATUS, SYSTEM, AND METHOD OF CONTROLLING DISPLAY, AND RECORDING MEDIUM

(71) Applicant: Ricoh Company, Ltd., Tokyo (JP)

(72) Inventors: Kazuhiro Yoshida, Kanagawa (JP); Keiichi Kawaguchi, Kanagawa (JP); Hiroshi Suitoh, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 64 days.

(21) Appl. No.: 15/856,949

(22) Filed: Dec. 28, 2017

(65) Prior Publication Data

US 2018/0182065 A1 Jun. 28, 2018

(30) Foreign Application Priority Data

Dec. 28, 2016 (JP) .................................. 2016-256381
Dec. 28, 2016 (JP) .................................. 2016-256382

(Continued)

(51) Int. Cl.
*G06T 3/00* (2006.01)
*H04N 5/445* (2011.01)
(Continued)

(52) U.S. Cl.
CPC .......... *G06T 3/0062* (2013.01); *G06T 3/4038* (2013.01); *H04N 5/217* (2013.01);
(Continued)

(58) Field of Classification Search
CPC ..... G06T 3/0062; G06T 3/4038; H04N 5/217; H04N 5/2258; H04N 5/23206;
(Continued)

(56) References Cited

U.S. PATENT DOCUMENTS 6,785,469 B1 * 8/2004 Ide .......................... G02B 7/28
250/201.2
2002/0180759 A1 * 12/2002 Park ...................... G06T 3/0012
345/629

(Continued)

FOREIGN PATENT DOCUMENTS

CN 1856693 A 11/2006
CN 101616237 A 12/2009
(Continued)

OTHER PUBLICATIONS

Office Action dated Jan. 7, 2020, issued in corresponding Chinese Patent Application No. CN201711457442.9, 9 pages.

*Primary Examiner* — William C Vaughn, Jr.
*Assistant Examiner* — Jae N Noh
(74) *Attorney, Agent, or Firm* — Xsensus LLP

(57) ABSTRACT

An apparatus, system, and method for controlling display, each of which: obtains a first image and a second image, the second image being superimposed on the first image; controls a display to display an image of a predetermined area of the first image, such that the predetermined area of the first image matches a display area of the display; and in response to an instruction to start displaying the first image superimposed with the second image, controls the display to display the image of the predetermined area of the first image, such that the second image being superimposed on the first image is displayed within the predetermined area of the first image.

16 Claims, 90 Drawing Sheets

CAPTURED IMAGE (EQUIRECTANGULAR PROJECTION IMAGE EC)

(30) Foreign Application Priority Data

| Dec. 28, 2016 | (JP) | ................................ 2016-256575 |
| Oct. 25, 2017 | (JP) | ................................ 2017-206647 |
| Oct. 26, 2017 | (JP) | ................................ 2017-207635 |
| Dec. 21, 2017 | (JP) | ................................ 2017-245460 |

(51) Int. Cl.
   *H04N 5/232* (2006.01)
   *H04N 5/217* (2011.01)
   *H04N 5/225* (2006.01)
   *H04N 5/357* (2011.01)
   *G06T 3/40* (2006.01)

(52) U.S. Cl.
   CPC ....... *H04N 5/2258* (2013.01); *H04N 5/23206* (2013.01); *H04N 5/23238* (2013.01); *H04N 5/23293* (2013.01); *H04N 5/3572* (2013.01); *H04N 5/44504* (2013.01)

(58) Field of Classification Search
   CPC ........... H04N 5/23238; H04N 5/23293; H04N 5/3572; H04N 5/44504
   USPC .......................................................... 348/36
   See application file for complete search history.

(56) References Cited

U.S. PATENT DOCUMENTS

| 2007/0064246 A1 | 3/2007 | Braunecker et al. |
| 2009/0324135 A1* | 12/2009 | Kondo ................. G06T 3/4038 382/284 |
| 2014/0185009 A1* | 7/2014 | Imamura ................ A61B 3/152 351/208 |
| 2014/0347526 A1 | 11/2014 | Hara et al. |
| 2016/0050369 A1 | 2/2016 | Takenaka et al. |
| 2016/0132991 A1 | 5/2016 | Fukushi |
| 2016/0212336 A1 | 7/2016 | Takenaka et al. |
| 2017/0094169 A1 | 3/2017 | Yoshikawa et al. |
| 2017/0098330 A1* | 4/2017 | Inomata ................... G06F 3/012 |

FOREIGN PATENT DOCUMENTS

| CN | 201440702 U | 4/2010 |
| CN | 204971281 U | 1/2016 |
| JP | 7-077665 | 3/1995 |
| JP | 2012-178135 | 9/2012 |
| JP | 2015-018296 | 1/2015 |
| JP | 2016-096487 | 5/2016 |

* cited by examiner

LENS 102b

SHUTTER
BUTTON 115a
(OPERATION
UNIT 115)

1

LENS 102b    LENS 102a

1

152  151  153

150

1

HEMISPHERICAL IMAGE (FRONT)

HEMISPHERICAL IMAGE (BACK)

CAPTURED IMAGE (EQUIRECTANGULAR PROJECTION IMAGE EC)

FIG. 4A
EQUIRECTANGULAR PROJECTION IMAGE EC
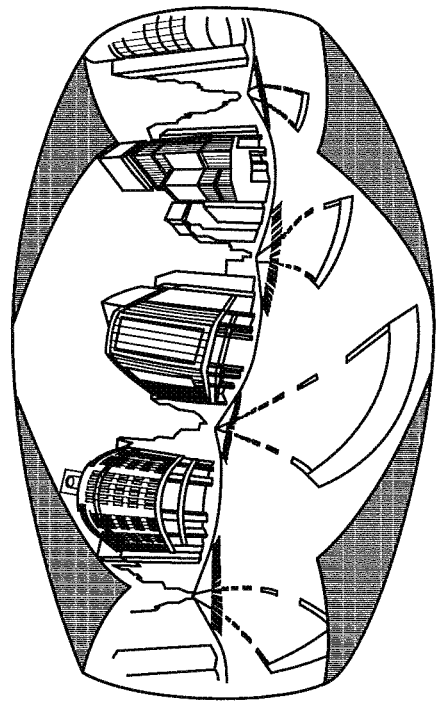
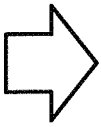
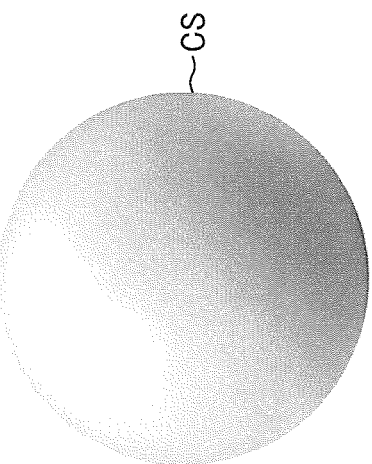
FIG. 4B
SPHERICAL IMAGE CE
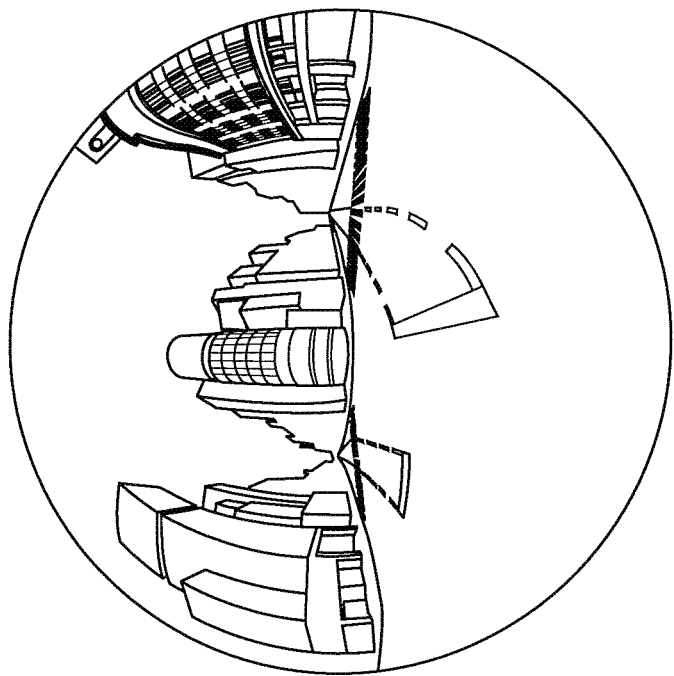

| LINKING INFORMATION | IP ADDRESS | DEVICE NAME |
|---|---|---|
| MAIN | 1.2.3.4 | k1-camera1 |
| SUB 1 | 1.2.3.5 | theta-camera1 |
| – | 1.2.3.6 | theta-camera2 |
| ⋮ | ⋮ | ⋮ |

FIG. 17

| | | | |
|---|---|---|---|
| EQUIRECTANGULAR PROJECTION IMAGE INFORMATION | ATTRIBUTE DATA | IMAGE ID | ./IMAGE001.JPG |
| | | POSITIONING CORRECTION (Pitch, Yaw, Roll) | (−2.8, −2.1, 0) |
| PALANAR IMAGE INFORMATION | ATTRIBUTE DATA | IMAGE ID | ./IMAGE111.JPG |
| | | 35 mm EQUIVALENT FOCAL LENGTH | 28 |
| | AREA DIVISION NUMBER INFORMATION | HORIZONTAL (LONGITUDE) DIVISION NUMBER | 30 |
| | | VERTICAL (LATITUDE) DIVISION NUMBER | 20 |
| SUPERIMPOSED DISPLAY INFORMATION | COORDINATE OF GRID IN GRID AREA (LOCATION PARAMETER) | | $(LO'_{00,00}, LA'_{00,00}), (LO'_{01,00}, LA'_{01,00}), \ldots ,$ $(LO'_{30,20}, LA'_{30,20})$ |
| | CORRECTION VALUE OF BRIGHTNESS AND COLOR (CORRECTION PARAMETER) | | $(R_{00,00}, G_{00,00}, B_{00,00}), (R_{01,00}, G_{01,00}, B_{01,00}),$ $\ldots , (R_{30,20}, G_{30,20}, B_{30,20})$ |
| | LOCATION OF POINT OF GAZE OF PREDETERMINED-AREA IMAGE | | $(LO1'_{15,10}, LA1'_{15,10})$ |
| | MAGNIFICATION PARAMETER | | 2.0 |
| METADATA GENERATION INFORMATION | VERSION INFORMATION | | 0.1.1 |

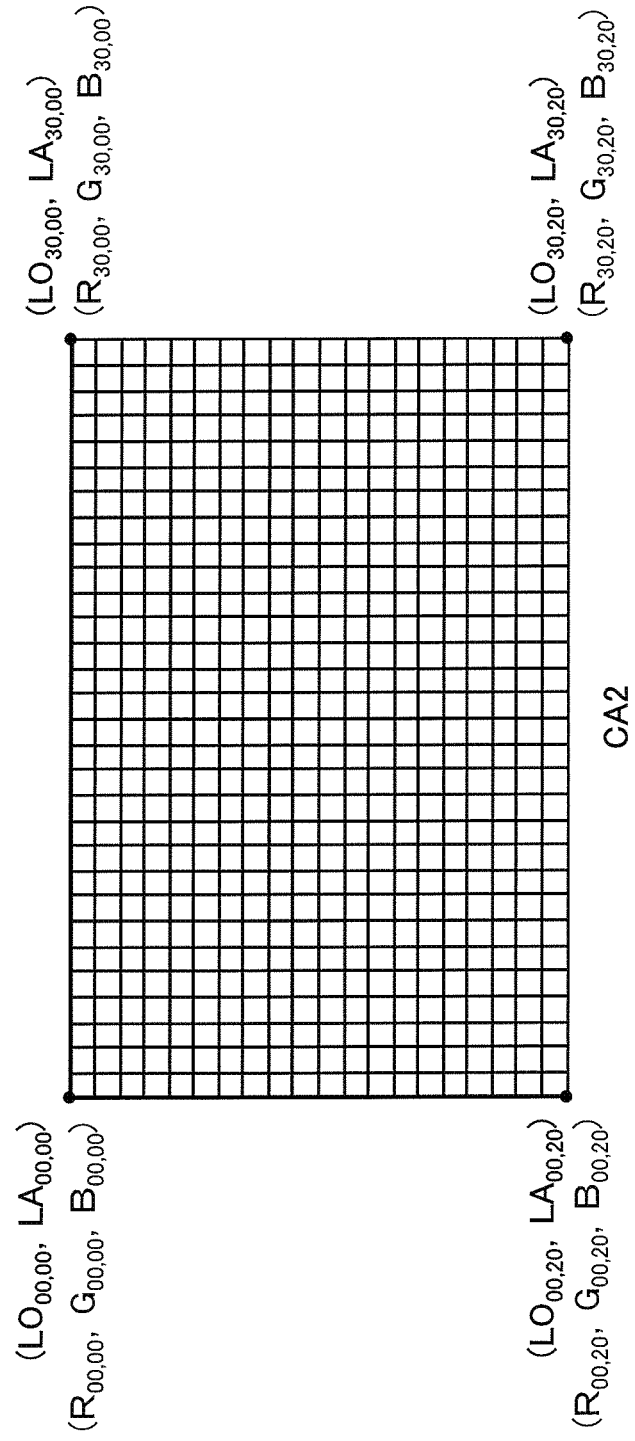

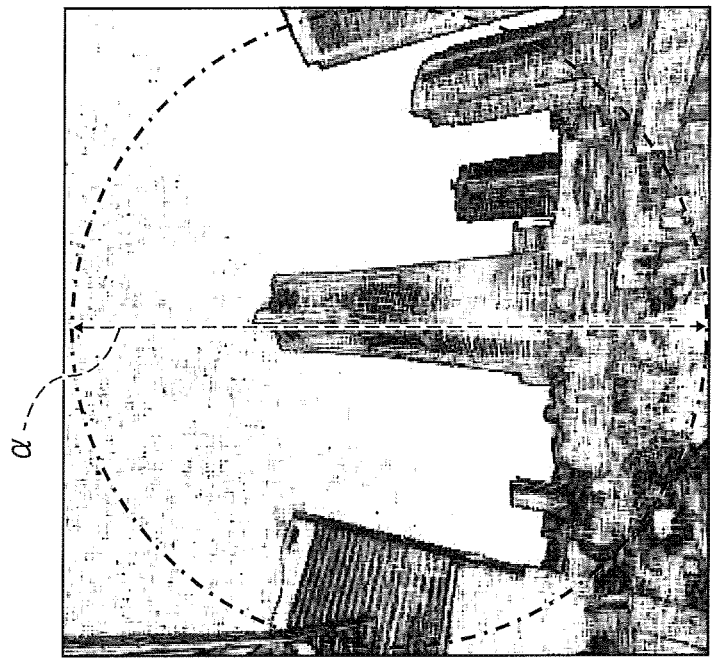
FIG. 21B PERIPHERAL AREA IMAGE PI
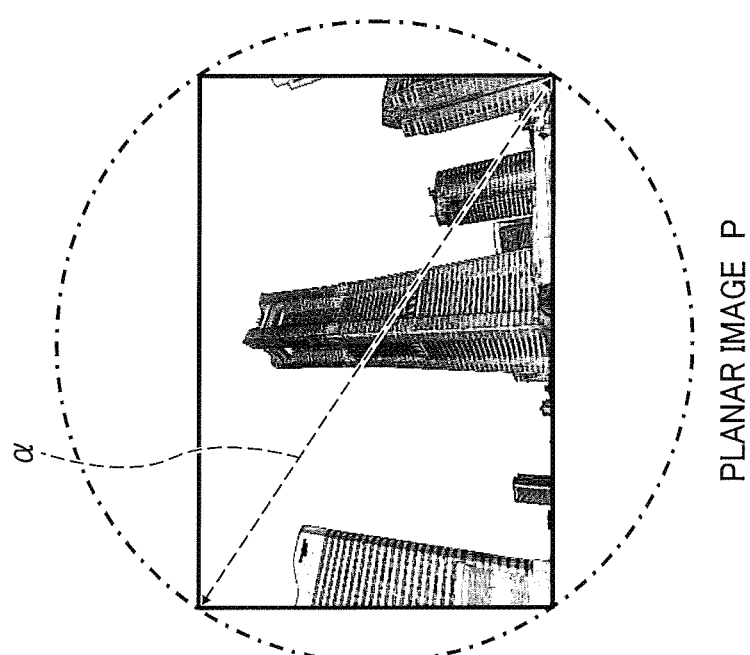
FIG. 21A PLANAR IMAGE P

CA2

CA2´

PLANAR IMAGE P

PART OF SUPERIMPOSED IMAGE S

SUPERIMPOSED IMAGE S

SUPERIMPOSED IMAGE S

FIG. 40A

| | | | |
|---|---|---|---|
| EQUIRECTANGULAR PROJECTION IMAGE INFORMATION | IMAGE ID | | ./IMAGE001.JPG |
| | ATTRIBUTE DATA | POSITIONING CORRECTION (Pitch, Yaw, Roll) | (−2.8, −2.1, 0) |
| PALANAR IMAGE INFORMATION | IMAGE ID | | ./IMAGE111.JPG |
| | ATTRIBUTE DATA | 35 mm EQUIVALENT FOCAL LENGTH | 28 |
| | | PRIORITY DISPLAY | 1 |
| SUPERIMPOSED DISPLAY INFORMATION | AREA DIVISION NUMBER INFORMATION | HORIZONTAL (LONGITUDE) DIVISION NUMBER | 30 |
| | | VERTICAL (LATITUDE) DIVISION NUMBER | 20 |
| | COORDINATE OF GRID IN GRID AREA (LOCATION PARAMETER) | | $(LO1'_{00,00}, LA1'_{00,00}), (LO1'_{01,00}, LA1'_{01,00}), \cdots,$ $(LO1'_{30,20}, LA1'_{30,20})$ |
| | CORRECTION VALUE OF BRIGHTNESS AND COLOR (CORRECTION PARAMETER) | | $(R1_{00,00}, G1_{00,00}, B1_{00,00}), (R1_{01,00}, G1_{01,00}, B1_{01,00}),$ $\cdots, (R1_{30,20}, G1_{30,20}, B1_{30,20})$ |
| | LOCATION OF POINT OF GAZE OF PREDETERMINED-AREA IMAGE | | $(LO1'_{15,10}, LA1'_{15,10})$ |
| | MAGNIFICATION PARAMETER | | 2 |
| METADATA GENERATION INFORMATION | VERSION INFORMATION | | 0.1.1 |

| | ./IMAGE112.JPG | ./IMAGE113.JPG |
|---|---|---|
| | 28 | 28 |
| | 0 | 0 |
| | 30 | 30 |
| | 20 | 20 |
| | $(LO2'_{00,00}, LA2'_{00,00})$, $(LO2'_{01,00}, LA2'_{01,00})$, $\cdots$, $(LO2'_{30,20}, LA2'_{30,20})$ | $(LO3'_{00,00}, LA3'_{00,00})$, $(LO3'_{01,00}, LA3'_{01,00})$, $\cdots$, $(LO3'_{30,20}, LA3'_{30,20})$ |
| | $(R2_{00,00}, G2_{00,00}, B2_{00,00})$, $(R2_{01,00}, G2_{01,00}, B2_{01,00})$, $\cdots$, $(R2_{30,20}, G2_{30,20}, B2_{30,20})$ | $(R3_{00,00}, G3_{00,00}, B3_{00,00})$, $(R3_{01,00}, G3_{01,00}, B3_{01,00})$, $\cdots$, $(R3_{30,20}, G3_{30,20}, B3_{30,20})$ |
| | $(LO2'_{15,10}, LA2'_{15,10})$ | $(LO3'_{15,10}, LA3'_{15,10})$ |
| | 3 | 1 |

FIG. 51A
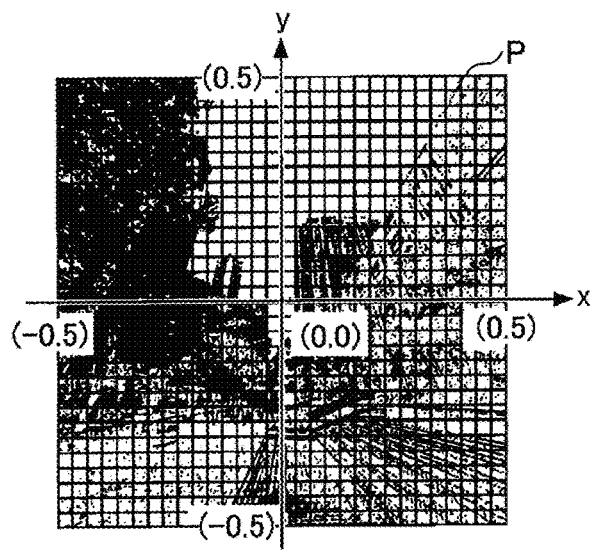
FIG. 51B
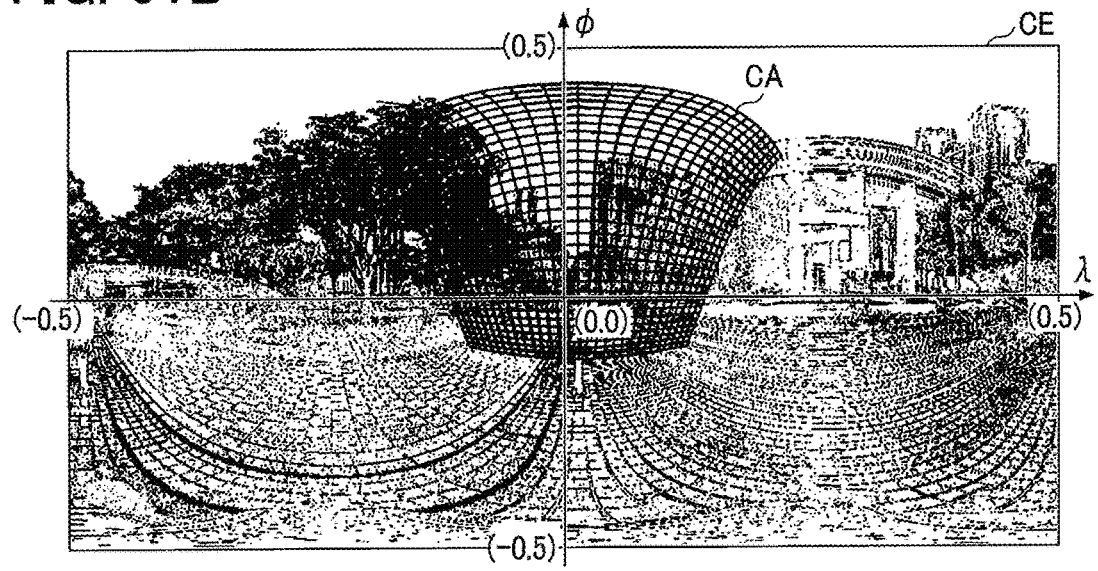
FIG. 51C
| x | y | λ | φ |
|---|---|---|---|
| −0.5 | 0.5 | −0.226 | 0.285 |
| −0.467 | 0.5 | −0.224 | 0.295 |
| −0.433 | 0.5 | −0.221 | 0.305 |
| −0.4 | 0.5 | −0.217 | 0.316 |
| −0.367 | 0.5 | −0.214 | 0.328 |
| −0.333 | 0.5 | −0.209 | 0.339 |
| −0.3 | 0.5 | −0.203 | 0.351 |
| ⋮ | ⋮ | ⋮ | ⋮ |
| 0.4 | −0.5 | 0.078 | −0.097 |
| 0.433 | −0.5 | 0.084 | −0.095 |
| 0.467 | −0.5 | 0.09 | −0.092 |
| 0.5 | −0.5 | 0.095 | −0.09 |

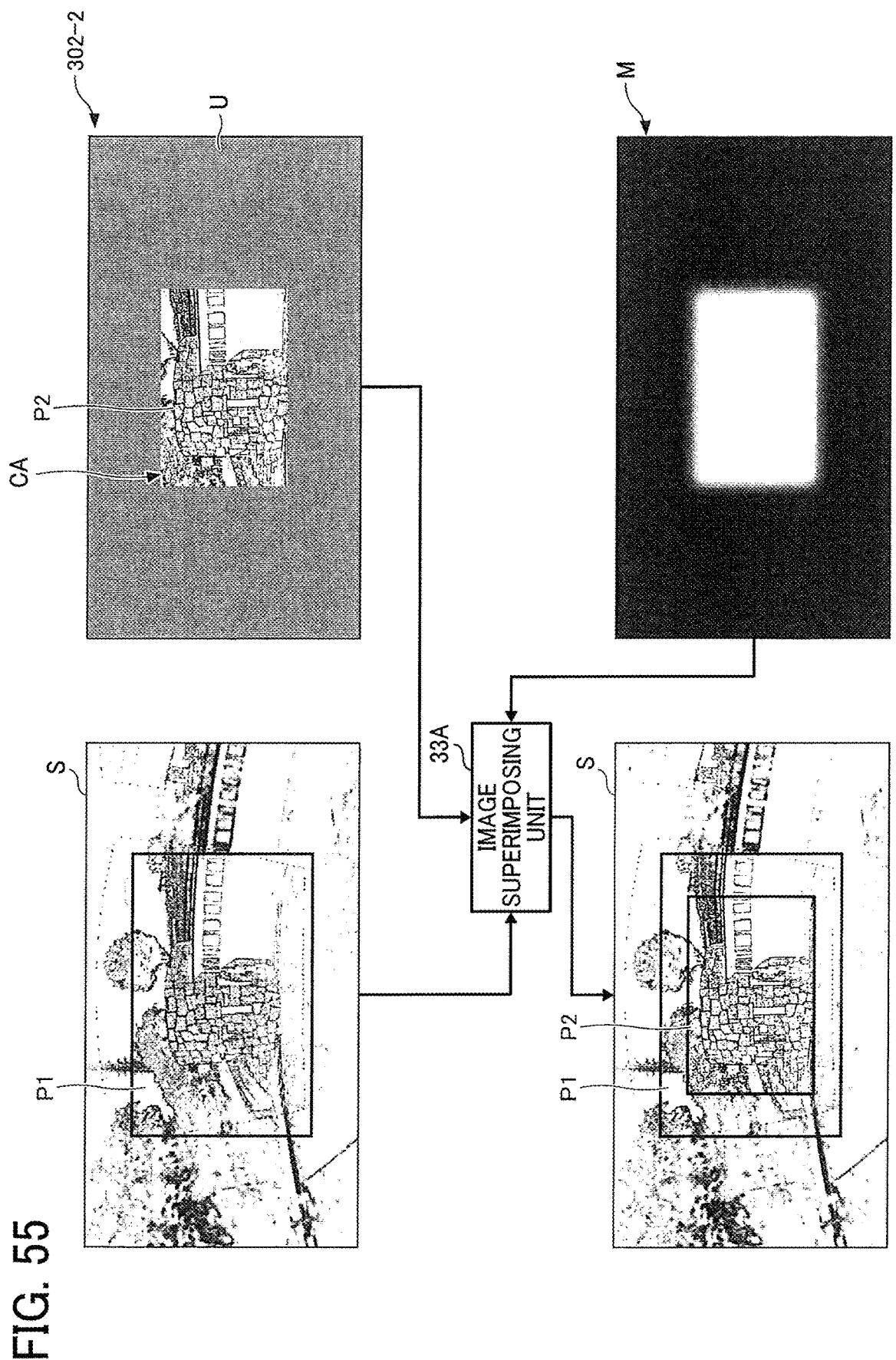

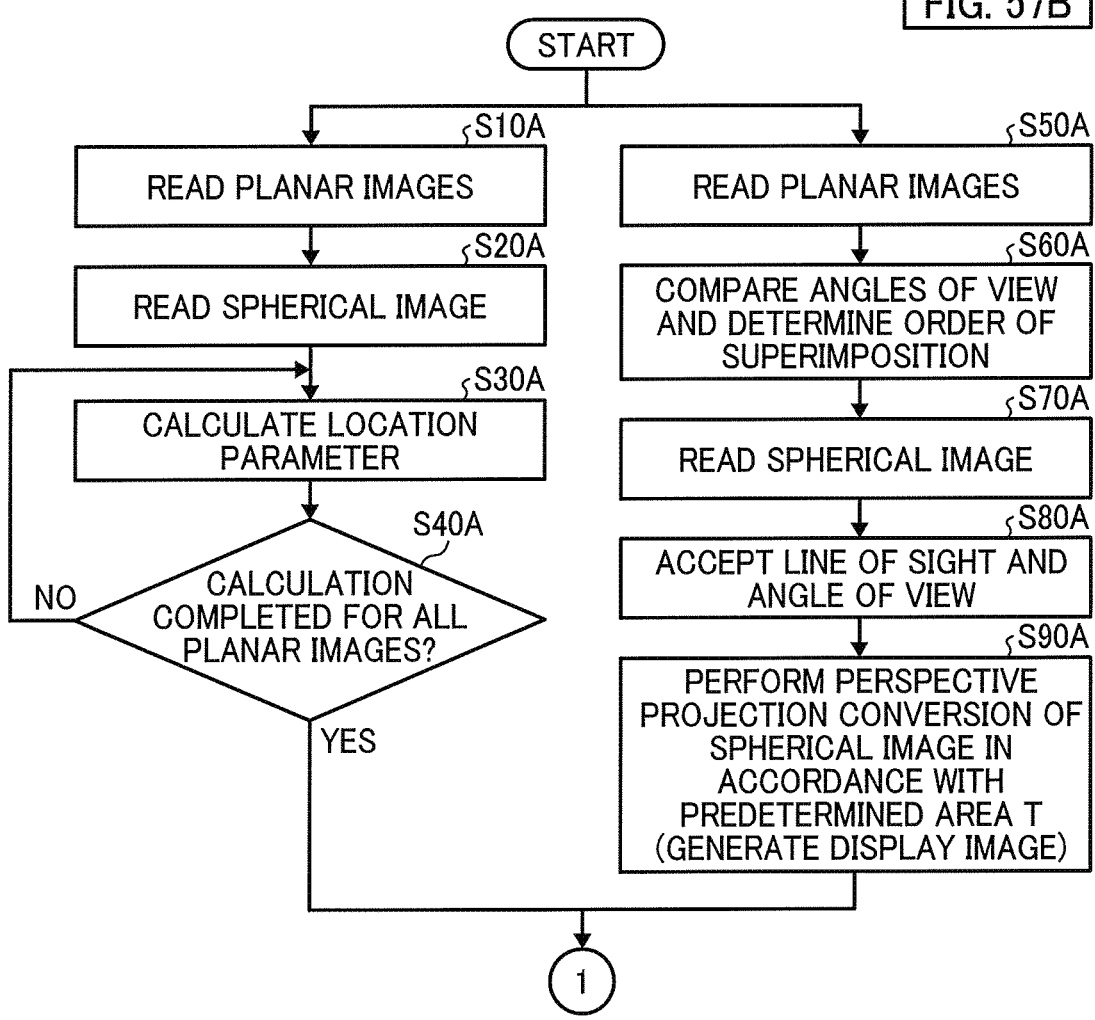

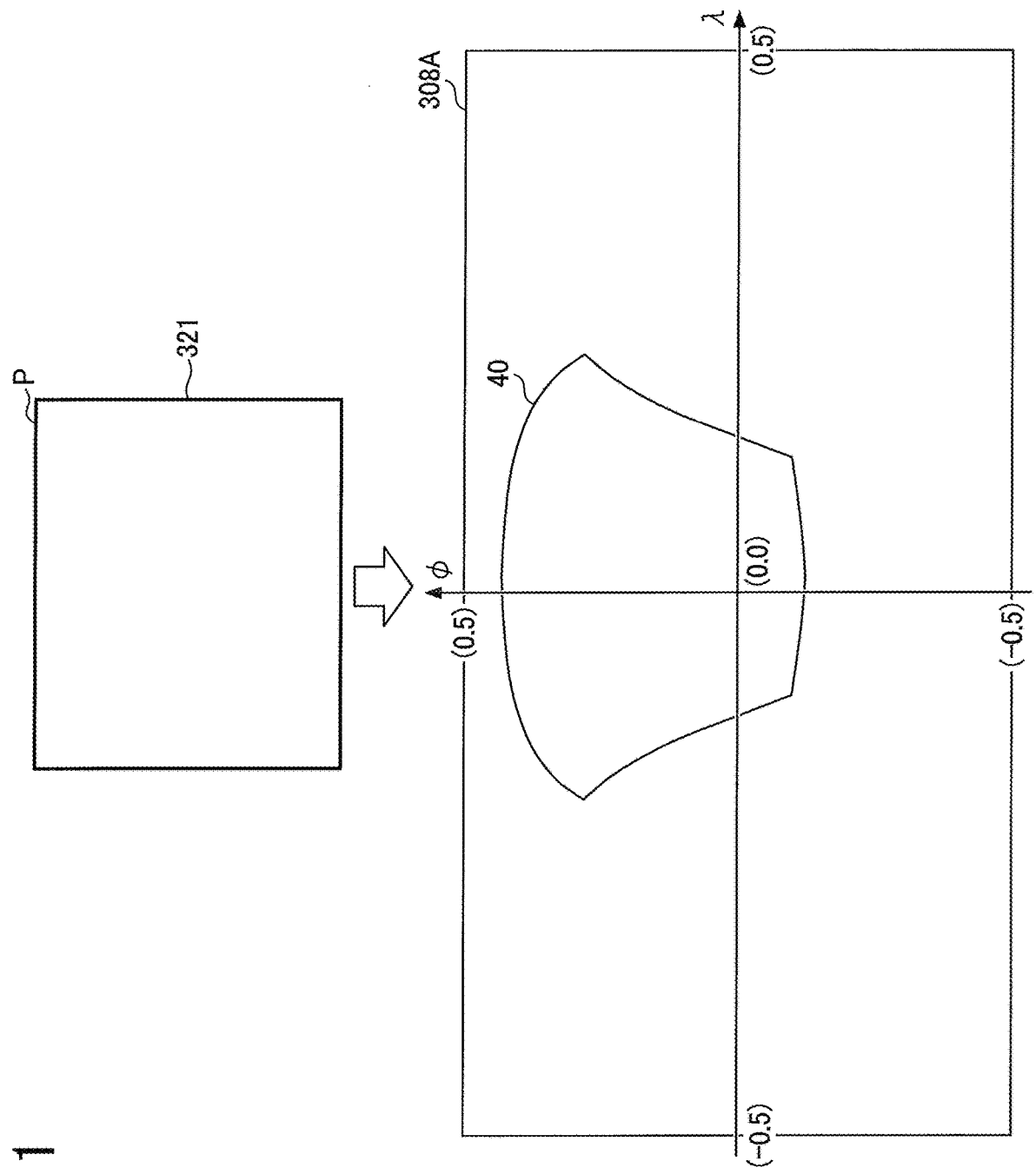

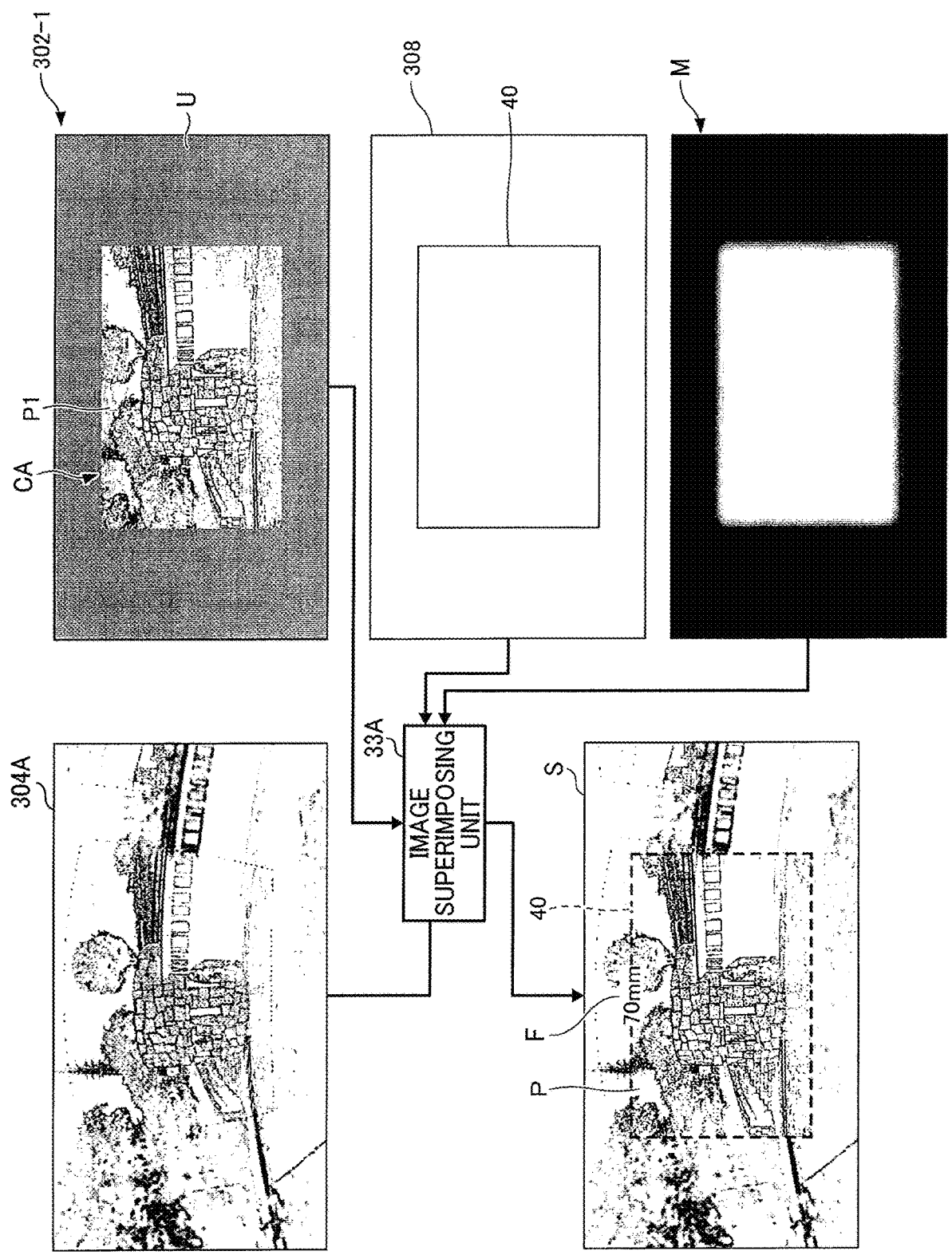

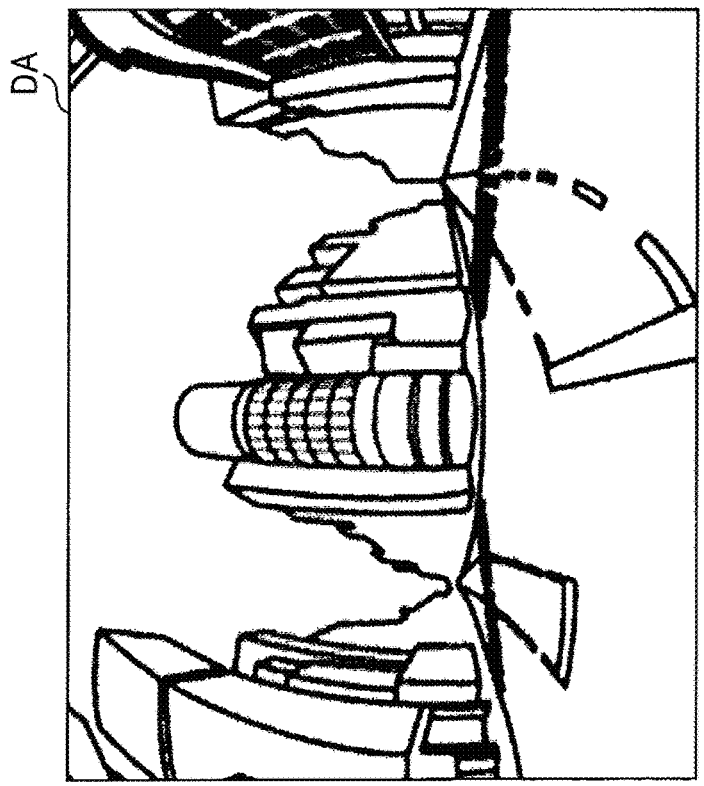
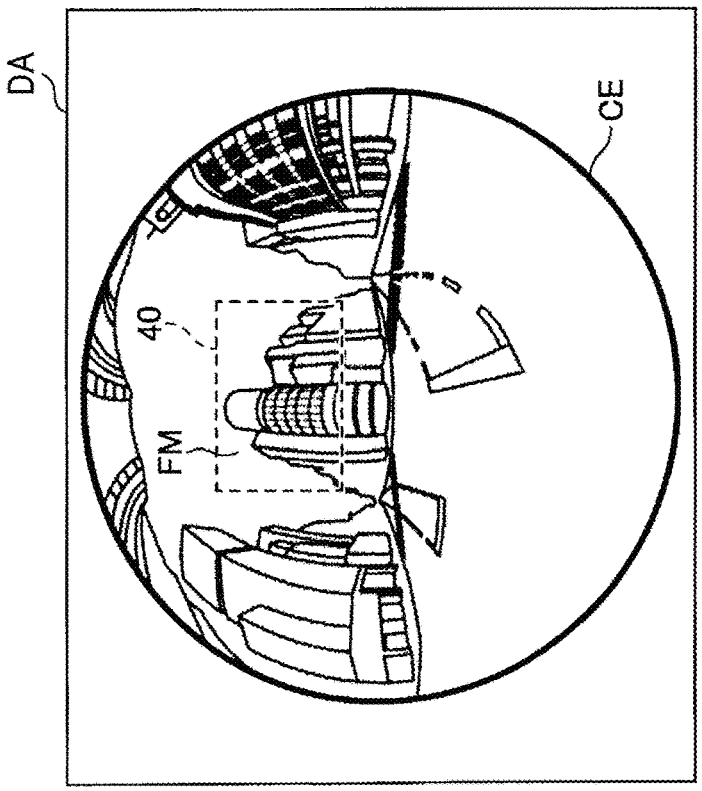

FIG. 68A
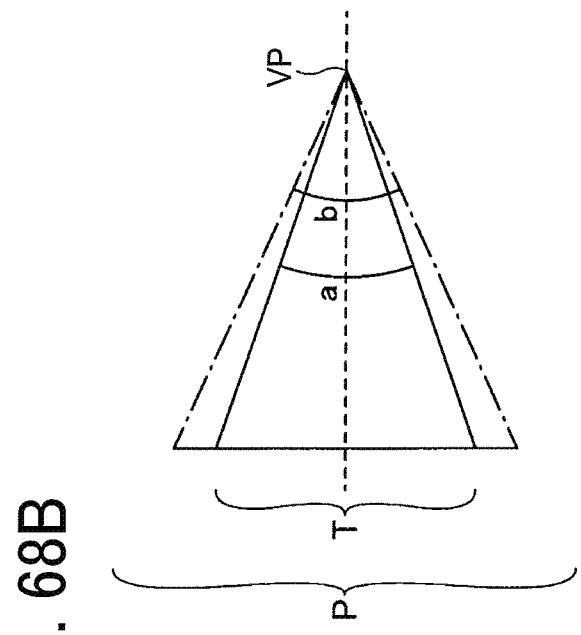
FIG. 68B
FIG. 68C
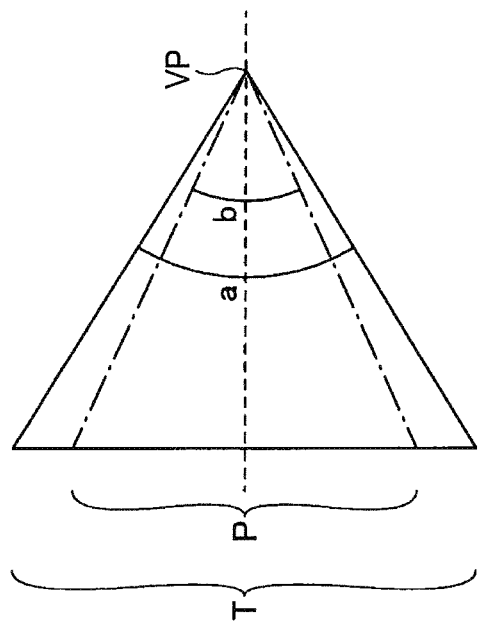
FIG. 68D
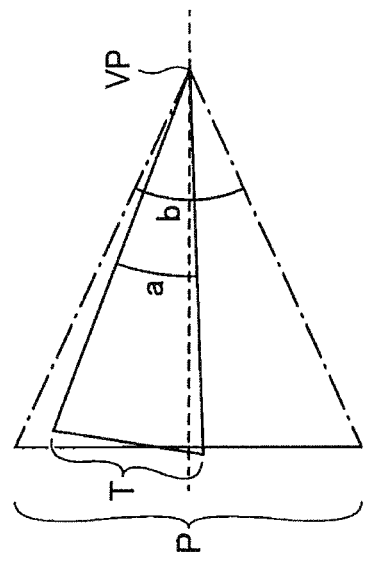

APPARATUS, SYSTEM, AND METHOD OF CONTROLLING DISPLAY, AND RECORDING MEDIUM

CROSS-REFERENCE TO RELATED APPLICATIONS

This patent application is based on and claims priority pursuant to 35 U.S.C. § 119(a) to Japanese Patent Application Nos. 2016-256575, filed on Dec. 28, 2016, 2016-256381, filed on Dec. 28, 2016, 2016-256382, filed on Dec. 28, 2016, 2017-206647, filed on Oct. 25, 2017, 2017-207635, filed on Oct. 26, 2017, 2017-245460, filed on Dec. 21, 2017, in the Japan Patent Office, the entire disclosure of which is hereby incorporated by reference herein.

BACKGROUND

Technical Field

The present invention relates to an apparatus, system, and method of controlling display, and a recording medium.

Description of the Related Art

The wide-angle image, taken with a wide-angle lens, is useful in capturing such as landscape, as the image tends to cover large areas. For example, there is an image capturing system, which captures a wide-angle image of a target object and its surroundings, and an enlarged image of the target object. The wide-angle image is combined with the enlarged image such that, even when a part of the wide-angle image showing the target object is enlarged, that part embedded with the enlarged image is displayed in high resolution.

On the other hand, a digital camera that captures two hemispherical images from which a 360-degree, spherical image is generated, has been proposed. Such digital camera generates an equirectangular projection image based on two hemispherical images, and transmits the equirectangular projection image to a communication terminal, such as a smart phone, for display to a user.

SUMMARY

Example embodiments of the present invention include an apparatus, system, and method for controlling display, each of which: obtains a first image and a second image, the second image being superimposed on the first image; controls a display to display an image of a predetermined area of the first image, such that the predetermined area of the first image matches a display area of the display; and in response to an instruction to start displaying the first image superimposed with the second image, controls the display to display the image of the predetermined area of the first image, such that the second image being superimposed on the first image is displayed within the predetermined area of the first image.

Example embodiments of the present invention include an image capturing system including the image processing apparatus, an image processing method, and a recording medium.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4A and FIG. 4B are views respectively illustrating the image in equirectangular projection covering a surface of a sphere, and a spherical image, according to an embodiment;

FIG. 17 is an illustration of a data structure of superimposed display metadata according to the first embodiment;

FIGS. 18A and 18B are conceptual diagrams respectively illustrating a plurality of grid areas in a second area, and a plurality of grid areas in a third area, according to the first embodiment;

FIGS. 21A and 21B are conceptual diagrams for describing determination of a peripheral area image, according to the first embodiment;

FIGS. 40A and 40B are an illustration of a data structure of superimposed display metadata in the second display example;

FIGS. 51A and 51B illustrate projection transformation of a planar image into a corresponding area, according to the eighth display example;

FIG. 51C illustrates one example of a location parameter for associating the planar image with the corresponding area, according to the eighth display example;

FIG. 55 is an exemplary diagram schematically illustrating superimposition of a projection-converted image, according to the eighth display example;

FIGS. 57A and 57B (FIG. 57) are an exemplary flowchart illustrating a procedure for the display apparatus to superimpose planar images on a spherical image in order of decreasing angle of view, according to the eighth display example;

FIG. 61 is an exemplary diagram illustrating a frame obtained through projection transformation, according to the eighth display example;

FIG. 62 is an exemplary diagram schematically illustrating superimposition of a frame, according to the eighth display example;

FIGS. 66A and 66B (FIG. 66) are exemplary diagrams illustrating how a spherical image is displayed, according to a ninth display example;

FIGS. 68A to 68D are exemplary diagrams illustrating the relative position of a planar image with respect to a predetermined area, according to the ninth display example;

Figure 1A:
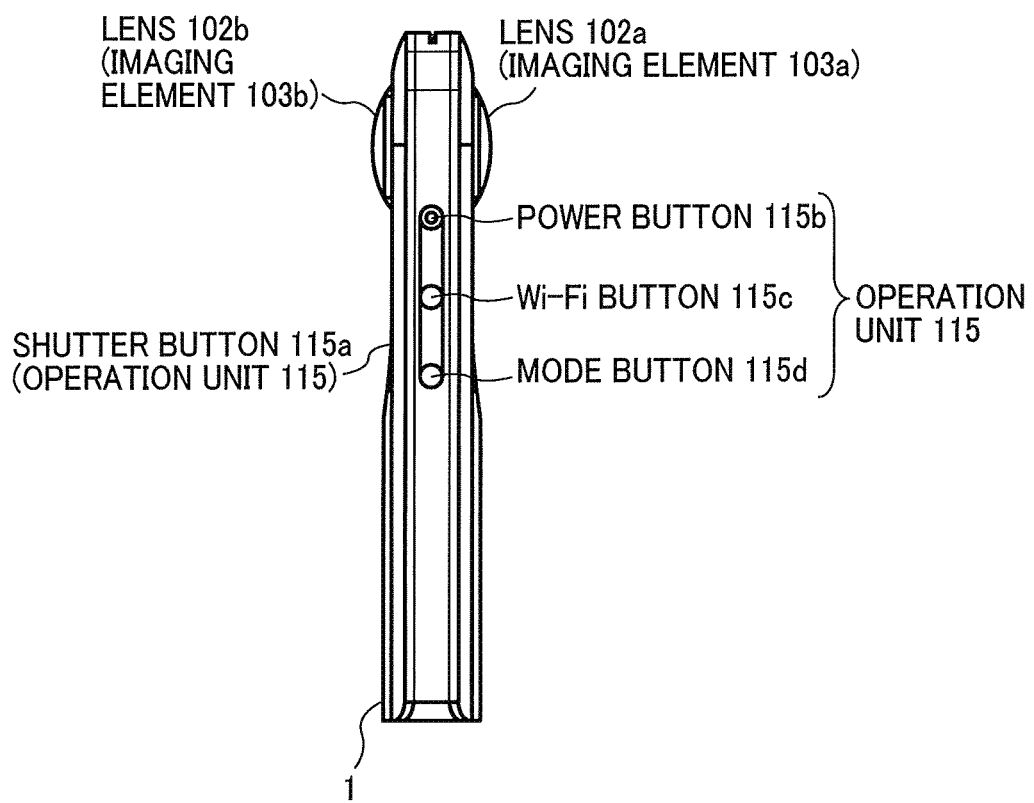
FIGS. 1A, 1B, 1C, and 1D (FIG. 1) are a left side view, a rear view, a plan view, and a bottom side view of a special image capturing device, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In this disclosure, a first image is an image superimposed with a second image, and a second image is an image to be superimposed on the first image. For example, the first image is an image covering an area larger than that of the second image. In another example, the first image and the second image are images expressed in different projections. In another example, the second image is an image with image quality higher than that of the first image, for example, in terms of image resolution. However, the definition of "high image quality" differs depending on the image, and therefore, may vary depending on the user's purpose of viewing. In general, "high image quality" means an image faithfully representing a scene. For example, "high image quality" means an image having a high resolution, a wide dynamic range, high color reproducibility, or less noise. Examples of the first image include a spherical image, an equirectangular projection image, and a low-definition image. Examples of the second image include a planar image, a perspective projection image, and a high-definition image.

Further, in this disclosure, the spherical image does not have to be the spherical image. For example, the spherical image may be the wide-angle view image having an angle of about 180 to 360 degrees in the horizontal direction. As described below, it is desirable that the spherical image is image data having at least a part that is not entirely displayed in the predetermined area T.

Referring to the drawings, embodiments of the present invention are described below.

First, referring to FIGS. 1 to 7, operation of generating a spherical image is described according to an embodiment.

First, referring to FIGS. 1A to 1D, an external view of a special-purpose (special) image capturing device 1, is described according to the embodiment. The special image capturing device 1 is a digital camera for capturing images from which a 360-degree spherical image is generated. FIGS. 1A to 1D are respectively a left side view, a rear view, a plan view, and a bottom view of the special image capturing device 1.

Figure 1B:
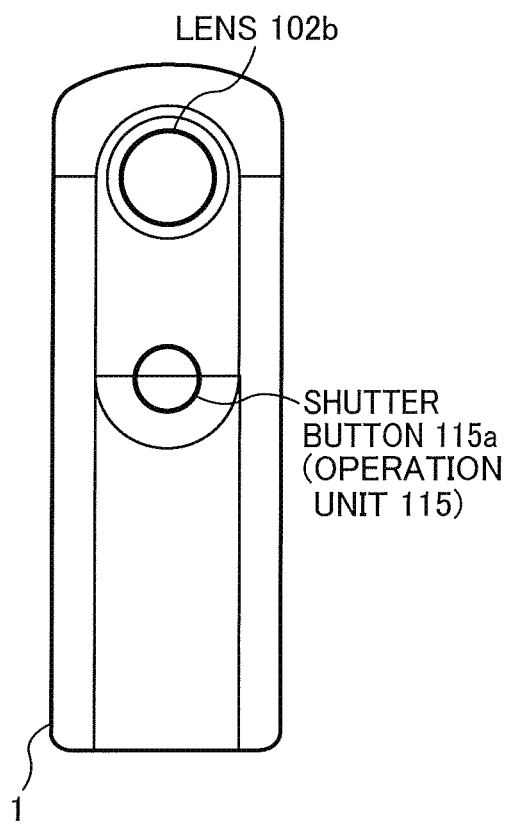
Figure 1C:
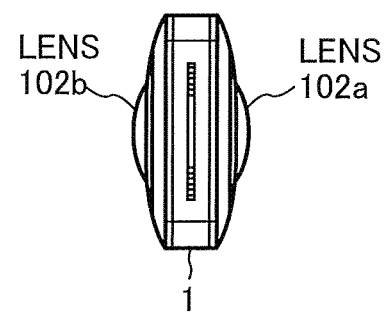

As illustrated in FIGS. 1A to 1D, the special image capturing device 1 has an upper part, which is provided with a fish-eye lens 102a on a front side (anterior side) thereof, and a fish-eye lens 102b on a back side (rear side) thereof. The special image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the special image capturing device 1 further includes a shutter button 115a on a rear side of the special image capturing device 1, which is opposite of the front side of the special image capturing device 1. As illustrated in FIG. 1A, the left side of the special image capturing device 1 is provided with a power button 115b, a Wireless Fidelity (Wi-Fi) button 115c, and an image capturing mode button 115d. Any one of the power button 115b and the Wi-Fi button 115c switches between ON and OFF, according to selection (pressing) by the user. The image capturing mode button 115d switches between a still-image capturing mode and a moving image capturing mode, according to selection (pressing) by the user. The shutter button 115a, power button 115b, Wi-Fi button 115c, and image capturing mode button 115d are a part of an operation unit 115. The operation unit 115 is any section that receives a user instruction, and is not limited to the above-described buttons or switches.

Figure 1D:
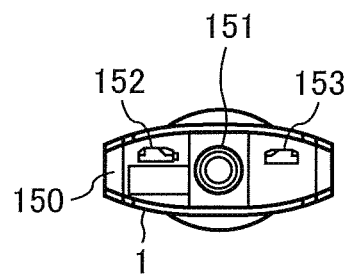

As illustrated in FIG. 1D, the special image capturing device 1 is provided with a tripod mount hole 151 at a center of its bottom face 150. The tripod mount hole 151 receives a screw of a tripod, when the special image capturing device 1 is mounted on the tripod. In this embodiment, the tripod mount hole 151 is where the generic image capturing device 3 is attached via an adapter 9, described later referring to FIG. 9. The bottom face 150 of the special image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Figure 2:
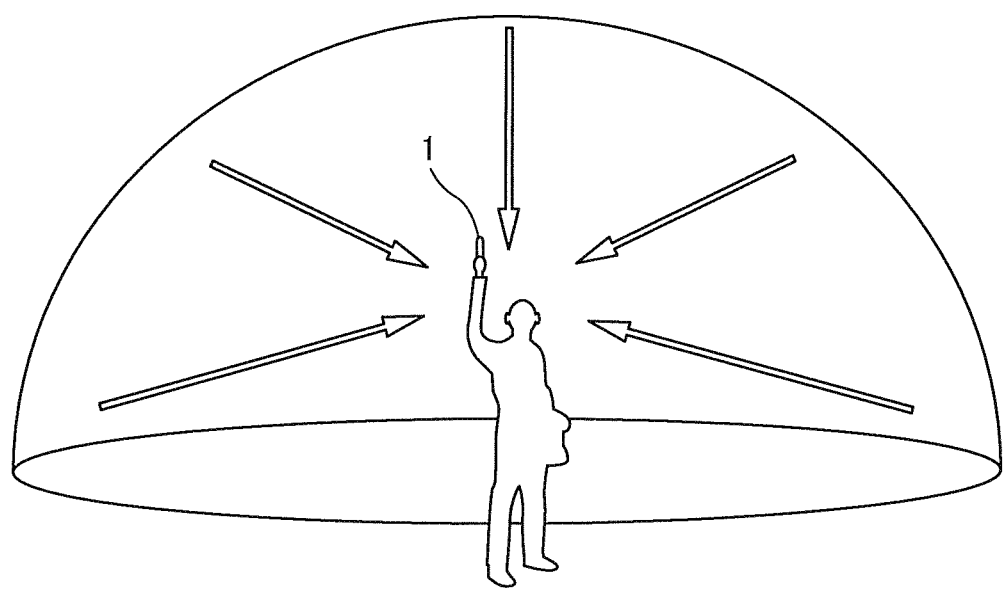
FIG. 2 is an illustration for explaining how a user uses the image capturing device, according to an embodiment.

Next, referring to FIG. 2, a description is given of a situation where the special image capturing device 1 is used. FIG. 2 illustrates an example of how the user uses the special image capturing device 1. As illustrated in FIG. 2, for example, the special image capturing device 1 is used for capturing objects surrounding the user who is holding the special image capturing device 1 in his or her hand. The imaging elements 103a and 103b illustrated in FIGS. 1A to 1D capture the objects surrounding the user to obtain two hemispherical images.

Figure 3A:
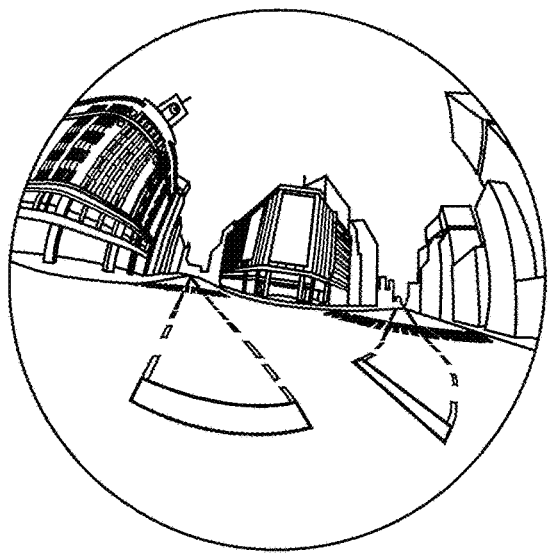
FIGS. 3A, 3B, and 3C are views illustrating a front side of a hemispherical image, a back side of the hemispherical image, and an image in equirectangular projection, respectively, captured by the image capturing device, according to an embodiment.
Figure 3B:
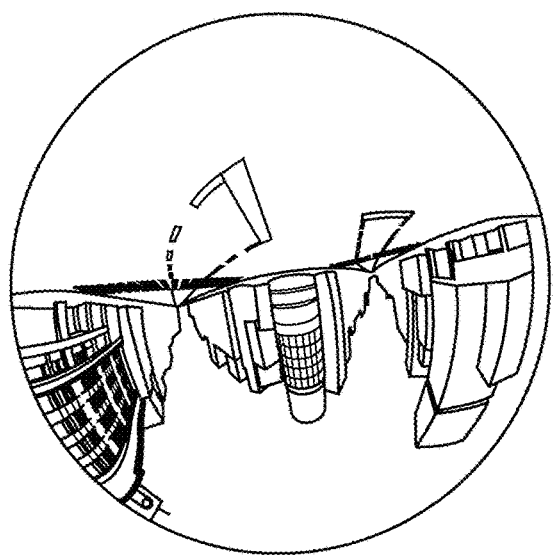
Figure 3C:
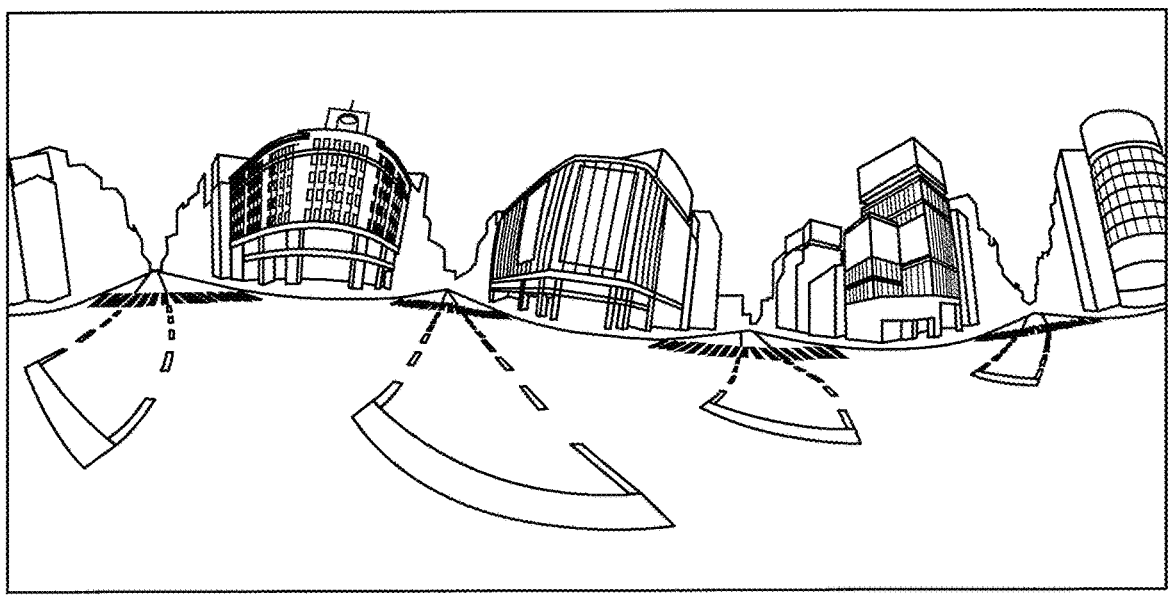

Next, referring to FIGS. 3A to 3C and FIGS. 4A and 4B, a description is given of an overview of an operation of generating an equirectangular projection image EC and a spherical image CE from the images captured by the special image capturing device 1. FIG. 3A is a view illustrating a hemispherical image (front side) captured by the special image capturing device 1. FIG. 3B is a view illustrating a hemispherical image (back side) captured by the special image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the special image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Figure 47:
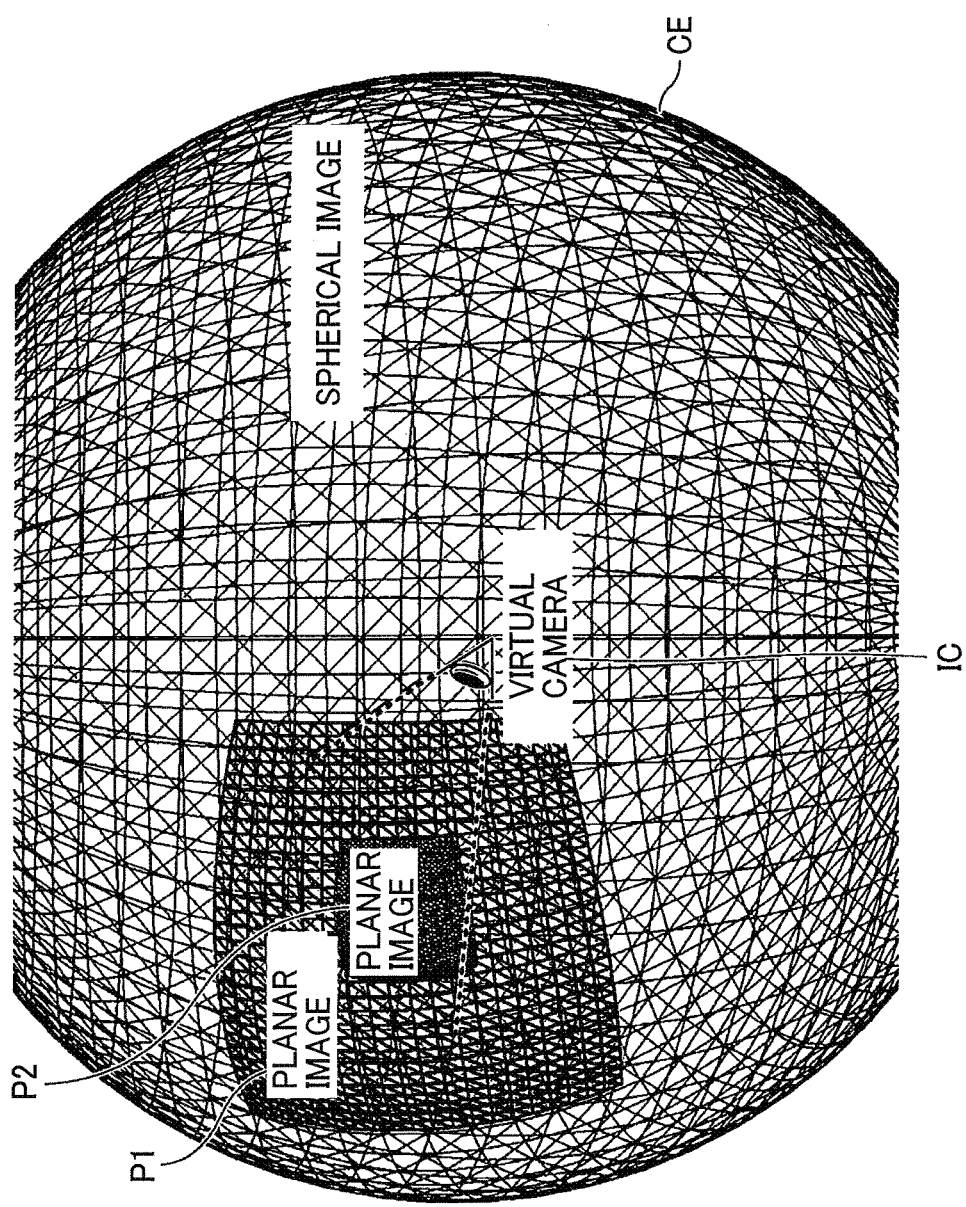
FIG. 47 is an exemplary diagram illustrating how a spherical image is displayed, according to an eighth display example.

In some embodiments, as illustrated in FIG. 47, a plurality of planar images P1 and P2 may be superimposed on the three-dimensional, spherical image CE. Using the location parameter, the smart phone 5 maps each planar image P on the spherical image CE, at the right longitude and latitude. When mapping, the smart phone 5 may render the image, without removing a hidden surface using the depth information (i.e., Z-buffer method). One may feel strange viewing the spherical image CE, because the spherical image CE is an image mapped to the sphere surface. As illustrated in FIG. 4B, a part of the image may be distorted.

To resolve this strange feeling, an image of a predetermined area, which is a part of the spherical image CE, is displayed as a flat image having fewer curves. The predetermined area is, for example, a part of the spherical image CE that is viewable by the user when displayed on a display. In this disclosure, the image of the predetermined area is referred to as a "predetermined-area image" Q. Hereinafter, a description is given of displaying the predetermined-area image Q with reference to FIG. 5 and FIGS. 6A and 6B.

Figure 5:
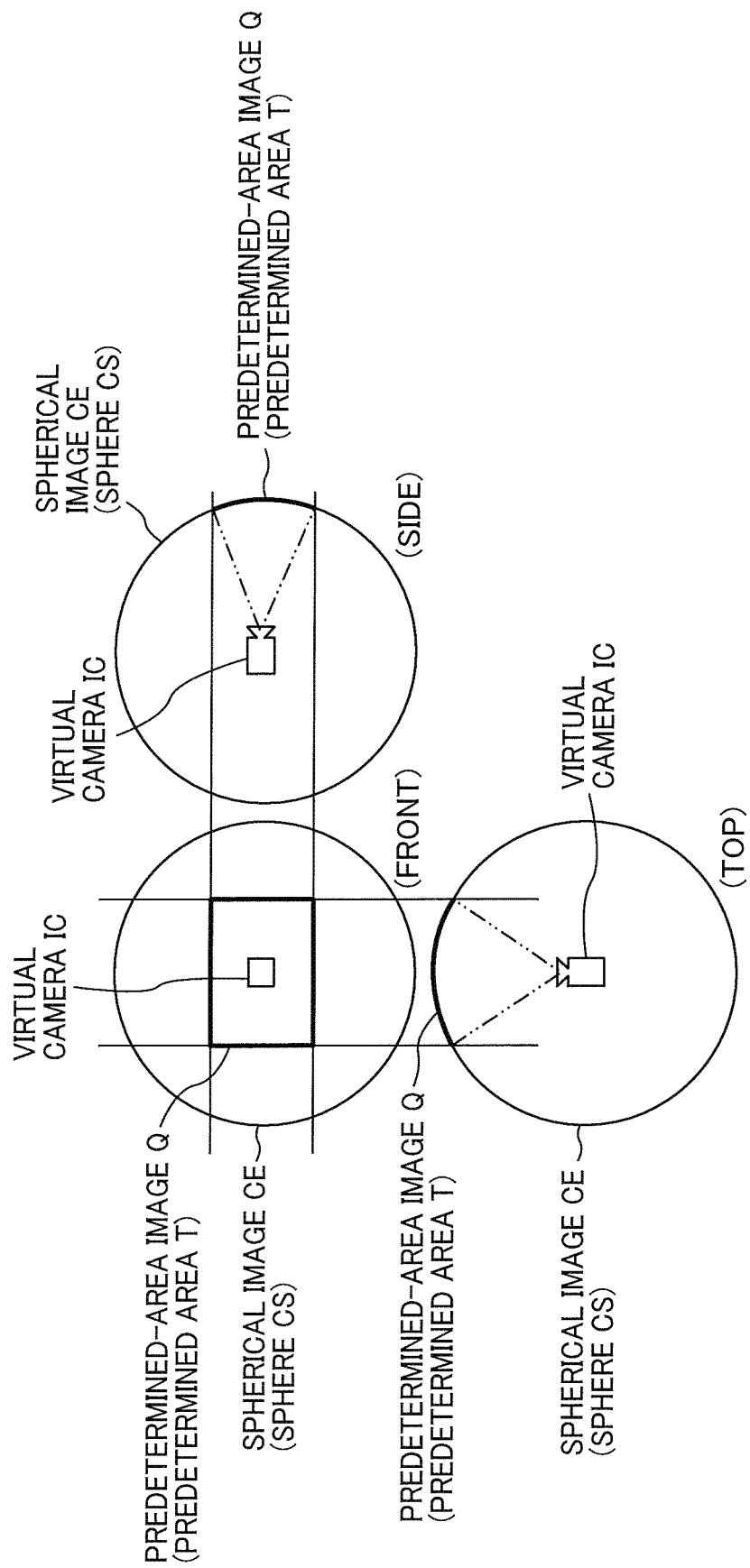
FIG. 5 is a view illustrating positions of a virtual camera and a predetermined area in a case in which the spherical image is represented as a three-dimensional solid sphere according to an embodiment.
Figure 6A:
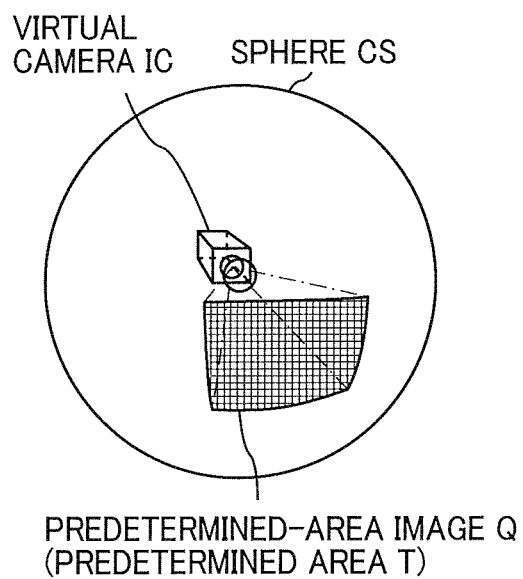
FIGS. 6A and 6B are respectively a perspective view of FIG. 5, and a view illustrating an image of the predetermined area on a display, according to an embodiment.
Figure 6B:
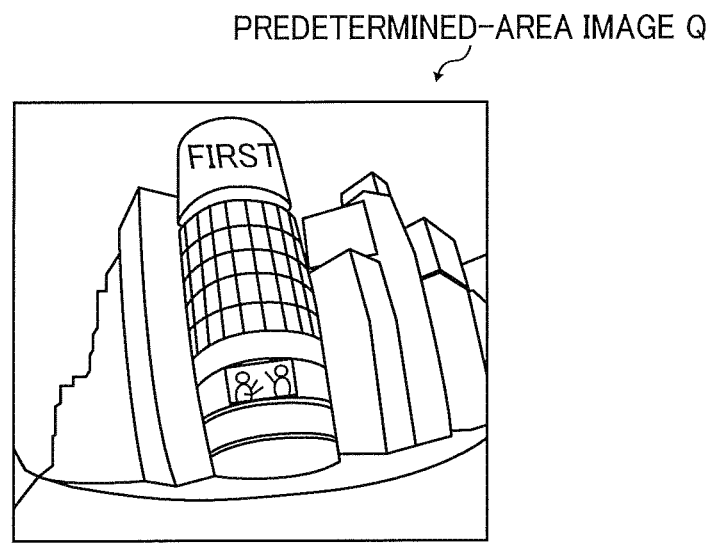

FIG. 5 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is inside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. The following explains the position of the virtual camera IC, using an imaging direction (ea, aa) and an angle of view α of the virtual camera IC.

Figure 7:
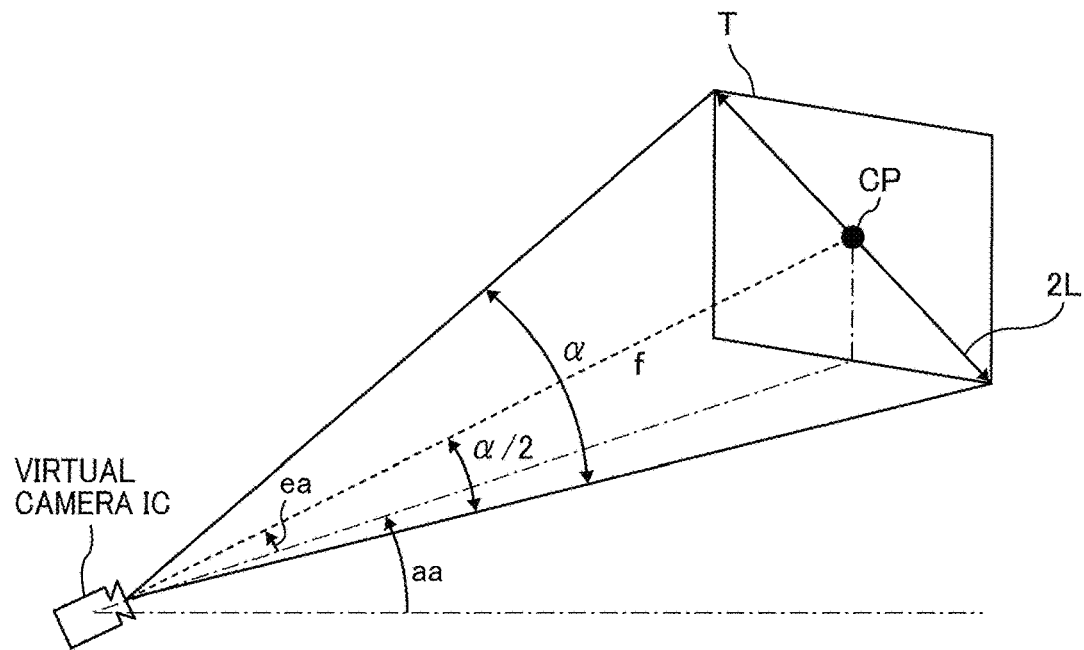
FIG. 7 is a view illustrating a relation between predetermined-area information and a predetermined-area image according to an embodiment.

Referring to FIG. 7, a relation between the predetermined-area information and the image of the predetermined area T is described according to the embodiment. FIG. 7 is a view illustrating a relation between the predetermined-area information and the image of the predetermined area T. As illustrated in FIG. 7, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. "L" denotes a distance between the central point CP and a given vertex of the predetermined area T (2L is a diagonal line). In FIG. 7, a trigonometric function equation generally expressed by the following Equation 1 is satisfied.

$$L/f = \tan(\alpha/2) \quad \text{(Equation 1)}$$

First Embodiment

Referring to FIGS. 8 to 30D, the image capturing system according to a first embodiment of the present invention is described.

<Overview of Image Capturing System>

Figure 8:
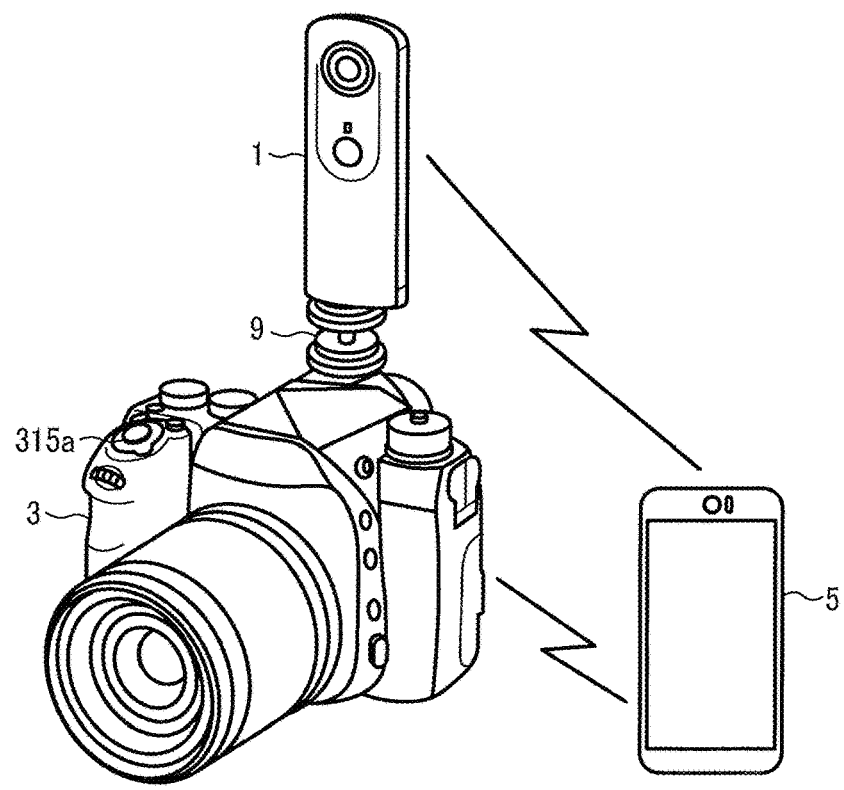
FIG. 8 is a schematic view illustrating an image capturing system according to a first embodiment.

First, referring to FIG. 8, an overview of the image capturing system is described according to the first embodiment. FIG. 8 is a schematic diagram illustrating a configuration of the image capturing system according to the embodiment.

As illustrated in FIG. 8, the image capturing system includes the special image capturing device 1, a general-purpose (generic) capturing device 3, a smart phone 5, and an adapter 9. The special image capturing device 1 is connected to the generic image capturing device 3 via the adapter 9.

The special image capturing device 1 is a special digital camera, which captures an image of an object or surroundings such as scenery to obtain two hemispherical images, from which a spherical (panoramic) image is generated, as described above referring to FIGS. 1 to 7.

The generic image capturing device 3 is a digital single-lens reflex camera, however, it may be implemented as a compact digital camera.

For example, the generic image capturing device 3 is provided with the image capturing element capable of processing an image with higher resolutions (a larger number of image pixels per an imaging angle of view), compared to the special image capturing device 1. The generic image capturing device 3 is able to optimize various image capturing conditions (exposure time, shutter speed, white balance, etc.), for an imaging area that is smaller than that of the special image capturing device 1. Accordingly, the generic image capturing device 3 is able to capture the high-quality, planar image. Examples of the generic image capturing device 3 include, but not limited to, an image capturing device capable of capturing images with a focal length of 35 mm or more on a 35-mm-film basis, and an image capturing device capable of capturing wide-angle images corresponding to about 24 mm to 35 mm.

The generic image capturing device 3 may be a digital still camera, or a digital video camera. Other examples of the generic image capturing device 3 include a smart phone, tablet, personal digital assistant (PDA) device, a wearable PC, each having a built-in camera. The generic image capturing device 3 is provided with a shutter button 315a, which is a part of an operation unit 315 described below.

The smart phone 5 is wirelessly communicable with the special image capturing device 1 and the generic image capturing device 3 using near-distance wireless communication, such as Wi-Fi, Bluetooth (Registered Trademark), and Near Field Communication (NFC). The smart phone 5 is capable of displaying the images obtained respectively from the special image capturing device 1 and the generic image capturing device 3, on a display 517 provided for the smart phone 5 as described below.

The smart phone 5 may communicate with the special image capturing device 1 and the generic image capturing device 3, without using the near-distance wireless communication, but using wired communication such as a cable. The smart phone 5 is an example of an image processing apparatus capable of processing images being captured. Other examples of the image processing apparatus include, but not limited to, a tablet personal computer (PC), a note PC, a desktop PC, and a PDA. Other examples of the image processing apparatus include, but not limited to, a multifunction peripheral, a projector, and a video conference terminal, each having image processing functions.

The smart phone 5 is wirelessly communicable with the special image capturing device 1 and the generic image capturing device 3 using near-distance wireless communication, such as Wi-Fi, Bluetooth (Registered Trademark), and Near Field Communication (NFC). The smart phone 5 is capable of displaying the images obtained respectively from the special image capturing device 1 and the generic image capturing device 3, on a display 517 provided for the smart phone 5 as described below.

The smart phone 5 may communicate with the special image capturing device 1 and the generic image capturing device 3, without using the near-distance wireless communication, but using wired communication such as a cable. The smart phone 5 is an example of an image processing apparatus capable of processing images being captured. Other examples of the image processing apparatus include, but not limited to, a tablet personal computer (PC), a note PC, and a desktop PC. The smart phone 5 may operate as a communication terminal described below.

Figure 9:
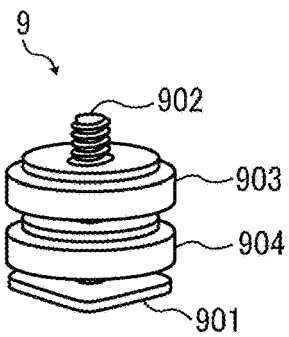
FIG. 9 is a perspective view illustrating an adapter, according to the first embodiment.

FIG. 9 is a perspective view illustrating the adapter 9 according to the embodiment. As illustrated in FIG. 9, the adapter 9 includes a shoe adapter 901, a bolt 902, an upper adjuster 903, and a lower adjuster 904. The shoe adapter 901 is attached to an accessory shoe of the generic image capturing device 3 as it slides. The bolt 902 is provided at a center of the shoe adapter 901, which is to be screwed into the tripod mount hole 151 of the special image capturing device 1. The bolt 902 is provided with the upper adjuster 903 and the lower adjuster 904, each of which is rotatable around the central axis of the bolt 902. The upper adjuster 903 secures the object attached with the bolt 902 (such as the special image capturing device 1). The lower adjuster 904 secures the object attached with the shoe adapter 901 (such as the generic image capturing device 3).

Figure 10:
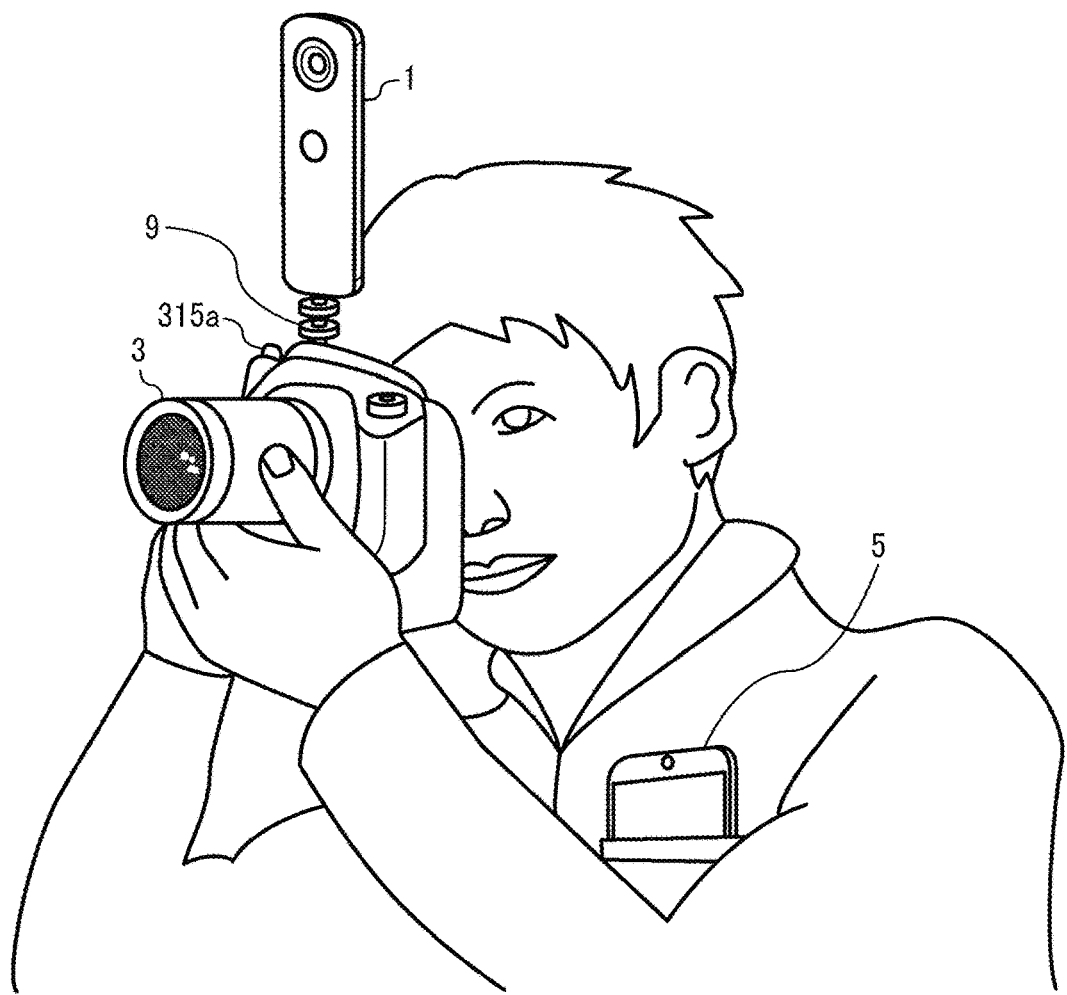
FIG. 10 illustrates how a user uses the image capturing system, according to the first embodiment.

FIG. 10 illustrates how a user uses the image capturing device, according to the embodiment. As illustrated in FIG. 10, the user puts his or her smart phone 5 into his or her pocket. The user captures an image of an object using the generic image capturing device 3 to which the special image capturing device 1 is attached by the adapter 9. While the smart phone 5 is placed in the pocket of the user's shirt, the smart phone 5 may be placed in any area as long as it is wirelessly communicable with the special image capturing device 1 and the generic image capturing device 3.

More specifically, in example operation, the planar image P captured by the generic image capturing device 3 is superimposed on the spherical image CE captured by the special image capturing device 1, when displayed on the smart phone 5. Accordingly, the spherical image CE, which tends to be blurred when enlarged, can be complemented by the planar image P, which is an image of high image quality.

The special image capturing device 1, the generic image capturing device 3, and the smart phone 5 are communicable with one another using such as USB, Bluetooth (Registered Trademark), and wireless LAN. In one example, the spherical image CE captured by the special image capturing device 1 is transmitted to the smart phone 5. The planar image P captured by the image capturing device 3 is transmitted to the smart phone 5. Alternatively, the smart phone 5 may read any one of the spherical image CE and the planar image P from any desired memory.

In this disclosure, it is assumed that the smart phone 5 automatically selects the spherical image CE and the planar image P to be processed for superimposition. Alternatively, the smart phone 5 may allow the user to select the spherical image CE and the planar image P to be processed.

Hardware Configuration

Figure 11:
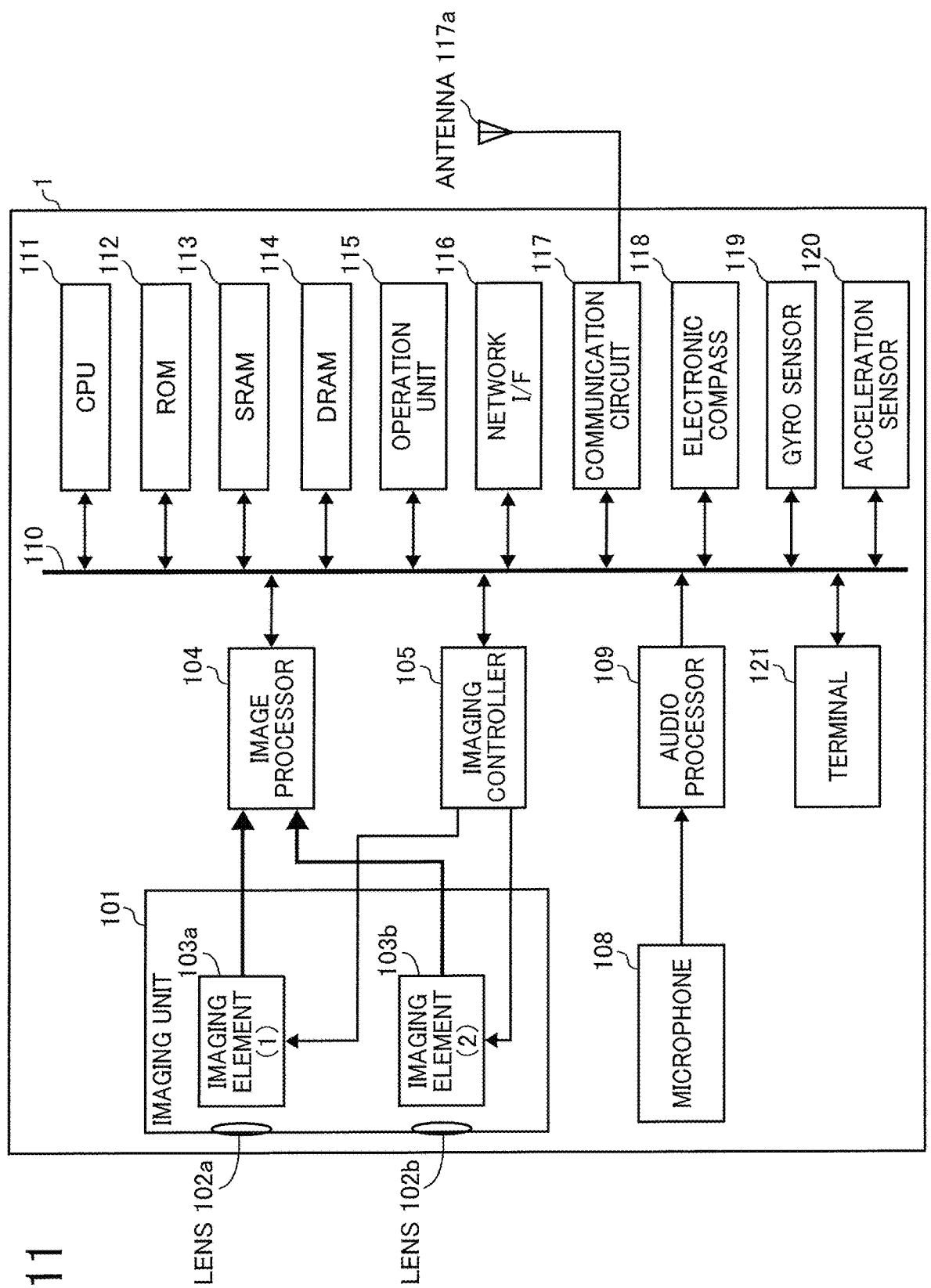
FIG. 11 is a schematic block diagram illustrating a hardware configuration of a special-purpose image capturing device according to the first embodiment.
Figure 12:
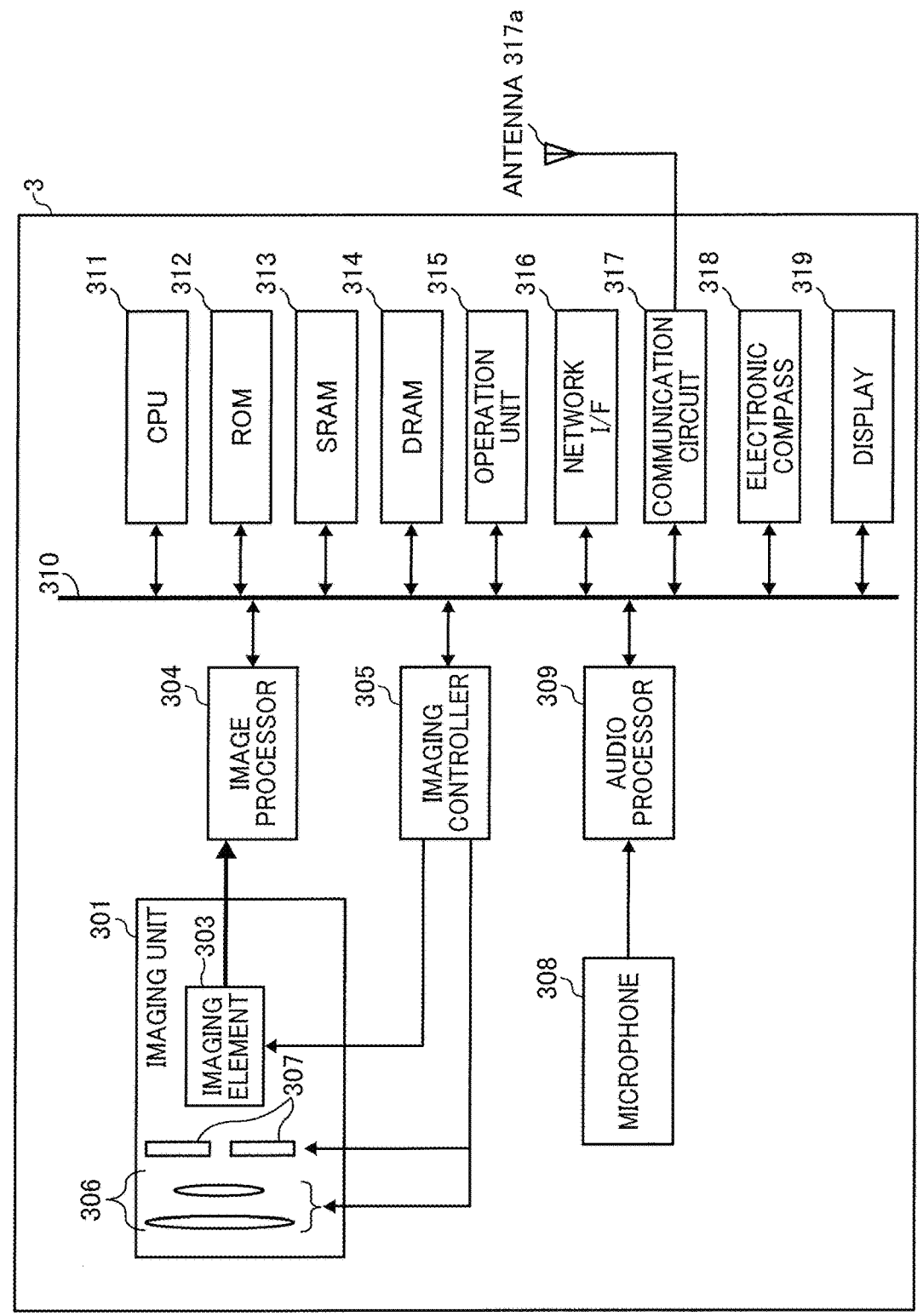
FIG. 12 is a schematic block diagram illustrating a hardware configuration of a general-purpose image capturing device according to the first embodiment.
Figure 13:
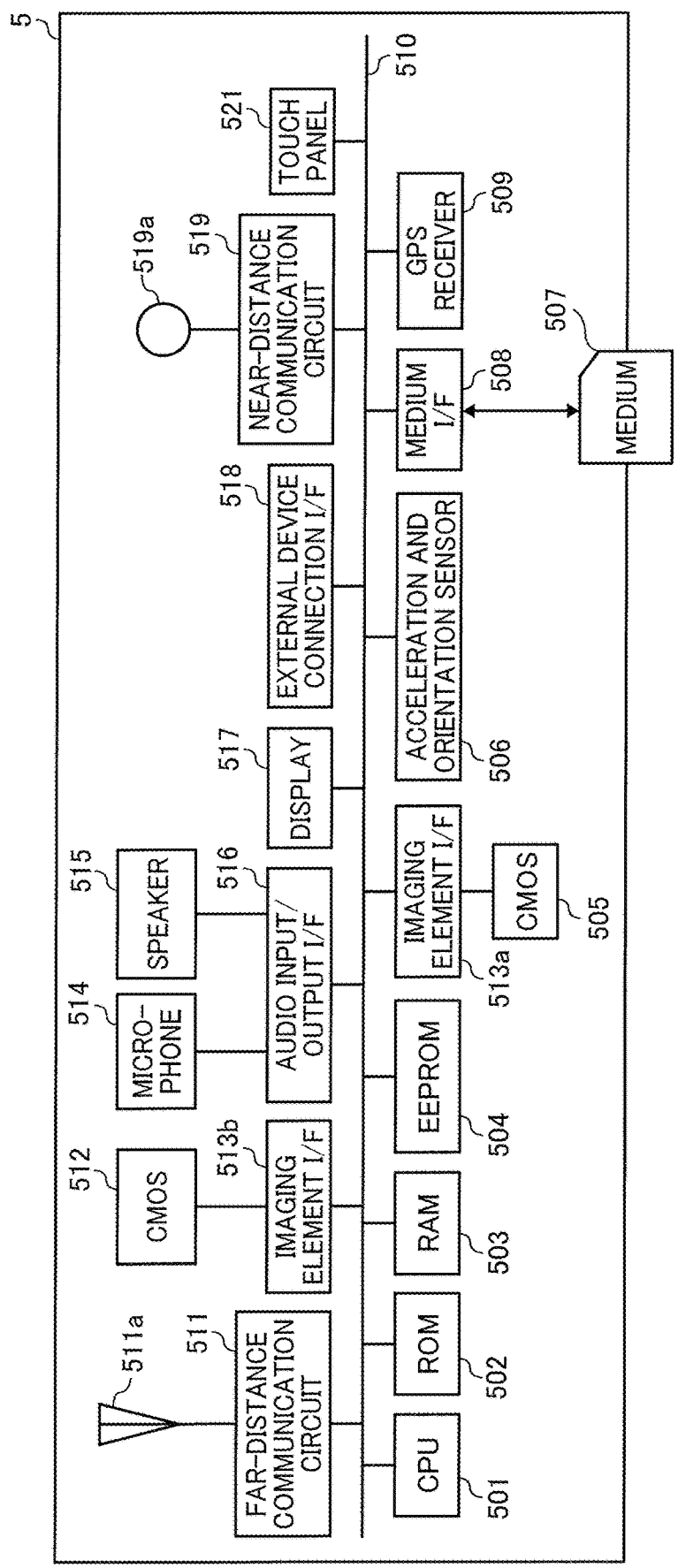
FIG. 13 is a schematic block diagram illustrating a hardware configuration of a smart phone, according to the first embodiment.

Next, referring to FIGS. 11 to 13, hardware configurations of the special image capturing device 1, generic image capturing device 3, and smart phone 5 are described according to the embodiment.

<Hardware Configuration of Special Image Capturing Device>

First, referring to FIG. 11, a hardware configuration of the special image capturing device 1 is described according to the embodiment. FIG. 11 illustrates the hardware configuration of the special image capturing device 1. The following describes a case in which the special image capturing device 1 is a spherical (omnidirectional) image capturing device having two imaging elements. However, the special image capturing device 1 may include any suitable number of imaging elements, providing that it includes at least two imaging elements. In addition, the special image capturing device 1 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the special image capturing device 1.

As illustrated in FIG. 11, the special image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, an acceleration sensor 120, and a Micro USB terminal 121.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, the electronic compass 118, and the terminal 121 are also connected to the bus 110. The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when the shutter button 115a of the operation unit 115 is pressed. In some cases, the special image capturing device 1 is capable of displaying a preview image on a display (e.g., the display of the smart phone 5) or displaying a moving image (movie). In case of displaying movie, the image data are continuously output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the special image capturing device 1 does not include a display in this embodiment, the special image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the special image capturing device 1, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the special image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 5 via the network I/F 116, at any desired time.

The communication circuit 117 communicates data with the external device such as the smart phone 5 via the antenna 117a of the special image capturing device 1 by near-distance wireless communication such as Wi-Fi, NFC, and Bluetooth. The communication circuit 117 is also capable of transmitting the data of equirectangular projection image to the external device such as the smart phone 5.

The electronic compass 118 calculates an orientation of the special image capturing device 1 from the Earth's magnetism to output orientation information. This orientation information is an example of related information, which is metadata described in compliance with Exif. This information is used for image processing such as image correction of captured images. The related information also includes a date and time when the image is captured by the special image capturing device 1, and a size of the image data.

The gyro sensor 119 detects the change in tilt of the special image capturing device 1 (roll, pitch, yaw) with movement of the special image capturing device 1. The change in angle is one example of related information (metadata) described in compliance with Exif. This information is used for image processing such as image correction of captured images.

The acceleration sensor 120 detects acceleration in three axial directions. The position (an angle with respect to the direction of gravity) of the special image capturing device 1 is determined, based on the detected acceleration. With the gyro sensor 119 and the acceleration sensor 120, accuracy in image correction improves.

The Micro USB terminal 121 is a connector to be connected with such as a Micro USB cable, or other electronic device.

<Hardware Configuration of Generic Image Capturing Device>

Next, referring to FIG. 12, a hardware configuration of the generic image capturing device 3 is described according to the embodiment. FIG. 12 illustrates the hardware configuration of the generic image capturing device 3. As illustrated in FIG. 12, the generic image capturing device 3 includes an imaging unit 301, an image processor 304, an imaging controller 305, a microphone 308, an audio processor 309, a bus 310, a CPU 311, a ROM 312, a SRAM 313, a DRAM 314, an operation unit 315, a network I/F 316, a communication circuit 317, an antenna 317a, an electronic compass 318, and a display 319. The image processor 304 and the imaging controller 305 are each connected to the CPU 311 via the bus 310.

The elements 304, 310, 311, 312, 313, 314, 315, 316, 317, 317a, and 318 of the generic image capturing device 3 are substantially similar in structure and function to the elements 104, 110, 111, 112, 113, 114, 115, 116, 117, 117a, and 118 of the special image capturing device 1, such that the description thereof is omitted.

Further, as illustrated in FIG. 12, in the imaging unit 301 of the generic image capturing device 3, a lens unit 306 having a plurality of lenses, a mechanical shutter button 307, and the imaging element 303 are disposed in this order from a side facing the outside (that is, a side to face the object to be captured).

The imaging controller 305 is substantially similar in structure and function to the imaging controller 105. The imaging controller 305 further controls operation of the lens unit 306 and the mechanical shutter button 307, according to user operation input through the operation unit 315.

The display 319 is capable of displaying an operational menu, an image being captured, or an image that has been captured, etc.

<Hardware Configuration of Smart Phone>

Referring to FIG. 13, a hardware configuration of the smart phone 5 is described according to the embodiment.

FIG. 13 illustrates the hardware configuration of the smart phone 5. As illustrated in FIG. 13, the smart phone 5 includes a CPU 501, a ROM 502, a RAM 503, an EEPROM 504, a Complementary Metal Oxide Semiconductor (CMOS) sensor 505, an imaging element I/F 513a, an acceleration and orientation sensor 506, a medium I/F 508, and a GPS receiver 509.

The CPU 501 controls entire operation of the smart phone 5. The ROM 502 stores a control program for controlling the CPU 501 such as an IPL. The RAM 503 is used as a work area for the CPU 501. The EEPROM 504 reads or writes various data such as a control program for the smart phone 5 under control of the CPU 501. The CMOS sensor 505 captures an object (for example, the user operating the smart phone 5) under control of the CPU 501 to obtain captured image data. The imaging element 1/F 513a is a circuit that controls driving of the CMOS sensor 505. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The smart phone 5 further includes a far-distance communication circuit 511, an antenna 511a for the far-distance communication circuit 511, a CMOS sensor 512, an imaging element I/F 513b, a microphone 514, a speaker 515, an audio input/output I/F 516, a display 517, an external device connection I/F 518, a near-distance communication circuit 519, an antenna 519a for the near-distance communication circuit 519, and a touch panel 521.

The far-distance communication circuit 511 is a circuit that communicates with other device through the communication network 100. The CMOS sensor 512 is an example of a built-in imaging device capable of capturing a subject under control of the CPU 501. The imaging element 1/F 513a is a circuit that controls driving of the CMOS sensor 512. The microphone 514 is an example of built-in audio collecting device capable of inputting audio under control of the CPU 501. The audio I/O I/F 516 is a circuit for inputting or outputting an audio signal between the microphone 514 and the speaker 515 under control of the CPU 501. The display 517 may be a liquid crystal or organic electro luminescence (EL) display that displays an image of a subject, an operation icon, or the like. The external device connection I/F 518 is an interface circuit that connects the smart phone 5 to various external devices. The near-distance communication circuit 519 is a communication circuit that communicates in compliance with the Wi-Fi, NFC, Bluetooth, and the like. The touch panel 521 is an example of input device that enables the user to input a user instruction through touching a screen of the display 517.

The smart phone 5 further includes a bus line 510. Examples of the bus line 510 include an address bus and a data bus, which electrically connects the elements such as the CPU 501.

It should be noted that a recording medium such as a CD-ROM or HD storing any of the above-described programs may be distributed domestically or overseas as a program product.

Figure 14:
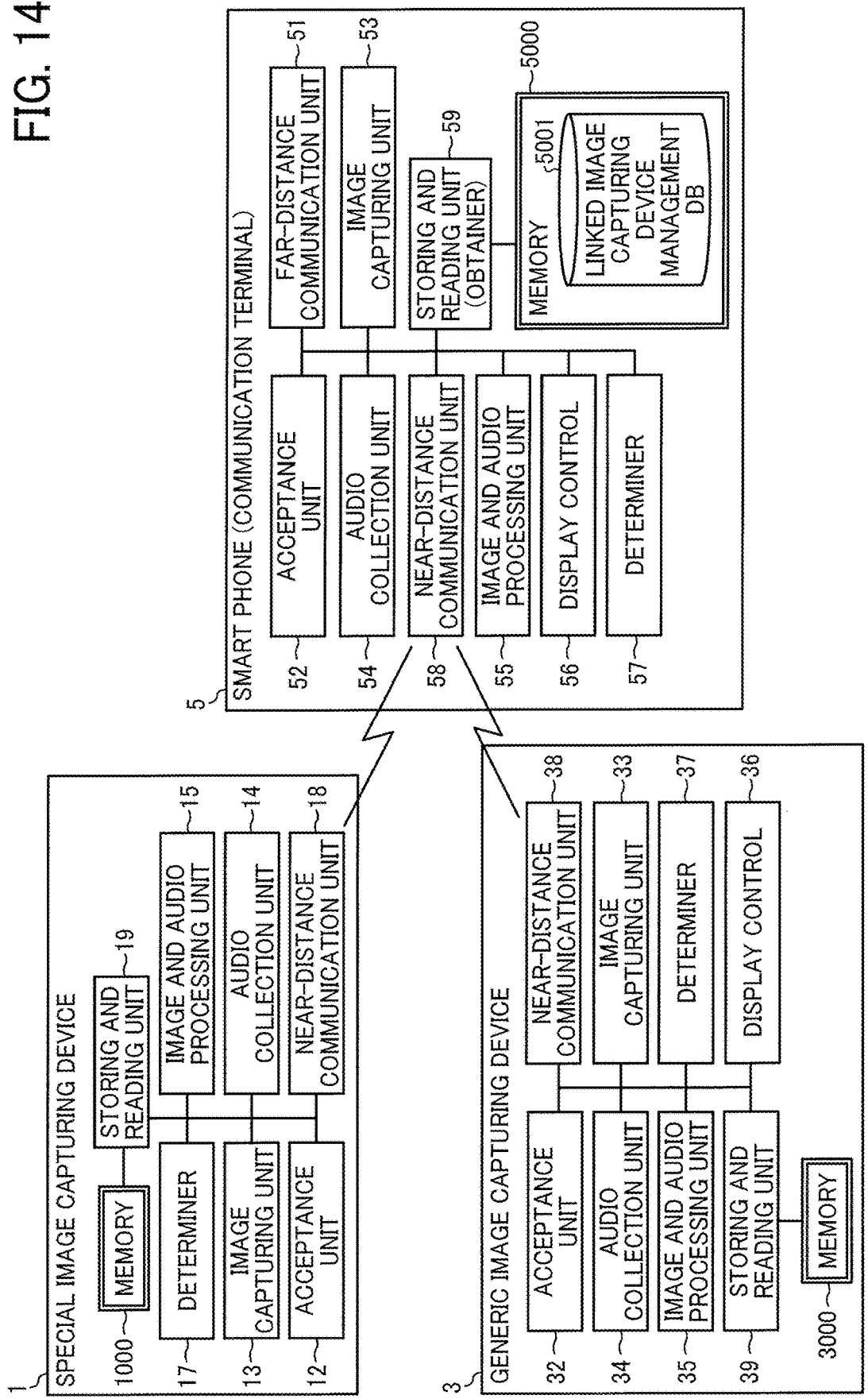
FIG. 14 is a functional block diagram of the image capturing system according to the first embodiment.

<Functional Configuration of Image Capturing System>
Referring now to FIGS. 11 to 14, a functional configuration of the image capturing system is described according to the embodiment. FIG. 14 is a schematic block diagram illustrating functional configurations of the special image capturing device 1, generic image capturing device 3, and smart phone 5, in the image capturing system, according to the embodiment.

<Functional Configuration of Special Image Capturing Device>
Referring to FIGS. 11 and 14, a functional configuration of the special image capturing device 1 is described according to the embodiment. As illustrated in FIG. 14, the special image capturing device 1 includes an acceptance unit 12, an image capturing unit 13, an audio collection unit 14, an image and audio processing unit 15, a determiner 17, a near-distance communication unit 18, and a storing and reading unit 19. These units are functions that are implemented by or that are caused to function by operating any of the elements illustrated in FIG. 11 in cooperation with the instructions of the CPU 111 according to the special image capturing device control program expanded from the SRAM 113 to the DRAM 114.

The special image capturing device 1 further includes a memory 1000, which is implemented by the ROM 112, the SRAM 113, and the DRAM 114 illustrated in FIG. 11.

Still referring to FIGS. 11 and 14, each functional unit of the special image capturing device 1 is described according to the embodiment.

The acceptance unit 12 of the special image capturing device 1 is implemented by the operation unit 115 illustrated in FIG. 11, which operates under control of the CPU 111. The acceptance unit 12 receives an instruction input from the operation unit 115 according to a user operation.

The image capturing unit 13 is implemented by the imaging unit 101, the image processor 104, and the imaging controller 105, illustrated in FIG. 11, each operating under control of the CPU 111. The image capturing unit 13 captures an image of the object or surroundings to obtain captured image data. As the captured image data, the two hemispherical images, from which the spherical image is generated, are obtained as illustrated in FIGS. 3A and 3B.

The audio collection unit 14 is implemented by the microphone 108 and the audio processor 109 illustrated in FIG. 11, each of which operates under control of the CPU 111. The audio collection unit 14 collects sounds around the special image capturing device 1.

The image and audio processing unit 15 is implemented by the instructions of the CPU 111, illustrated in FIG. 11. The image and audio processing unit 15 applies image processing to the captured image data obtained by the image capturing unit 13. The image and audio processing unit 15 applies audio processing to audio obtained by the audio collection unit 14. For example, the image and audio processing unit 15 generates data of the equirectangular projection image (FIG. 3C), using two hemispherical images (FIGS. 3A and 3B) respectively obtained by the imaging elements 103a and 103b.

The determiner 17, which is implemented by instructions of the CPU 111, performs various determinations.

The near-distance communication unit 18, which is implemented by instructions of the CPU 111, and the communication circuit 117 with the antenna 117a, communicates data with a near-distance communication unit 58 of the smart phone 5 using the near-distance wireless communication in compliance with such as Wi-Fi.

The storing and reading unit 19, which is implemented by instructions of the CPU 111 illustrated in FIG. 11, stores various data or information in the memory 1000 or reads out various data or information from the memory 1000.

<Functional Configuration of Generic Image Capturing Device>

Next, referring to FIGS. 12 and 14, a functional configuration of the generic image capturing device 3 is described according to the embodiment. As illustrated in FIG. 14, the generic image capturing device 3 includes an acceptance unit 32, an image capturing unit 33, an audio collection unit 34, an image and audio processing unit 35, a display control 36, a determiner 37, a near-distance communication unit 38, and a storing and reading unit 39. These units are functions that are implemented by or that are caused to function by operating any of the elements illustrated in FIG. 12 in cooperation with the instructions of the CPU 311 according to the image capturing device control program expanded from the SRAM 313 to the DRAM 314.

The generic image capturing device 3 further includes a memory 3000, which is implemented by the ROM 312, the SRAM 313, and the DRAM 314 illustrated in FIG. 12.

The acceptance unit 32 of the generic image capturing device 3 is implemented by the operation unit 315 illustrated in FIG. 12, which operates under control of the CPU 311. The acceptance unit 32 receives an instruction input from the operation unit 315 according to a user operation.

The image capturing unit 33 is implemented by the imaging unit 301, the image processor 304, and the imaging controller 305, illustrated in FIG. 12, each of which operates under control of the CPU 311. The image capturing unit 13 captures an image of the object or surroundings to obtain captured image data. In this example, the captured image data is planar image data, captured with a perspective projection method.

The audio collection unit 34 is implemented by the microphone 308 and the audio processor 309 illustrated in FIG. 12, each of which operates under control of the CPU 311. The audio collection unit 34 collects sounds around the generic image capturing device 3.

The image and audio processing unit 35 is implemented by the instructions of the CPU 311, illustrated in FIG. 12. The image and audio processing unit 35 applies image processing to the captured image data obtained by the image capturing unit 33. The image and audio processing unit 35 applies audio processing to audio obtained by the audio collection unit 34.

The display control 36, which is implemented by the instructions of the CPU 311 illustrated in FIG. 12, controls the display 319 to display a planar image P based on the captured image data that is being captured or that has been captured.

The determiner 37, which is implemented by instructions of the CPU 311, performs various determinations. For example, the determiner 37 determines whether the shutter button 315a has been pressed by the user.

The near-distance communication unit 38, which is implemented by instructions of the CPU 311, and the communication circuit 317 with the antenna 317a, communicates data with the near-distance communication unit 58 of the smart phone 5 using the near-distance wireless communication in compliance with such as Wi-Fi.

The storing and reading unit 39, which is implemented by instructions of the CPU 311 illustrated in FIG. 12, stores various data or information in the memory 3000 or reads out various data or information from the memory 3000.

<Functional Configuration of Smart Phone>

Referring now to FIGS. 13 to 16, a functional configuration of the smart phone 5 is described according to the embodiment. As illustrated in FIG. 14, the smart phone 5 includes a far-distance communication unit 51, an acceptance unit 52, an image capturing unit 53, an audio collection unit 54, an image and audio processing unit 55, a display control 56, a determiner 57, the near-distance communication unit 58, and a storing and reading unit 59. These units are functions that are implemented by or that are caused to function by operating any of the hardware elements illustrated in FIG. 13 in cooperation with the instructions of the CPU 501 according to the control program for the smart phone 5, expanded from the EEPROM 504 to the RAM 503.

Figures 15A, 15B:
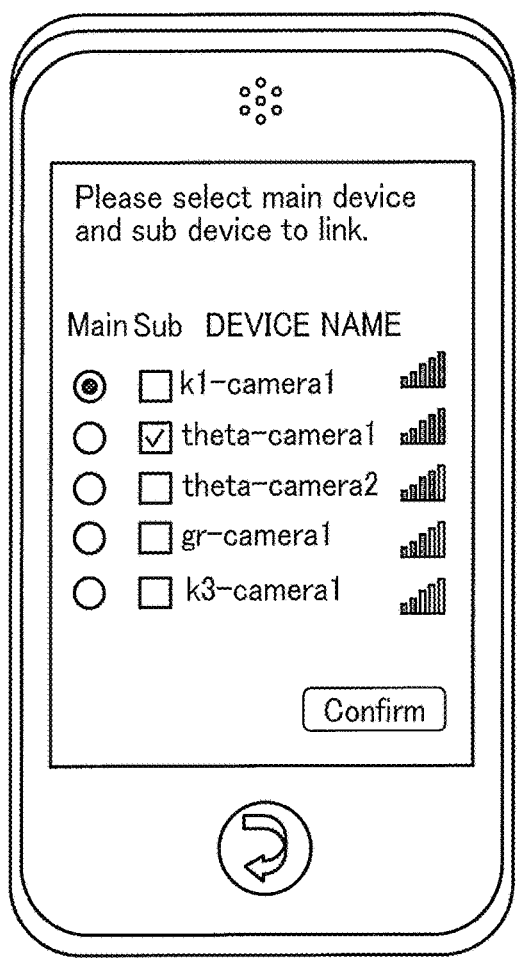
FIGS. 15A and 15B are conceptual diagrams respectively illustrating a linked image capturing device management table, and a linked image capturing device configuration screen, according to the first embodiment.

The smart phone 5 further includes a memory 5000, which is implemented by the ROM 502, RAM 503 and EEPROM 504 illustrated in FIG. 13. The memory 5000 stores a linked image capturing device management DB 5001. The linked image capturing device management DB 5001 is implemented by a linked image capturing device management table illustrated in FIG. 15A. FIG. 15A is a conceptual diagram illustrating the linked image capturing device management table, according to the embodiment.

Referring now to FIG. 15A, the linked image capturing device management table is described according to the embodiment. As illustrated in FIG. 15A, the linked image capturing device management table stores, for each image capturing device, linking information indicating a relation to the linked image capturing device, an IP address of the image capturing device, and a device name of the image capturing device, in association with one another. The linking information indicates whether the image capturing device is "main" device or "sub" device in performing the linking function. The image capturing device as the "main" device, starts capturing the image in response to pressing of the shutter button provided for that device. The image capturing device as the "sub" device, starts capturing the image in response to pressing of the shutter button provided for the "main" device. The IP address is one example of destination information of the image capturing device. The IP address is used in case the image capturing device communicates using Wi-Fi. Alternatively, a manufacturer's identification (ID) or a product ID may be used in case the image capturing device communicates using a wired USB cable. Alternatively, a Bluetooth Device (BD) address is used in case the image capturing device communicates using wireless communication such as Bluetooth.

The far-distance communication unit 51 of the smart phone 5 is implemented by the far-distance communication circuit 511 that operates under control of the CPU 501, illustrated in FIG. 13, to transmit or receive various data or information to or from other device (for example, other smart phone or server) through a communication network such as the Internet. The acceptance unit 52 is implement by the touch panel 521, which operates under control of the CPU 501, to receive various selections or inputs from the user. While the touch panel 521 is provided separately from the display 517 in FIG. 13, the display 517 and the touch panel 521 may be integrated as one device. Further, the smart phone 5 may include any hardware key, such as a button, to receive the user instruction, in addition to the touch panel 521.

The image capturing unit 53 is implemented by the CMOS sensors 505 and 512, which operate under control of the CPU 501, illustrated in FIG. 13. The image capturing unit 13 captures an image of the object or surroundings to obtain captured image data.

In this example, the captured image data is planar image data, captured with a perspective projection method.

The audio collection unit 54 is implemented by the microphone 514 that operates under control of the CPU 501. The audio collecting unit 14a collects sounds around the smart phone 5.

The image and audio processing unit 55 is implemented by the instructions of the CPU 501, illustrated in FIG. 13. The image and audio processing unit 55 applies image processing to an image of the object that has been captured by the image capturing unit 53. The image and audio processing unit 15 applies audio processing to audio obtained by the audio collection unit 54.

The display control 56, which is implemented by the instructions of the CPU 501 illustrated in FIG. 13, controls the display 517 to display the planar image P based on the captured image data that is being captured or that has been captured by the image capturing unit 53. The display control 56 superimposes the planar image P, on the spherical image CE, using superimposed display metadata, generated by the image and audio processing unit 55. With the superimposed display metadata, each grid area LAO of the planar image P is placed at a location indicated by a location parameter, and is adjusted to have a brightness value and a color value indicated by a correction parameter. The planar image P is not previously combined with the spherical image CE, but the planar image P is superimposed on the spherical image CE for display to the user. This enables the planar image P to be displayed in various display forms, for example, by changing a zoom ratio or a projection method.

In this example, the location parameter is one example of location information. The correction parameter is one example of correction information.

The determiner 57 is implemented by the instructions of the CPU 501, illustrated in FIG. 13, to perform various determinations.

The near-distance communication unit 58, which is implemented by instructions of the CPU 501, and the near-distance communication circuit 519 with the antenna 519a, communicates data with the near-distance communication unit 18 of the special image capturing device 1, and the near-distance communication unit 38 of the generic image capturing device 3, using the near-distance wireless communication in compliance with such as Wi-Fi.

The storing and reading unit 59, which is implemented by instructions of the CPU 501 illustrated in FIG. 13, stores various data or information in the memory 5000 or reads out various data or information from the memory 5000. For example, the superimposed display metadata may be stored in the memory 5000. In this embodiment, the storing and reading unit 59 functions as an obtainer that obtains various data from the memory 5000.

Figure 16:
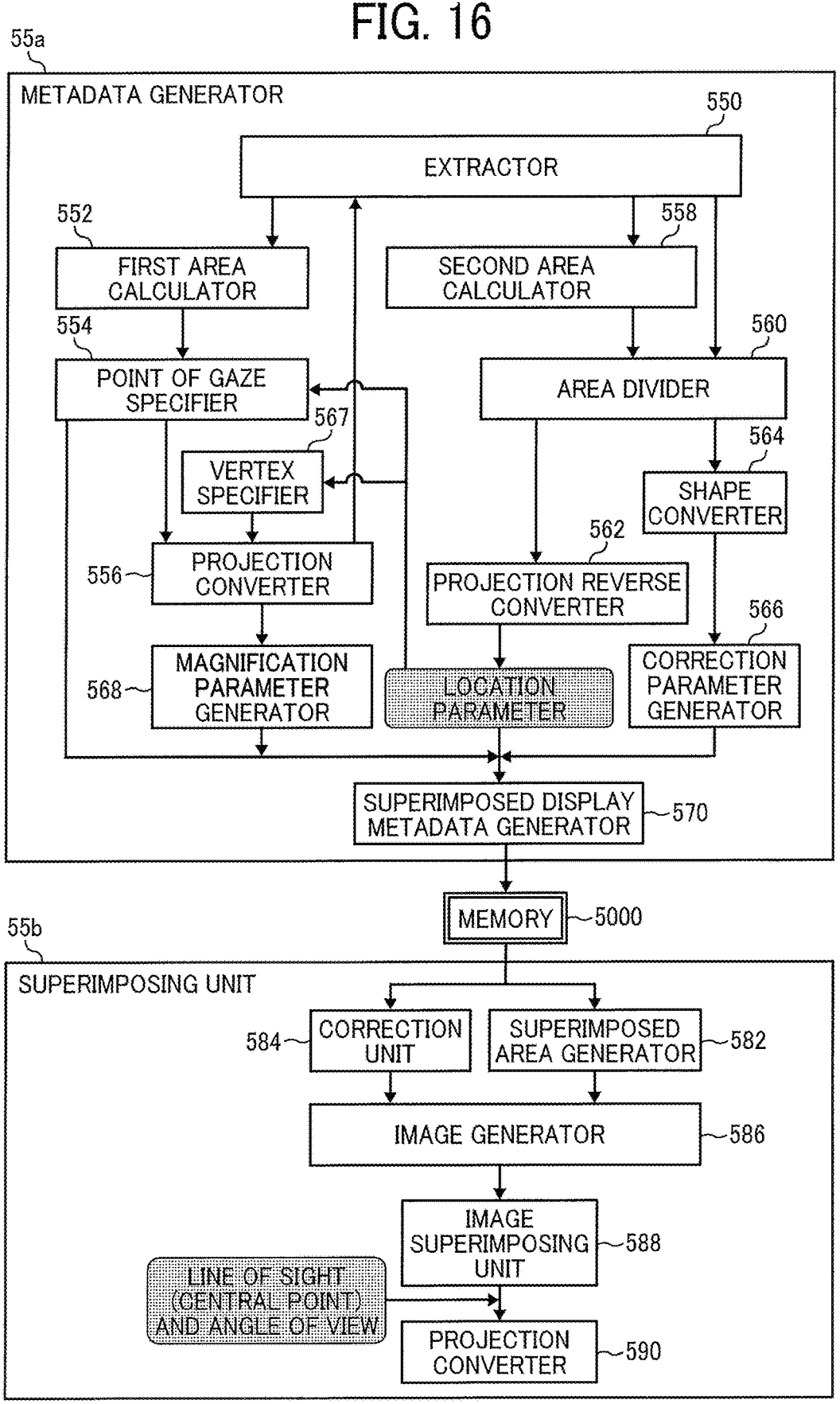
FIG. 16 is a block diagram illustrating a functional configuration of an image and audio processing unit according to the first embodiment.

Referring to FIG. 16, a functional configuration of the image and audio processing unit 55 is described according to the embodiment. FIG. 16 is a block diagram illustrating the functional configuration of the image and audio processing unit 55 according to the embodiment.

Figure 19:
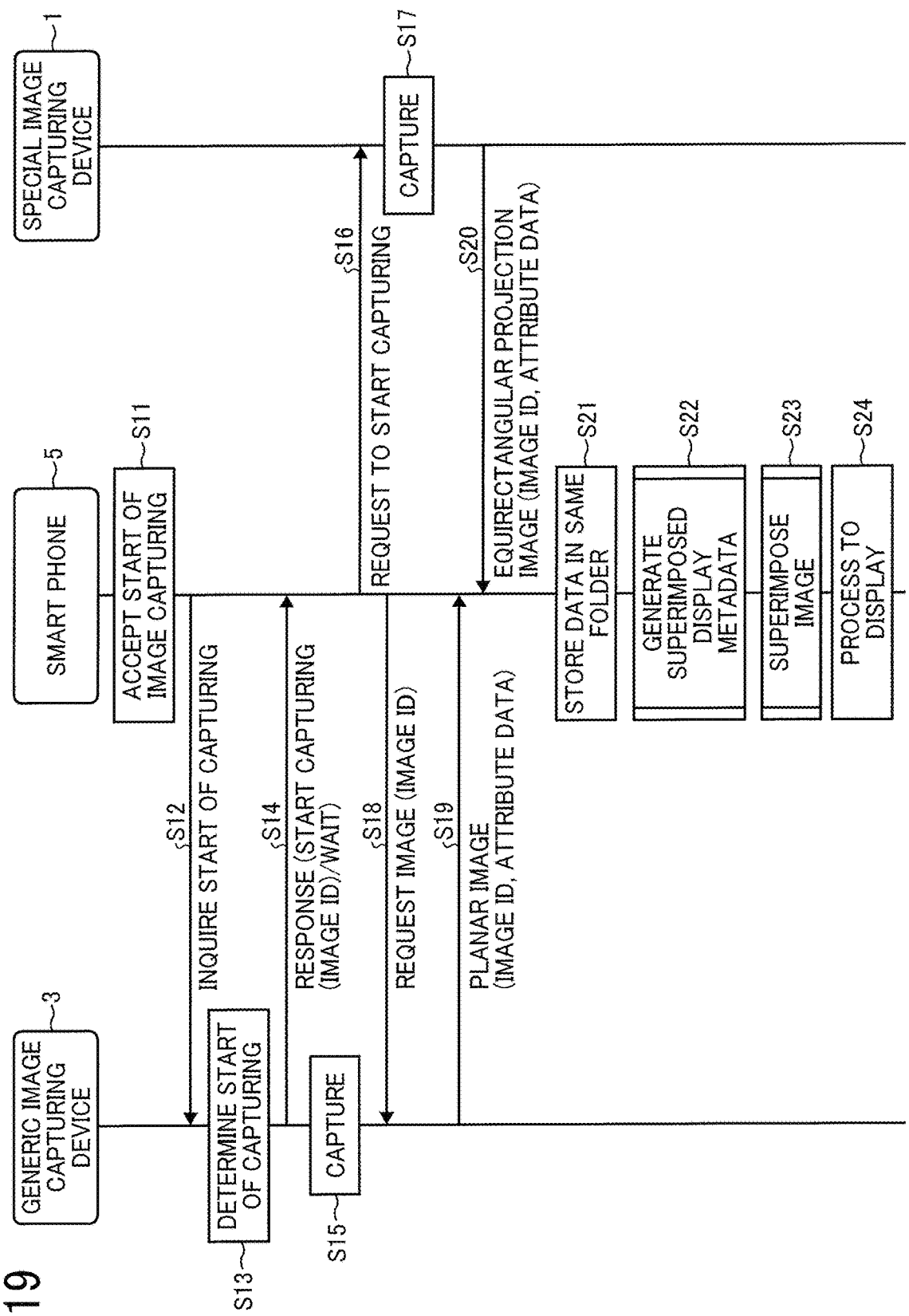
FIG. 19 is a data sequence diagram illustrating operation of capturing the image, performed by the image capturing system, according to the first embodiment.

The image and audio processing unit 55 mainly includes a metadata generator 55a that performs encoding, and a superimposing unit 55b that performs decoding. In this example, the encoding corresponds to processing to generate metadata to be used for superimposing images for display ("superimposed display metadata"). Further, in this example, the decoding corresponds to processing to generate images for display using the superimposed display metadata. The metadata generator 55a performs processing of S22, which is processing to generate superimposed display metadata, as illustrated in FIG. 19. The superimposing unit 55b performs processing of S23, which is processing to superimpose the images using the superimposed display metadata, as illustrated in FIG. 19.

Figure 20:
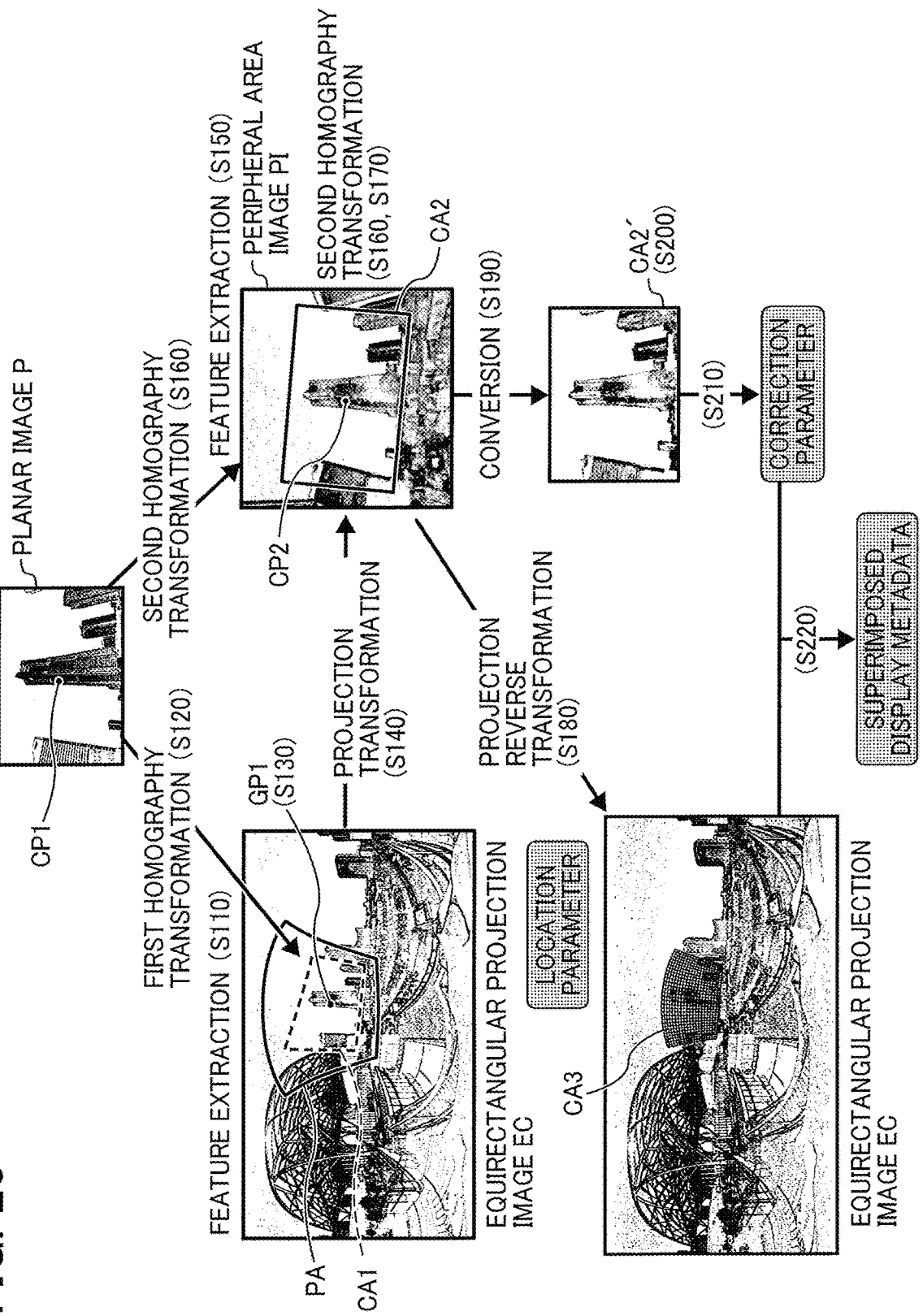
FIG. 20 is a conceptual diagram illustrating operation of generating a superimposed display metadata, according to the first embodiment.

First, a functional configuration of the metadata generator 55a is described according to the embodiment. The metadata generator 55a includes an extractor 550, a first area calculator 552, a point of gaze specifier 554, a projection converter 556, a second area calculator 558, an area divider 560, a projection reverse converter 562, a shape converter 564, a correction parameter generator 566, a vertex specifier 567, a magnification parameter generator 568, and a superimposed display metadata generator 570. In case the brightness and color is not to be corrected, the shape converter 564 and the correction parameter generator 566 do not have to be provided. FIG. 20 is a conceptual diagram illustrating operation of generating the superimposed display metadata, with images processed or generated in such operation.

The extractor 550 extracts feature points according to local features of each of two images having the same object. The feature points are distinctive keypoints in both images. The local features correspond to a pattern or structure detected in the image such as an edge or blob. In this embodiment, the extractor 550 extracts the features points for each of two images that are different from each other. These two images to be processed by the extractor 550 may be the images that have been generated using different image projection methods. Unless the difference in projection methods cause highly distorted images, any desired image projection methods may be used. For example, referring to FIG. 20, the extractor 550 extracts feature points from the rectangular, equirectangular projection image EC in equirectangular projection (S110), and the rectangular, planar image P in perspective projection (S110), based on local features of each of these images including the same object. Further, the extractor 550 extracts feature points from the rectangular, planar image P (S110), and a peripheral area image PI converted by the projection converter 556 (S150), based on local features of each of these images having the same object. In this embodiment, the equirectangular projection method is one example of a first projection method, and the perspective projection method is one example of a second projection method. The equirectangular projection image is one example of the first projection image, and the planar image P is one example of the second projection image.

The first area calculator 552 calculates the feature value fv1 based on the plurality of feature points fp1 in the equirectangular projection image EC. The first area calculator 552 further calculates the feature value fv2 based on the plurality of feature points fp2 in the planar image P. The feature values, or feature points, may be detected in any desired method. However, it is desirable that feature values, or feature points, are invariant or robust to changes in scale or image rotation. The first area calculator 552 specifies corresponding points between the images, based on similarity between the feature value fv1 of the feature points fp1 in the equirectangular projection image EC, and the feature value fv2 of the feature points fp2 in the planar image P. Based on the corresponding points between the images, the first area calculator 552 calculates the homography for transformation between the equirectangular projection image EC and the planar image P. The first area calculator 552 then applies first homography transformation to the planar image P (S120). Accordingly, the first area calculator 552 obtains a first corresponding area CA1 ("first area CA1"), in the equirectangular projection image EC, which corresponds to the planar image P. In such case, a central point CP1 of a rectangle defined by four vertices of the planar image P, is converted to the point of gaze GP1 in the equirectangular projection image EC, by the first homography transformation.

Here, the coordinates of four vertices p1, p2, p3, and p4 of the planar image P are p1=(x1, y1), p2=(x2, y2), p3=(x3, y3), and p4=(x4, y4). The first area calculator 552 calculates the central point CP1 (x, y) using the equation 2 below.

$$S1=\{(x4-x2)*(y1-y2)-(y4-y2)*(x1-x2)\}/2, S2=\{(x4-x2)*(y2-y3)-(y4-y2)*(x2-x3)\}/2, x=x1+(x3-x1)*S1/(S1+S2), y=y1+(y3-y1)*S1/(S1+S2) \quad \text{(Equation 2)}$$

While the planar image P is a rectangle in the case of FIG. 20, the central point CP1 may be calculated using the equation 2 with an intersection of diagonal lines of the planar image P, even when the planar image P is a square, trapezoid, or rhombus. When the planar image P has a shape of rectangle or square, the central point of the diagonal line may be set as the central point CP1. In such case, the central points of the diagonal lines of the vertices p1 and p3 are calculated, respectively, using the equation 3 below.

$$x=(x1+x3)/2, y=(y1+y3)/2 \quad \text{(Equation 3)}$$

The point of gaze specifier 554 specifies the point (referred to as the point of gaze) in the equirectangular projection image EC, which corresponds to the central point CP1 of the planar image P after the first homography transformation (S130).

Here, the point of gaze GP1 is expressed as a coordinate on the equirectangular projection image EC. The coordinate of the point of gaze GP1 may be transformed to the latitude and longitude. Specifically, a coordinate in the vertical direction of the equirectangular projection image EC is expressed as a latitude in the range of −90 degree (−0.5π) to +90 degree (+0.5π). Further, a coordinate in the horizontal direction of the equirectangular projection image EC is expressed as a longitude in the range of −180 degree (−π) to +180 degree (+π). With this transformation, the coordinate of each pixel, according to the image size of the equirectangular projection image EC, can be calculated from the latitude and longitude system.

The projection converter 556 extracts a peripheral area PA, which is a part surrounding the point of gaze GP1, from the equirectangular projection image EC. The projection converter 556 converts the peripheral area PA, from the equirectangular projection to the perspective projection, to generate a peripheral area image PI (S140). The peripheral area PA is determined, such that, after projection transformation, the square-shaped, peripheral area image PI has a vertical angle of view (or a horizontal angle of view), which is the same as the diagonal angle of view α of the planar image P. Here, the central point CP2 of the peripheral area image PI corresponds to the point of gaze GP 1.

(Transformation of Projection)

The following describes transformation of a projection, performed at S140 of FIG. 20, in detail. As described above referring to FIGS. 3 to 5, the equirectangular projection image EC covers a surface of the sphere CS, to generate the spherical image CE. Therefore, each pixel in the equirectangular projection image EC corresponds to each pixel in the surface of the sphere CS, that is, the three-dimensional, spherical image. The projection converter 556 applies the following transformation equation. Here, the coordinate system used for the equirectangular projection image EC is expressed with (latitude, longitude)=(ea, aa), and the rectangular coordinate system used for the three-dimensional sphere CS is expressed with (x, y, z).

$$(x,y,z)=(\cos(ea)\times\cos(aa), \cos(ea)\times\sin(aa), \sin(ea)),$$
wherein the sphere CS has a radius of 1. (Equation 4)

The planar image P in perspective projection, is a two-dimensional image. When the planar image P is represented by the two-dimensional polar coordinate system (moving radius, argument)=(r, a), the moving radius r, which corresponds to the diagonal angle of view α, has a value in the range from 0 to tan (diagonal angle view/2). That is, 0<=r<=tan(diagonal angle view/2). The planar image P, which is represented by the two-dimensional rectangular coordinate system (u, v), can be expressed using the polar coordinate system (moving radius, argument)=(r, a) using the following transformation equation 5.

$$u=r\times\cos(a), v=r\times\sin(a) \quad \text{(Equation 5)}$$

The equation 5 is represented by the three-dimensional coordinate system (moving radius, polar angle, azimuth). For the surface of the sphere CS, the moving radius in the three-dimensional coordinate system is "1". The equirectangular projection image, which covers the surface of the sphere CS, is converted from the equirectangular projection to the perspective projection, using the following equations 6 and 7. Here, the equirectangular projection image is represented by the above-described two-dimensional polar coordinate system (moving radius, azimuth)=(r, a), and the virtual camera IC is located at the center of the sphere.

$$r=\tan(\text{polar angle}) \quad \text{(Equation 6)}$$

$a$=azimuth Assuming that the polar angle is $t$, Equation 6 can be expressed as: $t=\arctan(r)$. (Equation 7)

Accordingly, the three-dimensional polar coordinate (moving radius, polar angle, azimuth) is expressed as (1,arctan(r),a).

The three-dimensional polar coordinate system is transformed into the rectangle coordinate system (x, y, z), using Equation 8.

$$(x,y,z)=(\sin(t)\times\cos(a), \sin(t)\times\sin(a), \cos(t)) \quad \text{(Equation 8)}$$

Equation 8 is applied to convert between the equirectangular projection image EC in equirectangular projection, and the planar image P in perspective projection. More specifically, the moving radius r, which corresponds to the diagonal angle of view α of the planar image P, is used to calculate transformation map coordinates, which indicate correspondence of a location of each pixel between the planar image P and the equirectangular projection image EC. With this transformation map coordinates, the equirectangular projection image EC is transformed to generate the peripheral area image PI in perspective projection.

Through the above-described projection transformation, the coordinate (latitude=90°, longitude=0°) in the equirectangular projection image EC becomes the central point CP2 in the peripheral area image PI in perspective projection. In case of applying projection transformation to an arbitrary point in the equirectangular projection image EC as the point of gaze, the sphere CS covered with the equirectangular projection image EC is rotated such that the coordinate (latitude, longitude) of the point of gaze is positioned at (90°,0°).

The sphere CS may be rotated using any known equation for rotating the coordinate.

(Determination of Peripheral Area Image)

Next, referring to FIGS. 21A and 21B, determination of a peripheral area image P1 is described according to the embodiment. FIGS. 21A and 21B are conceptual diagrams for describing determination of the peripheral area image PI.

To enable the first area calculator 552 to determine correspondence between the planar image P and the peripheral area image PI, it is desirable that the peripheral area image PI is sufficiently large to include the entire second area CA2. If the peripheral area image PI has a large size, the second area CA2 is included in such large-size area image. With the large-size peripheral area image PI, however, the time required for processing increases as there are a large number of pixels subject to similarity calculation. For this reasons, the peripheral area image PI should be a minimum-size image area including at least the entire second area CA2. In this embodiment, the peripheral area image PI is determined as follows.

More specifically, the peripheral area image PI is determined using the 35 mm equivalent focal length of the planar image, which is obtained from the Exif data recorded when the image is captured. Since the 35 mm equivalent focal length is a focal length corresponding to the 24 mm×36 mm film size, it can be calculated from the diagonal and the focal length of the 24 mm×36 mm film, using Equations 9 and 10.

$$\text{film diagonal} = \text{sqrt}(24*24+36*36) \quad \text{(Equation 9)}$$

$$\text{angle of view of the image to be combined}/2 = \arctan((\text{film diagonal}/2)/35 \text{ mm equivalent focal length of the image to be combined}) \quad \text{(Equation 10)}$$

The image with this angle of view has a circular shape. Since the actual imaging element (film) has a rectangular shape, the image taken with the imaging element is a rectangle that is inscribed in such circle. In this embodiment, the peripheral area image PI is determined such that, a vertical angle of view $\alpha$ of the peripheral area image PI is made equal to a diagonal angle of view $\alpha$ of the planar image P. That is, the peripheral area image PI illustrated in FIG. 21B is a rectangle, circumscribed around a circle containing the diagonal angle of view $\alpha$ of the planar image P illustrated in FIG. 21A. The vertical angle of view $\alpha$ is calculated from the diagonal angle of a square and the focal length of the planar image P, using Equations 11 and 12.

$$\text{angle of view of square} = \text{sqrt}(\text{film diagonal}*\text{film diagonal}+\text{film diagonal}*\text{film diagonal}) \quad \text{(Equation 11)}$$

$$\text{vertical angle of view } \alpha/2 = \arctan((\text{angle of view of square}/2)/35 \text{ mm equivalent focal length of planar image})) \quad \text{(Equation 12)}$$

The calculated vertical angle of view $\alpha$ is used to obtain the peripheral area image PI in perspective projection, through projection transformation. The obtained peripheral area image PI at least contains an image having the diagonal angle of view $\alpha$ of the planar image P while centering on the point of gaze, but has the vertical angle of view $\alpha$ that is kept small as possible.

(Calculation of Location Information)

Referring back to FIGS. 16 and 20, the second area calculator 558 calculates the feature value fp2 of a plurality of feature points fp2 in the planar image P, and the feature value fp3 of a plurality of feature points fp3 in the peripheral area image PI. The second area calculator 558 specifies corresponding points between the images, based on similarity between the feature value fv2 and the feature value fv3. Based on the corresponding points between the images, the second area calculator 558 calculates the homography for transformation between the planar image P and the peripheral area image PI. The second area calculator 558 then applies second homography transformation to the planar image P (S160). Accordingly, the second area calculator 558 obtains a second (corresponding) area CA2 ("second area CA2"), in the peripheral area image PI, which corresponds to the planar image P (S170).

In the above-described transformation, in order to increase the calculation speed, an image size of at least one of the planar image P and the equirectangular projection image EC may be changed, before applying the first homography transformation. For example, assuming that the planar image P has 40 million pixels, and the equirectangular projection image EC has 30 million pixels, the planar image P may be reduced in size to 30 million pixels. Alternatively, both of the planar image P and the equirectangular projection image EC may be reduced in size to 10 million pixels. Similarly, an image size of at least one of the planar image P and the peripheral area image PI may be changed, before applying the second homography transformation.

The homography in this embodiment is a transformation matrix indicating the projection relation between the equirectangular projection image EC and the planar image P. The coordinate system for the planar image P is multiplied by the homography transformation matrix to convert into a corresponding coordinate system for the equirectangular projection image EC (spherical image CE).

Figure 22B:
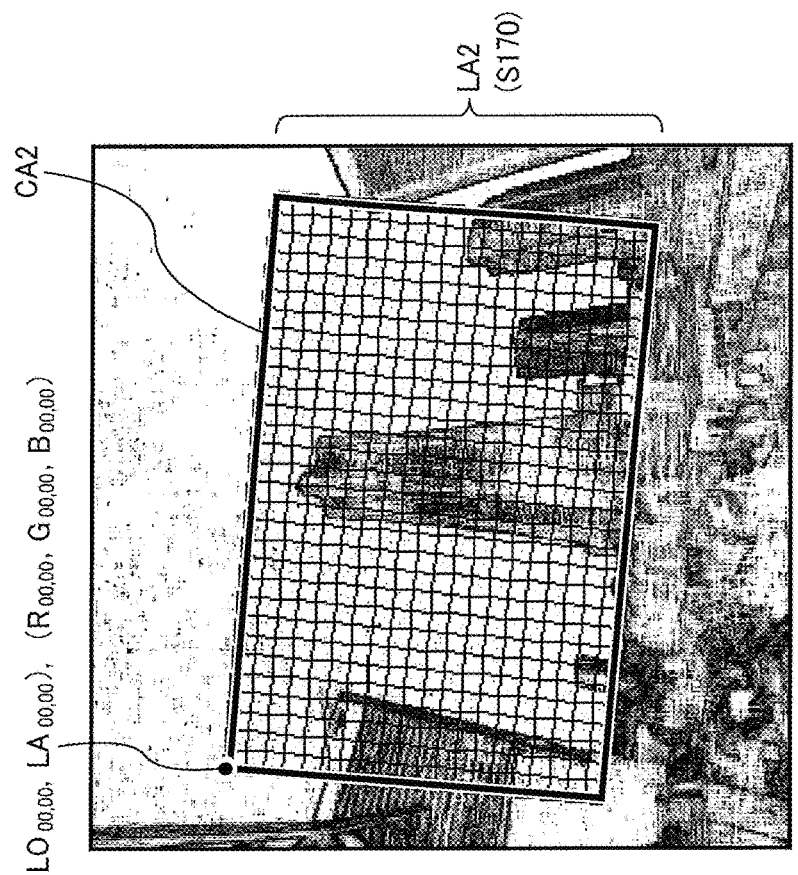
FIGS. 22A and 22B are conceptual diagrams for explaining operation of dividing the second area into a plurality of grid areas, according to the first embodiment.
Figure 22A:
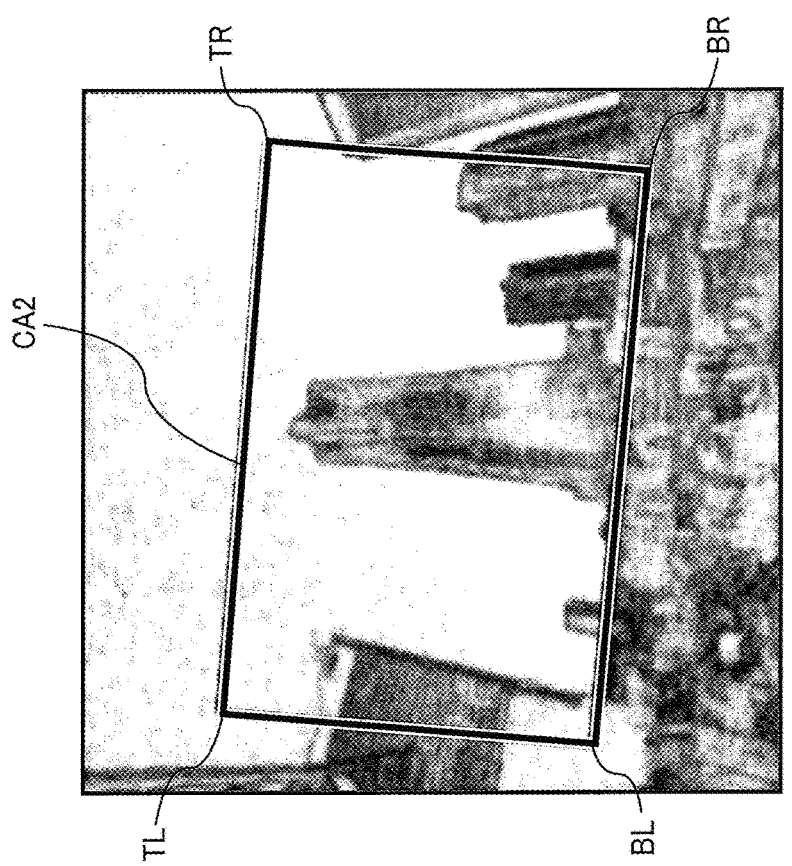

The area divider 560 divides a part of the image into a plurality of grid areas. Referring to FIGS. 22A and 22B, operation of dividing the second area CA2 into a plurality of grid areas is described according to the embodiment. FIGS. 22A and 22B illustrate conceptual diagrams for explaining operation of dividing the second area into a plurality of grid areas, according to the embodiment.

As illustrated in FIG. 22A, the second area CA2 is a rectangle defined by four vertices each obtained with the second homography transformation, by the second area calculator 558. As illustrated in FIG. 22B, the area divider 560 divides the second area CA2 into a plurality of grid areas LA2. For example, the second area CA2 is equally divided into 30 grid areas in the horizontal direction, and into 20 grid areas in the vertical direction.

Next, dividing the second area CA2 into the plurality of grid areas LA2 is explained in detail.

The second area CA2 is equally divided using the following equation. Assuming that a line connecting two points, A(X1, Y1) and B(X2, Y2), is to be equally divided into "n" coordinates, the coordinate of a point Pm that is the "m" th point counted from the point A is calculated using the equation 13.

$$Pm = (X1+(X2-X1) \times m/n, Y1+(Y2-Y1) \times m/n) \quad \text{(Equation 13)}$$

With Equation 13, the line can be equally divided into a plurality of coordinates. The upper line and the lower line of the rectangle are each divided into a plurality of coordinates, to generate a plurality of lines connecting corresponding coordinates of the upper line and the lower line. The generated lines are each divided into a plurality of coordinates, to further generate a plurality of lines. Here, coordinates of points (vertices) of the upper left, upper right, lower right, and lower left of the rectangle are respectively represented by TL, TR, BR, and BL. The line connecting TL and TR, and the line connecting BR and BL are each equally divided into 30 coordinates (0 to 30th coordinates). Next, each of the lines connecting corresponding 0 to 30th coordinates of the TL-TR line and the BR-BL line, is equally divided into 20 coordinates. Accordingly, the rectangular area is divided into 30×20, sub-areas. FIG. 22B shows an example case of the coordinate ($LO_{00,00}$, $LA_{00,00}$) of the upper left point TL.

Figure 18B:
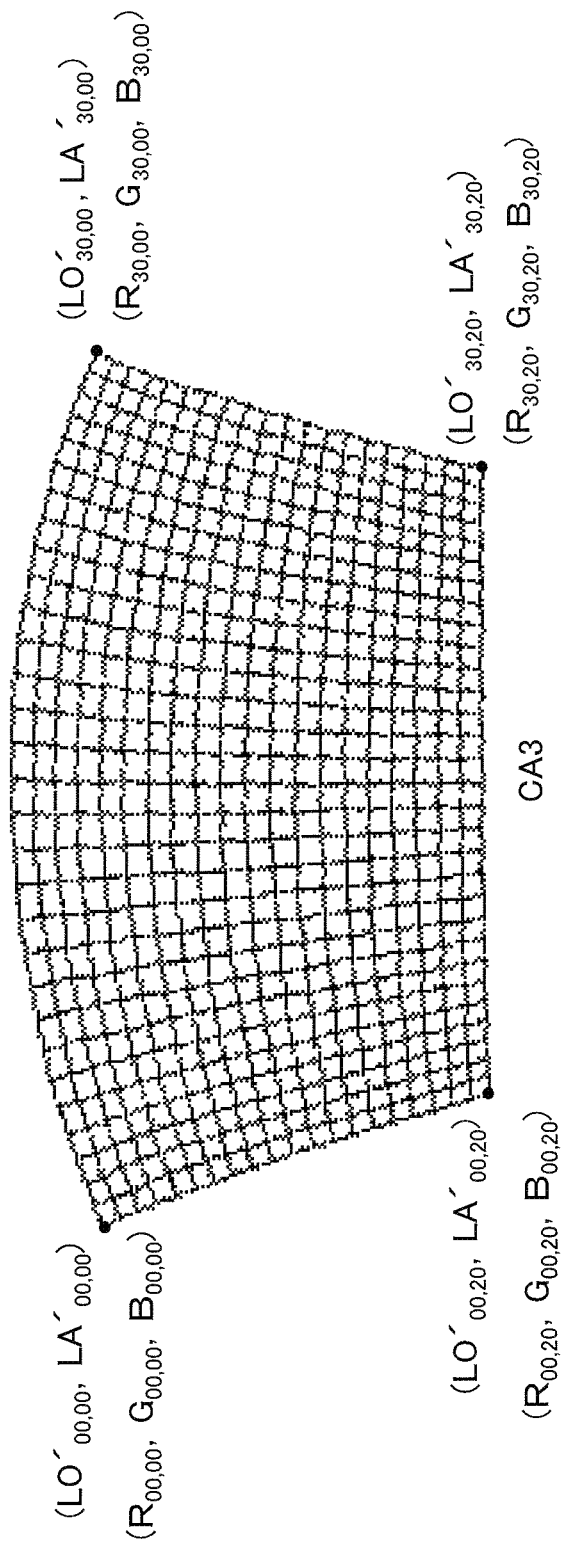
Figure 23:
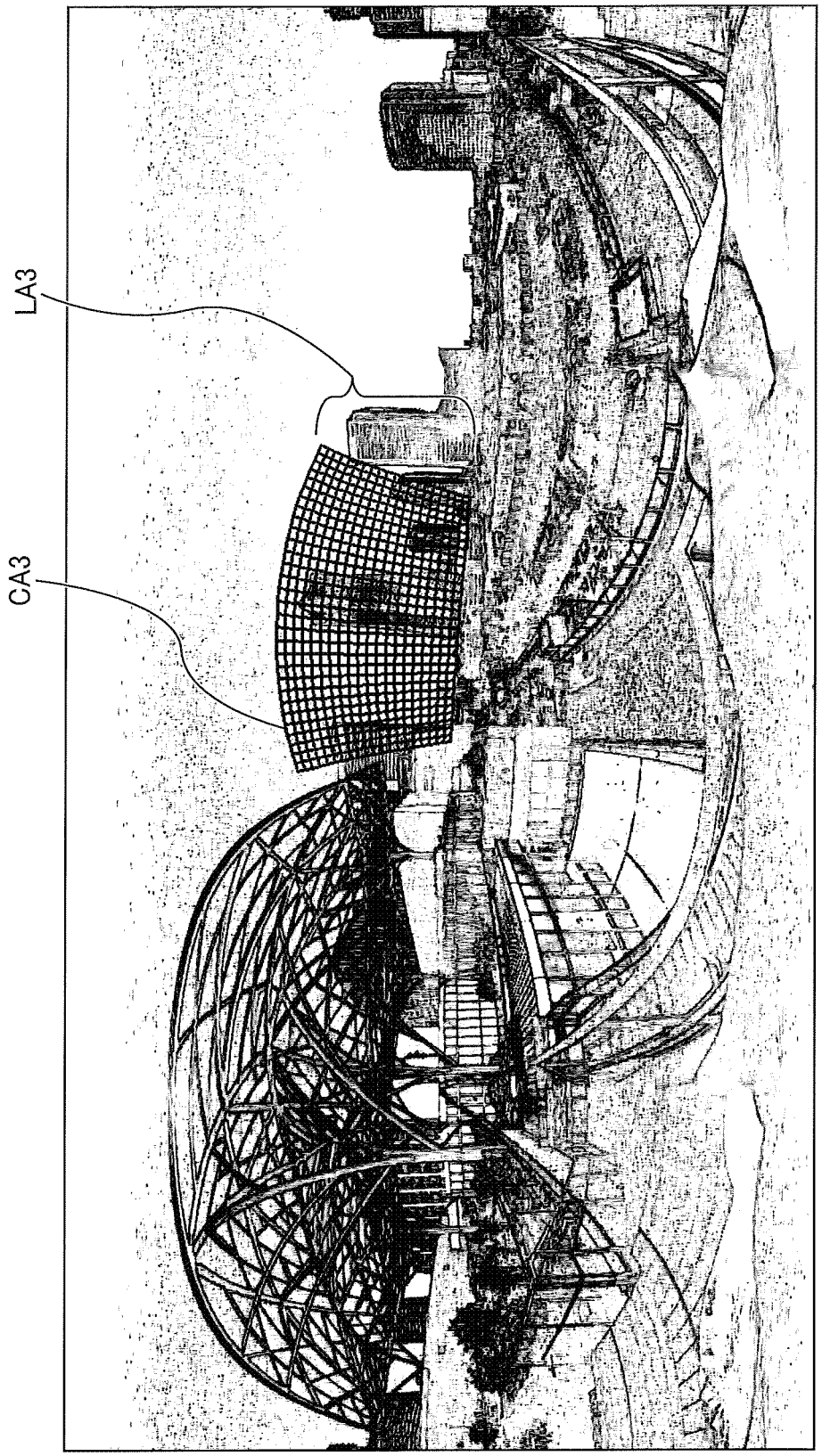
FIG. 23 is a conceptual diagram for explaining determination of the third area in the equirectangular projection image, according to the first embodiment.

Referring back to FIGS. 16 and 20, the projection reverse converter 562 reversely converts projection applied to the second area CA2, back to the equirectangular projection applied to the equirectangular projection image EC. With this projection transformation, the third area CA3 in the equirectangular projection image EC, which corresponds to the second area CA2, is determined. Specifically, the projection reverse converter 562 determines the third area CA3 in the equirectangular projection image EC, which contains a plurality of grid areas LA3 corresponding to the plurality of grid areas LA2 in the second area CA2. FIG. 23 illustrates an enlarged view of the third area CA3 illustrated in FIG. 20. FIG. 23 is a conceptual diagram for explaining determination of the third area CA3 in the equirectangular projection image EC. The planar image P is superimposed on the spherical image CE, which is generated from the equirectangular projection image EC, so as to fit in a portion defined by the third area CA3 by mapping. Through processing by the projection reverse converter 562, a location parameter is generated, which indicates the coordinate of each grid in each grid area LA3. The location parameter is illustrated in FIG. 17 and FIG. 18B. In this example, the gird may be referred to as a single point of a plurality of points.

As described above, the location parameter is generated, which is used to calculate the correspondence of each pixel between the equirectangular projection image EC and the planar image P.

Although the planar image P is superimposed on the equirectangular projection image EC at a right location with the location parameter, these image EC and image P may vary in brightness or color (such as tone), causing an unnatural look. The shape converter 564 and the correction parameter generator 566 are provided to avoid this unnatural look, even when these images that differ in brightness and color, are partly superimposed one above the other.

Figure 24A:
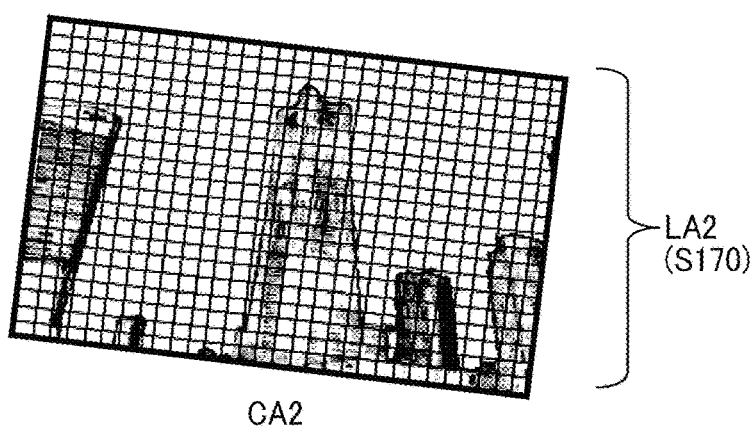
FIGS. 24A, 24B, and 24C are conceptual diagrams illustrating operation of generating a correction parameter, according to the first embodiment.

Before applying color correction, the shape converter 564 converts the second area CA2 to have a shape that is the same as the shape of the planar image P. To made the shape equal, the shape converter 564 maps four vertices of the second area CA2, on corresponding four vertices of the planar image P. More specifically, the shape of the second area CA2 is made equal to the shape of the planar image P, such that each grid area LA2 in the second area CA2 illustrated in FIG. 24A, is located at the same position of each grid area LA0 in the planar image P illustrated in FIG. 24C. That is, a shape of the second area CA2 illustrated in FIG. 24A is converted to a shape of the second area CA2' illustrated in FIG. 24B. As each grid area LA2 is converted to the corresponding grid area LA2', the grid area LA2' becomes equal in shape to the corresponding grid area LA0 in the planar image P.

The correction parameter generator 566 generates the correction parameter, which is to be applied to each grid area LA2' in the second area CA2', such that each grid area LA2' is equal to the corresponding grid area LA0 in the planar image P in brightness and color. Specifically, the correction parameter generator 566 specifies four grid areas LA0 that share one common grid, and calculates an average avg= $(R_{ave}, G_{ave}, B_{ave})$ of brightness and color values (R, G, B) of all pixels contained in the specified four grid areas LA0. Similarly, the correction parameter generator 566 specifies four grid areas LA2' that share one common grid, and calculates an average avg'= $(R_{ave}, G_{ave}, B_{ave})$ of brightness and color values (R, G, B) of all pixels contained in the specified four grid areas LA2'. If one gird of the specified grid areas LA0 and the corresponding grid of the specific grid areas LA2' correspond to one of four vertices of the second area CA2 (or the third area CA3), the correction parameter generator 566 calculates the average avg and the average avg' of the brightness and color of pixels from one grid area located at the corner. If one grid of the specific grid areas LA0 and the corresponding grid of the specific grid areas LA2' correspond to a gird of the outline of the second area CA2 (or the third area CA3), the correction parameter generator 566 calculates the average avg and the average avg' of the brightness and color of pixels from two grid areas inside the outline. In this embodiment, the correction parameter is gain data for correcting the brightness and color of the planar image P. Accordingly, the correction parameter Pa is obtained by dividing the avg' by the avg, as represented by the following equation 14.

$$Pa = \text{avg}'/\text{avg} \qquad \text{(Equation 14)}$$

In displaying images being superimposed, each grid area LA0 is multiplied with the gain, represented by the correction parameter. Accordingly, the brightness and color of the planar image P is made substantially equal to that of the equirectangular projection image EC (spherical image CE). This prevents unnatural look, even when the planar image P is superimposed on the equirectangular projection image EC. In addition to or in alternative to the average value, the correction parameter may be calculated using the median or the most frequent value of brightness and color of pixels in the grid areas.

In this embodiment, the values (R, G, B) are used to calculate the brightness and color of each pixel. Alternatively, any other color space may be used to obtain the brigthness and color, such as brightness and color difference using YUV, and brigthness and color difference using sYCC (YCbCr) according to the JPEG. The color space may be converted from RGB, to YUV, or to sYCC (YCbCr), using any desired known method. For example, RGB, in compliance with JPEG file interchange format (JFIF), may be converted to YCbCr, using Equation 15.

$$\begin{pmatrix} Y \\ Cb \\ Cr \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} + \begin{pmatrix} 0 \\ 128 \\ 128 \end{pmatrix} \qquad \text{(Equation 15)}$$

Referring back to FIG. 16, the vertex specifier 567 specifies the locations (coordinates) of four vertices c1, c2, c3, and c4 of the third area CA3 illustrated in FIG. 23. The magnification parameter is a parameter for enlarging or reducing a size of the predetermined area T, such that the predetermined area T of the spherical image CE, with the superimposed image S being superimposed, is displayed in the display area DA of the display 517. More specifically, the magnification parameter is generated, such that the point of gaze GP2 of the third area C3, specified by the point of gaze specifier 554, and four vertices c1, c2, c3, and c4 specified with the vertex specifier 567, respectively match the point of gaze GP3 and four vertices C1, C2, C3, and C4 after projection transformation by the projection converter 556. The display area DA of the display 517 is represented by a display size in horizontal and vertical directions, expressed in a number of pixels.

The superimposed display metadata generator 570 generates superimposed display metadata indicating a location where the planar image P is superimposed on the spherical image CE, and correction values for correcting brightness and color of pixels, using such as the location parameter and the correction parameter.

(Superimposed Display Metadata)

Referring to FIG. 17, a data structure of the superimposed display metadata is described according to the embodiment.

FIG. 17 illustrates a data structure of the superimposed display metadata according to the embodiment.

As illustrated in FIG. 17, the superimposed display metadata includes equirectangular projection image information, planar image information, superimposed display information, and metadata generation information.

The equirectangular projection image information is transmitted from the special image capturing device 1, with the captured image data. The equirectangular projection image information includes an image identifier (image ID) and attribute data of the captured image data. The image identifier, included in the equirectangular projection image information, is used to identify the equirectangular projection image. While FIG. 17 uses an image file name as an example of image identifier, an image ID for uniquely identifying the image may be used instead.

The attribute data, included in the equirectangular projection image information, is any information related to the equirectangular projection image. In the case of metadata of FIG. 17, the attribute data includes positioning correction data (Pitch, Yaw, Roll) of the equirectangular projection image, which is obtained by the special image capturing device 1 in capturing the image. The positioning correction data is stored in compliance with a standard image recording format, such as Exchangeable image file format (Exif). Alternatively, the positioning correction data may be stored in any desired format defined by Google Photo Sphere schema (GPano). As long as an image is taken at the same place, the special image capturing device 1 captures the image in 360 degrees with any positioning. However, in displaying such spherical image CE, the positioning information and the center of image (point of gaze) should be specified. Generally, the spherical image CE is corrected for display, such that its zenith is right above the user capturing the image. With this correction, a horizontal line is displayed as a straight line, thus the displayed image have more natural look.

The planar image information is transmitted from the generic image capturing device 3 with the captured image data. The planar image information includes an image identifier (image ID) and attribute data of the captured image data. The image identifier, included in the planar image information, is used to identify the planar image P. While FIG. 17 uses an image file name as an example of image identifier, an image ID for uniquely identifying the image may be used instead.

The attribute data, included in the planar image information, is any information related to the planar image P. In the case of metadata of FIG. 17, the planar image information includes, as attribute data, a value of 35 mm equivalent focal length. The value of 35 mm equivalent focal length is not necessary to display the image on which the planar image P is superimposed on the spherical image CE. However, the value of 35 mm equivalent focal length may be referred to determine an angle of view when displaying superimposed images.

The superimposed display information is generated by the smart phone 5. In this example, the superimposed display information includes area division number information, a coordinate of a grid in each grid area (location parameter), correction values for brightness and color (correction parameter), the location (coordinate) of the point of gaze in the predetermined-area image Q, and the magnification parameter. The area division number information indicates a number of divisions of the first area CA1, both in the horizontal (longitude) direction and the vertical (latitude) direction. The area division number information is referred to when dividing the first area CA1 into a plurality of grid areas.

The location parameter is mapping information, which indicates, for each grid in each grid area of the planar image P, a location in the equirectangular projection image EC. For example, the location parameter associates a location of each grid in each grid area in the equirectangular projection image EC, with each grid in each grid area in the planar image P. The correction parameter, in this example, is gain data for correcting color values of the planar image P. Since the target to be corrected may be a monochrome image, the correction parameter may be used only to correct the brightness value. Accordingly, at least the brightness of the image is to be corrected using the correction parameter.

The perspective projection, which is used for capturing the planar image P, is not applicable to capturing the 360-degree omnidirectional image, such as the spherical image CE. The wide-angle image, such as the spherical image, is often captured in equirectangular projection. In equirectangular projection, like Mercator projection, the distance between lines in the horizontal direction increases away from the standard parallel. This results in generation of the image, which looks very different from the image taken with the general-purpose camera in perspective projection. If the planar image P, superimposed on the spherical image CE, is displayed, the planar image P and the spherical image CE that differ in projection, look different from each other. Even scaling is made equal between these images, the planar image P does not fit in the spherical image CE. In view of the above, the location parameter is generated as described above referring to FIG. 20.

Referring to FIGS. 18A and 18B, the location parameter and the correction parameter are described in detail, according to the embodiment. FIG. 18A is a conceptual diagram illustrating a plurality of grid areas in the second area CA2, according to the embodiment. FIG. 18B is a conceptual diagram illustrating a plurality of grid areas in the third area CA3, according to the embodiment.

As described above, the first area CA1, which is a part of the equirectangular projection image EC, is converted to the second area CA2 in perspective projection, which is the same projection with the projection of the planar image P. As illustrated in FIG. 18A, the second area CA2 is divided into 30 grid areas in the horizontal direction, and 20 grid areas in the vertical direction, resulting in 600 grid areas in total. Still referring to FIG. 18A, the coordinate of each grid in each grid area can be expressed by $(LO_{00,00}, LA_{00,00})$, $(LO_{01,00}, LA_{01,00})$, . . . , $(LO_{30,20}, LA_{30,20})$. The correction value of brightness and color of each grid in each grid area can be expressed by $(R_{00,00}, G_{00,00}, B_{00,00})$, $(R_{01,00}, G_{01,00}, B_{01,00})$, . . . , $(R_{30,20}, G_{30,20}, B_{30,20})$. For simplicity, in FIG. 18A, only four vertices (grids) are each shown with the coordinate value, and the correction value for brightness and color. However, the coordinate value and the correction value for brightness and color, are assigned to each of all girds. The correction values R, G, B for brightness and color, corresponds to correction gains for red, green, and blue, respectively. In this example, the correction values R, G, B for brightness and color, are generated for a predetermined area centering on a specific grid. The specific grid is selected, such that the predetermined area of such grid does not overlap with a predetermined area of an adjacent specific gird.

As illustrated in FIG. 18B, the second area CA2 is reverse converted to the third area CA3 in equirectangular projection, which is the same projection with the projection of the equirectangular projection image EC. In this embodiment, the third area CA3 is equally divided into 30 grid areas in the horizontal direction, and 20 grid areas in the vertical direction, resulting in 600 grid areas in total. Referring to FIG. 18B, the coordinate of each grid in each area can be expressed by ($LO'_{00,00}$, $LA'_{00,00}$), ($LO'_{01,00}$, $LA'_{00,00}$), . . . , ($LO'_{30,20}$, $LA'_{30,20}$). The correction values of brightness and color of each grid in each grid area are the same as the correction values of brightness and color of each grid in each grid area in the second area CA2. For simplicity, in FIG. 18B, only four vertices (grids) are each shown with the coordinate value, and the correction value for brightness and color. However, the coordinate value and the correction value for brightness and color, are assigned to each of all girds.

Referring back to FIG. 17, the location of the point of gaze in the predetermined-area image Q, corresponds to the point of gaze GP3 in the predetermined-area image Q, which has been converted from the point of gaze GP2 in the third area CA3 specified by the point of gaze specifier 554.

The magnification parameter is a parameter for enlarging or reducing a size of the predetermined area T, such that the predetermined area T of the spherical image CE, with the superimposed image S being superimposed, is displayed in the display area DA of the display 517. That is, with the magnification parameter, the predetermined area T matches the display area DA in a number of pixels both in horizontal and vertical directions.

Referring back to FIG. 17, the metadata generation information includes version information indicating a version of the superimposed display metadata.

As described above, the location parameter indicates correspondence of pixel positions, between the planar image P and the equirectangular projection image EC (spherical image CE). If such correspondence information is to be provided for all pixels, data for about 40 million pixels is needed in case the generic image capturing device 3 is a high-resolution digital camera. This increases processing load due to the increased data size of the location parameter. In view of this, in this embodiment, the planar image P is divided into 600 (30×20) grid areas. The location parameter indicates correspondence of each gird in each of 600 grid areas, between the planar image P and the equirectangular projection image EC (spherical image CE). When displaying the superimposed images by the smart phone 5, the smart phone 5 may interpolate the pixels in each grid area based on the coordinate of each grid in that grid area.

(Functional Configuration of Superimposing Unit)

Referring to FIG. 16, a functional configuration of the superimposing unit 55b is described according to the embodiment. The superimposing unit 55b includes a superimposed area generator 582, a correction unit 584, an image generator 586, an image superimposing unit 588, and a projection converter 590.

The superimposed area generator 582 specifies a part of the sphere CS, which corresponds to the third area CA3, to generate a partial sphere PS.

The correction unit 584 corrects the brightness and color of the planar image P, using the correction parameter of the superimposed display metadata, to match the brightness and color of the equirectangular projection image EC. The correction unit 584 may not always perform correction on brightness and color. In one example, the correction unit 584 may only correct the brightness of the planar image P using the correction parameter.

The image generator 586 superimposes (maps) the planar image P (or the corrected image C of the planar image P), on the partial sphere PS to generate an image to be superimposed on the spherical image CE, which is referred to as a superimposed image S for simplicity. The image generator 586 generates mask data M, based on a surface area of the partial sphere PS. The image generator 586 covers (attaches) the equirectangular projection image EC, over the sphere CS, to generate the spherical image CE.

The mask data M, having information indicating the degree of transparency, is referred to when superimposing the superimposed image S on the spherical image CE. The mask data M sets the degree of transparency for each pixel, or a set of pixels, such that the degree of transparency increases from the center of the superimposed image S toward the boundary of the superimposed image S with the spherical image CE. With this mask data M, the pixels around the center of the superimposed image S have brightness and color of the superimposed image S, and the pixels near the boundary between the superimposed image S and the spherical image CE have brightness and color of the spherical image CE. Accordingly, superimposition of the superimposed image S on the spherical image CE is made unnoticeable. However, application of the mask data M can be made optional, such that the mask data M does not have to be generated.

The image superimposing unit 588 superimposes the superimposed image S and the mask data M, on the spherical image CE. The image is generated, in which the high-definition superimposed image S is superimposed on the low-definition spherical image CE.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T. In projection transformation, the projection converter 590 converts a resolution of the predetermined area T, to match with a resolution of a display area DA of the display 517. Specifically, when the resolution of the predetermined area T is less than the resolution of the display area DA of the display 517, the projection converter 590 enlarges a size of the predetermined area T to match the display area DA of the display 517. In contrary, when the resolution of the predetermined area T is greater than the resolution of the display area DA of the display 517, the projection converter 590 reduces a size of the predetermined area T to match the display area DA of the display 517. Accordingly, the display control 56 displays the predetermined-area image Q, that is, the image of the predetermined area T, in the entire display area DA of the display 517.

Referring now to FIGS. 19 to 30, operation of capturing the image and displaying the image, performed by the image capturing system, is described according to the embodiment. First, referring to FIG. 19, operation of capturing the image, performed by the image capturing system, is described according to the embodiment. FIG. 19 is a data sequence diagram illustrating operation of capturing the image, according to the embodiment. The following describes the example case in which the object and surroundings of the object are captured. However, in addition to capturing the object, audio may be recorded by the audio collection unit 14 as the captured image is being generated.

As illustrated in FIG. 19, the acceptance unit 52 of the smart phone 5 accepts a user instruction to start linked image capturing (S11). In response to the user instruction to start linked image capturing, the display control 56 controls the display 517 to display a linked image capturing device configuration screen as illustrated in FIG. 15B. The screen of FIG. 15B includes, for each image capturing device available for use, a radio button to be selected when the image capturing device is selected as a main device, and a check box to be selected when the image capturing device is selected as a sub device. The screen of FIG. 15B further displays, for each image capturing device available for use, a device name and a received signal intensity level of the image capturing device. Assuming that the user selects one image capturing device as a main device, and other image capturing device as a sub device, and presses the "Confirm" key, the acceptance unit 52 of the smart phone 5 accepts the instruction for starting linked image capturing. In this example, more than one image capturing device may be selected as the sub device. For this reasons, more than one check boxes may be selected.

The near-distance communication unit 58 of the smart phone 5 sends a polling inquiry to start image capturing, to the near-distance communication unit 38 of the generic image capturing device 3 (S12). The near-distance communication unit 38 of the generic image capturing device 3 receives the inquiry to start image capturing.

The determiner 37 of the generic image capturing device 3 determines whether image capturing has started, according to whether the acceptance unit 32 has accepted pressing of the shutter button 315a by the user (S13).

The near-distance communication unit 38 of the generic image capturing device 3 transmits a response based on a result of the determination at S13, to the smart phone 5 (S14). When it is determined that image capturing has started at S13, the response indicates that image capturing has started. In such case, the response includes an image identifier of the image being captured with the generic image capturing device 3. In contrary, when it is determined that the image capturing has not started at S13, the response indicates that it is waiting to start image capturing. The near-distance communication unit 58 of the smart phone 5 receives the response.

The description continues, assuming that the determination indicates that image capturing has started at S13 and the response indicating that image capturing has started is transmitted at S14.

The generic image capturing device 3 starts capturing the image (S15). The processing of S15, which is performed after pressing of the shutter button 315a, includes capturing the object and surroundings to generate captured image data (planar image data) with the image capturing unit 33, and storing the captured image data in the memory 3000 with the storing and reading unit 39.

At the smart phone 5, the near-distance communication unit 58 transmits an image capturing start request, which requests to start image capturing, to the special image capturing device 1 (S16). The near-distance communication unit 18 of the special image capturing device 1 receives the image capturing start request.

The special image capturing device 1 starts capturing the image (S17). Specifically, at S17, the image capturing unit 13 captures the object and surroundings to generate captured image data, i.e., two hemispherical images as illustrated in FIGS. 3A and 3B. The image and audio processing unit 15 then generates one equirectangular projection image as illustrated in FIG. 3C, based on these two hemispherical images. The storing and reading unit 19 stores data of the equirectangular projection image in the memory 1000.

At the smart phone 5, the near-distance communication unit 58 transmits a request to transmit a captured image ("captured image request") to the generic image capturing device 3 (S18). The captured image request includes the image identifier received at S14. The near-distance communication unit 38 of the generic image capturing device 3 receives the captured image request.

The near-distance communication unit 38 of the generic image capturing device 3 transmits planar image data, obtained at S15, to the smart phone 5 (S19). With the planar image data, the image identifier for identifying the planar image data, and attribute data, are transmitted. The image identifier and attribute data of the planar image, are a part of planar image information illustrated in FIG. 17. The near-distance communication unit 58 of the smart phone 5 receives the planar image data, the image identifier, and the attribute data.

The near-distance communication unit 18 of the special image capturing device 1 transmits the equirectangular projection image data, obtained at S17, to the smart phone 5 (S20). With the equirectangular projection image data, the image identifier for identifying the equirectangular projection image data, and attribute data, are transmitted. As illustrated in FIG. 17, the image identifier and the attribute data are a part of the equirectangular projection image information. The near-distance communication unit 58 of the smart phone 5 receives the equirectangular projection image data, the image identifier, and the attribute data.

Next, the storing and reading unit 59 of the smart phone 5 stores the planar image data received at S19, and the equirectangular projection image data received at S20, in the same folder in the memory 5000 (S21).

Next, the image and audio processing unit 55 of the smart phone 5 generates superimposed display metadata, which is used to display an image where the planar image P is partly superimposed on the spherical image CE (S22). Here, the planar image P is a high-definition image, and the spherical image CE is a low-definition image. The storing and reading unit 59 stores the superimposed display metadata in the memory 5000.

Referring to FIGS. 20 to 24, operation of generating superimposed display metadata is described in detail, according to the embodiment. Even when the generic image capturing device 3 and the special image capturing device 1 are equal in resolution of imaging element, the imaging element of the special image capturing device 1 captures a wide area to obtain the equirectangular projection image, from which the 360-degree spherical image CE is generated. Accordingly, the image data captured with the special image capturing device 1 tends to be low in definition per unit area.

<Generation of Superimposed Display Metadata>

First, operation of generating the superimposed display metadata is described. The superimposed display metadata is used to display an image on the display 517, where the high-definition planar image P is superimposed on the spherical image CE. The spherical image CE is generated from the low-definition equirectangular projection image EC. As illustrated in FIG. 17, the superimposed display metadata includes the location parameter and the correction parameter, each of which is generated as described below.

Referring to FIG. 20, the extractor 550 extracts a plurality of feature points fp1 from the rectangular, equirectangular projection image EC captured in equirectangular projection (S110). The extractor 550 further extracts a plurality of feature points fp2 from the rectangular, planar image P captured in perspective projection (S110).

Next, the first area calculator 552 calculates a rectangular, first area CA1 in the equirectangular projection image EC, which corresponds to the planar image P, based on similarity between the feature value fv1 of the feature 8 points fp1 in the equirectangular projection image EC, and the feature value fv2 of the feature points fp2 in the planar image P, using the homography (S120). More specifically, the first area calculator 552 calculates a rectangular, first area CA1 in the equirectangular projection image EC, which corresponds to the planar image P, based on similarity between the feature value fv1 of the feature points fp1 in the equirectangular projection image EC, and the feature value fv2 of the feature points fp2 in the planar image P, using the homography (S120). The above-described processing is performed to roughly estimate corresponding pixel (gird) positions between the planar image P and the equirectangular projection image EC that differ in projection.

Next, the point of gaze specifier 554 specifies the point (referred to as the point of gaze) in the equirectangular projection image EC, which corresponds to the central point CP1 of the planar image P after the first homography transformation (S130).

The projection converter 556 extracts a peripheral area PA, which is a part surrounding the point of gaze GP1, from the equirectangular projection image EC. The projection converter 556 converts the peripheral area PA, from the equirectangular projection to the perspective projection, to generate a peripheral area image PI (S140).

The extractor 550 extracts a plurality of feature points fp3 from the peripheral area image PI, which is obtained by the projection converter 556 (S150).

Next, the second area calculator 558 calculates a rectangular, second area CA2 in the peripheral area image PI, which corresponds to the planar image P, based on similarity between the feature value fv2 of the feature points fp2 in the planar image P, and the feature value fv3 of the feature points fp3 in the peripheral area image PI using second homography (S160). In this example, the planar image P, which is a high-definition image of 40 million pixels, may be reduced in size.

Next, the area divider 560 divides the second area CA2 into a plurality of grid areas LA2 as illustrated in FIG. 22B (S170).

As illustrated in FIG. 20, the projection reverse converter 562 converts (reverse converts) the second area CA2 from the perspective projection to the equirectangular projection, which is the same as the projection of the equirectangular projection image EC (S180). As illustrated in FIG. 23, the projection reverse converter 562 determines the third area CA3 in the equirectangular projection image EC, which contains a plurality of grid areas LA3 corresponding to the plurality of grid areas LA2 in the second area CA2. FIG. 23 is a conceptual diagram for explaining determination of the third area CA3 in the equirectangular projection image EC. Through processing by the projection reverse converter 562, a location parameter is generated, which indicates the coordinate of each grid in each grid area LA3. The location parameter is illustrated in FIG. 17 and FIG. 18B.

Figure 24B:
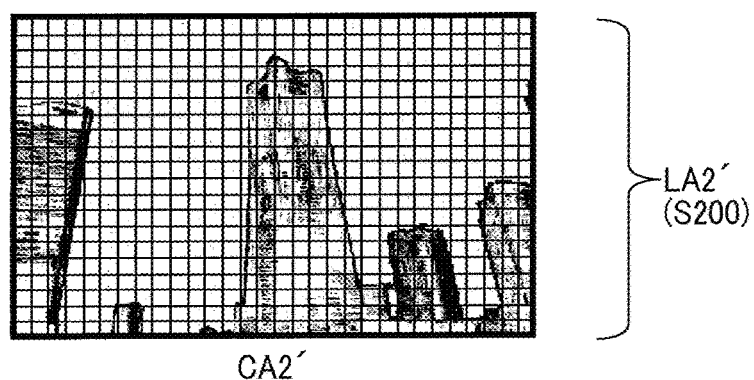
Figure 24C:
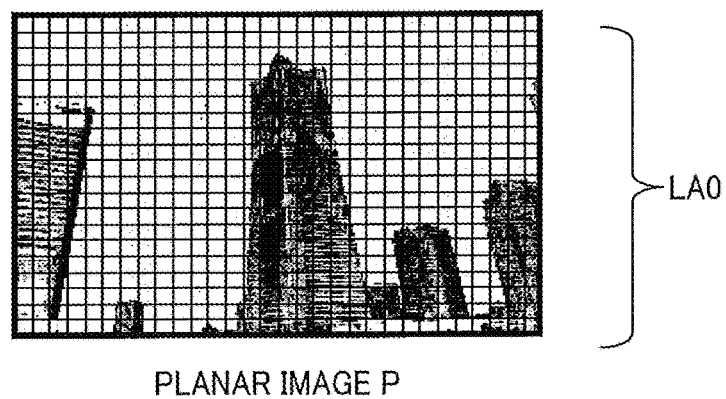

Referring to FIGS. 20 to 24C, operation of generating the correction parameter is described according to the embodiment. FIGS. 24A to 24C are conceptual diagrams illustrating operation of generating the correction parameter, according to the embodiment.

After S180, the shape converter 564 converts the second area CA2 to have a shape that is the same as the shape of the planar image P. Specifically, the shape converter 564 maps four vertices of the second area CA2, illustrated in FIG. 24A, on corresponding four vertices of the planar image P, to obtain the second area CA2 as illustrated in FIG. 24B.

As illustrated in FIG. 24C, the area divider 560 divides the planar image P into a plurality of grid areas LAO, which are equal in shape and number to the plurality of grid areas LA2' of the second area CA2' (S200).

The correction parameter generator 566 generates the correction parameter, which is to be applied to each grid area LA2' in the second area CA2', such that each grid area LA2' is equal to the corresponding grid area LAO in the planar image P in brightness and color (S210).

As illustrated in FIG. 17, the superimposed display metadata generator 570 generates the superimposed display metadata, using the equirectangular projection image information obtained from the special image capturing device 1, the planar image information obtained from the generic image capturing device 3, the area division number information previously set, the location parameter generated by the projection reverse converter 562, the correction parameter generated by the correction parameter generator 566, and the metadata generation information (S220). The superimposed display metadata is stored in the memory 5000 by the storing and reading unit 59.

Then, the operation of generating the superimposed display metadata performed at S22 of FIG. 19 ends. The display control 56, which cooperates with the storing and reading unit 59, superimposes the images, using the superimposed display metadata (S23).

<Superimposition>

Figure 25:
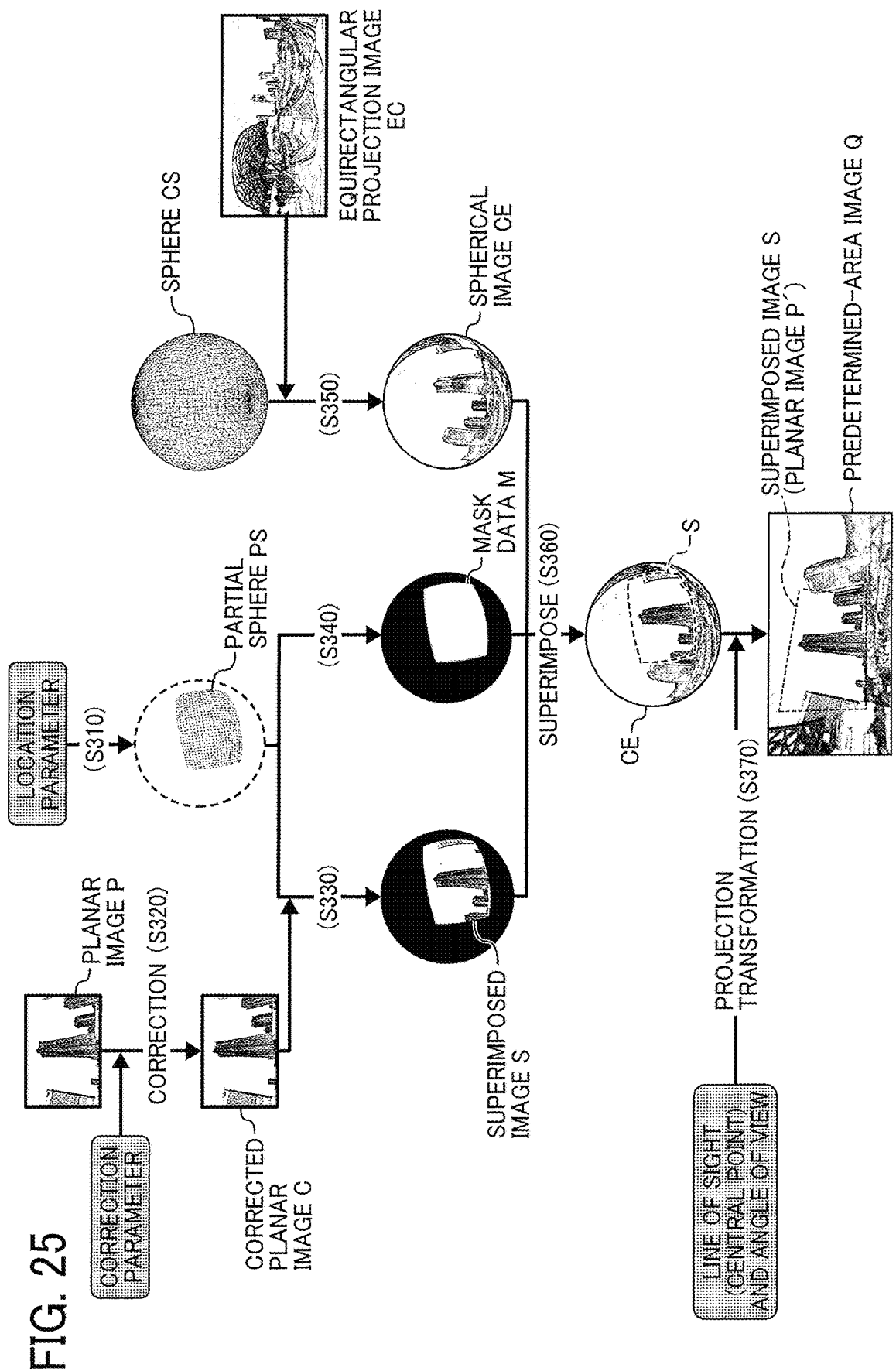
FIG. 25 is a conceptual diagram illustrating operation of superimposing images, with images being processed or generated, according to the first embodiment.

Referring to FIGS. 25 to 30D, operation of superimposing images is described according to the embodiment. FIG. 25 is a conceptual diagram illustrating operation of superimposing images, with images being processed or generated, according to the embodiment.

The storing and reading unit 59 (obtainer) illustrated in FIG. 14 reads from the memory 5000, data of the equirectangular projection image EC in equirectangular projection, data of the planar image P in perspective projection, and the superimposed display metadata.

As illustrated in FIG. 25, using the location parameter, the superimposed area generator 582 specifies a part of the virtual sphere CS, which corresponds to the third area CA3, to generate a partial sphere PS (S310). The pixels other than the pixels corresponding to the grids having the positions defined by the location parameter are interpolated by linear interpolation.

The correction unit 584 corrects the brightness and color of the planar image P, using the correction parameter of the superimposed display metadata, to match the brightness and color of the equirectangular projection image EC (S320). The planar image P, which has been corrected, is referred to as the "corrected planar image C".

The image generator 586 superimposes the corrected planar image C of the planar image P, on the partial sphere PS to generate the superimposed image S (S330). The pixels other than the pixels corresponding to the grids having the positions defined by the location parameter are interpolated by linear interpolation. The image generator 586 generates mask data M based on the partial sphere PS (S340). The image generator 586 covers (attaches) the equirectangular projection image EC, over a surface of the sphere CS, to generate the spherical image CE (S350). The image superimposing unit 588 superimposes the superimposed image S and the mask data M, on the spherical image CE (S360). The image is generated, in which the high-definition superimposed image S is superimposed on the low-definition spherical image CE. With the mask data, the boundary between the two different images is made unnoticeable.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T (S370). The projection converter 590 may further change a size of the predetermined area T according to the resolution of the display area DA of the display 517. Accordingly, the display control 56 displays the predetermined-area image Q, that is, the image of the predetermined area T, in the entire display area DA of the display 517 (S24). In this example, the predetermined-area image Q includes the superimposed image S superimposed with the planar image P.

Figure 26:
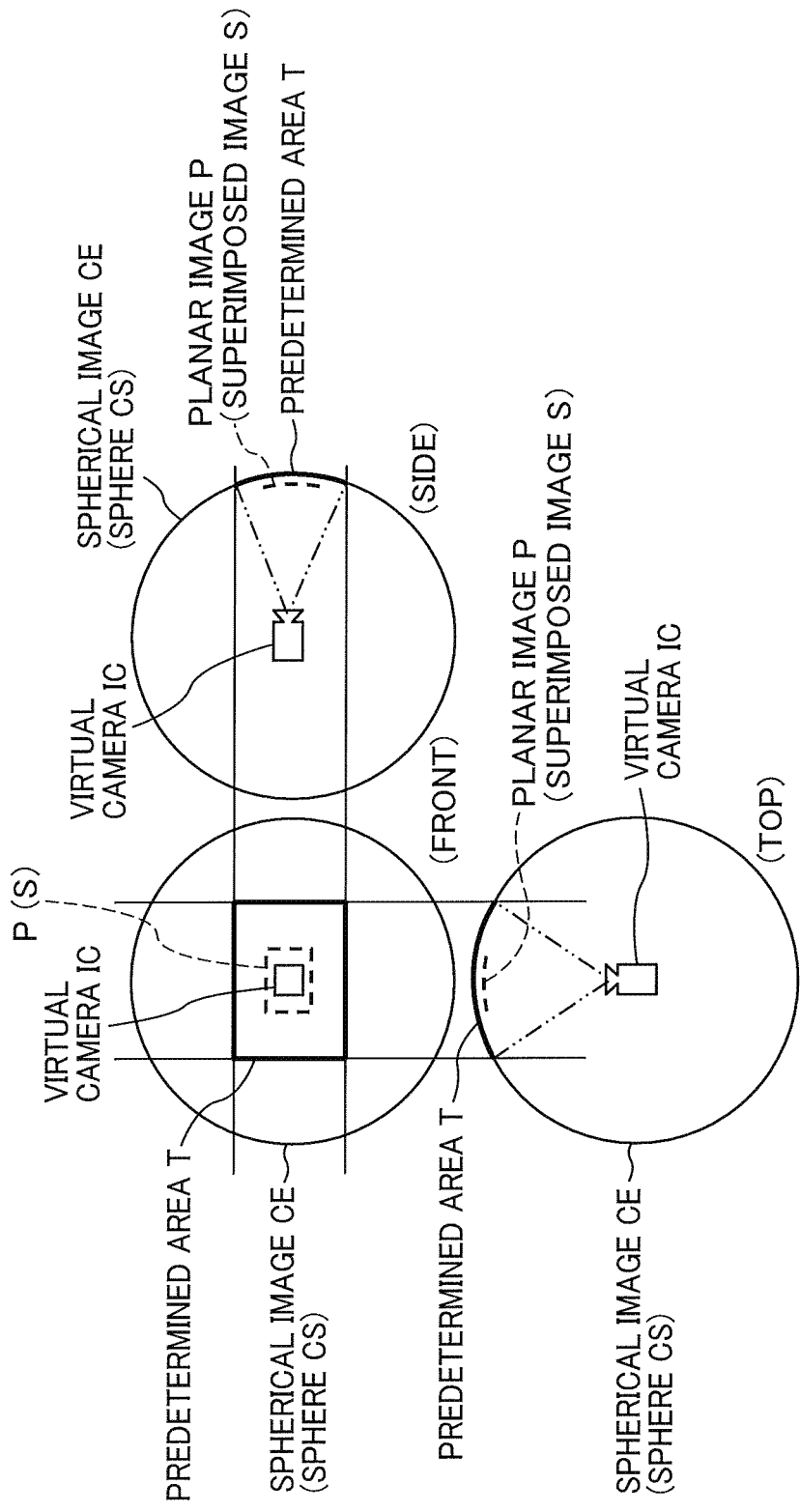
FIG. 26 is a conceptual diagram illustrating a two-dimensional view of the spherical image superimposed with the planar image, according to the first embodiment.

Referring to FIGS. 26 to 30D, display of the superimposed image is described in detail, according to the embodiment. FIG. 26 is a conceptual diagram illustrating a two-dimensional view of the spherical image CE superimposed with the planar image P. The planar image P is superimposed on the spherical image CE illustrated in FIG. 5. As illustrated in FIG. 26, the high-definition superimposed image S is superimposed on the spherical image CE, which covers a surface of the sphere CS, to be within the inner side of the sphere CS, according to the location parameter.

Figure 27:
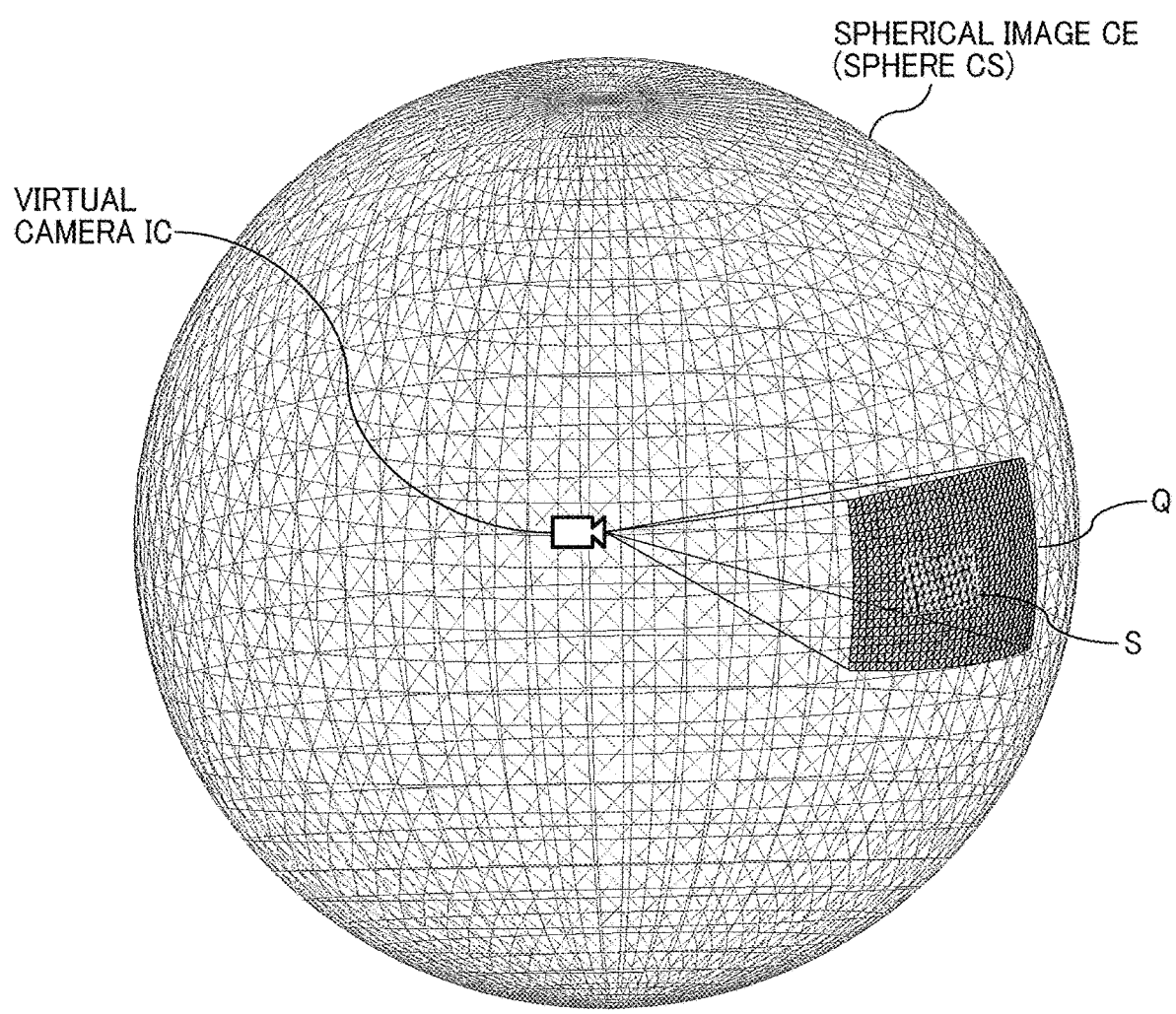
FIG. 27 is a conceptual diagram illustrating a three-dimensional view of the spherical image superimposed with the planar image, according to the first embodiment.

FIG. 27 is a conceptual diagram illustrating a three-dimensional view of the spherical image CE superimposed with the planar image P. FIG. 27 represents a state in which the spherical image CE and the superimposed image S cover a surface of the sphere CS, and the predetermined-area image Q includes the superimposed image S.

Figure 28A:
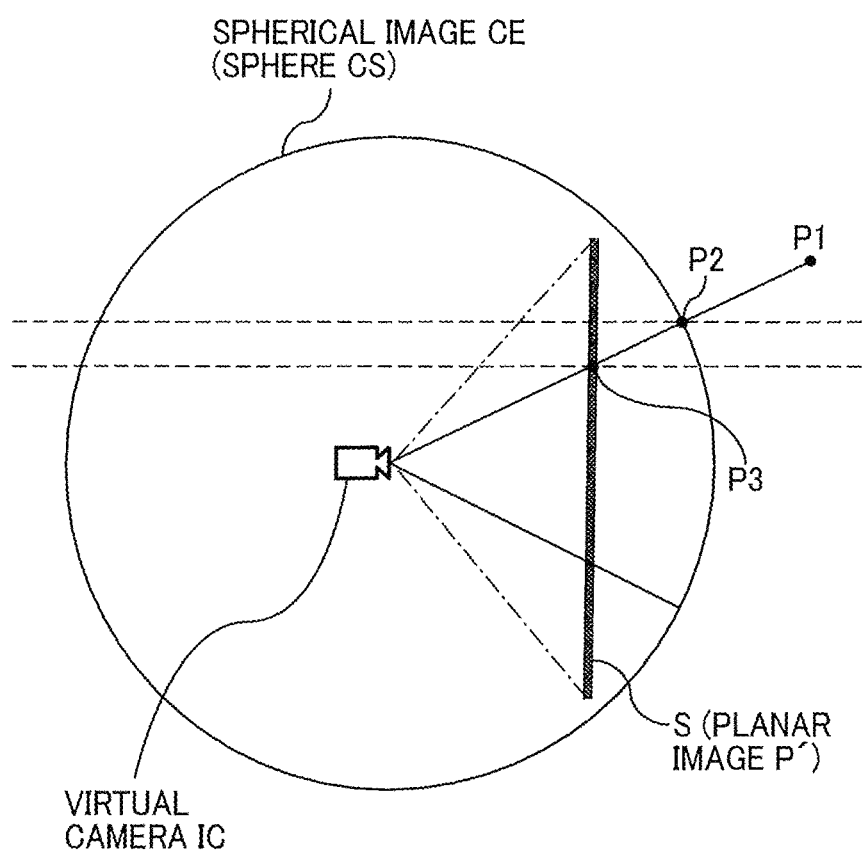
FIGS. 28A and 28B are conceptual diagrams illustrating a two-dimensional view of a spherical image superimposed with a planar image, without using the location parameter, according to a comparative example.
Figure 28B:
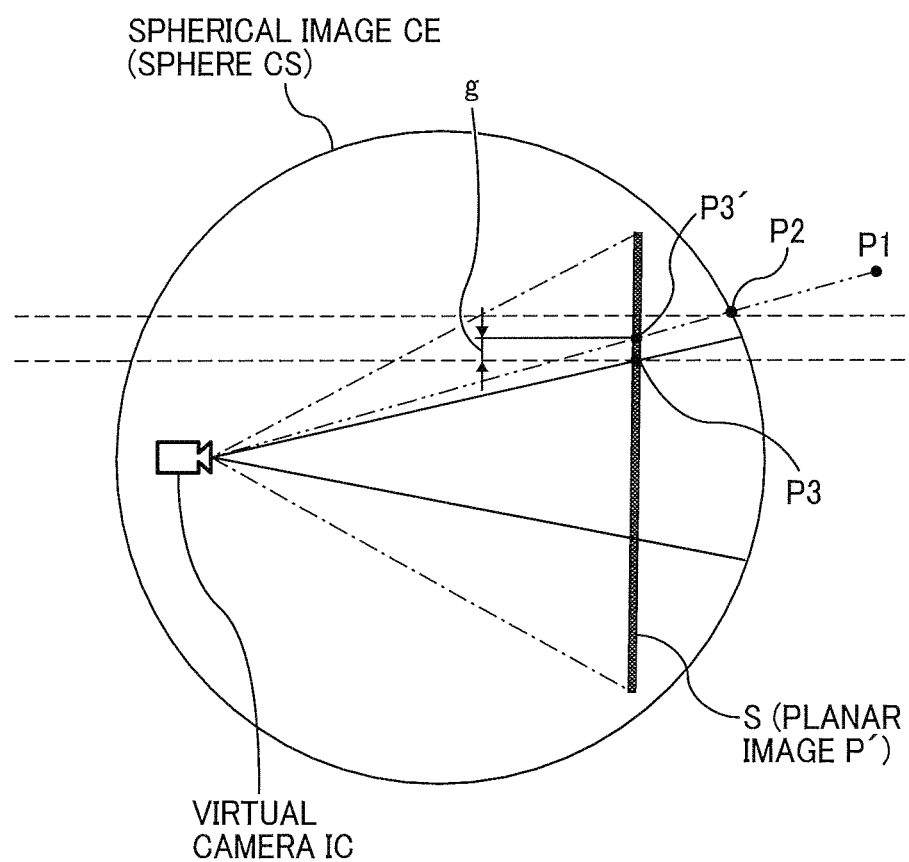
Figure 29A:
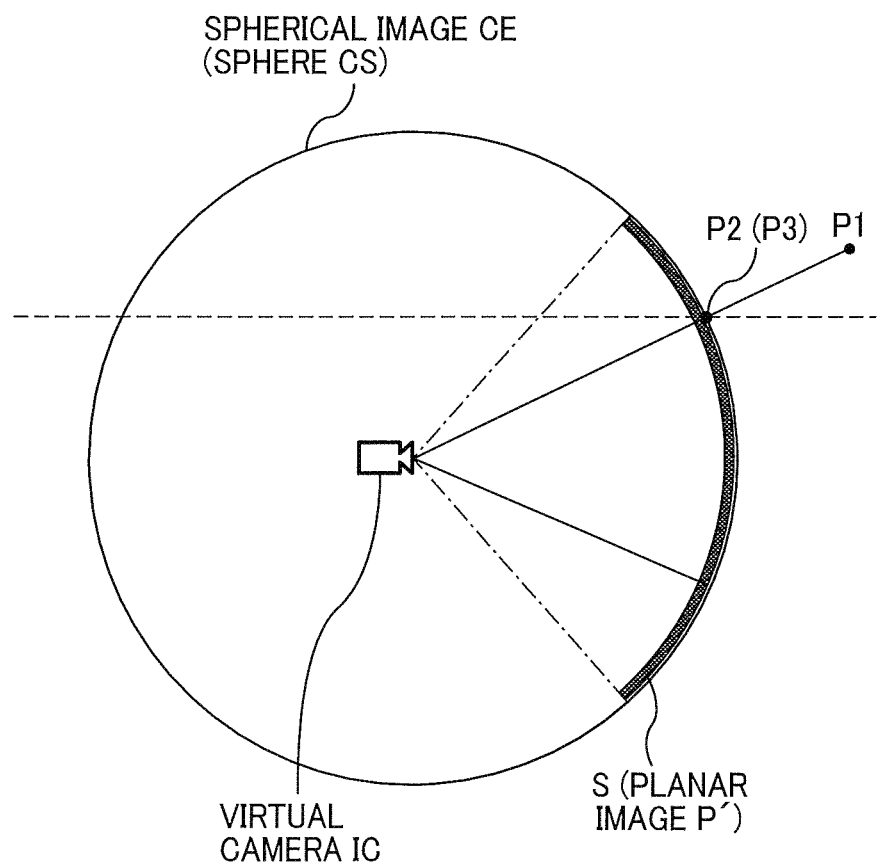
FIGS. 29A and 29B are conceptual diagrams illustrating a two-dimensional view of the spherical image superimposed with the planar image, using the location parameter, in the first embodiment.
Figure 29B:
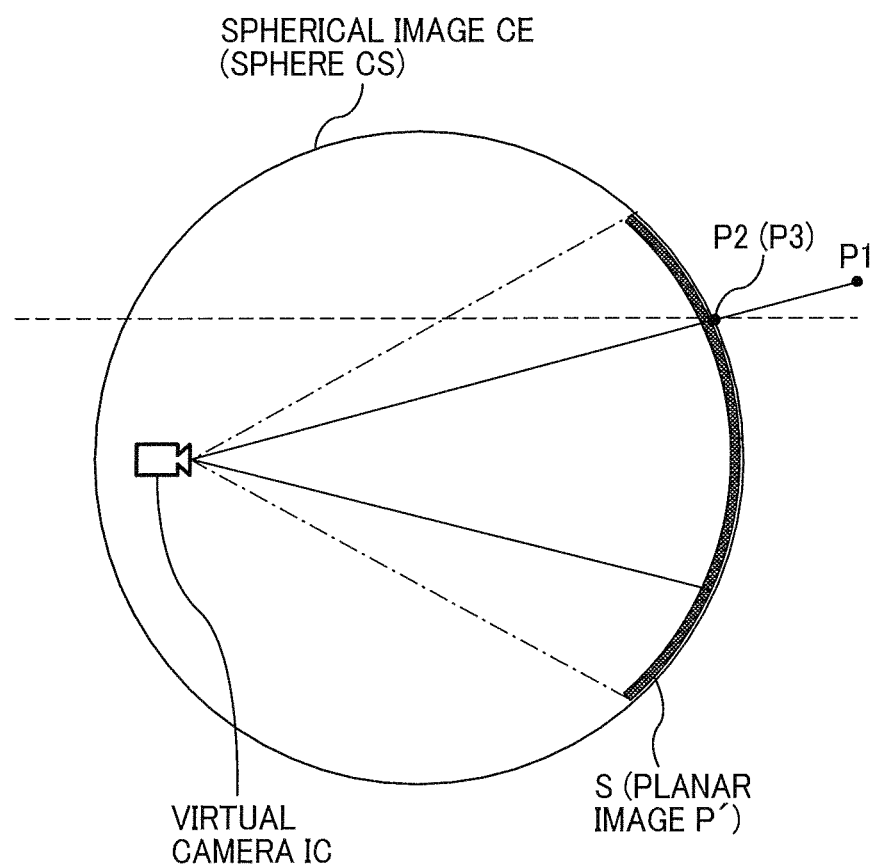

FIGS. 28A and 28B are conceptual diagrams illustrating a two-dimensional view of a spherical image superimposed with a planar image, without using the location parameter, according to a comparative example. FIGS. 29A and 29B are conceptual diagrams illustrating a two-dimensional view of the spherical image CE superimposed with the planar image P, using the location parameter, in this embodiment.

As illustrated in FIG. 28A, it is assumed that the virtual camera IC, which corresponds to the user's point of view, is located at the center of the sphere CS, which is a reference point. The object P1, as an image capturing target, is represented by the object P2 in the spherical image CE. The object P1 is represented by the object P3 in the superimposed image S. Still referring to FIG. 28A, the object P2 and the object P3 are positioned along a straight line connecting the virtual camera IC and the object P1. This indicates that, even when the superimposed image S is displayed as being superimposed on the spherical image CE, the coordinate of the spherical image CE and the coordinate of the superimposed image S match. As illustrated in FIG. 28B, if the virtual camera IC is moved away from the center of the sphere CS, the position of the object P2 stays on the straight line connecting the virtual camera IC and the object P1, but the position of the object P3 is slightly shifted to the position of an object P3'. The object P3' is an object in the superimposed image S, which is positioned along the straight line connecting the virtual camera IC and the object P1. This will cause a difference in grid positions between the spherical image CE and the superimposed image S, by an amount of shift "g" between the object P3 and the object P3'. Accordingly, in displaying the superimposed image S, the coordinate of the superimposed image S is shifted from the coordinate of the spherical image CE.

In view of the above, in this embodiment, the location parameter is generated, which indicates respective positons of a plurality of grid areas in the superimposed image S with respect to the planar image P. With this location parameter, as illustrated in FIGS. 29A and 29B, the superimposed image S is superimposed on the spherical image CE at right positions, while compensating the shift. More specifically, as illustrated in FIG. 29A, when the virtual camera IC is at the center of the sphere CS, the object P2 and the object P3 are positioned along the straight line connecting the virtual camera IC and the object P1. As illustrated in FIG. 29B, even when the virtual camera IC is moved away from the center of the sphere CS, the object P2 and the object P3 are positioned along the straight line connecting the virtual camera IC and the object P1. Even when the superimposed image S is displayed as being superimposed on the spherical image CE, the coordinate of the spherical image CE and the coordinate of the superimposed image S match.

Figure 30B:
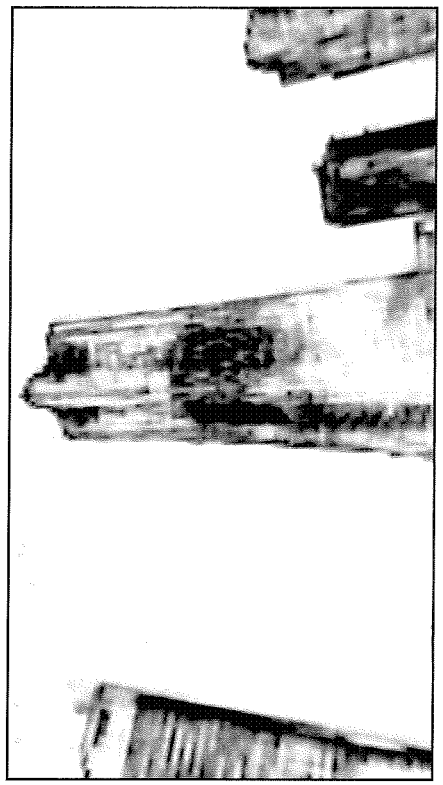
FIGS. 30A, 30B, 30C, and 30D are illustrations of a wide-angle image without superimposed display, a telephoto image without superimposed display, a wide-angle image with superimposed display, and a telephoto image with superimposed display, according to the first embodiment.
Figure 30A:
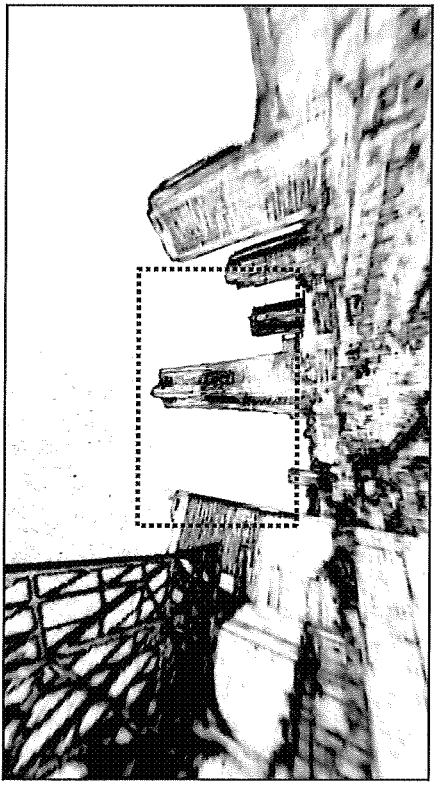
Figure 30D:
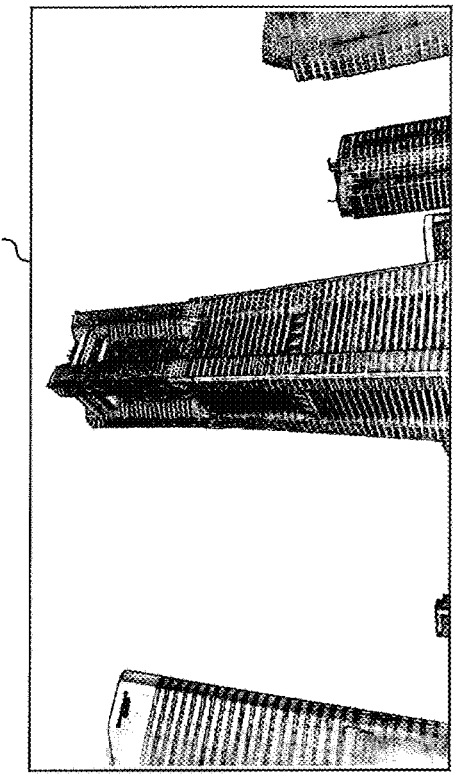
Figure 30C:
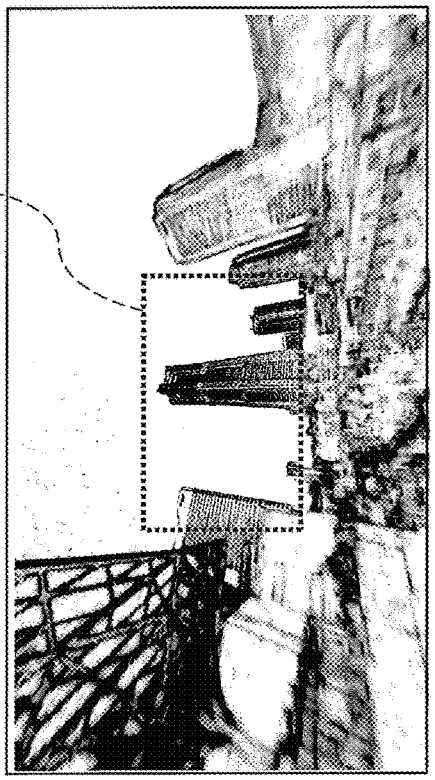

Accordingly, the image capturing system of this embodiment is able to display an image in which the high-definition planar image P is superimposed on the low-definition spherical image CE, with high image quality. This will be explained referring to FIGS. 30A to 30D. FIG. 30A illustrates the spherical image CE, when displayed as a wide-angle image. Here, the planar image P is not superimposed on the spherical image CE. FIG. 30B illustrates the spherical image CE, when displayed as a telephoto image. Here, the planar image P is not superimposed on the spherical image CE. FIG. 30C illustrates the spherical image CE, superimposed with the planar image P, when displayed as a wide-angle image. FIG. 30D illustrates the spherical image CE, superimposed with the planar image P, when displayed as a telephoto image. The dotted line in each of FIGS. 30A and 30C, which indicates the boundary of the planar image P, is shown for the descriptive purposes. Such dotted line may be displayed, or not displayed, on the display 517 to the user.

It is assumed that, while the spherical image CE without the planar image P being superimposed, is displayed as illustrated in FIG. 30A, a user instruction for enlarging an area indicated by the dotted area is received. In such case, as illustrated in FIG. 30B, the enlarged, low-definition image, which is a blurred image, is displayed to the user. As described above in this embodiment, it is assumed that, while the spherical image CE with the planar image P being superimposed, is displayed as illustrated in FIG. 30C, a user instruction for enlarging an area indicated by the dotted area is received. In such case, as illustrated in FIG. 30D, a high-definition image, which is a clear image, is displayed to the user. For example, assuming that the target object, which is shown within the dotted line, has a sign with some characters, even when the user enlarges that section, the user may not be able to read such characters if the image is blurred. If the high-definition planar image P is superimposed on that section, the high-quality image will be displayed to the user such that the user is able to read those characters.

As described above in this embodiment, even when images that differ in projection are superimposed one above the other, the grid shift caused by the difference in projection can be compensated. For example, even when the planar image P in perspective projection is superimposed on the equirectangular projection image EC in equirectangular projection, these images are displayed with the same coordinate positions. More specifically, the special image capturing device 1 and the generic image capturing device 3 capture images using different projection methods. In such case, if the planar image P obtained by the generic image capturing device 3, is superimposed on the spherical image CE that is generated from the equirectangular projection image EC obtained by the special image capturing device, the planar image P does not fit in the spherical image CE as these images CE and P look different from each other. In view of this, as illustrated in FIG. 20, the smart phone 5 according to this embodiment determines the first area CA1 in the equirectangular projection image EC, which corresponds to the planar image P, to roughly determine the area where the planar image P is superimposed (S120). The smart phone 5 extracts a peripheral area PA, which is a part surrounding the point of gaze GP1 in the first area CA1, from the equirectangular projection image EC. The smart phone 5 further converts the peripheral area PA, from the equirectangular projection, to the perspective projection that is the projection of the planar image P, to generate a peripheral area image PI (S140). The smart phone 5 determines the second area CA2, which corresponds to the planar image P, in the peripheral area image PI (S160), and reversely converts the projection applied to the second area CA2, back to the equirectangular projection applied to the equirectangular projection image EC. With this projection transformation, the third area CA3 in the equirectangular projection image EC, which corresponds to the second area CA2, is determined (S180). As illustrated in FIG. 30C, the high-definition planar image P is superimposed on a part of the predetermined-area image on the low-definition, spherical image CE. The planar image P fits in the spherical image CE, when displayed to the user.

Further, in this embodiment, the location parameter indicates positions where the superimposed image S is superimposed on the spherical image CE, using the third area CA3 including a plurality of grid areas. Accordingly, as illustrated in FIG. 29B, the superimposed image S is superimposed on the spherical image CE at right positions. This compensates the shift in grid due to the difference in projection, even when the position of the virtual camera IC changes.

Second Embodiment

Referring now to FIGS. 31 to 35, an image capturing system is described according to a second embodiment.

<Overview of Image Capturing System>

Figure 31:
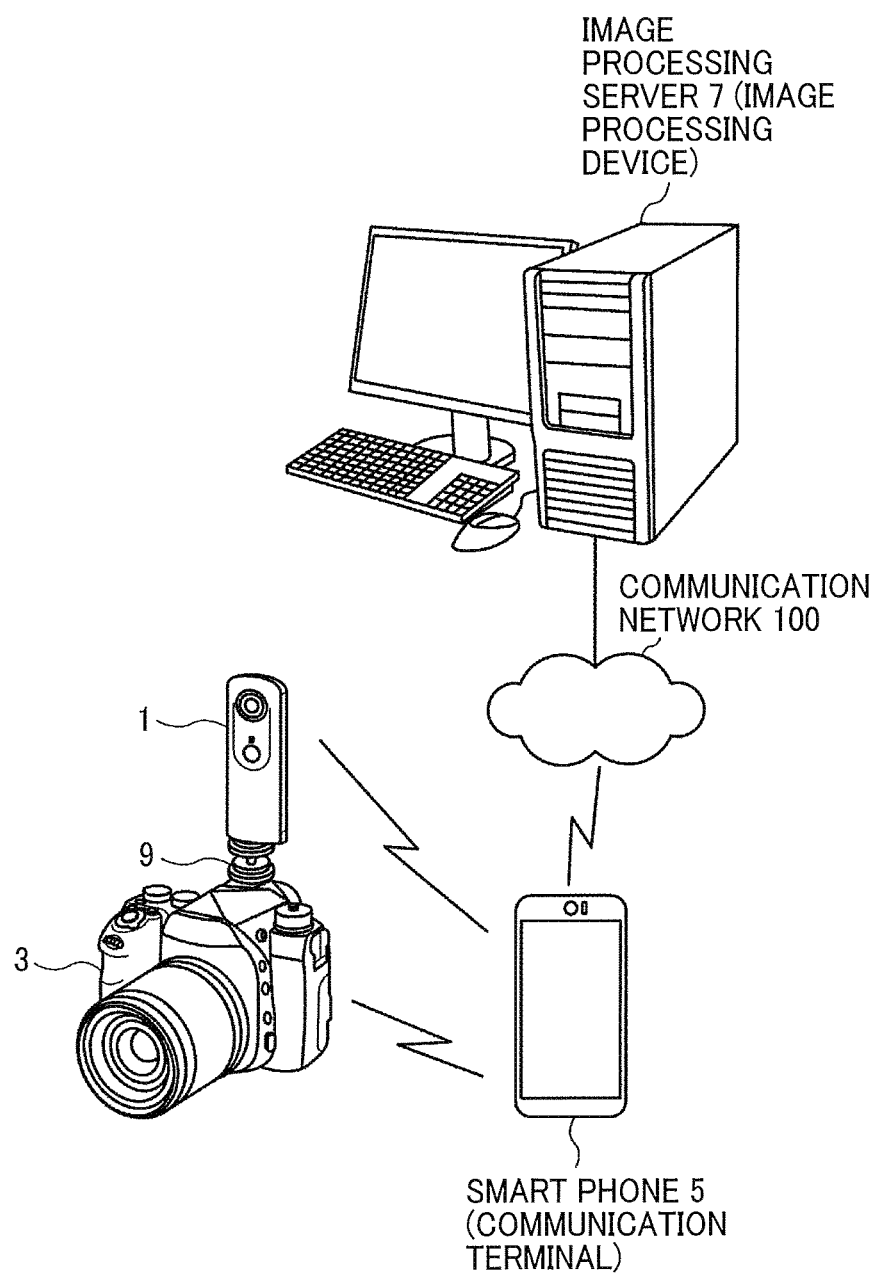
FIG. 31 is a schematic view illustrating an image capturing system according to a second embodiment.

First, referring to FIG. 31, an overview of the image capturing system is described according to the second embodiment. FIG. 31 is a schematic block diagram illustrating a configuration of the image capturing system according to the second embodiment.

As illustrated in FIG. 31, compared to the image capturing system of the first embodiment described above, the image capturing system of this embodiment further includes an image processing server 7. In the second embodiment, the elements that are substantially same to the elements described in the first embodiment are assigned with the same reference numerals. For descriptive purposes, description thereof is omitted. The smart phone 5 and the image processing server 7 communicate with each other through the communication network 100 such as the Internet and the Intranet.

In the first embodiment, the smart phone 5 generates superimposed display metadata, and processes superimposition of images. In this second embodiment, the image processing server 7 performs such processing, instead of the smart phone 5. The smart phone 5 in this embodiment is one example of the communication terminal, and the image processing server 7 is one example of the image processing apparatus or device.

The image processing server 7 is a server system, which is implemented by a plurality of computers that may be distributed over the network to perform processing such as image processing in cooperation with one another.

For example, the image processing server 7 receives the spherical image CE, captured by the special image capturing device 1, and the planar image P, captured by the generic image capturing device 3. The image processing server 7 superimposes the planar image P on the spherical image CE. The image processing server 7 may automatically superimpose one image on other image, or may superimpose one image on other image, according to a user instruction.

In case of processing superimposition according to the user instruction, the smart phone 5 accesses the image processing server 7 in response to the user instruction, and controls the smart phone 5 to display a list of one or more spherical images CE and one or more planar images P, for example, in the form of a thumbnail image. The user selects one spherical image CE and at least one planar image P to be processed, and sends a notification to the image processing server 7.

In one example, the image processing server 7 superimposes the planar image P on the spherical image CE, and transmits image data of the predetermined area T to the smart phone 5. It is assumed that the line of sight direction and the angle of view, in the initial state, are previously determined.

The image processing server 7 may transmit the image data of the predetermined area T, and a display control program (described in script language), to the smart phone 5. The display control program enables the smart phone 5 to accept the user instruction regarding the image data of the predetermined area T. The smart phone 5, which activates the display control program, accepts the user instruction, and further transmits information regarding a line of sight direction and an angle of view, to the image processing server 7. The image processing server 7 updates a predetermined area T according to the information regarding the line of sight direction and the angle of view, which are received, and transmits image data of the updated predetermined area T to the smart phone 5.

Alternatively, the image processing server 7 may send the spherical image CE, the planar image P, and the display control program, to the smart phone 5. In such case, the smart phone 5 determines a predetermined area T according to the user instruction, and superimposes the planar image P on the spherical image CE.

Alternatively, the image processing server 7 may calculate a location parameter using the spherical image CE and the planar image P. The smart phone 5 may download the spherical image CE, the planar image P, and the location parameter, from the image processing server 7. With this configuration, as the user freely changes the line of sight, the smart phone 5 is able to superimpose the planar image P on the spherical image CE using the location parameter that has been downloaded.

<Hardware Configuration>

Figure 32:
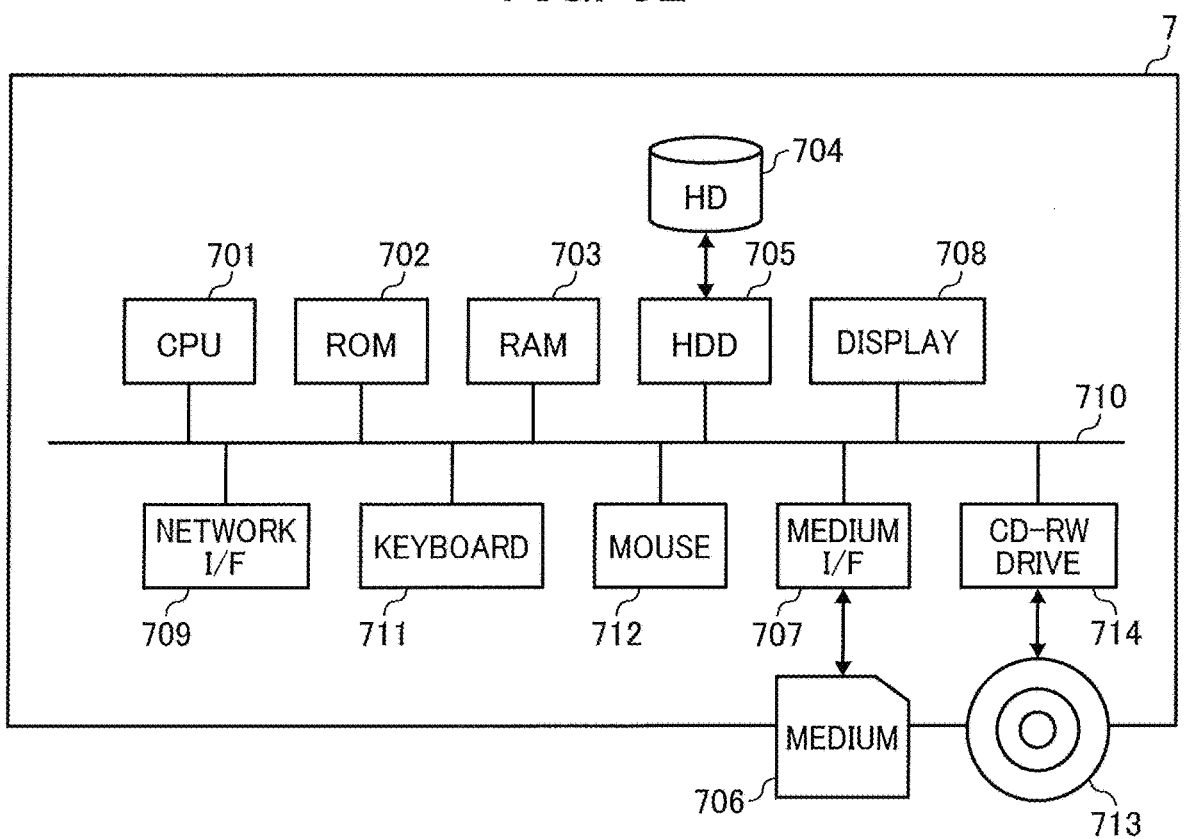
FIG. 32 is a schematic diagram illustrating a hardware configuration of an image processing server according to the second embodiment.

Next, referring to FIG. 32, a hardware configuration of the image processing server 7 is described according to the embodiment. FIG. 32 illustrates a hardware configuration of the image processing server 7 according to the embodiment. Since the special image capturing device 1, the generic image capturing device 3, and the smart phone 5 are substantially the same in hardware configuration, as described in the first embodiment, description thereof is omitted.

<Hardware Configuration of Image Processing Server>

FIG. 32 is a schematic block diagram illustrating a hardware configuration of the image processing server 7, according to the embodiment. Referring to FIG. 32, the image processing server 7, which is implemented by the general-purpose computer, includes a CPU 701, a ROM 702, a RAM 703, a HD 704, a HDD 705, a medium I/F 707, a display 708, a network I/F 709, a keyboard 711, a mouse 712, a CD-RW drive 714, and a bus line 710. Since the image processing server 7 operates as a server, an input device such as the keyboard 711 and the mouse 712, or an output device such as the display 708 does not have to be provided.

The CPU 701 controls entire operation of the image processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network I/F 709 is an interface that controls communication of data with an external device through the communication network 100. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The CD-RW drive 714 reads or writes various data with respect to a Compact Disc ReWritable (CD-RW) 713, which is one example of removable recording medium.

The image processing server 7 further includes the bus line 710. The bus line 710 is an address bus or a data bus, which electrically connects the elements in FIG. 32 such as the CPU 701.

<Functional Configuration of Image Capturing System>

Figure 33:
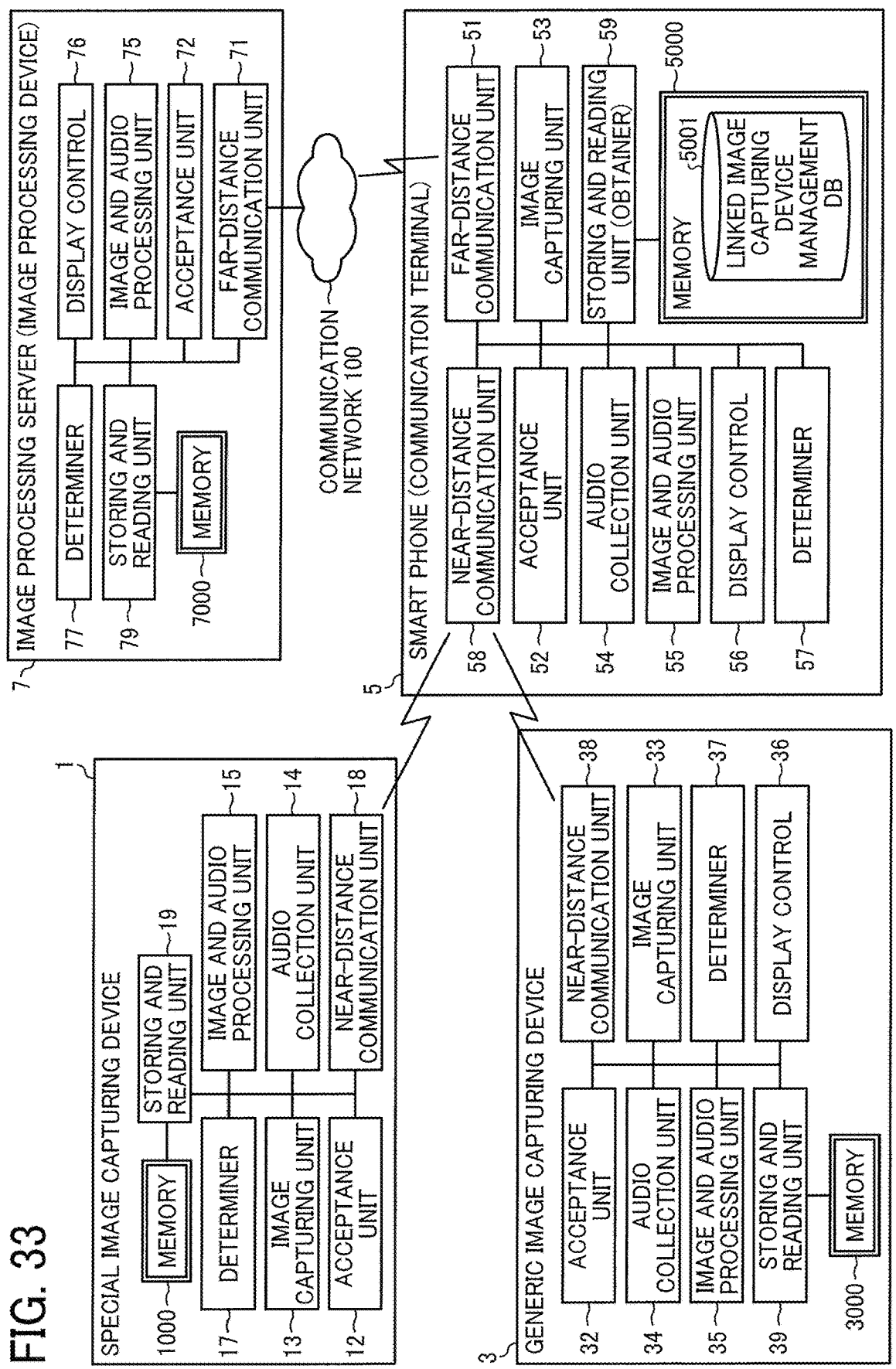
FIG. 33 is a schematic block diagram illustrating a functional configuration of the image capturing system of FIG. 31 according to the second embodiment.
Figure 34:
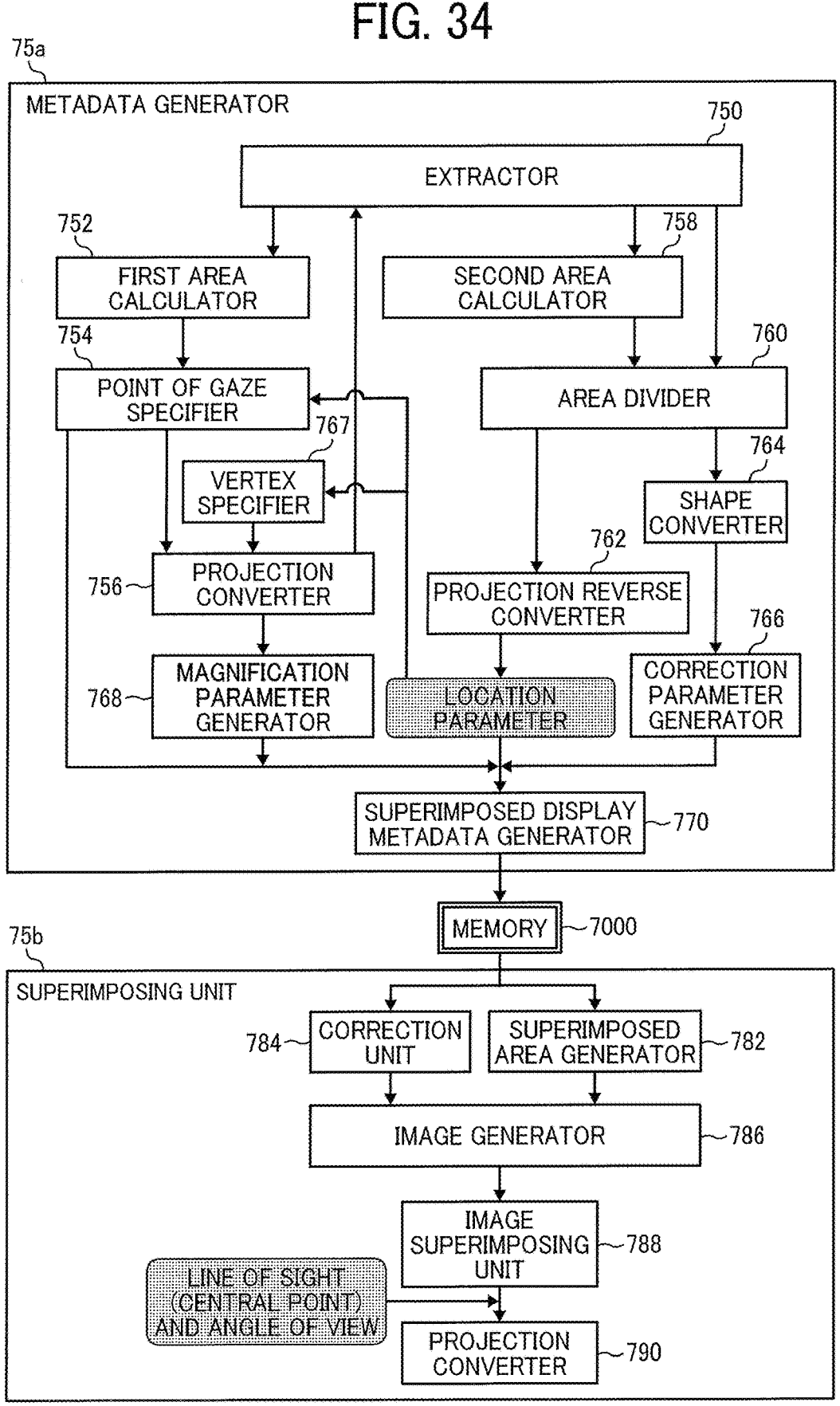
FIG. 34 is a block diagram illustrating a functional configuration of an image and audio processing unit according to the second embodiment.

Referring now to FIGS. 33 and 34, a functional configuration of the image capturing system of FIG. 31 is described according to the second embodiment. FIG. 33 is a schematic block diagram illustrating a functional configuration of the image capturing system of FIG. 31 according to the second embodiment. Since the special image capturing device 1, the generic image capturing device 3, and the smart phone 5 are substantially same in functional configuration, as described in the first embodiment, description thereof is omitted. In this embodiment, however, the image and audio processing unit 55 of the smart phone 5 does not have to be provided with all of the functional units illustrated in FIG. 16.

<Functional Configuration of Image Processing Server>

As illustrated in FIG. 33, the image processing server 7 includes a far-distance communication unit 71, an acceptance unit 72, an image and audio processing unit 75, a display control 76, a determiner 77, and a storing and reading unit 79. These units are functions that are implemented by or that are caused to function by operating any of the elements illustrated in FIG. 32 in cooperation with the instructions of the CPU 701 according to the control program expanded from the HD 704 to the RAM 703.

The image processing server 7 further includes a memory 7000, which is implemented by the ROM 702, the RAM 703 and the HD 704 illustrated in FIG. 32.

The far-distance communication unit 71 of the image processing server 7 is implemented by the network I/F 709 that operates under control of the CPU 701, illustrated in FIG. 32, to transmit or receive various data or information to or from other device (for example, other smart phone or server) through the communication network such as the Internet.

The acceptance unit 72 is implement by the keyboard 711 or mouse 712, which operates under control of the CPU 701, to receive various selections or inputs from the user.

The image and audio processing unit 75 is implemented by the instructions of the CPU 701. The image and audio processing unit 75 applies various types of processing to various types of data, transmitted from the smart phone 5.

The display control 76, which is implemented by the instructions of the CPU 701, generates data of the predetermined-area image Q, as a part of the planar image P, for display on the display 517 of the smart phone 5. The display control 76 superimposes the planar image P, on the spherical image CE, using superimposed display metadata, generated by the image and audio processing unit 75. With the superimposed display metadata, each grid area LAO of the planar image P is placed at a location indicated by a location parameter, and is adjusted to have a brightness value and a color value indicated by a correction parameter.

The determiner 77 is implemented by the instructions of the CPU 701, illustrated in FIG. 32, to perform various determinations.

The storing and reading unit 79, which is implemented by instructions of the CPU 701 illustrated in FIG. 32, stores various data or information in the memory 7000 and read out various data or information from the memory 7000. For example, the superimposed display metadata may be stored in the memory 7000. In this embodiment, the storing and reading unit 79 functions as an obtainer that obtains various data from the memory 7000.

(Functional configuration of Image and Audio Processing Unit)

Referring to FIG. 34, a functional configuration of the image and audio processing unit 75 is described according to the embodiment. FIG. 34 is a block diagram illustrating the functional configuration of the image and audio processing unit 75 according to the embodiment.

Figure 35:
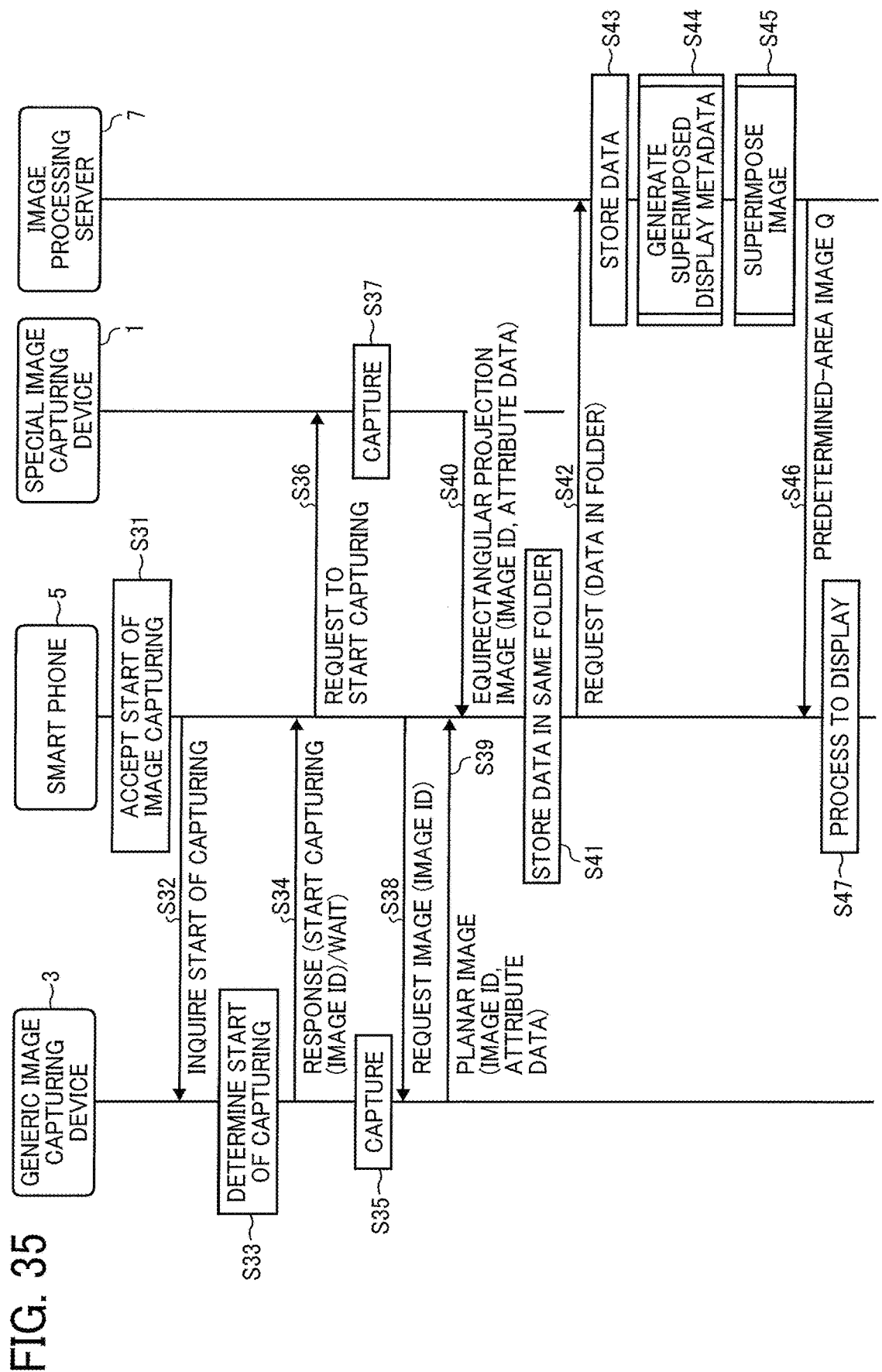
FIG. 35 is a data sequence diagram illustrating operation of capturing the image, performed by the image capturing system, according to the second embodiment.

The image and audio processing unit 75 mainly includes a metadata generator 75a that performs encoding, and a superimposing unit 75b that performs decoding. The metadata generator 75a performs processing of S44, which is processing to generate superimposed display metadata, as illustrated in FIG. 35. The superimposing unit 75b performs processing of S45, which is processing to superimpose the images using the superimposed display metadata, as illustrated in FIG. 35.

(Functional Configuration of Metadata Generator)

First, a functional configuration of the metadata generator 75a is described according to the embodiment. The metadata generator 75a includes an extractor 750, a first area calculator 752, a point of gaze specifier 754, a projection converter 756, a second area calculator 758, an area divider 760, a projection reverse converter 762, a shape converter 764, a correction parameter generator 766, and a superimposed display metadata generator 770. These elements of the metadata generator 75a are substantially similar in function to the extractor 550, first area calculator 552, point of gaze specifier 554, projection converter 556, second area calculator 558, area divider 560, projection reverse converter 562, shape converter 564, correction parameter generator 566, and superimposed display metadata generator 570 of the metadata generator 55a, respectively. Accordingly, the description thereof is omitted.

Referring to FIG. 34, a functional configuration of the superimposing unit 75b is described according to the embodiment. The superimposing unit 75b includes a superimposed area generator 782, a correction unit 784, an image generator 786, an image superimposing unit 788, and a projection converter 790. These elements of the superimposing unit 75b are substantially similar in function to the superimposed area generator 582, correction unit 584, image generator 586, image superimposing unit 588, and projection converter 590 of the superimposing unit 55b, respectively. Accordingly, the description thereof is omitted.

<Operation>

Referring to FIG. 35, operation of capturing the image, performed by the image capturing system of FIG. 31, is described according to the second embodiment. Referring to FIG. 35, operation of capturing the image, performed by the image capturing system of FIG. 31, is described according to the second embodiment. FIG. 35 is a data sequence diagram illustrating operation of capturing the image, according to the second embodiment. S31 to S41 are performed in a substantially similar manner as described above referring to S11 to S21 according to the first embodiment, and description thereof is omitted.

At the smart phone 5, the far-distance communication unit 51 transmits a superimposing request, which requests for superimposing one image on other image that are different in projection, to the image processing server 7, through the communication network 100 (S42). The superimposing request includes image data to be processed, which has been stored in the memory 5000. In this example, the image data to be processed includes planar image data, and equirectangular projection image data, which are stored in the same folder. The far-distance communication unit 71 of the image processing server 7 receives the image data to be processed.

Next, at the image processing server 7, the storing and reading unit 79 stores the image data to be processed (planar image data and equirectangular projection image data), which is received at S42, in the memory 7000 (S43). The metadata generator 75a illustrated in FIG. 34 generates superimposed display metadata (S44). Further, the superimposing unit 75b superimposes images using the superimposed display metadata (S45). More specifically, the superimposing unit 75b superimposes the planar image on the equirectangular projection image. S44 and S45 are performed in a substantially similar manner as described above referring to S22 and S23 of FIG. 19, and description thereof is omitted.

Next, the display control 76 generates data of the predetermined-area image Q, which corresponds to the predetermined area T, to be displayed in a display area DA of the display 517 of the smart phone 5. As described above in this example, the predetermined-area image Q is displayed so as to cover the entire display area DA of the display 517. In this example, the predetermined-area image Q includes the superimposed image S superimposed with the planar image P. The far-distance communication unit 71 transmits data of the predetermined-area image Q, which is generated by the display control 76, to the smart phone 5 (S46). The far-distance communication unit 51 of the smart phone 5 receives the data of the predetermined-area image Q.

The display control 56 of the smart phone 5 controls the display 517 to display the predetermined-area image Q including the superimposed image S (S47).

Accordingly, the image capturing system of this embodiment can achieve the advantages described above referring to the first embodiment.

Further, in this embodiment, the smart phone 5 performs image capturing, and the image processing server 7 performs image processing such as generation of superimposed display metadata and generation of superimposed images. This results in decrease in processing load on the smart phone 5. Accordingly, high image processing capability is not required for the smart phone 5.

Display Examples

When displaying the planar image (superimposed image) on a part of the spherical image, the user may feel inconvenient. In one example, if the planar image (superimposed image) is not displayed in the predetermined area, which is an area viewable by the user, the user may need to look for the planar image while moving the spherical image in all directions of horizontal, vertical, and diagonal, or even rotating the spherical image. In another example, when there is a plurality of planar images being superimposed on the spherical image, depending on an order of superimposition, the planar image being placed far from the viewpoint of the user may not be viewed by the user.

First, referring to FIGS. 36 to 46, display examples 1 to 7 according to this embodiment are described.

Display Example 1

Display example 1 is described with reference to FIGS. 36, 37A, 37B, and 38A to 38D.

Figure 36:
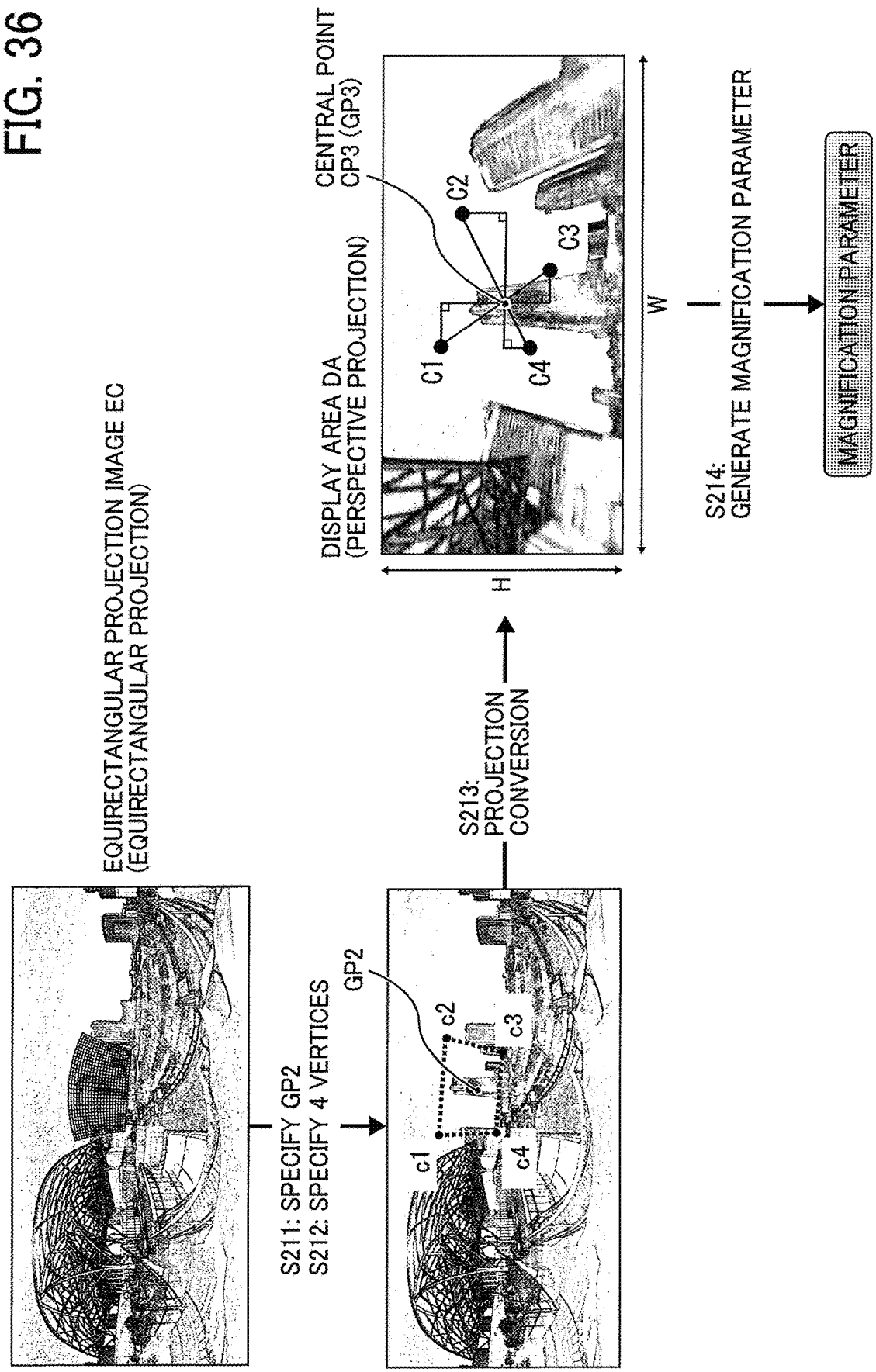
FIG. 36 is a conceptual diagram illustrating operation of specifying a point of gaze and generating a magnification parameter, according to a first display example.

FIG. 36 is a conceptual diagram illustrating operation of specifying a point of gaze and generating a magnification parameter. The operation illustrated in FIG. 36 is performed after processing of S210 illustrated in FIG. 20. First, the point of gaze specifier 554 specifies the point of gaze GP2 in the third area CA3 illustrated in FIG. 36 (S211). The vertex specifier 567 specifies the positions (coordinates) of the four vertices c1, c2, c3, and c4 of the third area CA3 illustrated in FIG. 36 (S212).

Then, the projection converter 556 converts the equirectangular projection image EC including the point of gaze GP2 and the four vertices c1, c2, c3, and c4, from the equirectangular projection to the perspective projection, to generate a perspective projection image (S213). Thus, the point of gaze GP2 is converted to the point of gaze GP3, and the four vertices c1, c2, c3, and c4 are respectively converted to the four vertices C1, C2, C3, and C4.

Figure 37A:
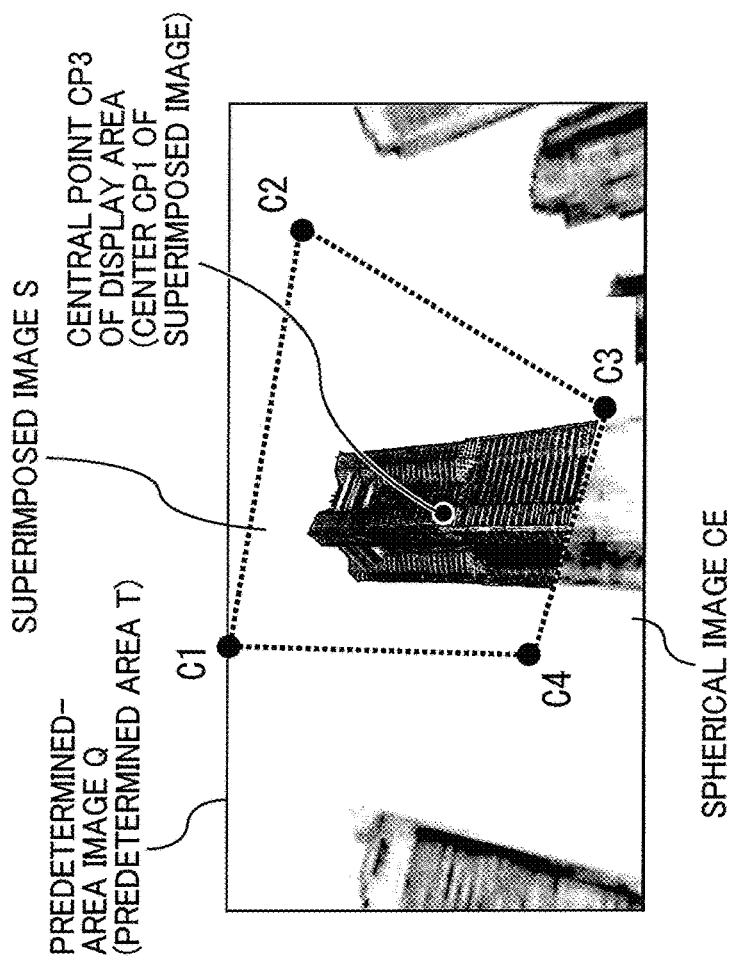
FIG. 37A is a conceptual diagram illustrating operation of calculating a magnification parameter.

Then, the magnification parameter generator 568 generates a magnification parameter based on the point of gaze GP3 and the four vertices C1, C2, C3, and C4. The operation of generating a magnification parameter is described with reference to FIGS. 37A and 37B. FIG. 37A is a conceptual diagram illustrating operation of calculating a magnification parameter.

First, referring to FIG. 37A, a description is given of calculation of a distance between the point of gaze GP3 and each of the positions (coordinates) of the four vertices C1, C2, C3, and C4 on the perspective projection image in each of the horizontal and vertical directions of the image. When the point of gaze GP3 has coordinates $(x, y)$ and the vertex C1 has coordinates $(x_1, y_1)$, a horizontal distance $w_1$ and a vertical distance $h_1$ between the point of gaze GP3 and the vertex C1 are respectively calculated using the following Equations 16 and 17. The horizontal distance $w_1$ and the vertical distance $h_1$ are calculated with the point of gaze GP3 aligned to match a central point CP3 of the display area DA of the display 517. The magnification parameter generator 568 obtains the size of the display area DA (the number of pixels both in horizontal and vertical directions) from the display 517.

$$\text{Horizontal distance } w1=|x-x1| \qquad \text{(Equation 16)}$$

$$\text{Vertical distance } h1=|y-y1| \qquad \text{(Equation 17)}$$

Similarly, when the other vertices C2, C3, and C4 respectively have coordinates (x2, y2), (x3, y3), and (x4, y4), the horizontal and vertical distances between the point of gaze GP3 and each of the coordinates of the vertices C2, C3, and C4 are calculated using the following equations.

$$\text{Horizontal distance } w2=|x-x2| \qquad \text{(Equation 18)}$$

$$\text{Vertical distance } h2=|y-y2| \qquad \text{(Equation 19)}$$

$$\text{Horizontal distance } w3=|x-x3| \qquad \text{(Equation 20)}$$

$$\text{Vertical distance } h3=|y-y3| \qquad \text{(Equation 21)}$$

$$\text{Horizontal distance } w4=|x-x4| \qquad \text{(Equation 22)}$$

$$\text{Vertical distance } h4=|y-y4| \qquad \text{(Equation 23)}$$

After the calculation of the horizontal distance and the vertical distance between the point of gaze GP3 and each of the coordinates of the vertices C1, C2, C3, and C4, the largest one of the horizontal distances (w1 to w4) and the largest one of the vertical distances (h1 to h4) are selected. In FIG. 37A, the horizontal distance w2 and the vertical distance h1 are largest.

When the largest horizontal distance is represented by w, the largest vertical distance is represented by h, the size (the number of pixels both in horizontal and vertical directions) of the display area DA of the display 517 is represented by W for the horizontal direction and H for the vertical direction, the display magnification in the horizontal direction is represented by a1, and the display magnification in the vertical direction is represented by a2, the display magnification in the horizontal direction and the display magnification in the vertical direction are calculated using the following equations.

$$\text{Display magnification } a1 \text{ in horizontal direction}=W/2w \qquad \text{(Equation 24)}$$

$$\text{Display magnification } a2 \text{ in vertical direction}=H/2h \qquad \text{(Equation 25)}$$

If the display magnification to be calculated is represented by a, the magnification parameter generator 568 selects the smaller one of the display magnification a1 in the horizontal direction and the display magnification a2 in the vertical direction to determine the display magnification a. The magnification parameter generator 568 selects the smaller one of the display magnifications in the horizontal and vertical directions to determine the maximum display magnification such that the coordinates of the four vertices C1, C2, C3, and C4 fall within the display area DA of the display 517. When the selected display magnification is a display magnification in the horizontal direction, the image is displayed maximally in the horizontal direction. When the selected display magnification is a display magnification in the vertical direction, the image is displayed maximally in the vertical direction.

Figure 37B:
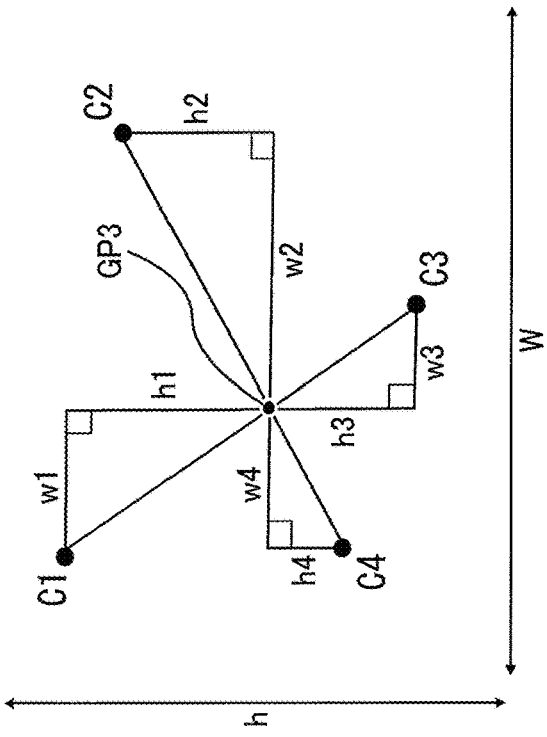
FIG. 37B is a conceptual diagram illustrating a relation among a point of gaze, four vertices, and a predetermined area, according to the first display example.

FIG. 37B is a conceptual diagram illustrating a relation among the point of gaze GP3, the four vertices C1, C2, C3, and C4, and the predetermined area T. In FIG. 37B, a superimposed area for the superimposed image S is displayed to have a maximum size centering on the point of gaze GP3 in the display area DA of the display 517. The superimposed image S is displayed such that an end of the image in the vertical direction is reached. This indicates that the display magnification a2 in the vertical direction is selected out of the display magnification a1 in the horizontal direction and the display magnification a2 in the vertical direction.

In this display example, as illustrated in FIG. 36, a display magnification is determined using the point of gaze GP3 and the coordinates of the four vertices C1, C2, C3, and C4, by way of example but not limitation. The point of gaze GP2 and the coordinates of the four vertices c1, c2, c3, and c4 before conversion may be used to determine a display magnification. When a display magnification is determined using coordinates on the equirectangular projection image EC before conversion, as in the determination of a display magnification using coordinates on the perspective projection image, horizontal distances (w1 to w4) and vertical distances (h1 to h4) are determined from the point of gaze GP2 and the coordinates of the four vertices c1, c2, c3, and c4, and the largest horizontal distance w and the largest vertical distance h are calculated. The equirectangular projection image EC is an image with an angle of view of 360 degrees in the horizontal direction and an angle of view of 180 degrees in the vertical direction. When the number of longitudinal pixels and the number of lateral pixels in the equirectangular projection image EC are respectively represented by X and Y, the largest horizontal distance w and the largest vertical distance h, which are calculated from the equirectangular projection image EC, can be respectively converted into a horizontal angle of view α1 and a vertical angle of view α2 in accordance with the following equations.

$$\alpha1=w*360/X \qquad \text{(Equation 26)}$$

$$\alpha2=h*180/Y \qquad \text{(Equation 27)}$$

From the horizontal angle of view α1 and the vertical angle of view α2, the largest horizontal distance w and the largest vertical distance h are expressed by the following equations, where f is a distance from the virtual camera IC to the central point CP, which is set by default.

$$w=2*f*\tan(\alpha1) \qquad \text{(Equation 28)}$$

$$h=2*f*\tan(\alpha2) \qquad \text{(Equation 29)}$$

Thereafter, the display magnifications in the horizontal and vertical directions are calculated from Equations 24 and 25, and the smaller one of the display magnifications is selected to determine a magnification parameter. This method is similar to that for the determination of a display magnification using coordinates of points on the perspective projection image.

Accordingly, in S220, the superimposed display metadata generator 570 generates the superimposed display metadata illustrated in FIG. 17 by using, in addition to the location parameter and the correction parameter, the position of the point of gaze GP3 in the predetermined-area image Q specified after conversion performed by the projection converter 556 and the magnification parameter generated by the magnification parameter generator 568.

In S370 illustrated in FIG. 25 described above, the projection converter 590 performs projection transformation of the spherical image CE on which the superimposed image S is superimposed, by using the position of the point of gaze GP3 in the predetermined-area image Q and the magnification parameter instead of using the line of sight direction (central point) and the angle of view α, which are set by default. Since Equation 1 holds for the predetermined-area image Q, the magnification parameter is multiplied by the distance f from the virtual camera IC to the central point CP, which is set by default, or by $\tan(\alpha/2)$, which is calculated from the angle of view α of the virtual camera IC in a three-dimensional virtual space containing the spherical image CE.

Accordingly, when the acceptance unit 52 accepts an instruction to start displaying on the display 517 the spherical image CE on which the superimposed image S is superimposed, the display control 56 displays the predetermined-area image Q such that, as illustrated in FIG. 37B, the central point CP1 of the superimposed image S is aligned to match the central point CP3 of the display 517 in the initial state and the superimposed image S has a maximum size. This can save the user from having to search for the superimposed image S in the spherical image CE.

Figure 38B:
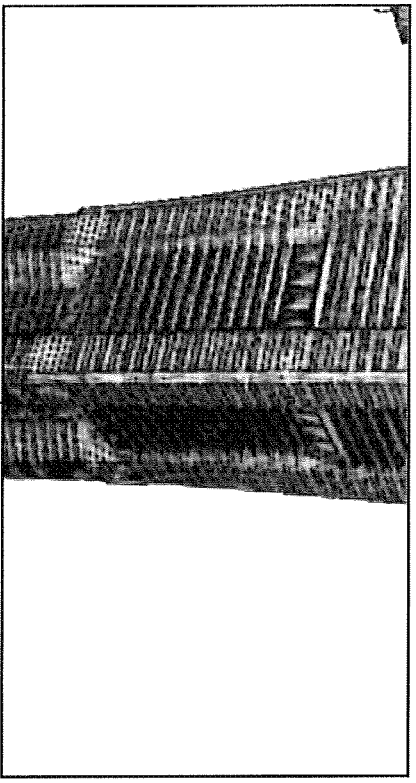
FIGS. 38A, 38B, 38C, and 38D are views respectively illustrating a predetermined-area image including no superimposed image, a predetermined-area image having a central point that matches a point of gaze in a superimposed image although a portion of the superimposed image is included in the predetermined-area image, a predetermined-area image having a central point that matches a point of gaze in a superimposed image and including an entire portion of the superimposed image although the superimposed image has a small size, and a predetermined-area image having a central point that does not match a point of gaze in a superimposed image although an entire portion of the superimposed image is included in the predetermined-area image, according to the first display example.
Figure 38D:
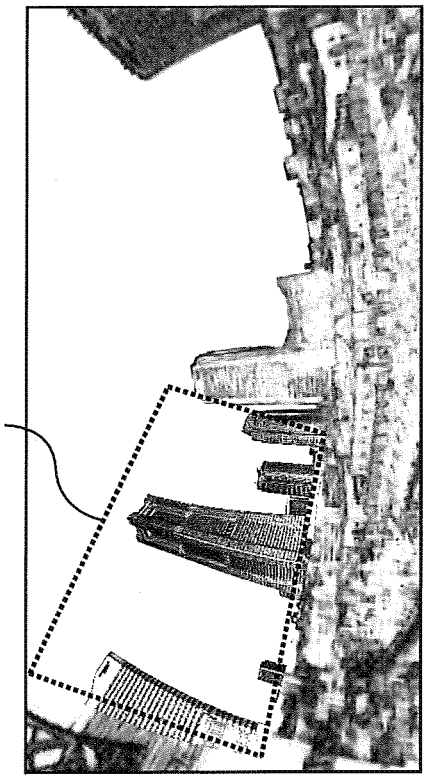
Figure 38A:
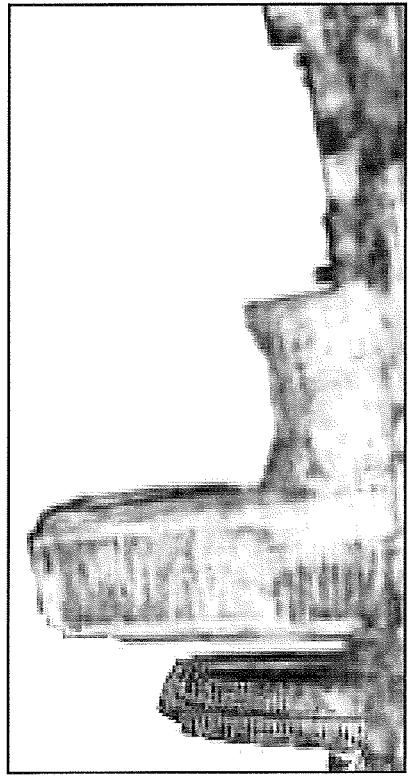
Figure 38C:
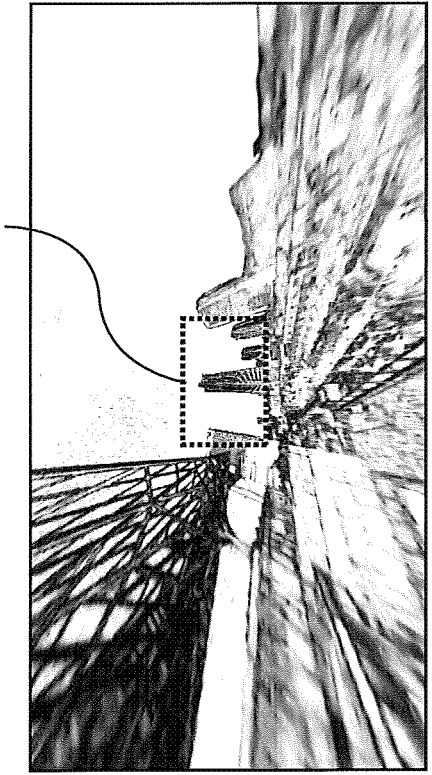

FIG. 38B is a view illustrating the predetermined-area image Q having a central point that matches a point of gaze in the superimposed image S although a portion of the superimposed image S is included in the predetermined-area image Q. FIG. 38C is a view illustrating the predetermined-area image Q having a central point that matches a point of gaze in the superimposed image S and including an entire portion of the superimposed image S although the superimposed image S has a small size. FIG. 38D is a view illustrating the predetermined-area image Q having a central point that does not match a point of gaze in the superimposed image S although an entire portion of the superimposed image S is included in the predetermined-area image Q.

In the display example described above, the projection converter 590 performs projection transformation by using both the position of the point of gaze GP3 in the predetermined-area image Q and the magnification parameter. Alternatively, the projection converter 590 may perform projection transformation without using the magnification parameter, for example. FIGS. 38B and 38C illustrate examples of the predetermined-area image Q, which is obtained through projection transformation without using the magnification parameter. Alternatively, the projection converter 590 may perform projection transformation by using the magnification parameter without using the position of the point of gaze GP3 in the predetermined-area image Q, for example. FIG. 38D illustrates an example of the predetermined-area image Q, which is obtained through projection transformation without using the position of the point of gaze GP3 in the predetermined-area image Q. Accordingly, the superimposed image S is visible in FIGS. 38B, 38C, and 38D. This can save the user from having to search for the superimposed image S in the spherical image CE, unlike a case in which, as illustrated in FIG. 38A, the superimposed image S is not included at all in the predetermined-area image Q.

As described above, in this display example, when the user provides an instruction by using the touch panel 521 or the like to start displaying on the display 517 the spherical image CE on which the superimposed image S is superimposed at a specified position, as illustrated in FIGS. 37B, 38B, 38C, and 38D, the predetermined-area image Q including the superimposed image S in the initial state can be displayed. This saves the user from having to turn the spherical image CE vertically, horizontally, or diagonally to search for the superimposed image S. In particular, in FIG. 37B, the superimposed image S is located in a center portion of the predetermined-area image Q in such a manner as to have a maximum size. This enables the user to easily find the superimposed image S.

Display Example 2

Figure 39:
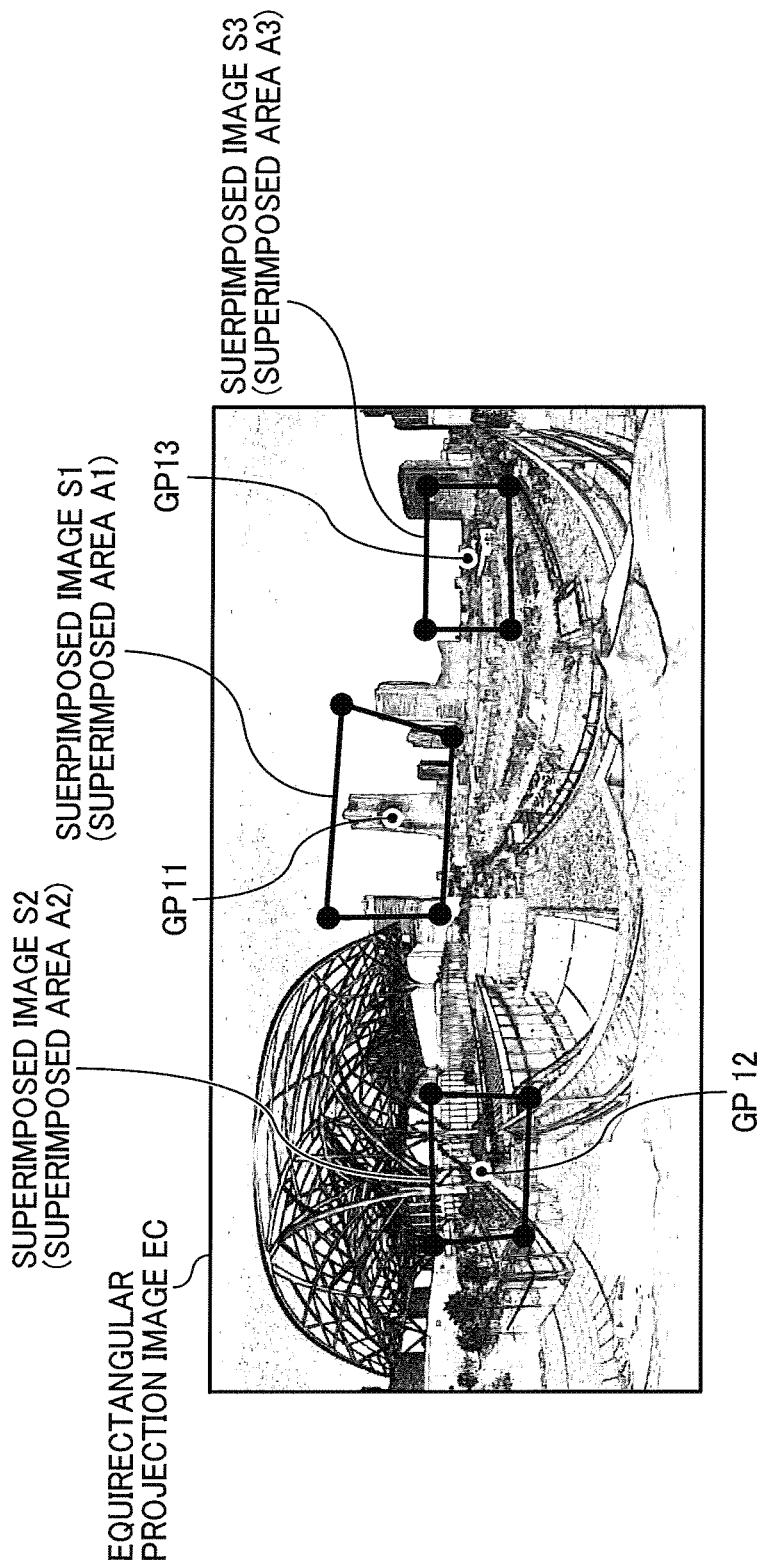
FIG. 39 is a conceptual diagram illustrating an equirectangular projection image on which a plurality of planar images are superimposed, according to a second display example.

Display example 2 is now described with reference to FIGS. 39 and 40. FIG. 39 is a conceptual diagram illustrating an equirectangular projection image on which a plurality of planar images are superimposed. In display example 1 described above, a single planar image P is superimposed on the equirectangular projection image EC, whereas in display example 2, a plurality of planar images P are superimposed on the equirectangular projection image EC. In the illustrated example, three planar images are superimposed on the equirectangular projection image EC. The equirectangular projection image EC includes a first superimposed area A1, a second superimposed area A2, and a third superimposed area A3 respectively having points of gaze GP11, GP12, and GP13. Superimposed images S1, S2, and S3 are respectively superimposed in the first, second, and third superimposed areas A1, A2, and A3. While the term "superimposed area" is used in the following description, a superimposed image is subjected to projection transformation so that the superimposed image can be superimposed in a superimposed area and a superimposed image (planar image) may or may not be displayed in the superimposed area.

FIGS. 40A and 40B (FIG. 40) are an illustration of a data structure of superimposed display metadata in display example 2. The data structure of the superimposed display metadata illustrated in FIG. 17 contains planar image information and superimposed display information to superimpose a single planar image. The data structure of the superimposed display metadata in display example 2 illustrated in FIG. 40, in contrast, contains planar image information and superimposed display information to superimpose a plurality of planar images (in this example, three planar images). In the superimposed display metadata in display example 2, each planar image is further assigned "priority-display information" to indicate whether to preferentially display the planar image in the predetermined-area image Q. The illustrated example indicates that the superimposed image S1 is preferentially included in the predetermined-area image Q and is identified with "1". A superimposed image identified with "0" is not preferentially included in the predetermined-area image Q. The determiner 57 automatically determines a planar image to be displayed preferentially, based on image capturing information about a planar image to be used for superimposition. The image capturing information includes a file name, a file size, the duration of image capturing, a focal length, an image size, and International Organization for Standardization (ISO) sensitivity. For example, the determiner 57 selects a planar image having the largest image size among three planar images and determines a planar image to be displayed preferentially. Alternatively, the user may manually set a planar image to be displayed preferentially.

The priority-display information may not necessarily use two values, namely, "1" and "0", but may rather use "1", "2", "3", . . . , and "n" which indicate the order of priority. In this case, a superimposed image initially identified with "1" is preferentially included in a predetermined-area image. When the acceptance unit 52 accepts the user's touch of the smart phone 5, the display control 56 selectively displays a predetermined-area image in which a superimposed image identified with "2" is to be included. Each time the user touches the smart phone 5, the display control 56 sequentially displays predetermined-area images in which superimposed images identified with "3", . . . , "n", "1", "2", . . . are to be included. Alternatively, the priority-display information may be displayed in association with each of the superimposed images, for example, on or near each superimposed image being displayed on the display area DA. In such case, the priority-display information, which may be expressed by a numeral ("1", "2", "3", etc.), may be displayed as is. Alternatively, any mark or sign corresponding to the priority-display information may be displayed (for example, the circle for the priority-display information of "1", and the X for the priority-order of "0").

With the functional configuration described above, superimposed display information on a plurality of superimposed images in superimposed display metadata is used to superimpose a plurality of planar images P on the equirectangular projection image EC. This enables a superimposition process similar to that for superimposing a single planar image (S310 to S360 in FIG. 25) to be performed to generate a spherical image CE and a plurality of superimposed images S. Then, as illustrated in FIGS. 38B to 38D, the display control 56 displays, on the display 517, the predetermined-area image Q that includes a superimposed image S to be displayed preferentially in accordance with the priority-display information in the superimposed display metadata illustrated in FIG. 40.

As described above, in this display example, the priority-display information in the superimposed display metadata allows a plurality of planar images that are superimposed to be displayed by using a method similar to that for displaying a single planar image.

Display Example 3

Display example 3 is now described with reference to FIGS. 41, 42A, and 42B. In display example 2 described above, a specific superimposed image among a plurality of superimposed images is preferentially included in the predetermined-area image Q, whereas in display example 3, all of the plurality of superimposed images are included in the predetermined-area image Q.

Figure 41:
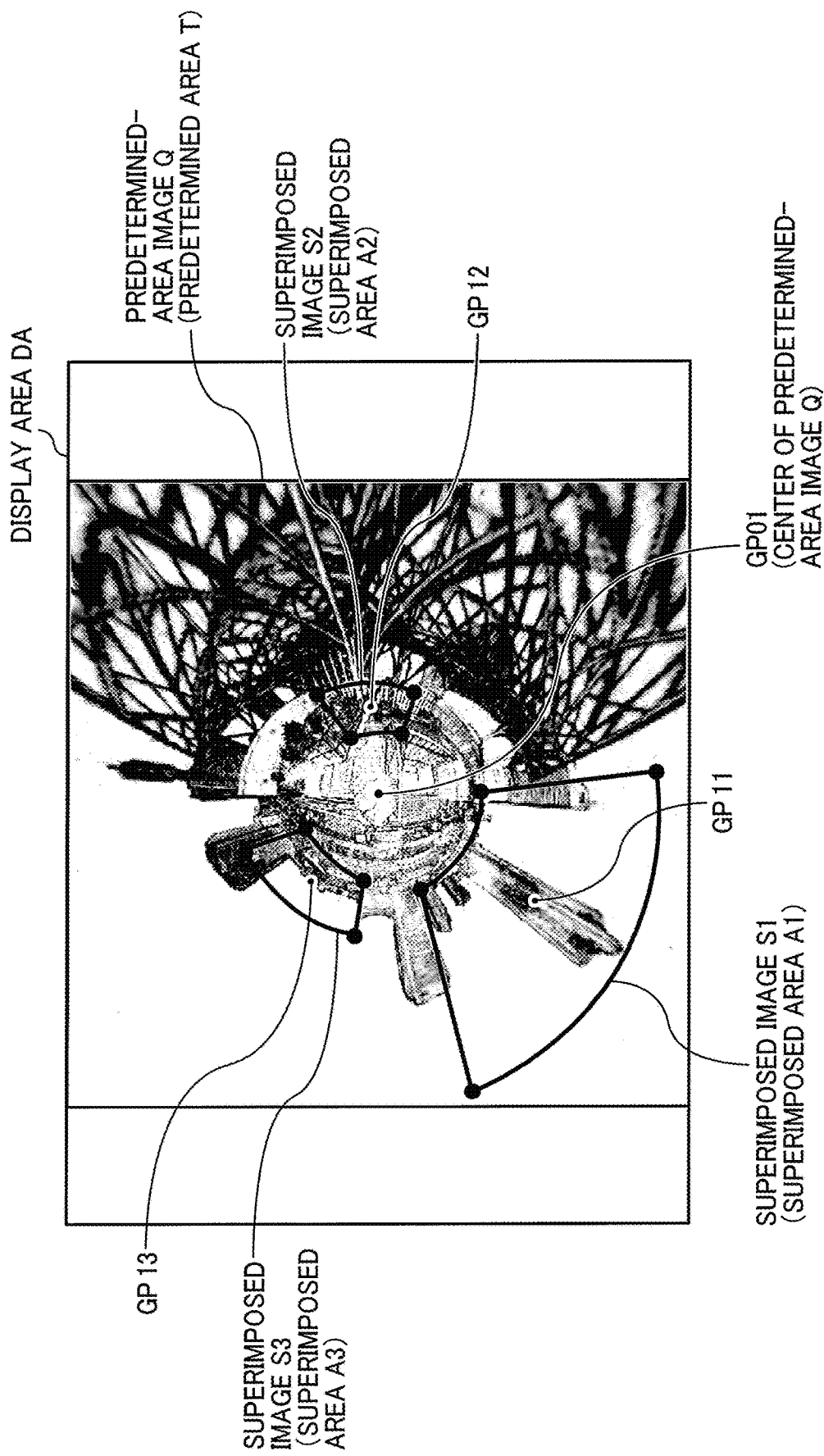
FIG. 41 illustrates an example screen in which a plurality of superimposed images are included in a predetermined-area image, according to a third display example.

FIG. 41 illustrates an example screen in which a plurality of superimposed images are included in the predetermined-area image Q. FIG. 42A is a conceptual diagram illustrating a predetermined area T specified by an angle of view α when the virtual camera IC is situated at a central point of the sphere CS, and FIG. 42B is a conceptual diagram illustrating a predetermined area T specified by the angle of view α when the virtual camera IC is moved closer to the outer edge of the sphere CS from the central point as illustrated in FIG. 42A.

FIG. 41 presents an example of projection transformation of the spherical image CE using an image reference point GP01, which is a central point of the predetermined-area image Q, as the nadir (opposite the zenith) of the equirectangular projection image EC and using the angle of view α as a configurable maximum value. In order to enlarge the display area DA of the display 517 after the projection transformation of the spherical image CE, the predetermined-area image Q is presented, which is obtained in the state where, as illustrated in FIGS. 42A and 42B, the position of the virtual camera IC is moved from the central point (FIG. 42A) of the sphere CS to a position away from the central point (FIG. 42B) with the angle of view α of the virtual camera IC remaining unchanged. As illustrated in FIG. 41, all of the superimposed images S1, S2, and S3 are included in the predetermined-area image Q. As illustrated in FIG. 41, if the predetermined-area image Q has a square shape or nearly square shape, the display area DA has blank areas at both ends thereof. Whereas the range of the predetermined area T for a single superimposed image depends on the planar image information and the superimposed display information, the range of the predetermined area T for a plurality of superimposed images does not depend on the planar image information and the superimposed display information and is fixed to the state illustrated in FIG. 41.

As described above, this display example enables the spherical image CE to be displayed in a manner like a bird's eye view and enables all of the plurality of superimposed images to be displayed. The range of the predetermined area T, which does not depend on the planar image information and the superimposed display information and is fixed to the state illustrated in FIG. 41, can be widely used for a plurality of superimposed images. In this display example, the image reference point GP01 is used as the nadir, by way of example but not limitation. The image reference point GP01 may be used as the zenith. Alternatively, any of points of gaze in superimposed areas may be used as the nadir or any desired point may be set.

Display Example 4

Display example 4 is now described with reference to FIG. 43. In display example 3 described above, the entire areas of all superimposed images are included in the predetermined-area image Q, whereas in display example 4, a portion of the specific superimposed image S1, which is farthest from the image reference point GP01, is included in the predetermined-area image Q.

Figure 43:
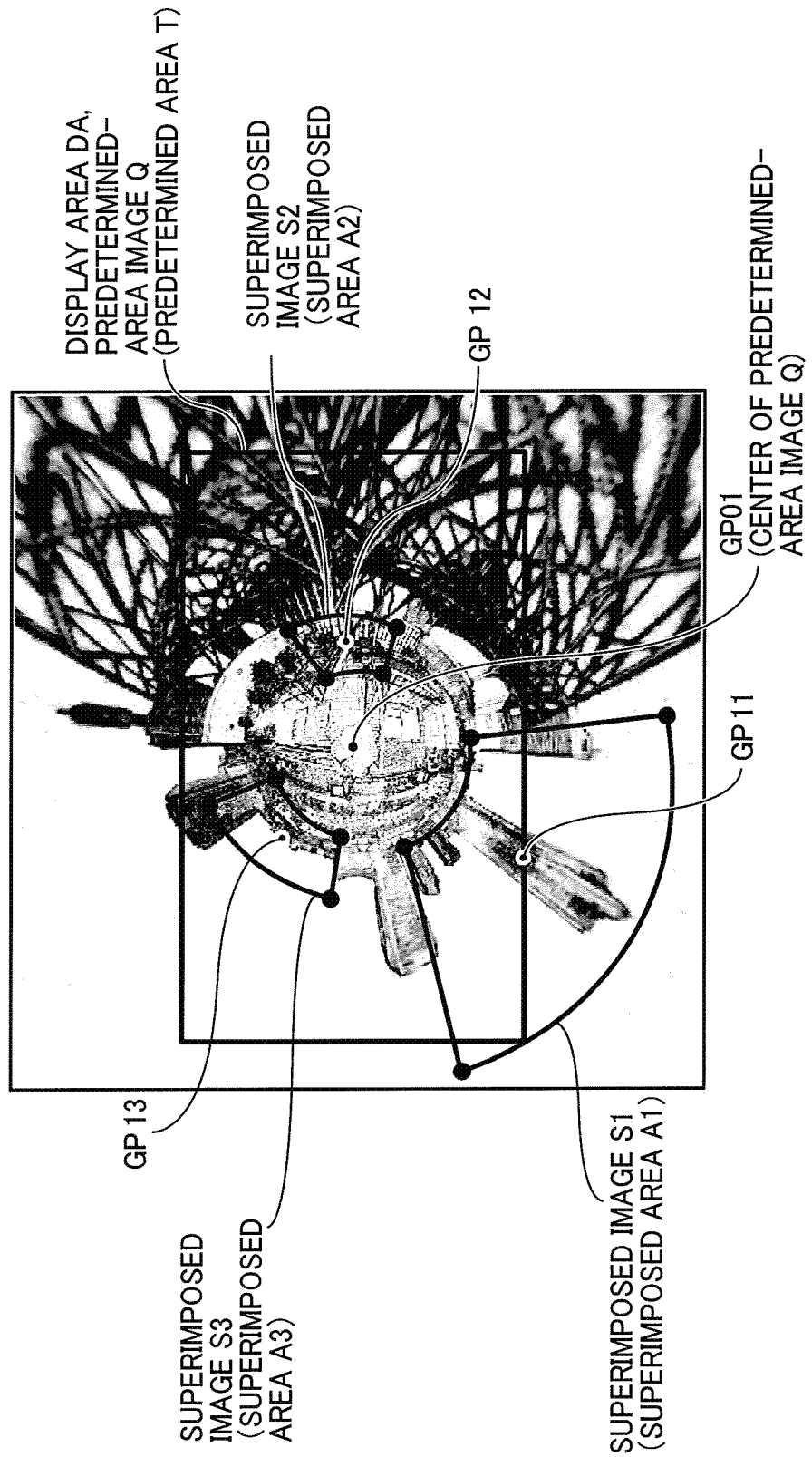
FIG. 43 illustrates an example screen in which a portion of a superimposed image having a point of gaze farthest from an image reference point among a plurality of superimposed images is included in a predetermined-area image, according to a fourth display example.

FIG. 43 illustrates an example screen in which a portion of a superimposed image having a point of gaze farthest from the image reference point GP01 among a plurality of superimposed images is included in the predetermined-area image Q. In FIG. 43, the image reference point GP01 is at the nadir of the equirectangular projection image EC. The entire areas of the superimposed images S2 and S3 having the points of gaze GP12 and GP13, which are respectively closest and second closest to the image reference point GP01, are included in the predetermined-area image Q. In contrast, a portion of the superimposed image S1 having the point of gaze GP11, which is farthest from the image reference point GP01, is included in the predetermined-area image Q in such a manner that the point of gaze GP11 is included in the predetermined-area image Q.

As described above, in this display example, even when the display control 56 displays all of the superimposed images S1, S2, and S3, the predetermined-area image Q is enlarged and displayed compared with that in display example 3, which makes the image more visible to the user. If a small portion of the superimposed image S1 is included in the predetermined-area image Q even when the predetermined-area image Q is enlarged and displayed, the user has difficulty in identifying the superimposed image S1. As in this display example, however, a portion of the superimposed area A1 is displayed in such a manner as to include the point of gaze GP11, which enables the user to easily identify the superimposed image S1.

Figure 42B:
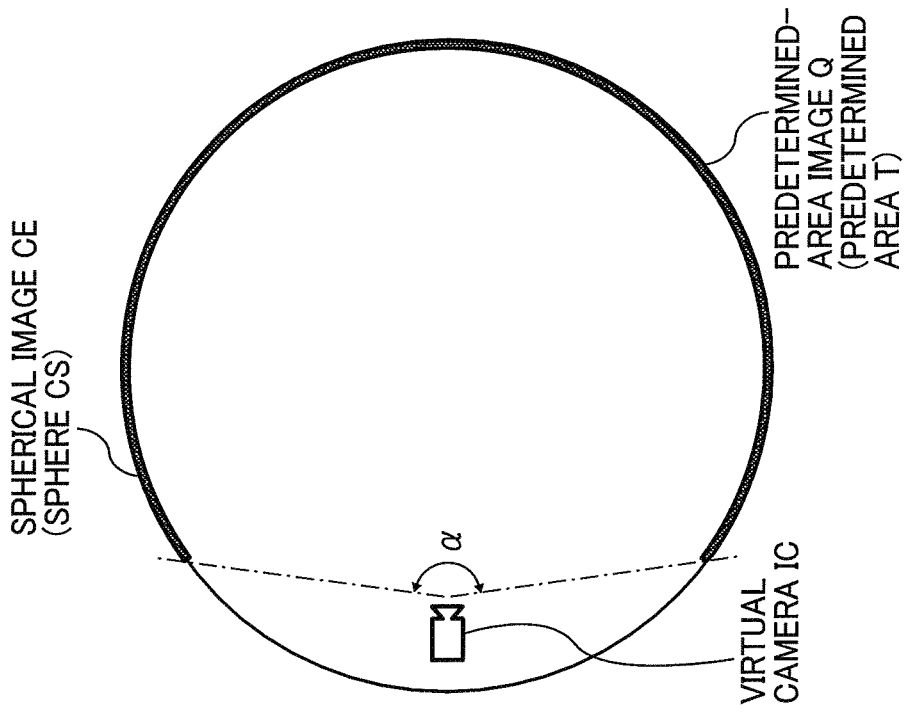
FIGS. 42A and 42B are conceptual diagrams respectively illustrating a predetermined area specified by an angle of view when the virtual camera is situated at a central point of a solid sphere, and a predetermined area specified by the same angle of view when the virtual camera is moved closer to the outer edge of the solid sphere from the central point, according to the third display example.
Figure 42A:
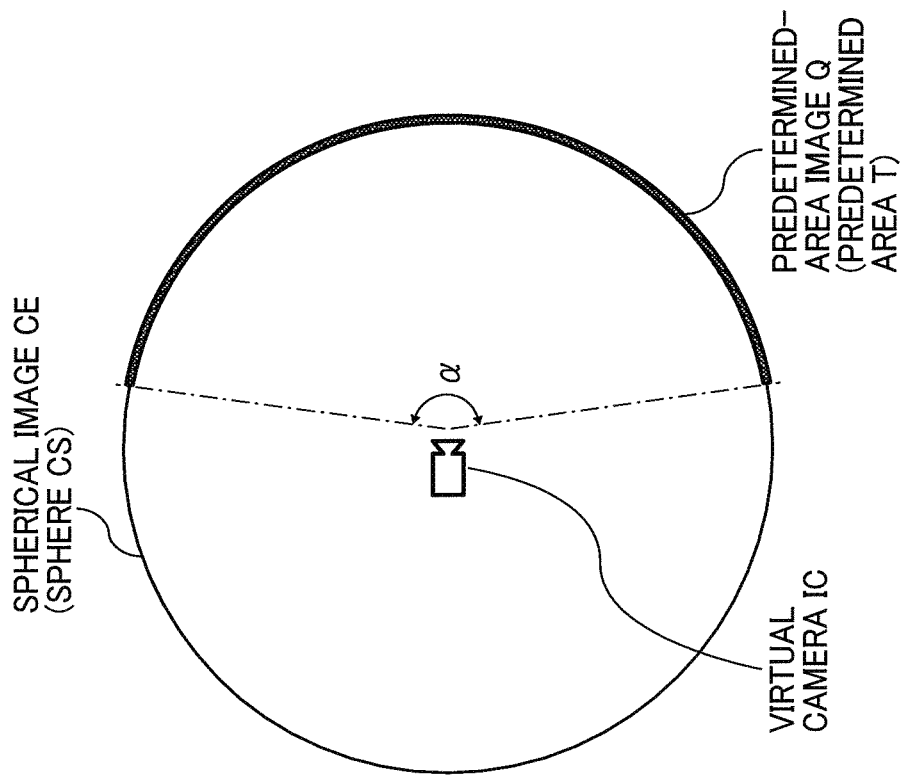

In addition to the enlarged display of the predetermined-area image Q, the position of the virtual camera IC may be moved closer to the central point of the sphere CS in the way from the state illustrated in FIG. 42B to the state illustrated in FIG. 42A. The points of gaze GP11, GP12, and GP13 in the superimposed images S1, S2, and S3 are included in the predetermined-area image Q, by way of example. Alternatively, two or more vertices of each superimposed image may be included in the predetermined-area image Q.

Display Example 5

Figure 44:
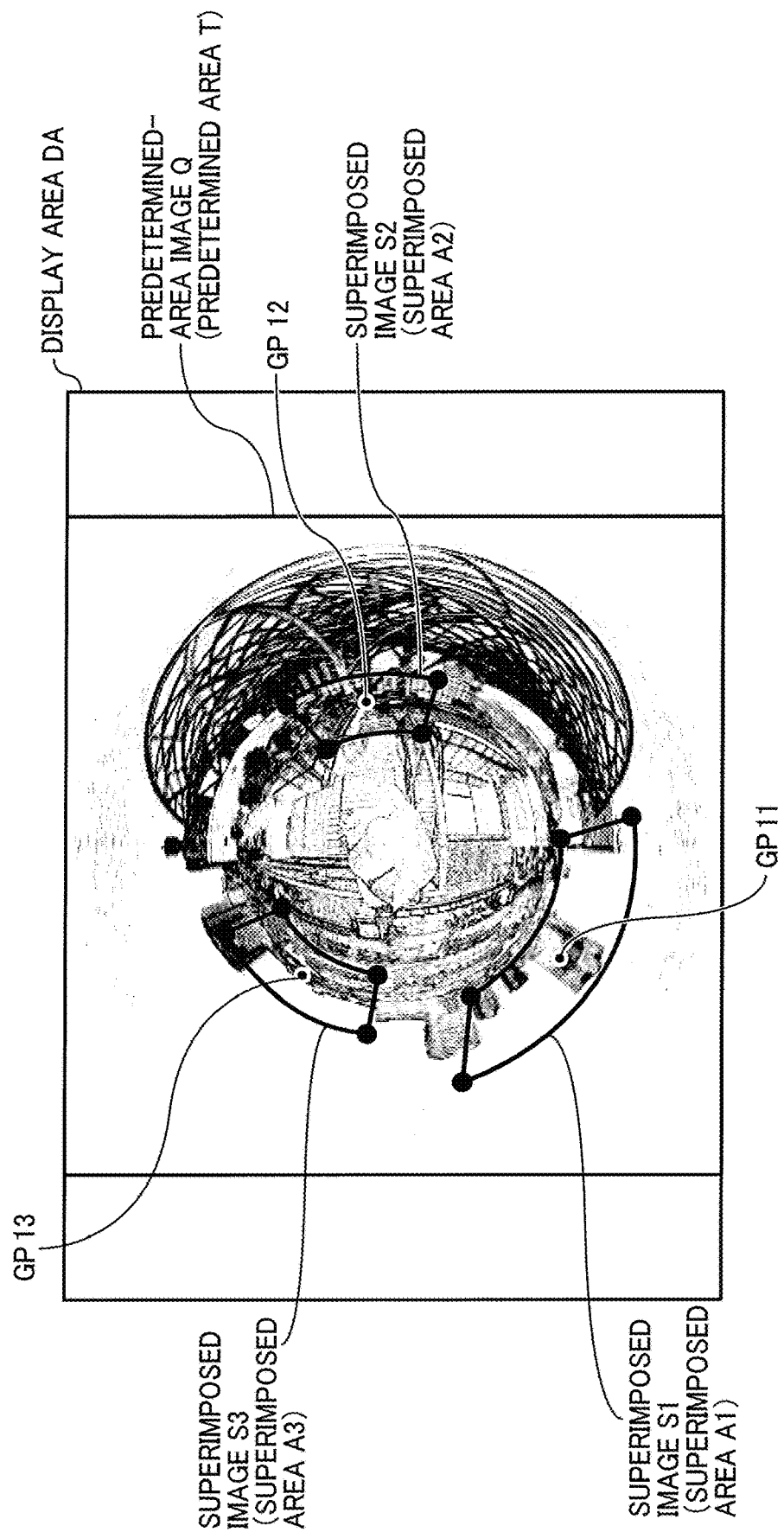
FIG. 44 illustrates a display example after little-planet projection transformation, according to a fifth display example.

Display example 5 is now described with reference to FIG. 44. In display example 5, the spherical image CE and the superimposed image S are subjected to projection transformation onto the equirectangular projection image EC, and the equirectangular projection image EC is converted to an image in projection called little-planet projection (converted from the rectangular coordinate system to the polar coordinate system). FIG. 44 illustrates a display example after little-planet projection transformation.

As described above, the little-planet projection enables the spherical image CE to be displayed in its entirety, and as a result all of a plurality of superimposed areas are also viewable.

Display Example 6

Figure 45:
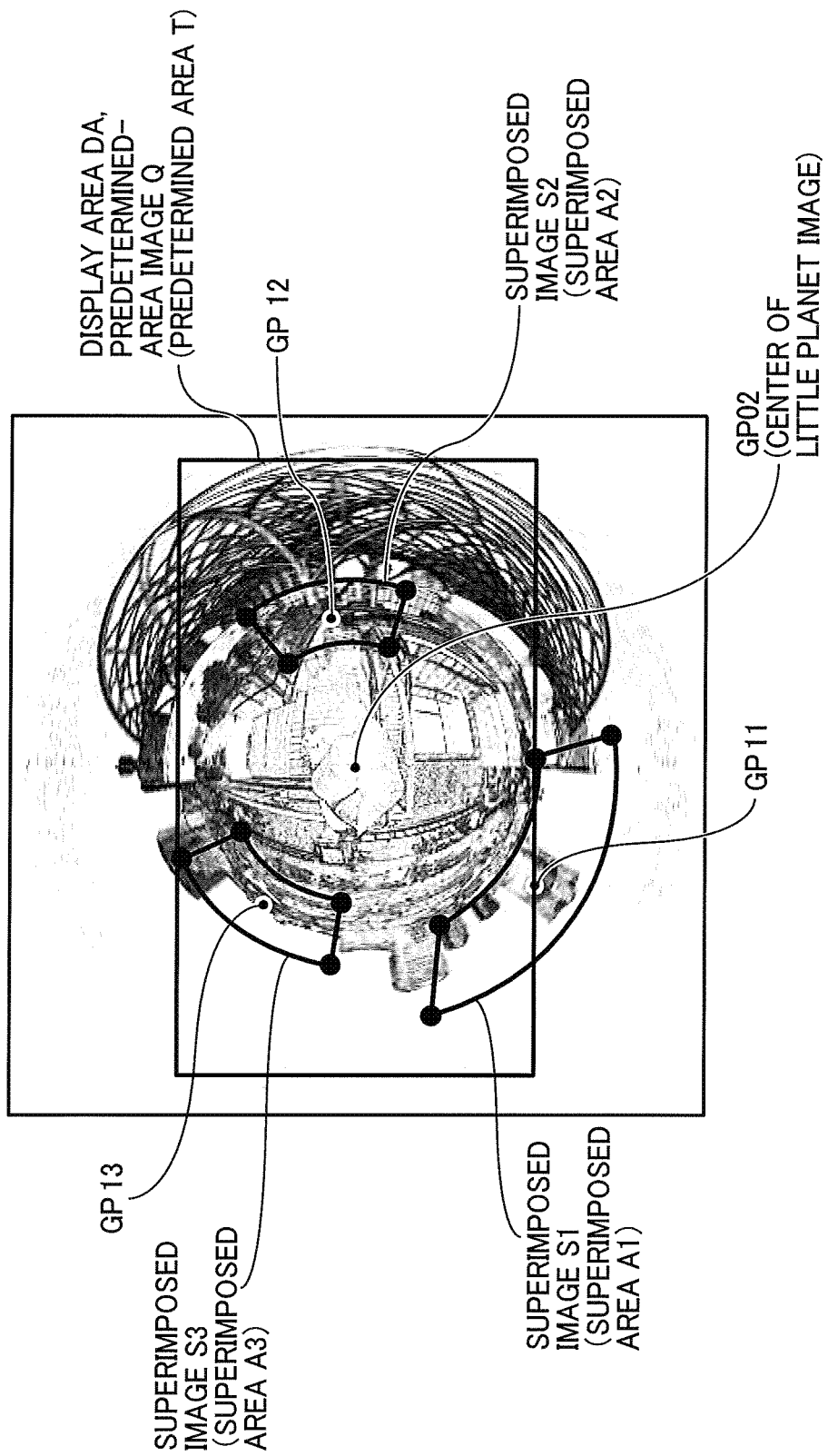
FIG. 45 illustrates an example screen after little-planet projection transformation in which a portion of a superimposed image having a point of gaze farthest from an image reference point among a plurality of superimposed images is included in a predetermined-area image, according to a sixth display example.

Display example 6 is now described with reference to FIG. 45. In display example 5 described above, a partial area in display example 4 described above is used as a predetermined-area image. Also in display example 6, a partial area in display example 5 described above is used as a predetermined-area image. FIG. 45 illustrates an example screen after little-planet projection transformation in which a portion of a superimposed image having a point of gaze farthest from an image reference point among a plurality of superimposed images is included in the predetermined-area image Q. In FIG. 45, an image reference point GP02 that is a central point of a little planet image is at the nadir of the equirectangular projection image EC. The entire areas of the superimposed images S2 and S3 having the points of gaze GP12 and GP13, which are respectively closest and second closest to the image reference point GP02, are included in the predetermined-area image Q. In contrast, a portion of the superimposed image S1 having the point of gaze GP11, which is farthest from the image reference point GP02, is included in the predetermined-area image Q in such a manner that the point of gaze GP11 is included in the predetermined-area image Q.

As described above, in this display example, after little-planet projection transformation, even when the display control 56 displays all of the superimposed images S1, S2, and S3, the predetermined-area image Q is enlarged and displayed compared with that in display example 5, which makes the image more visible to the user. If a small portion of the superimposed image S1 is included in the predetermined-area image Q even when the predetermined-area image Q is enlarged and displayed, the user has difficulty in identifying the superimposed image S1. As in this display example, however, a portion of the superimposed area A1 is displayed in such a manner as to include the point of gaze GP11, which enables the user to easily identify the superimposed image S1.

Display Example 7

Figure 46:
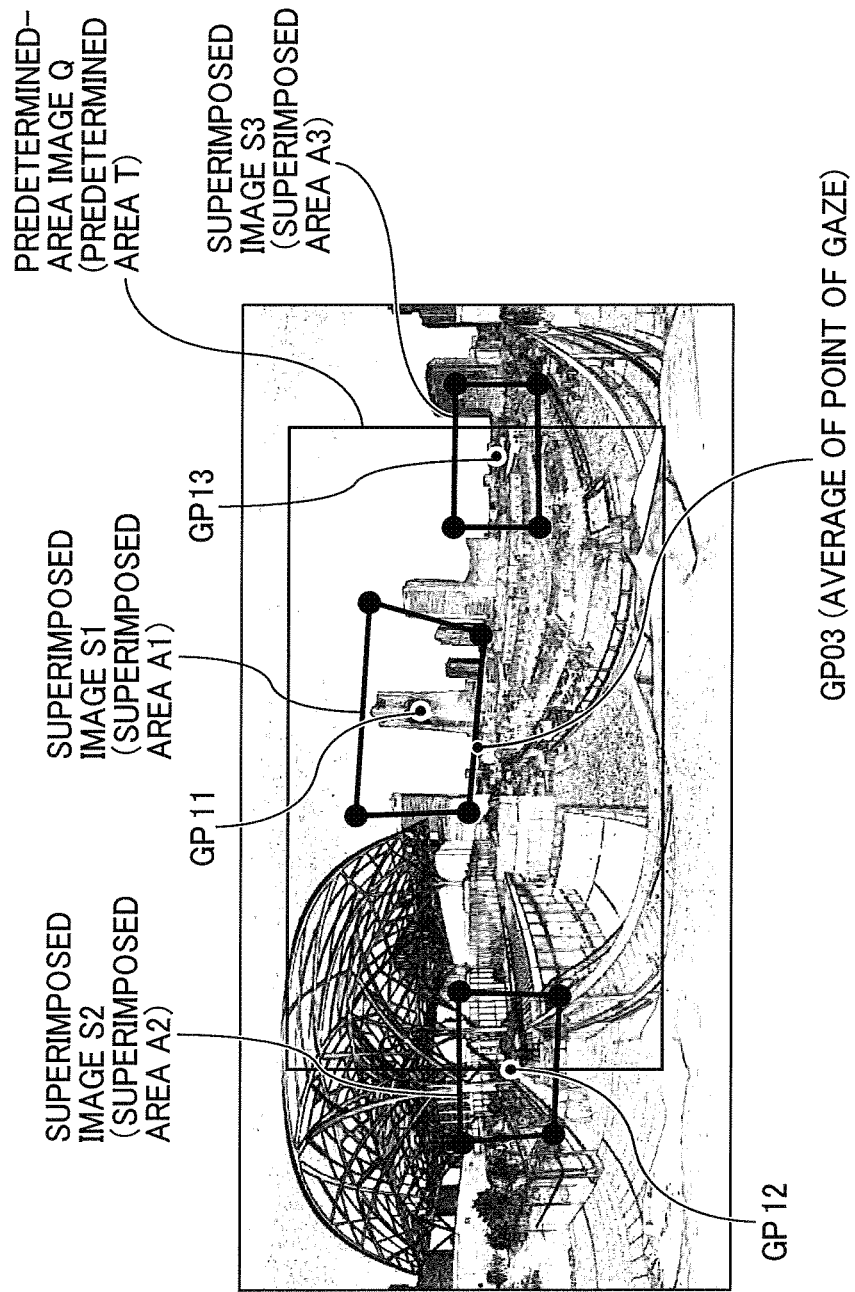
FIG. 46 is a conceptual diagram illustrating a spherical image and a plurality of superimposed images presented in equirectangular projection, according to a seventh display example.

Display example 7 is now described with reference to FIG. 46. When all of the superimposed images S1, S2, and S3 are included in the predetermined-area image Q, in display examples 2 to 6 described above, the spherical image CE or an image in little-planet projection is displayed. In display example 7, the equirectangular projection image EC is displayed. FIG. 46 is a conceptual diagram illustrating a spherical image and a plurality of superimposed images presented in equirectangular projection. As in display examples 3 and 5 described above, an entire area of an equirectangular projection image that is a spherical image may be the predetermined-area image Q. However, a large proportion of the equirectangular projection image is occupied by curved areas and, as in display examples 4 and 6 described above, a portion of an equirectangular projection image that is a spherical image is a predetermined-area image.

In this display example, an image reference point GP03 is determined as the average of the three points of gaze GP11, GP12, and GP13. Specifically, the display control 56 calculates an average coordinate of the points of gaze GP11, GP12, and GP13 in each of the horizontal and vertical directions and determines the image reference point GP03 having the calculated average coordinates. Then, the display control 56 displays the predetermined-area image Q such that a portion of a specific superimposed image located farthest from the image reference point GP03 (in the illustrated example, the superimposed image S2) is included in the predetermined-area image Q. In FIG. 46, the entire area of the superimposed image S1 having the point of gaze GP11, which is closest to the image reference point GP03, is included in the predetermined-area image Q. In contrast, a portion of the superimposed image S3 having the point of gaze GP13, which is second farthest from the image reference point GP03, and a portion of the superimposed image S2 having the point of gaze GP12, which is farthest from the image reference point GP03, are included in the predetermined-area image Q in such a manner that the point of gazes GP13 and GP12 are included in the predetermined-area image Q.

As described above, in this display example, even when the display control 56 displays all of the superimposed images S1, S2, and S3, the predetermined-area image Q is enlarged and displayed compared with a spherical image, which makes the image more visible to the user. If a small portion of the superimposed image S2 is included in the predetermined-area image Q even when the predetermined-area image Q is enlarged and displayed, the user has difficulty in identifying the superimposed image S2. As in this display example, however, a portion of the superimposed area A2 is displayed in such a manner as to include the point of gaze GP12, which enables the user to easily identify the superimposed image S2.

Display Example 8

Display example 8 is now described with reference to FIGS. 47 to 65.

FIG. 47 illustrates two planar images P1 and P2 superimposed on the spherical image CE. When the spherical image CE includes two planar images P1 and P2 which are captured images of the same location, the planar images P1 and P2 are superimposed in the same location. In the example illustrated in FIG. 47, the planar image P1 with a large angle of view is superimposed so as to appear farther from the viewer (user), and the planar image P2 with a small angle of view is superimposed so as to appear closer to the user. When viewed by the user, the planar image P2 appears at center and the planar image P1 appears behind the planar image P2, behind which the spherical image CE appears. The angles of view of the images P1 and P2 are less likely to be identical. Depending on the order of superimposition, a high-quality image superimposed so as to appear farther from the user may be invisible.

While the planar image P1 and the planar image P2 captured with the same resolution have the same number of pixels, the planar image P2 with a narrower angle of view has a larger number of pixels per angle of view. It is assumed that the user gradually enlarges the spherical image CE. In this situation, the user is able to view a larger area in the planar image P1 with high resolution and, when the spherical image CE is more enlarged, the user is able to view a smaller area with high resolution.

Conversely, when the planar image P1 is superimposed so as to appear closer to the user than the planar image P2, the user is not able to view the planar image P2.

In this display example, the planar image P1 with a larger angle of view is superimposed on the spherical image CE prior to the planar image P2 (a planar image P with a smaller angle of view is superimposed so as to appear closer to the user). This enables the user to view all the planar images P. Since a plurality of planar images P are superimposed on the spherical image CE, a high-resolution image can be displayed if the user enlarges the spherical image CE.

Figure 48:
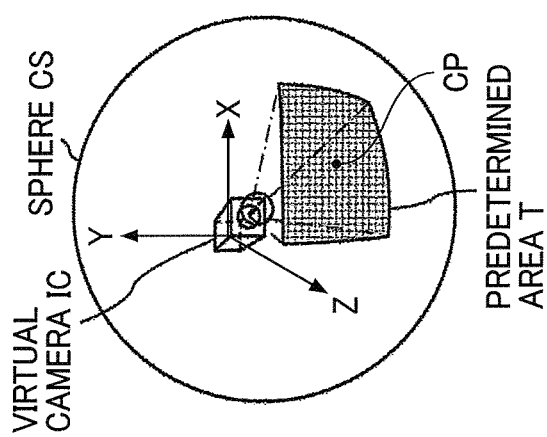
FIG. 48 is an exemplary diagram illustrating the line of sight of a user, according to the eighth display example.

FIG. 48 is an exemplary diagram illustrating the line of sight of the user. Since the spherical image CE has a three-dimensional coordinate system, the line of sight is specified by using information that specifies a point on the sphere, such as three-dimensional coordinates or latitude and longitude coordinates. In this embodiment, the line of sight is assumed to be directed at the central point CP of the predetermined area T.

The user can change the line of sight using the keyboard 711 or the mouse 712. If it is assumed that the virtual camera IC does not undergo translation, the virtual camera IC can be subjected to three types of rotations as a rigid body, namely, roll (rotation about the Z axis), yaw (rotation about the Y axis), and pitch (rotation about the X axis). When any of the yaw and pitch rotations occurs, the line of sight of the user (the direction of the virtual camera IC) changes. When the roll rotation occurs, however, the upper vector of the virtual camera IC changes but the line-of-sight vector (the direction vector of the virtual camera IC) does not change.

For example, the user rotates the spherical image CE in the horizontal direction, which causes a change in yaw angle. The user rotates the spherical image CE in the veridical direction, which causes a change in pitch angle. The user rotates the spherical image CE about the center of the display 517, which causes a change in roll angle. In this embodiment, an operation performed by the user on a web page, for example, is reflected to the line of sight (the roll angle, the yaw angle, and the pitch angle), for example. The way of reflection is described in advance in a program to be executed by the display apparatus 5.

Figure 49A:
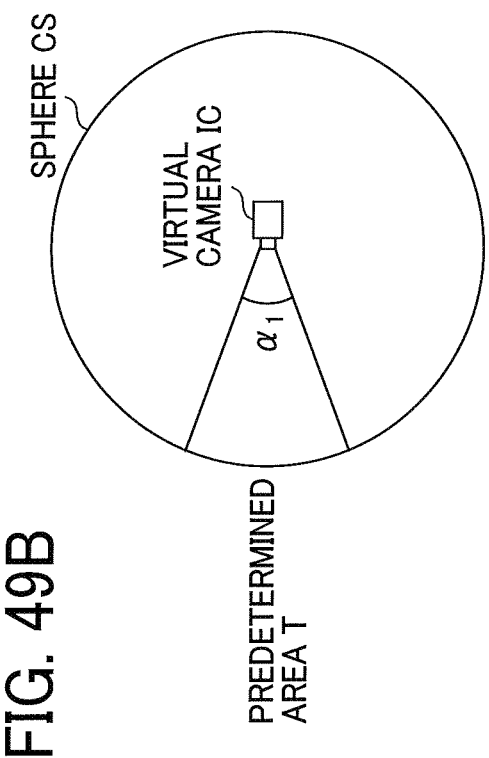
FIGS. 49A to 49D are exemplary diagrams schematically illustrating enlargement and reduction of the size of a predetermined area in a spherical image, according to the eighth display example.

FIGS. 49A to 49D are exemplary diagrams schematically illustrating enlargement and reduction of the size of the predetermined area T in the spherical image CE. FIG. 49A illustrates the predetermined area T in the initial state. If the virtual camera IC is present at the center of the sphere CS, the predetermined area T is determined in accordance with the angle of view α. The angle of view α is an angle between diagonally opposite vertices of the predetermined area T, as viewed from the center of the sphere CS, for example.

Figure 49B:
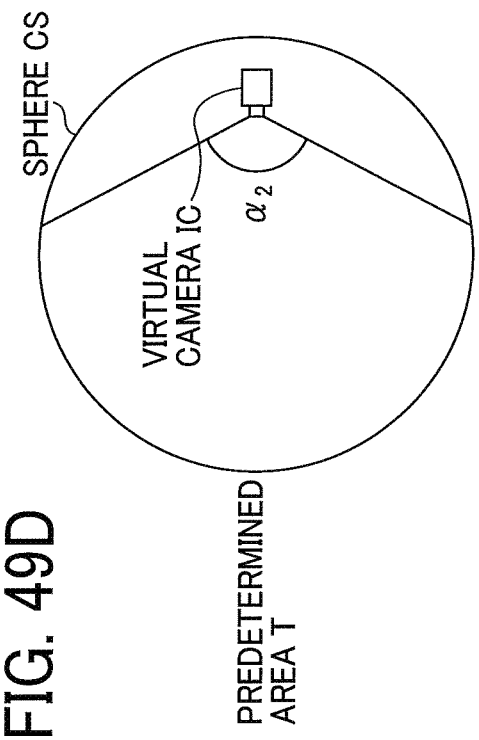
Figure 49C:
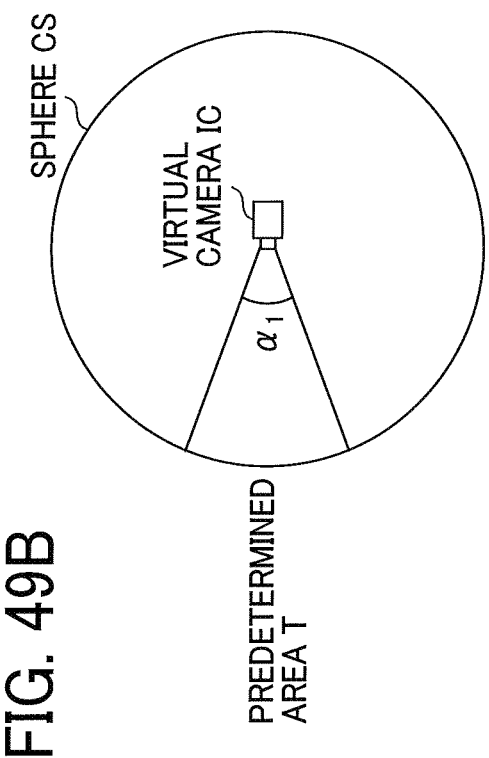

The angle of view α in the initial state is represented by $α_0$. As illustrated in FIG. 49B, a reduction in angle of view ($α_1 < α_0$) makes the predetermined area T narrow, and an enlarged image is displayed on the display 517. As illustrated in FIG. 49C, an increase in angle of view ($α_2 > α_0$) makes the predetermined area T wide, and a reduced image is displayed on the display 517. When the user performs an operation to enlarge or reduce the size of the spherical image CE, the smart phone 5 decreases or increases the angle of view in accordance with the amount of operation.

Figure 49D:
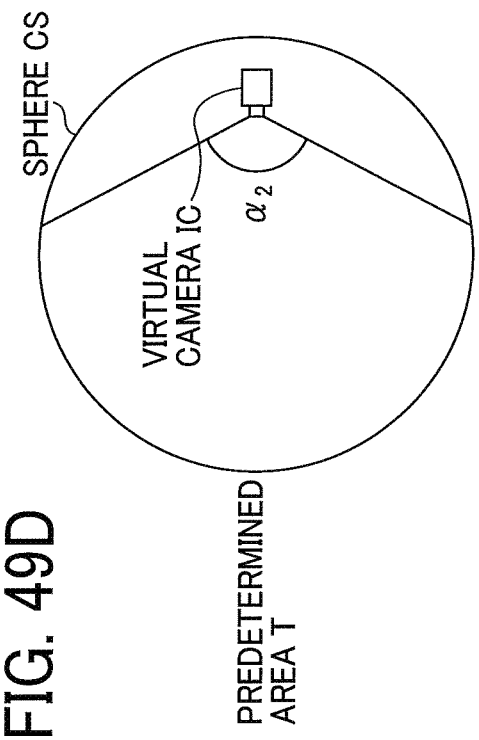

If the angle of view increases in the manner illustrated in FIG. 49C, an image behind the virtual camera IC is not displayable on the smart phone 5 so long as the virtual camera IC is located at the center of the sphere CS. When the user performs an operation to further reduce the size of the spherical image CE in the state illustrated in FIG. 49C, the smart phone 5 moves the virtual camera IC backward. In FIG. 49D, although the angle of view $α_2$ is still equal to that in FIG. 49C, the virtual camera IC moves backward, which makes the predetermined area T wider. The resulting image can be reduced in size compared with that in FIG. 49C.

<Functions Related to Superimposition of Planar Image P on Spherical Image CE>

Referring to FIGS. 50 to 55, a description is given of functions related to superimposition of the planar image P on the spherical image CE. An image capturing system includes the special image capturing device 1, the generic image capturing device 3, and the smart phone 5. The smart phone 5 functions as a display apparatus. In this embodiment, the special image capturing device 1, the generic image capturing device 3, and the smart phone 5 may be respectively referred to as a spherical camera 1, a digital camera 3, and a display apparatus 5.

Figure 50:
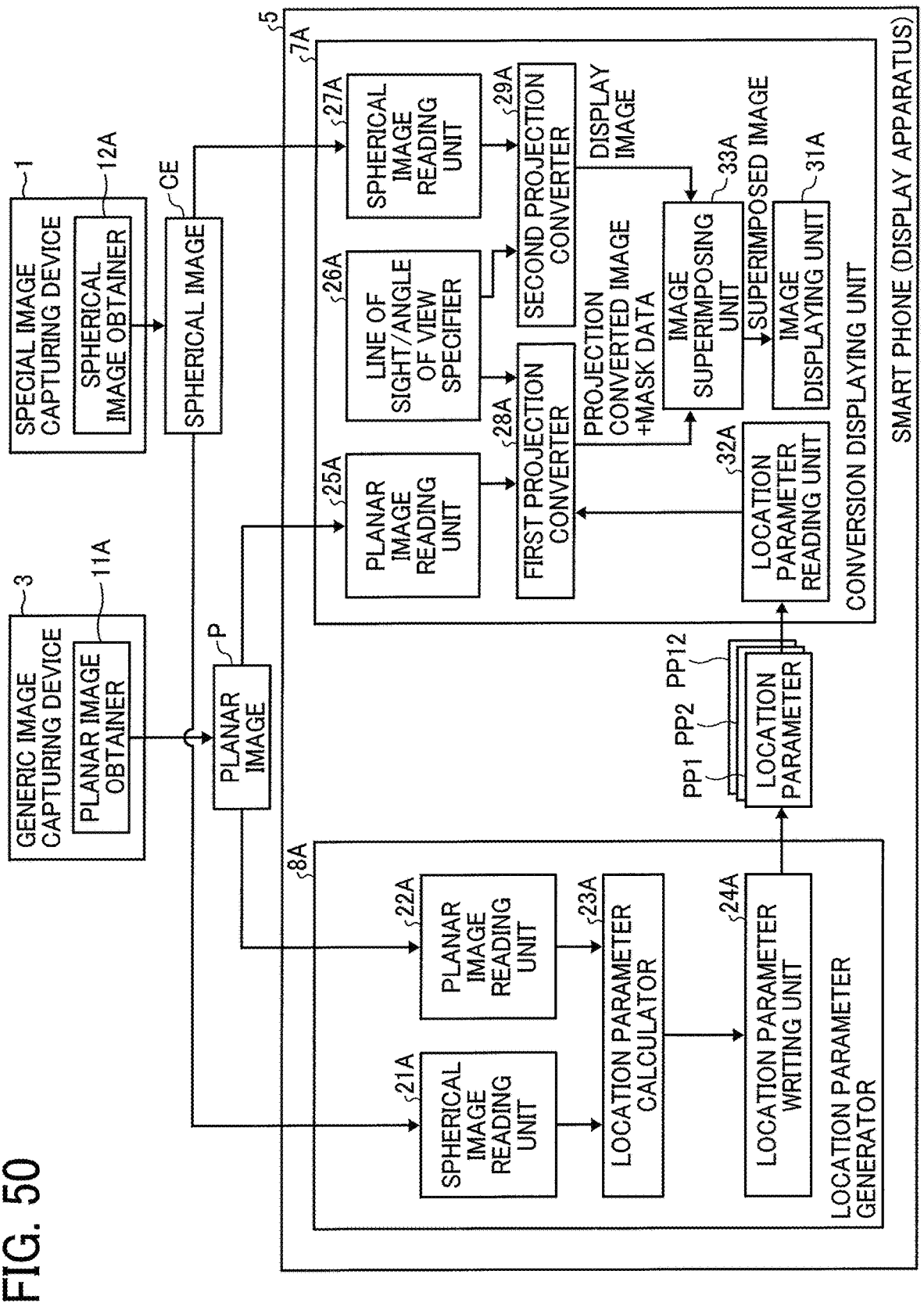
FIG. 50 is an exemplary functional block diagram illustrating a functional configuration of a digital camera, a spherical camera, and a display apparatus, according to the eighth display example.

FIG. 50 is an exemplary functional block diagram illustrating a functional configuration of the digital camera 3, the spherical camera 1, and the display apparatus 5. The digital camera 3 includes a planar image obtainer 11A. The planar image obtainer 11A is implemented by the imaging unit 301 of the generic image capturing device 3. The planar image obtainer 11A generates image data (planar image P) including pixels at predetermined resolution levels, each indicating a density level. The planar image P may be implemented as a single still image, a plurality of still images, or a moving image.

The spherical camera 1 includes a spherical image obtainer 12A. The spherical image obtainer 12A is implemented by the imaging unit 101 of the special image capturing device 1. The spherical image obtainer 12A generates image data of 360-degree surroundings (spherical image CE) of the spherical camera 1. The spherical image CE may be implemented as a single still image, a plurality of still images, or a moving image.

The display apparatus 5 mainly includes a position parameter generator 8A and a conversion displaying unit 7A. The functions of the position parameter generator 8A and the conversion displaying unit 7A included in the display apparatus 5 are functions implemented by the CPU 501 of the display apparatus 5 illustrated in FIG. 13 executing a program loaded from the EEPROM 504 onto the RAM 503.

The position parameter generator 8A includes a spherical image reading unit 21A, a planar image reading unit 22A, a location parameter calculator 23A, and a location parameter writing unit 24A. The spherical image reading unit 21A reads the spherical image CE from the spherical image obtainer 12A. The planar image reading unit 22A reads the planar image P from the planar image obtainer 11A. The term "read an image" refers to the process of obtaining an image, receiving an image, reading an image from a storage medium, or accepting input of an image.

The location parameter calculator 23A specifies an area in the spherical image CE that corresponds to the planar image P and determines a location parameter PP for specifying the corresponding area. The location parameter PP is described in detail with reference to FIGS. 51A to 51C. Since the spherical image CE in equirectangular projection is a distorted image, it is desirable to perform similar conversion on the planar image P to obtain a distorted image. Then, feature points are extracted from each of the spherical image CE and the planar image P and matching of the corresponding feature points is performed to determine the location parameter PP. There are available various methods for detecting feature points by using techniques such as edge detection, corner detection, scale-invariant feature transform (SIFT) feature values or speeded-up robust features (SURF) feature values, and consecutive central points of the same color. Alternatively, the following calculation may be performed: The sum of the absolute values of the differences between corresponding pixel values of the spherical image CE and the planar image P or the square sum of the differences between corresponding pixel values of the spherical image CE and the planar image P is calculated with the target pixels shifted one by one for each calculation, and the position of the planar image P obtained when the sum of the absolute values or the square sum of the differences is minimum may be used as a match area.

As described above, the planar image P may be divided into grid areas, and whether each area matches a corresponding area in the spherical image CE may be determined. This enables a correction for a shift caused by lens distortion or the like.

Since the correspondence between the spherical image CE and the planar image P is uniquely determined, the location parameter PP is determined once. When the planar image reading unit 22A reads a plurality of planar images P, the location parameter PP is calculated for each of the planar images P. The location parameter PP of a planar image P1 is referred to as a location parameter PP1, and the location parameter PP of a planar image P2 is referred to as a location parameter PP2. The location parameter calculator 23A delivers the location parameters PP1 and PP2 to the location parameter writing unit 24A.

The conversion displaying unit 7A includes a planar image reading unit 25A, a line of sight/angle of view specifier 26A, a spherical image reading unit 27A, a first projection converter 28A, a second projection converter 29A, an image superimposing unit 33A, a location parameter reading unit 32A, and an image displaying unit 31A. The functions of the planar image reading unit 25A and the spherical image reading unit 27A are similar to those of the planar image reading unit 22A and the spherical image reading unit 21A of the position parameter generator 8A, respectively. The location parameter reading unit 32A obtains the location parameters PP1 and PP2 from the position parameter generator 8A.

The line of sight/angle of view specifier 26A accepts the line of sight direction and the angle of view (enlargement or reduction), which are obtained in accordance with an operation by the user. The line of sight direction and the angle of view, which are input through the operation, can be used to determine the predetermined area T.

The line of sight direction and the angle of view (enlargement or reduction) are controllable by the user, as desired. In some cases, a portion of the planar image P subjected to projection transformation may be included in the predetermined area T or the planar image P subjected to projection transformation may not be included at all in the predetermined area T. Thus, the first projection converter 28A generates mask data indicating a portion of a projection-converted image that is included in the predetermined area T. The details are described with reference to FIGS. 52A and 52B. In this embodiment, mutual conversion normal projection (central projection: $y=f\cdot\tan\theta$) and fish-eye lens projection (for example, equidistant projection: $y=f\theta$) is performed.

The second projection converter 29A determines the predetermined area T corresponding to the line of sight direction and angle of view accepted by the line of sight/angle of view specifier 26A and performs perspective projection transformation of the predetermined area T in the read spherical image CE so as to fit to the display size of the image displaying unit 31A to generate a display image. The display image is therefore a two-dimensional planar image.

The image superimposing unit 33A superimposes the projection-converted image on the display image by using the mask data to generate a superimposed image. The details are described with reference to FIG. 53. The image displaying unit 31A displays the superimposed image on the display 517.

<Location Parameter>

FIGS. 51A and 51B illustrate projection transformation of the planar image P to a corresponding area, and FIG. 51C illustrates one example of the location parameter PP for associating the planar image P with the corresponding area. It is assumed that the correspondence between the planar image P and the spherical image CE has been determined through matching. The location parameter PP indicates the latitude and longitude of a point in the spherical image CE at which the planar image P is present when feature points match to the greatest extent.

FIG. 51A illustrates the planar image P, and FIG. 51B illustrates the spherical image CE in equirectangular projection. FIG. 51B also illustrates a corresponding area CA. The location parameter calculator 23A divides the planar image P into grids and obtains, for each of the intersections of the grids represented by coordinates (x, y), a corresponding point ($\lambda$, $\phi$) in the corresponding area CA of the spherical image CE as the location parameter PP, where $\lambda$ denotes the longitude and $\phi$ denotes the latitude. FIG. 51C illustrates one example of the location parameter PP. The coordinates of each of the grids in the planar image P are associated with the latitude and longitude of the corresponding point in the corresponding area CA of the spherical image CE.

<Processing Performed by First and Second Projection Converters>

Figure 52A:
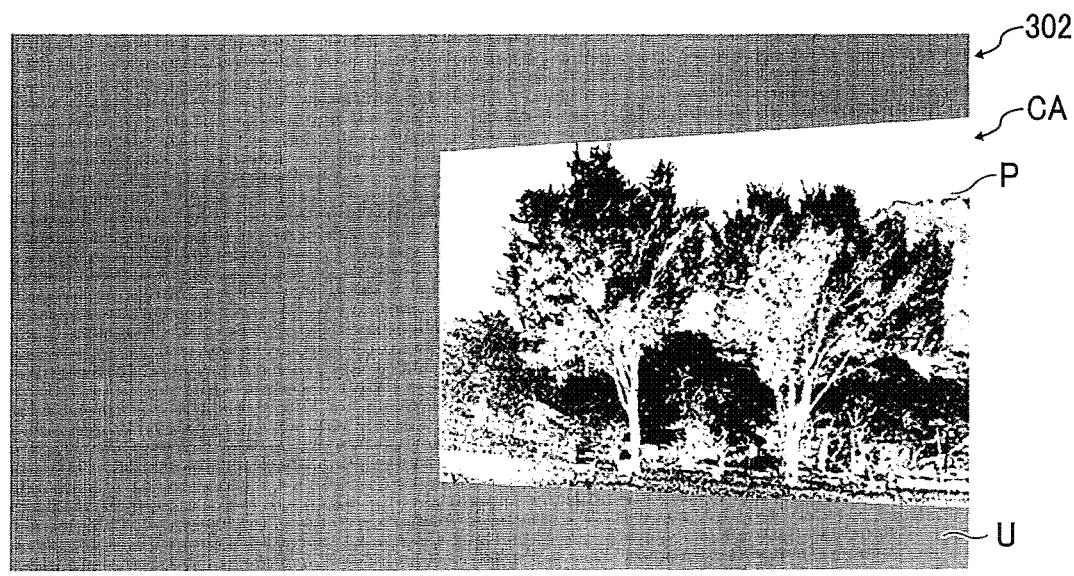
FIGS. 52A and 52B are exemplary diagrams illustrating a projection-converted image and mask data generated by projection converters, according to the eighth display example.
Figure 52B:
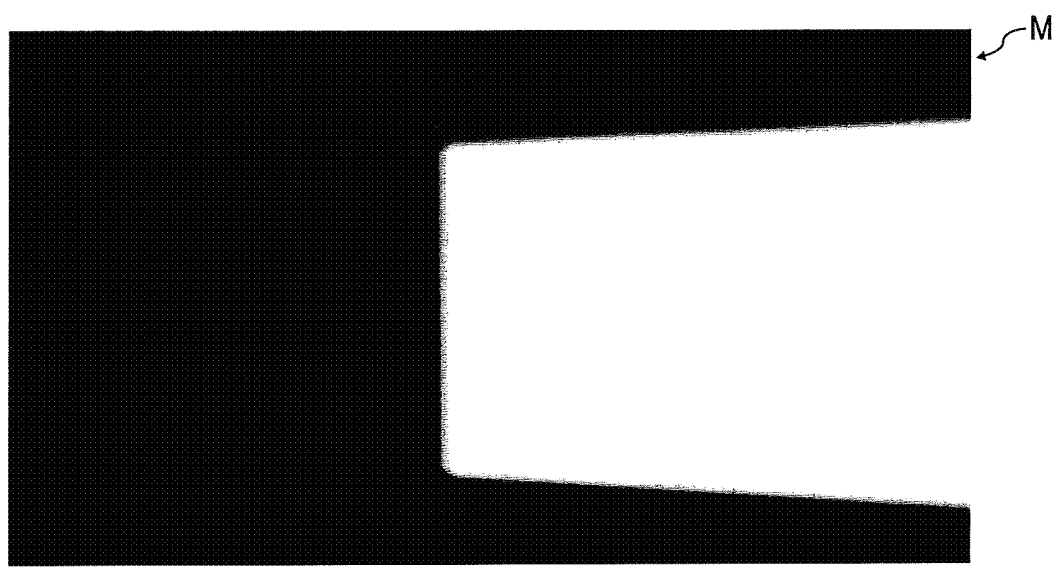

FIGS. 52A and 52B are exemplary diagrams illustrating a projection-converted image 302 and mask data M generated by the first and second projection converters 28A and 29A. FIG. 52A illustrates the projection-converted image 302. The projection-converted image 302 includes an area having the same size as the predetermined area T in the spherical image CE in equirectangular projection. The planar image P subjected to projection transformation is mapped to the corresponding area CA. The planar image P, which is subjected to projection transformation and is mapped to the corresponding area CA, is a trapezoidally distorted image. A portion of the projection-converted image 302 where the planar image P is not mapped is a uniform gray image U. The uniform gray image U is not used for superimposition and may have any pixel value.

FIG. 52B illustrates the mask data M for the planar image P illustrated in FIG. 52A. The mask data M is data for extracting the planar image P from the predetermined area T illustrated in FIG. 52A. In the mask data M, an area having white pixels indicates a portion of the predetermined area T that corresponds to the planar image P. Thus, the area having white pixels in the mask data M has a size equal to or less than the size of the portion corresponding to the planar image P. The mask data M illustrated in FIG. 52B is mask data in a case where the predetermined area T is larger than the planar image P. In the example illustrated in FIG. 52A, accordingly, the corresponding area CA has a size substantially equal to the size of the area having white pixels in the mask data M. When the predetermined area T and the planar image P do not overlap at all, the entire area of the mask data M includes black pixels. When the predetermined area T is smaller than the planar image P, the mask data M includes only white pixels. Accordingly, an area having white pixels in the mask data M and the corresponding area CA have the same size and are in the same location.

The image superimposing unit 33A performs mask processing using the projection-converted image 302 and the mask data M. The mask processing is processing for extracting a pixel corresponding to a white pixel in the mask data M from the projection-converted image 302. The image superimposing unit 33A extracts a pixel value at the position of a white pixel from the projection-converted image 302 and superimposes the extracted pixel value on the display image at a position corresponding to that in the projection-converted image 302.

Desirably, the boundary between the black pixels and the white pixels in the mask data M is provided with a gradual gradation of color from white to black as it goes from the white pixels to the black pixels. The boundary between the spherical image CE having low resolution and the planar image P having high resolution is made unnoticeable.

<Processing Performed by Image Superimposing Unit>

Figure 53:
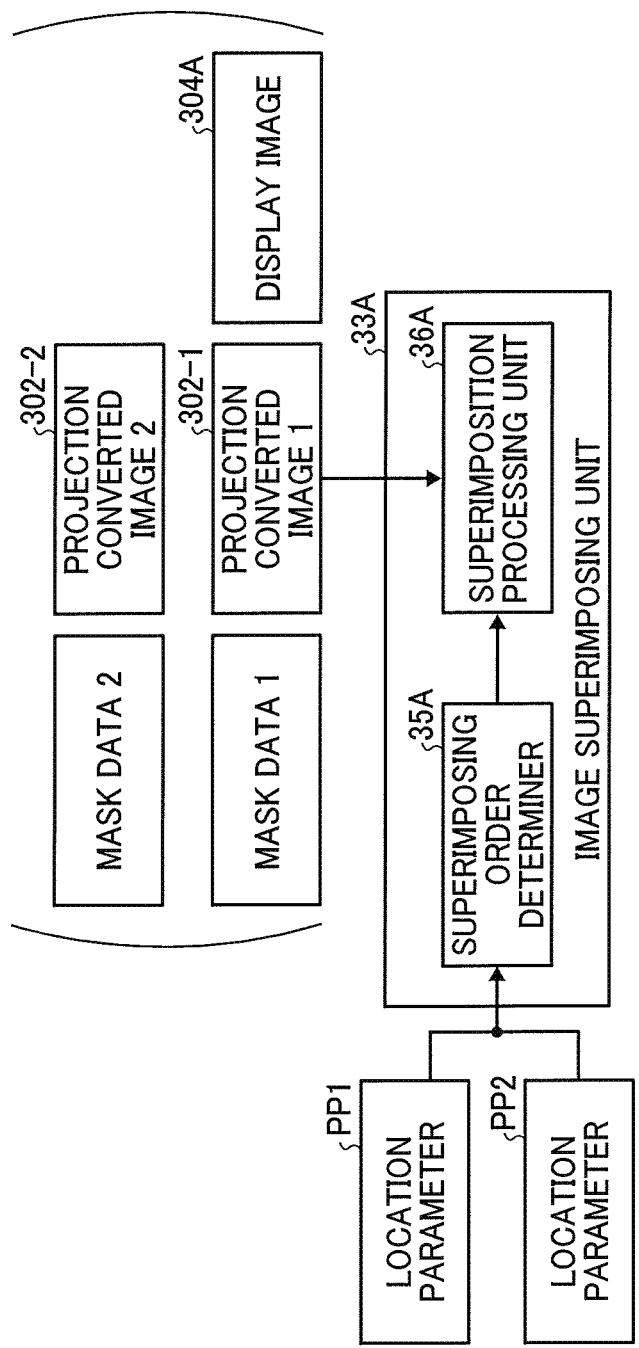
FIG. 53 is an exemplary functional block diagram illustrating a functional configuration of an image superimposing unit, according to the eighth display example.

FIG. 53 is an exemplary functional block diagram illustrating a functional configuration of the image superimposing unit 33A. The image superimposing unit 33A includes an order-of-superimposition ("superimposing order") determiner 35A and a superimposition processing unit 36A.

The superimposing order determiner 35A determines an order of superimposition by using the respective location parameters PP1 and PP2 of the plurality of planar images P1 and P2. The location parameters PP1 and PP2 indicate the respective corresponding areas CA in equirectangular projection, which correspond to the planar images P1 and P2. The lengths (or widths and heights) of the diagonal lines of the corresponding areas CA are compared to determine the magnitudes of the angles of view. The superimposing order determiner 35A determines an order of superimposition so that one of the planar images P1 and P2 having the narrower angle of view is superimposed so as to appear closer to the user. That is, the superimposing order determiner 35A determines an order of superimposition in which one of the planar images P1 and P2 having the larger angle of view is superimposed first. When the plurality of planar images P1 and P2 do not overlap at all, there is no need to determine an order of superimposition. When the plurality of planar images P1 and P2 partially overlap, the order of superimposition may or may not be determined. However, it is desirable that an order of superimposition be determined such that one of the planar images P1 and P2 having the larger angle of view is superimposed first.

Whether the plurality of planar images P1 and P2 overlap is determined by comparing the two location parameters PP. If at least one of the four vertices in one of the location parameters PP is inside the four vertices in the other location parameter PP, it is determined that the plurality of planar images P1 and P2 at least partially overlap. If all of the four vertices in one of the location parameters PP are inside the four vertices in the other location parameter PP, it is determined that the plurality of planar images P1 and P2 overlap in their entirety.

The superimposition processing unit 36A superimposes a projection-converted image 302-1 and a projection-converted image 302-2 on the display image 304A in accordance with the order of superimposition by using mask data M. The projection-converted image 302-1 is an image obtained by subjecting the planar image P1 to projection transformation, and the projection-converted image 302-2 is an image obtained by subjecting the planar image P2 to projection transformation.

<Superimposition of Image>

Figure 54:
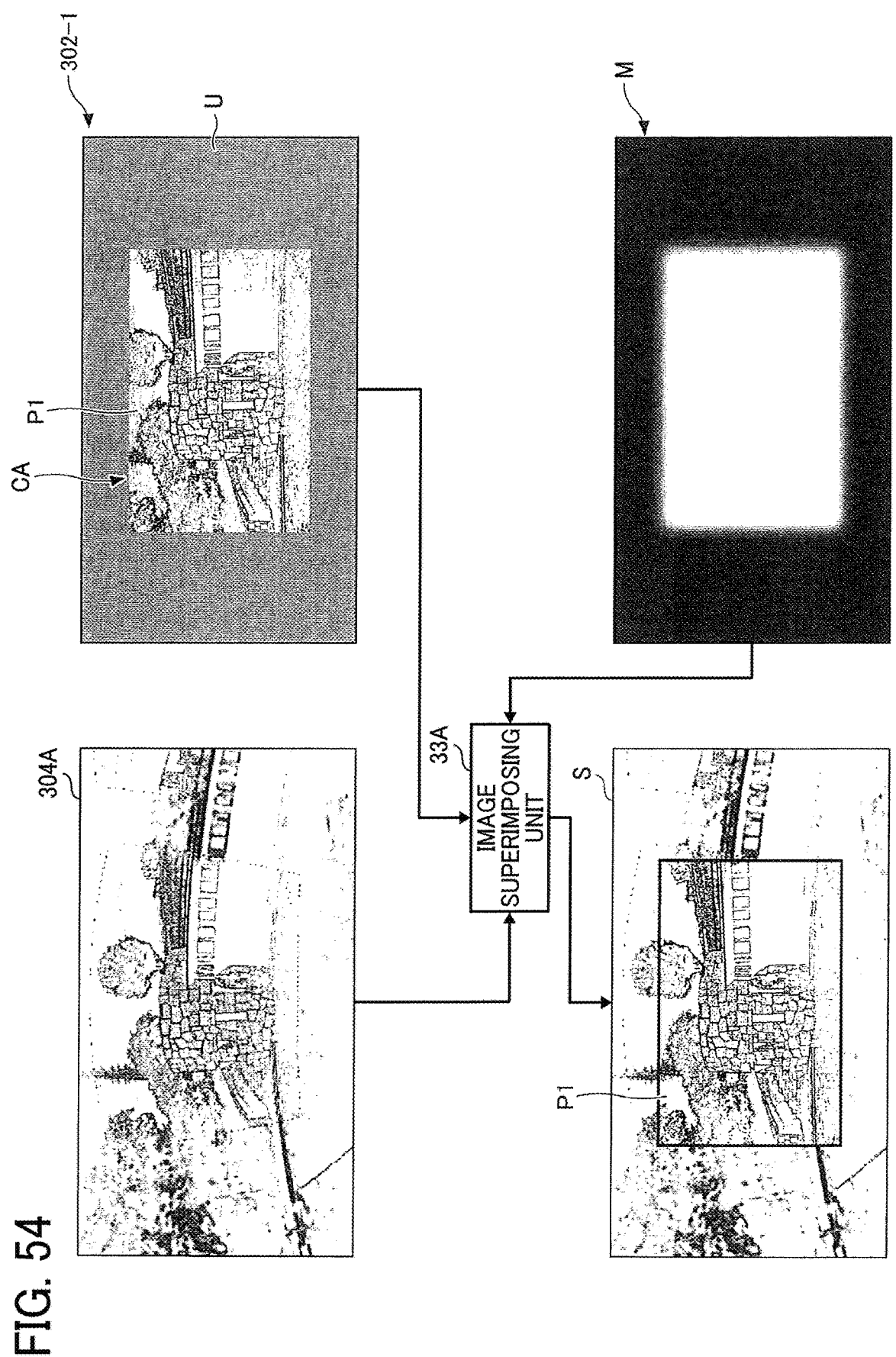
FIG. 54 is an exemplary diagram schematically illustrating superimposition of a planar image on a spherical image, according to the eighth display example.

Superimposition of an image is described with reference to FIG. 54. FIG. 54 is an exemplary diagram schematically illustrating superimposition of the planar image P1 on the spherical image CE. As illustrated in FIG. 54, a display image 304A generated by the second projection converter 29A performing perspective projection transformation of the predetermined area T, the projection-converted image 302-1, and the mask data M are input to the image superimposing unit 33A.

First, the superimposition processing unit 36A superimposes the projection-converted image 302-1, which is a wider angle-of-view image, on the display image 304A. The superimposition processing unit 36A performs mask processing using the mask data M to extract the projection-converted image 302-1 corresponding to the pixel positions of white pixels in the mask data M and to overwrite the display image 304A with the projection-converted image 302-1 (the corresponding pixels in the display image 304A are lost at this time). Accordingly, a superimposed image S is generated in which the planar image P1 having high resolution is placed on the spherical image CE having low resolution. The planar image P1 is illustrated as a rectangular shape in the superimposed image S illustrated in FIG. 54, for simplicity of illustration. The rectangular shape is not displayed unless a frame 40 described below is displayed.

Alternatively, a transparent layer may be used such that the projection-converted image 302-1 corresponding to the pixel positions of white pixels in the mask data M is extracted and placed on the transparent layer. In this case, no pixels are lost in the display image 304A, and, for example, the user is able to switch between the display and non-display of the planar image P1.

Then, the superimposition processing unit 36A superimposes the projection-converted image 302-2, which is a narrower angle-of-view image, on the superimposed image S. FIG. 55 is an exemplary diagram schematically illustrating superimposition of the projection-converted image 302-2. In FIG. 55, unlike FIG. 54, the superimposed image S is displayed instead of the display image 304A. The projection-converted image 302-2 may be superimposed by using the same technique as that for the projection-converted image 302-1. The superimposition processing unit 36A extracts pixels from the projection-converted image 302-2 by using mask processing and overwrites the superimposed image S with the pixels. A transparent layer may also be used for the projection-converted image 302-2. As a result, a superimposed image S illustrated in FIG. 55 is generated in which the planar image P1 and then the planar image P2 are superimposed on the spherical image CE having low resolution.

Accordingly, the planar image P1 with a wider angle of view can be superimposed first on the spherical image CE. In other words, the planar image P2 with a narrower angle of view can be superimposed on the spherical image CE so as to appear closer to the user.

In this embodiment, as described above, the display apparatus 5 performs perspective projection transformation of the spherical image CE and superimposition of the planar images P in parallel. If the planar images P are mapped to the spherical image CE and thereafter perspective projection transformation is performed, the spherical image CE needs to have the same resolution as the planar images P, resulting in an increase in data size. In this embodiment, the display image 304A is generated and thereafter the planar images P are superimposed. This can prevent an increase in data size.

The display apparatus 5 repeatedly superimposes the planar images P on the spherical image CE in accordance with the display cycle of the display 517 (for example, 30 to 60 times per second). This enables the display apparatus 5 to retain the sets of the planar images P1 and P2 and the spherical image CE one by one to generate the superimposed image S in real time from the point of view corresponding to an operation by the user.

<Relation Between Planar Images P1 and P2>

Figure 56A:
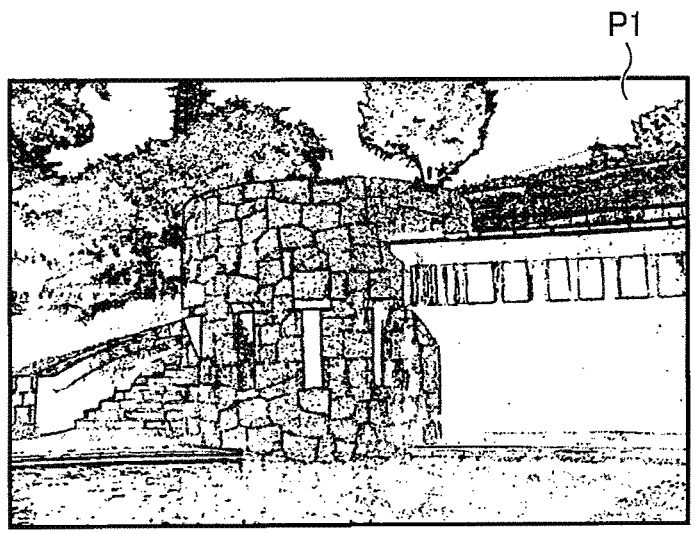
FIGS. 56A to 56C are exemplary diagrams illustrating a relation between planar images, according to the eighth display example.
Figure 56B:
Figure 56C:
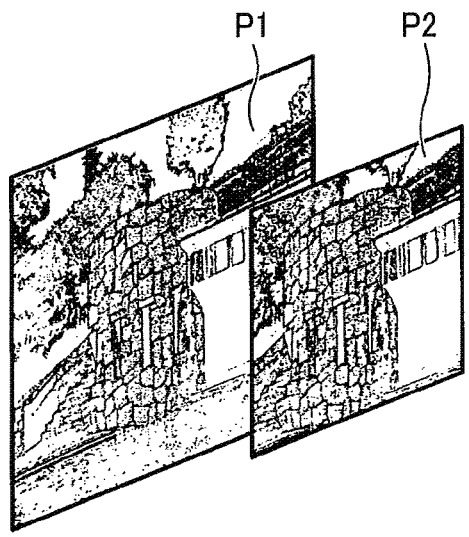

FIGS. 56A to 56C are exemplary diagrams illustrating a relation between the planar images P1 and P2. FIG. 56A illustrates the planar image P1, and FIG. 56B illustrates the planar image P2. The planar images P1 and P2 have the same number of pixels and the same image size. The planar image P2, which has a longer focal length than the planar image P1, appears more enlarged than the planar image P1. The difference in focal length may also be referred to as the difference in angle of view or the difference in magnification.

In matching between the planar images P1 and P2 and the spherical image CE, the planar image P2 is matched at a narrower angle of view than the planar image P1. Thus, as illustrated in FIG. 56C, the planar image P2 is determined to have a narrower angle of view than the planar image P1, and the planar image P1 and the planar image P2 are superimposed in this order.

<Superimposition Procedure>

The planar image reading unit 22A reads the planar images P (S10A). The spherical image reading unit 21A reads the spherical image CE (S20A). Then, the location parameter calculator 23A calculates location parameters PP (S30A).

The location parameter calculator 23A repeatedly performs the processing of 530A until the location parameters PP for all of the planar images P are calculated (540A).

The planar image reading unit 25A reads the planar images P (S50A). The superimposing order determiner 35A compares the respective location parameters PP or focal lengths of the planar images P and determines the order of superimposition of projection-converted images as the order of decreasing angle of view (S60A). The location parameters PP are compared to compare the angles of view in the spherical image CE. The focal lengths are included in metadata described in compliance with Exif or the like. As the focal length increases, the angle of view decreases. Thus, the focal lengths can be used to determine the order of superimposition. The relative magnitudes of the angles of view of the planar images P do not change if the position of the virtual camera IC changes. If a single planar image P is used, the order of superimposition is not determined.

The spherical image reading unit 27A reads the spherical image CE (570A). The line of sight/angle of view specifier 26A accepts the line of sight direction and the angle of view (S80A). The processing of S80A is performed at any time.

Then, the second projection converter 29A performs perspective projection transformation of the spherical image CE in accordance with the predetermined area T and generates the display image 304A (590A).

Then, the superimposing order determiner 35A determines whether one or more of the planar images P are included in the predetermined area T (S100A). If NO is determined in S100A, none of the planar images P is superimposed, and then the process ends.

If YES is determined in S100A, the superimposing order determiner 35A determines whether there are overlapping planar images having the same angle of view (S101A). If NO is determined in S101A, the process proceeds to S110A.

Figure 58:
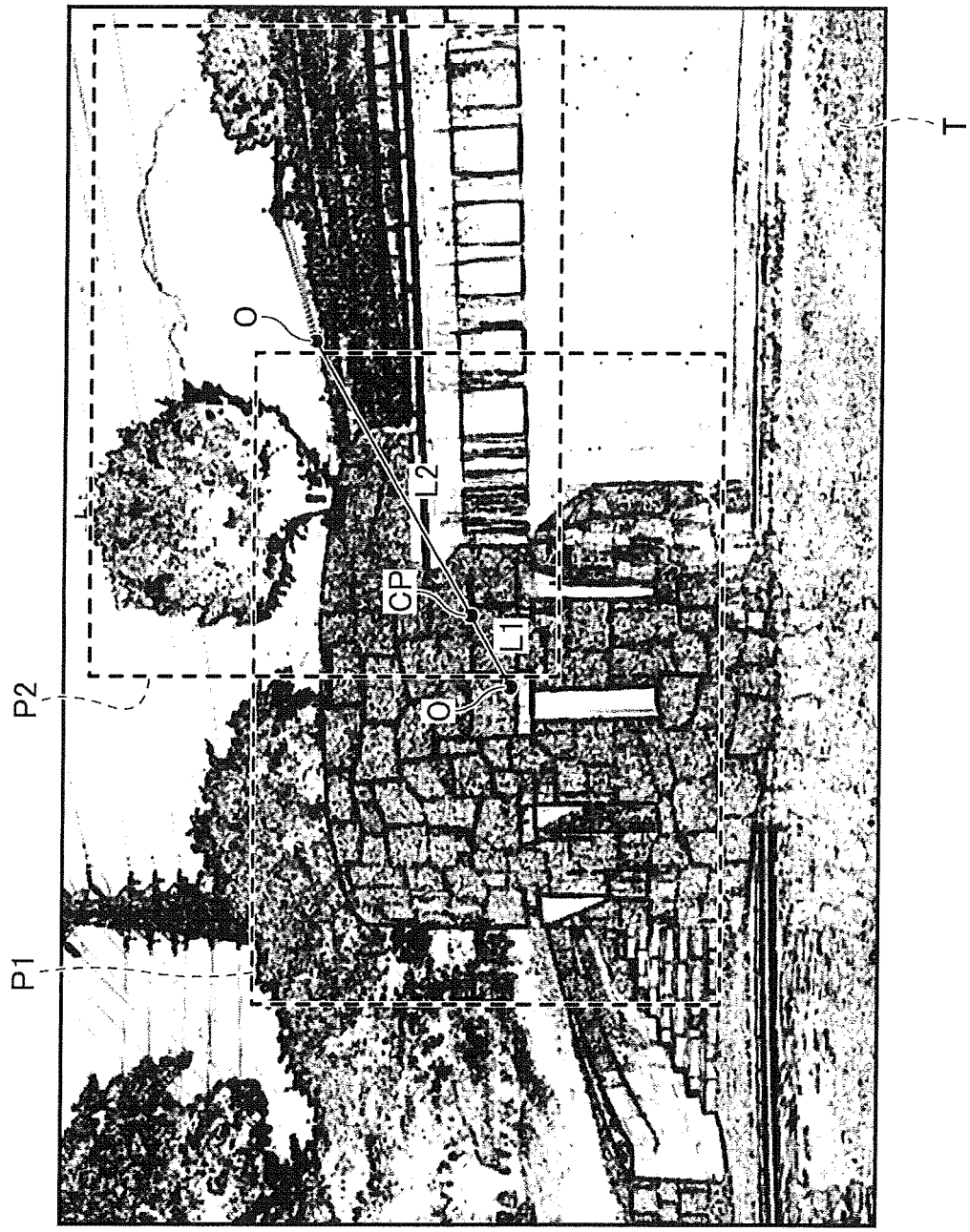
FIG. 58 is an exemplary diagram illustrating the order of superimposition of overlapping planar images having the same angle of view, according to the eighth display example.

If YES is determined in S101A, the superimposing order determiner 35A rearranges the planar images having the same angle of view in order of, as illustrated in FIG. 58, decreasing distance from the central point CP of the predetermined area T (S102A). That is, a planar image having the longest distance from the central point CP of the predetermined area T is superimposed first. Thus, if planar images having the same angle of view overlap, the planar image that is a shorter distance from the central point CP of the predetermined area T can be displayed to appear closer to the user.

Then, the first and second projection converters 28A and 29A perform projection transformation of the planar images P by using the location parameters PP and generate the projection-converted image 302 (S110A).

Then, the first and second projection converters 28A and 29A generate mask data M in accordance with the predetermined area T determined by using the line of sight direction and the angle of view and in accordance with the planar image P (match area) subjected to projection transformation (S120A).

Then, the image superimposing unit 33A superimposes the projection-converted image 302 on the display image 304A by using the mask data M and generates the superimposed image S (S130A). The second and following projection-converted images 302 are superimposed on the superimposed image S.

The image superimposing unit 33A determines whether all of the planar images P have been superimposed (S140A). If not all of the planar images P have been superimposed (NO in S140A), the processing after S110A is repeatedly performed.

If all of the planar images P have been superimposed (YES in S140A), the image displaying unit 31A displays the superimposed image S (S150A). The display apparatus 5 repeatedly performs the processing of S80A to 5150A illustrated in FIG. 57.

FIG. 58 is a diagram illustrating the distance between the central point CP of the predetermined area T and each of the planar images P1 and P2 having the same angle of view when the planar images P1 and P2 overlap. The planar images P1 and P2 overlap in the predetermined area T. In this case, the user is considered to focus on one of the planar images P1 and P2 that is closer to the central point CP of the predetermined area T. Thus, the superimposing order determiner 35A compares distances from the central point CP of the predetermined area T to centers O of the planar images P1 and P2 and superimposes one of the planar images P1 and P2 that is closer to the central point CP of the predetermined area T so as to appear closer to the user.

As a result comparison between a distance L1 between the central point CP of the predetermined area T and the center O of the planar image P1 and a distance L2 between the central point CP of the predetermined area T and the center O of the planar image P2, the distance L1 is shorter. Thus, the superimposing order determiner 35A determines that the planar image P1 is superimposed so as to appear closer to the user than the planar image P2.

<One Example of Display of Spherical Image>

Figure 59A:
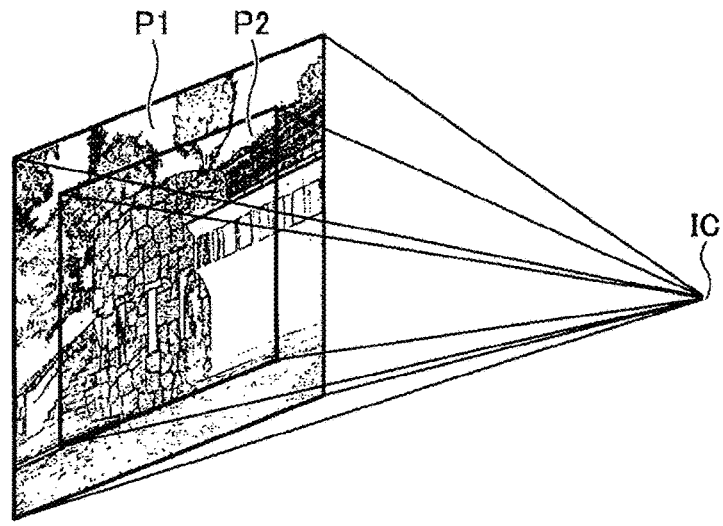
FIG. 59A, FIGS. 59B, and 59C (FIG. 59) are exemplary diagrams illustrating planar images to be viewed, according to the eighth display example.
Figure 59B:
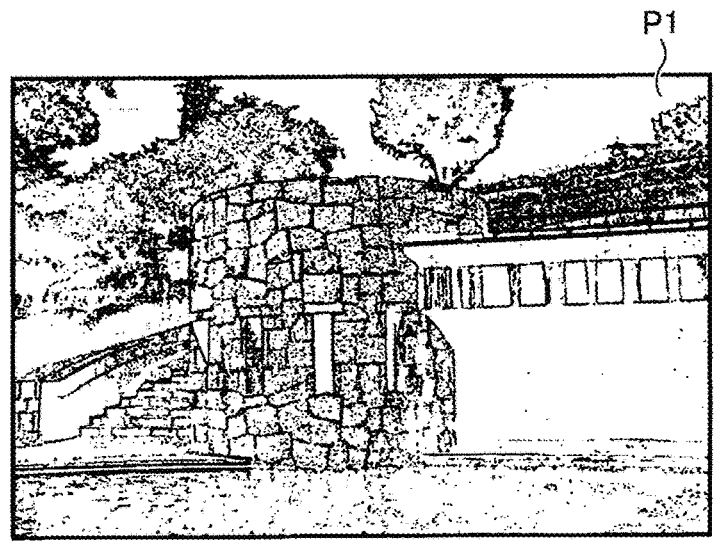
Figure 59C:
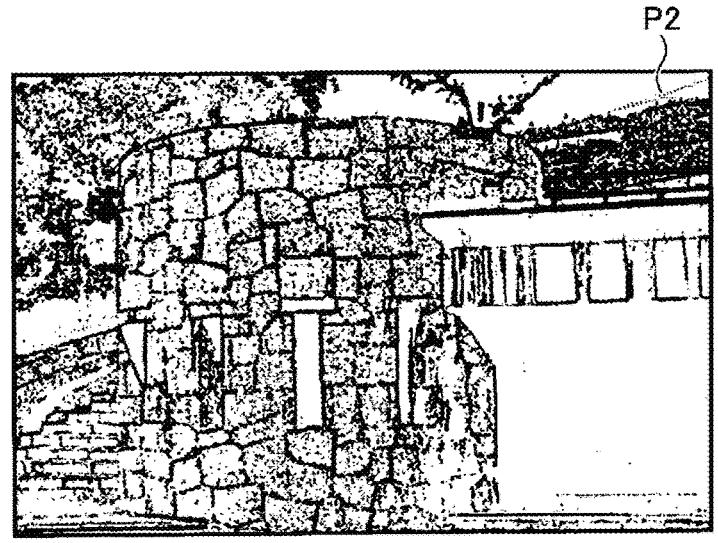

FIGS. 59A to 59C are exemplary diagrams illustrating the planar images P1 and P2 to be viewed. FIG. 59A illustrates the spherical image CE on which the planar images P1 and P2 are superimposed. In FIG. 59A, a portion of the spherical image CE in which the planar images P1 and P2 are superimposed is illustrated.

When the user operates the display apparatus 5 and displays the planar image P1 on the display 517, as illustrated in FIG. 59B, the planar image P1 is enlarged and displayed on the display 517. When the user further enlarges the spherical image CE, as illustrated in FIG. 59C, the planar image P2 is enlarged and displayed on the display 517.

Since the planar images P1 and P2 have high resolution, the user is able to view high-resolution images even when performing an enlarging operation.

<Display Example of Focal Length Information and Frames>

The display of planar images superimposed in the way illustrated in FIGS. 59A to 59C does not make the user aware of what planar images are superimposed. It is thus desirable to display focal length information, which is information on the focal lengths of the planar images P, near the planar images P.

Figure 60:
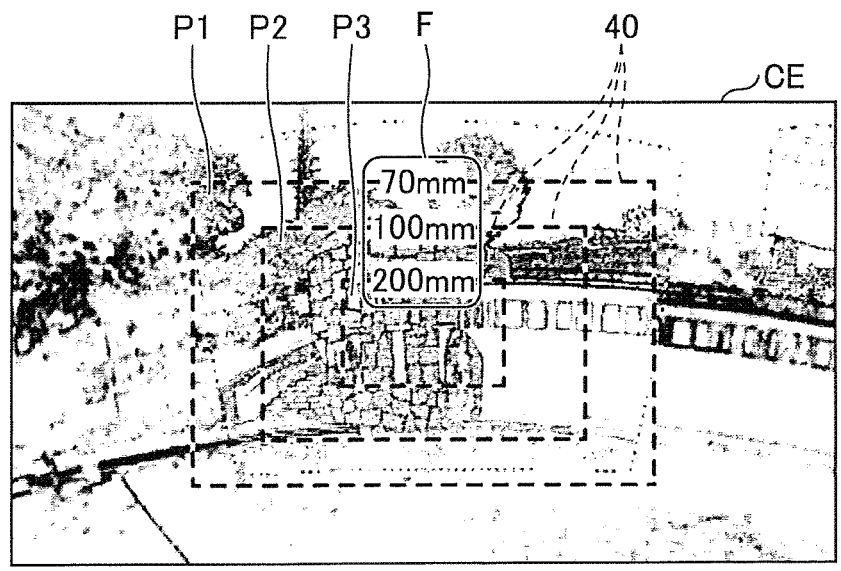
FIG. 60 is a view illustrating one example of planar images displayed on a display together with focal length information, according to the eighth display example.

FIG. 60 is a view illustrating one example of the planar images P displayed on the display 517 together with focal length information. In FIG. 60, three planar images P1 to P3 are superimposed, which respectively have focal lengths of 70 mm, 100 mm, and 200 mm. The display apparatus 5 displays focal length information F together with frames 40, each surrounding one of the planar images P1 to P3. This enables the user to know about the focal lengths of the planar images P that are superimposed on the spherical image CE. The user is also able to know the number of planar images P and the sizes and positions of the planar images P.

The focal lengths are described in metadata of the planar images P. The metadata is in Exif format, for example, and is associated with the planar images P. The image superimposing unit 33A reads focal lengths from the metadata.

<Method for Displaying Focal Length Information and Frames>

The frames 40 can be displayed in a way similar to that of the planar images P subjected to projection transformation. The first and second projection converters 28A and 29A perform projection transformation of rectangular areas on outer edges of the planar images P to obtain the frames 40. The first and second projection converters 28A and 29A perform projection transformation of the rectangular areas on the outer edges in a way similar to that in the projection transformation of the planar images P using the location parameters PP.

FIG. 61 is an exemplary diagram schematically illustrating a frame 40 obtained as a result of projection transformation. The first and second projection converters 28A and 29A use a transparent layer 308A having the same size (the same number of pixels) as the spherical image CE in equirectangular projection. A rectangular shape 321 indicating the outer edge of one of the planar images P is placed on the transparent layer 308A by using projection transformation. Dotted lines of the latitudes and longitudes of grids having values x=0.5 and −0.5 or y=0.5 and −0.5 in the location parameter PP may be drawn in the projection-converted image 302-1 to generate the frame 40.

FIG. 62 is an exemplary diagram schematically illustrating superimposition of the frame 40. The transparent layer 308A in addition to the display image 304A, the projection-converted image 302-1, and the mask data M is input to the image superimposing unit 33A. The method for superimposing the projection-converted image 302-1 on the display image 304A has been described with reference to FIG. 54.

The superimposition processing unit 36A extracts an area corresponding to white pixels in the mask data M from the transparent layer 308A by using the mask data M. The extracted area of the transparent layer 308A is superimposed on the superimposed image S to display a frame 40 indicating the outer edge of the planar image P.

The superimposition processing unit 36A further places the focal length information F on the top side of the frame 40. This allows the frame 40 and the focal length information F to be displayed near the planar image P. The focal length information F may appear on the right side, left side, or bottom side of the frame 40. Alternatively, the focal length information F about one of the planar images P1 to P3 over which a mouse cursor is placed may be displayed.

The display and non-display of the frame 40 may be switched in accordance with the viewer's operation, for example. In this case, the superimposition processing unit 36A switches between the display and non-display of the transparent layer 308A in accordance with an operation by the user.

<Superimposition Procedure>

Figure 63A:
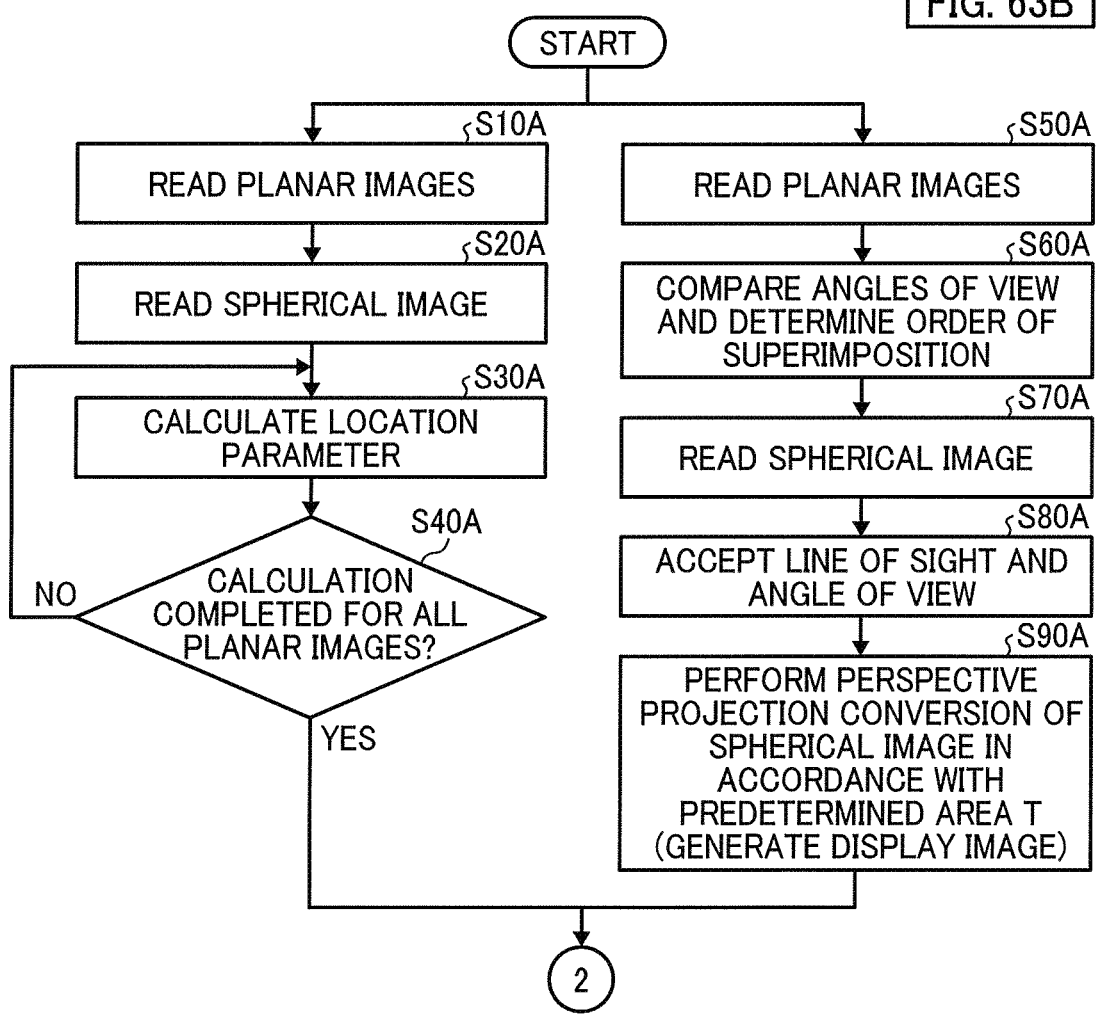
FIGS. 63A and 63B (FIG. 63) are an exemplary flowchart illustrating a procedure for the display apparatus to superimpose planar images on a spherical image in order of decreasing angle of view, according to the eighth display example.
Figure 63B:
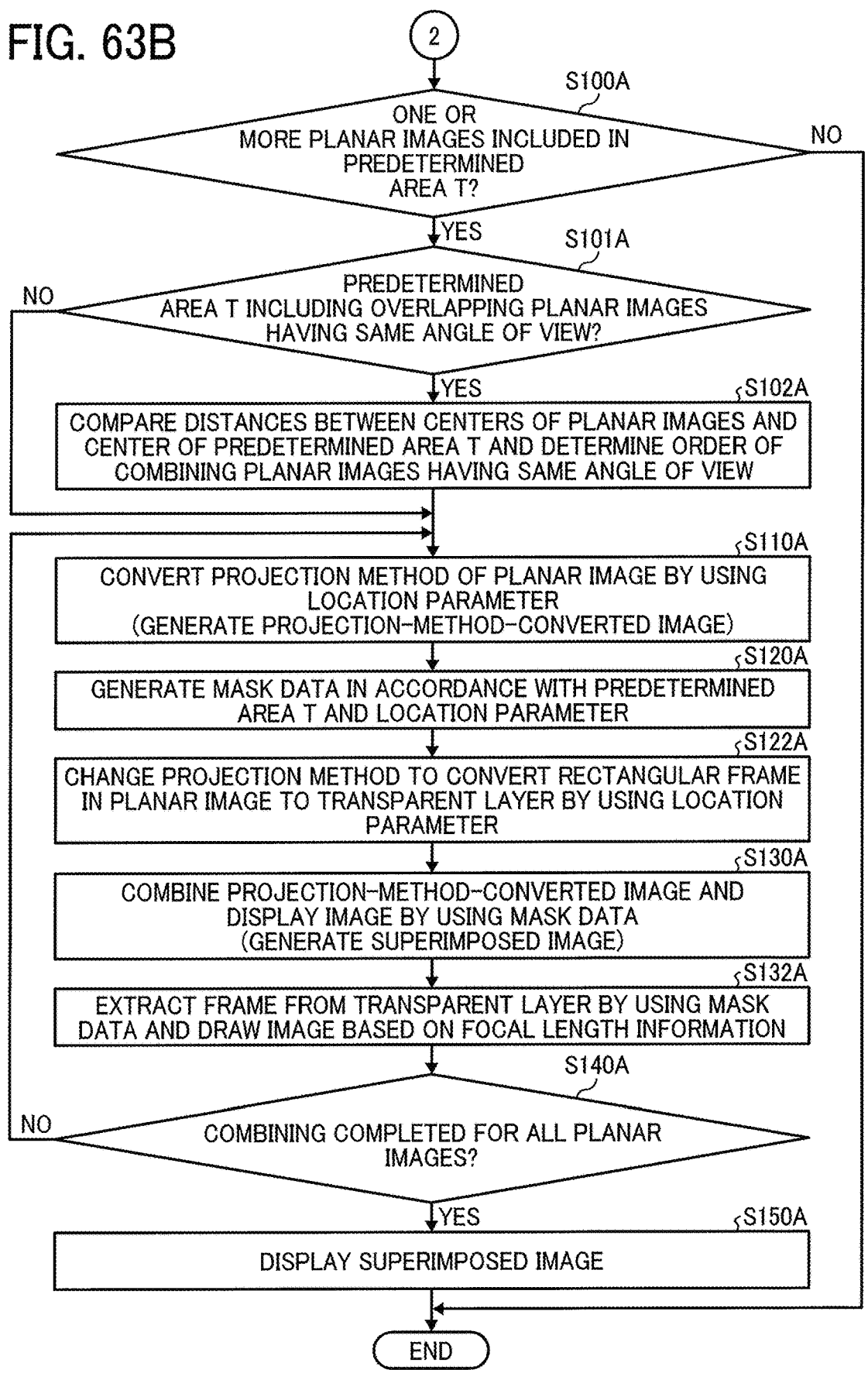

FIGS. 63A and 63B (FIG. 63) are an exemplary flowchart illustrating a procedure for the display apparatus 5 to superimpose the planar images P on the spherical image CE in order of decreasing angle of view. Referring to FIG. 63, a description is given, focusing on the difference from FIG. 57. The processing of S10A to S120A is similar to that in FIG. 57.

After S120A, the first and second projection converters 28A and 29A perform projection transformation to place the rectangular shape 321 indicating the outer edge of the planar image P on the transparent layer 308A by using the location parameter PP (S122A). As a result, the frame 40 is displayed on the transparent layer 308A.

Then, the superimposition processing unit 36A generates the superimposed image S (S130A), and extracts the frame 40 from the transparent layer 308A by using the mask data M (S132A). In addition, the superimposition processing unit 36A draws the focal length information F.

As described above, the display apparatus 5 can superimpose the planar images P1 and P2 on the spherical image CE and can also display the focal length information F.

<Stepwise Matching Processing>

In the foregoing description, the location parameter calculator 23A performs matching of the planar image P1 and the spherical image CE and performs matching of the planar image P2 and the spherical image CE. However, the planar image P1 and the planar image P2 have different image capturing conditions, such as the focal length, the lens used, and the number of pixels, from the spherical image CE. Due to the difference in image capturing conditions, the matching of the planar image P1 and the spherical image CE and the matching of the planar image P2 and the spherical image CE are successful, whereas the matching of the planar image P1 and the planar image P2 may fail. In this case, the user may view the spherical image CE such that the planar image P2 is shifted with respect to the planar image P1.

It is therefore desirable that the planar image P2 be matched to the planar image P1. The location parameter calculator 23A calculates the location parameters PP1 and PP2 in a way similar to that described above and determines whether the planar images P1 and P2 overlap in their entirety. When the planar images P1 and P2 partially overlap, the matching of the planar images P1 and P2 may not be performed because a shift is unnoticeable and the matching is difficult to achieve. However, even if the planar images P1 and P2 partially overlap, the matching of the planar images P1 and P2 may be performed.

When the planar images P1 and P2 overlap in their entirety, the location parameter calculator 23A determines which of the planar images P1 and P2 corresponds to a larger angle of view. The location parameter calculator 23A performs matching of the planar image P1 and the planar image P2 in order of decreasing angle of view (order of superimposition) and calculates a location parameter of the planar image P2 relative to the planar image P1. This location parameter is referred to as a location parameter PP12 for distinction.

<Location Parameter Pij>

A location parameter PPij is a location parameter of a planar image Pj based on a planar image Pi (j=i+1). When the planar images P are arranged in order of decreasing angle of view, the location parameter PPij is constituted by the location parameters PP of the preceding planar image Pi and the planar image Pj with the next smallest angle of view. The location parameter PPij is determined from the location parameter PP1 based on the position in the planar image Pi that matches the corresponding position in the planar image Pj.

Figure 64:
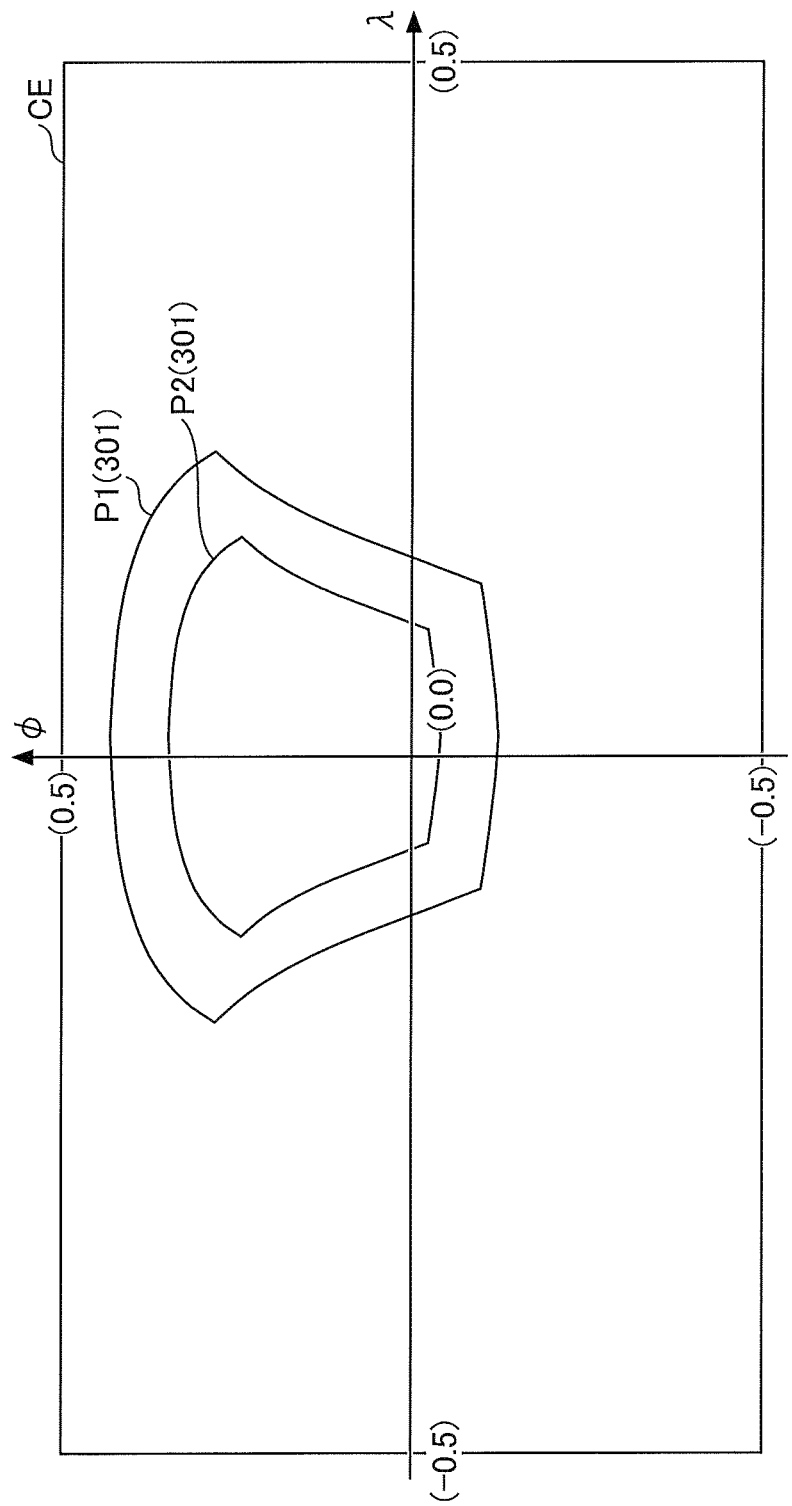
FIG. 64 is an exemplary diagram illustrating a location parameter, according to the eighth display example.

FIG. 64 is an exemplary diagram illustrating the location parameter PPij. The location parameter PP1 of the planar image P1 with the largest angle of view is determined through matching, and a point in the planar image P1 represented by coordinates (x, y) is associated with a corresponding point ($\lambda$, $\phi$) in the corresponding area CA of the spherical image CE.

As a result of matching of the planar images P1 and P2, the relative position of the planar image P2 with respect to the planar image P1 is determined. The point (x, y) in the planar image P2 identified by the relative position is associated with a corresponding point ($\lambda$, $\phi$) in the spherical image CE, thereby obtaining the location parameter PP12.

The first and second projection converters 28A and 29A may perform projection transformation of the planar image P1 by using the location parameter PP1 in the way described above. The first and second projection converters 28A and 29A perform projection transformation of the planar image P2 by using the location parameter PP12. The same superimposition method as that illustrated in FIG. 55 is used, except for the use of the location parameter PP12 instead of the location parameter PP2 for the projection transformation of the planar image P2.

As described above, the location parameter calculator 23A performs stepwise matching of the planar images P, which enables the user to view the spherical image CE without the planar image P2 being shifted with respect to the planar image P1.

<Superimposition Procedure>

Figure 65A:
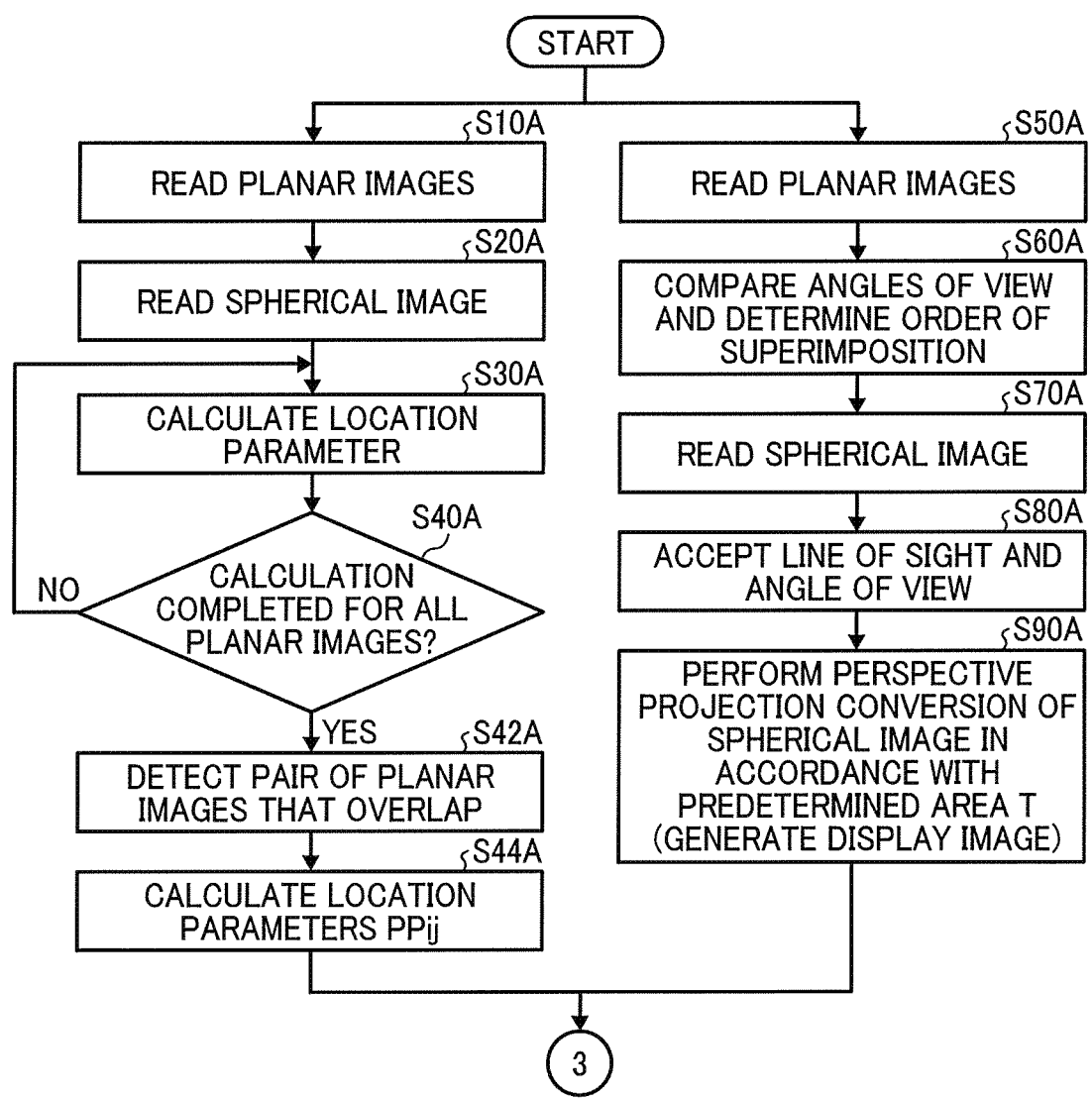
FIGS. 65A and 65B (FIG. 65) are an exemplary flowchart illustrating a procedure for the display apparatus to superimpose planar images on a spherical image in order of decreasing angle of view, according to the eighth display example.
Figure 65B:
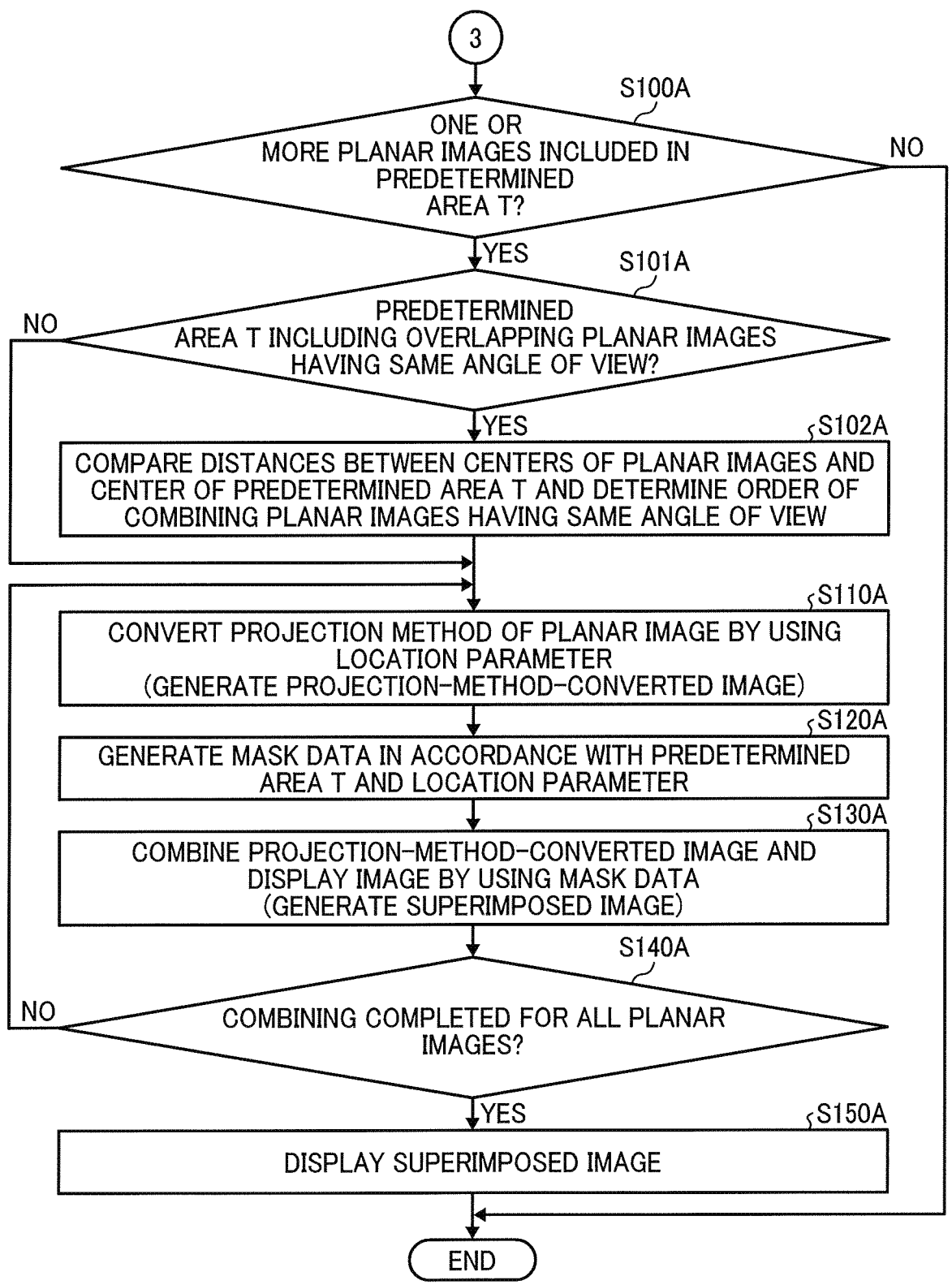

FIGS. 65A and 65B (FIG. 65) are an exemplary flowchart illustrating a procedure for the display apparatus 5 to superimpose the planar images P on the spherical image CE in order of decreasing angle of view. Referring to FIG. 65, a description is given, focusing on the difference from FIG. 57. The processing of S10A to S40A is similar to that in FIG. 57.

After S40A, the location parameter calculator 23A refers to the location parameters PP and detects a pair of planar images P that at least partially overlap (S42A). Then, the location parameter PPij for the pair of planar images P is calculated (S44A). The planar images P are paired such that one of a pair of planar images P with a smaller angle of view is one of the next pair of planar images P with a larger angle of view. For example, four planar images P, namely, planar images P1, P2, P3, and P4, overlap. In this case, the planar image P1 and the planar image P2 are paired, the planar image P2 and the planar image P3 are paired, and the planar image P3 and the planar image P4 are paired. A location parameter PP12 is determined through matching of the planar image P1 and the planar image P2, a location parameter PP23 is determined through matching of the planar image P2 and the planar image P3, and a location parameter PP34 is determined through matching of the planar image P3 and the planar image P4.

In the processing of S110A, the first and second projection converters 28A and 29A perform projection transformation of the planar image P1 by using the location parameter PP1 and perform projection transformation of the planar image P2 with the second largest angle of view by using the location parameter PP12 in the way described with reference to FIG. 55. The projection transformation of the planar image P3 is performed by using the location parameter PP23 in the way described with reference to FIG. 55. The projection transformation of the planar image P4 is performed by using the location parameter PP34 in the way described with reference to FIG. 55.

Accordingly, the display apparatus 5 can superimpose the planar images P1 and P2 on the spherical image CE in such a manner that the planar image P2 is shifted by a small amount.

As described above, the image capturing system according to this embodiment superimposes the planar images P on the spherical image CE to compensate for the spherical image CE having low quality by using the planar images P. The superimposition of the plurality of planar images P in order of decreasing angle of view allows the user to view α planar image P with a small angle of view. The user enlarges the spherical image CE, thereby being able to sequentially view the higher-quality planar images P in enlarged fashion.

The display method is not limited to that in the display examples described above. For example, the display apparatus 5 may automatically display planar images with different angles of view over an entire screen of a display. When the user enlarges the spherical image CE and the proportion of the planar image P with the largest angle of view in the spherical image CE becomes greater than or equal to a predetermined value, the display apparatus 5 automatically enlarges the planar images P at predetermined time intervals.

The spherical image CE may be displayed by using browser software or by using application software for displaying the spherical image CE.

It is desirable that the spherical image CE according to this embodiment be an image with an angle of view in such a manner as not to fit in the predetermined area T. For example, the spherical image CE may be an image with an angle of view of 180 degrees to 360 degrees only in the horizontal direction.

Display examples 9 and 10 are now described with reference to FIGS. 66A, 66B, and 67 to 85.

Display Example 9

As described in at least one of the display examples described above, simply superimposing a high-quality image on a low-quality image makes it difficult for a user to determine at which position in the low-quality image the high-quality image is superimposed. In this display example, a frame indicating the presence of a planar image is displayed in a spherical image. FIGS. 66A and 66B are exemplary diagrams illustrating how a spherical image according to this embodiment is displayed. FIG. 66A illustrates one example of the spherical image CE. It is assumed that the display apparatus 5, described below, has superimposed a planar image P on the spherical image CE. The display apparatus 5 displays a frame 40 in the spherical image CE. The frame 40 indicates the presence of the planar image P. In FIG. 66A, the frame 40 indicating the outer edge (frame) of the planar image P is displayed. The frame 40 allows the user to be aware of the planar image P mapped to the spherical image CE and to know the position and size of the planar image P.

The user is assumed to have been aware of the frame 40. In order to make the display of a high-quality image having high resolution feasible, the user enlarges the spherical image CE. This enables the planar image P to be displayed on the display 517 in enlarged view in the manner as illustrated in FIG. 66B. If a predetermined condition is met, the display apparatus 5 removes the frame 40. This enables the user to view the planar image P without being interfered with by the frame 40.

The predetermined condition used to remove the frame 40 is any condition in which it is assumed that the user views the planar image P. Specifically, (i) when the user clicks the planar image P or (ii) when the angle of view for the planar image P within the angle of view for the current predetermined area T is greater than or equal to a predetermined value, the frame 40 may be removed. Alternatively, the frame 40 may be removed in accordance with an operation by the user for viewing, such as (iii) when the mouse cursor is not over the planar image P or (iv) after a predetermined time period has elapsed since the predetermined area T in the spherical image CE was changed. In this disclosure, it is assumed that the user views the planar image P, when the user is actually viewing and when the user may start viewing.

As described above, the display apparatus 5 according to this embodiment superimposes the planar image P on the spherical image CE to compensate for the spherical image CE having low resolution by using the planar image P. The position of the planar image P is represented by the frame 40, which enables the user to easily know where the planar image P is located. The frame 40 has been removed when the user views the planar image P, which enables the user to view the planar image P without being interfered with by the frame 40. This display example uses the same functional configuration as that in display example 8 described above, and such a functional configuration is not repeatedly described. It is assumed that a single planar image P is superimposed.

<Superimposition Procedure>

Figure 57B:
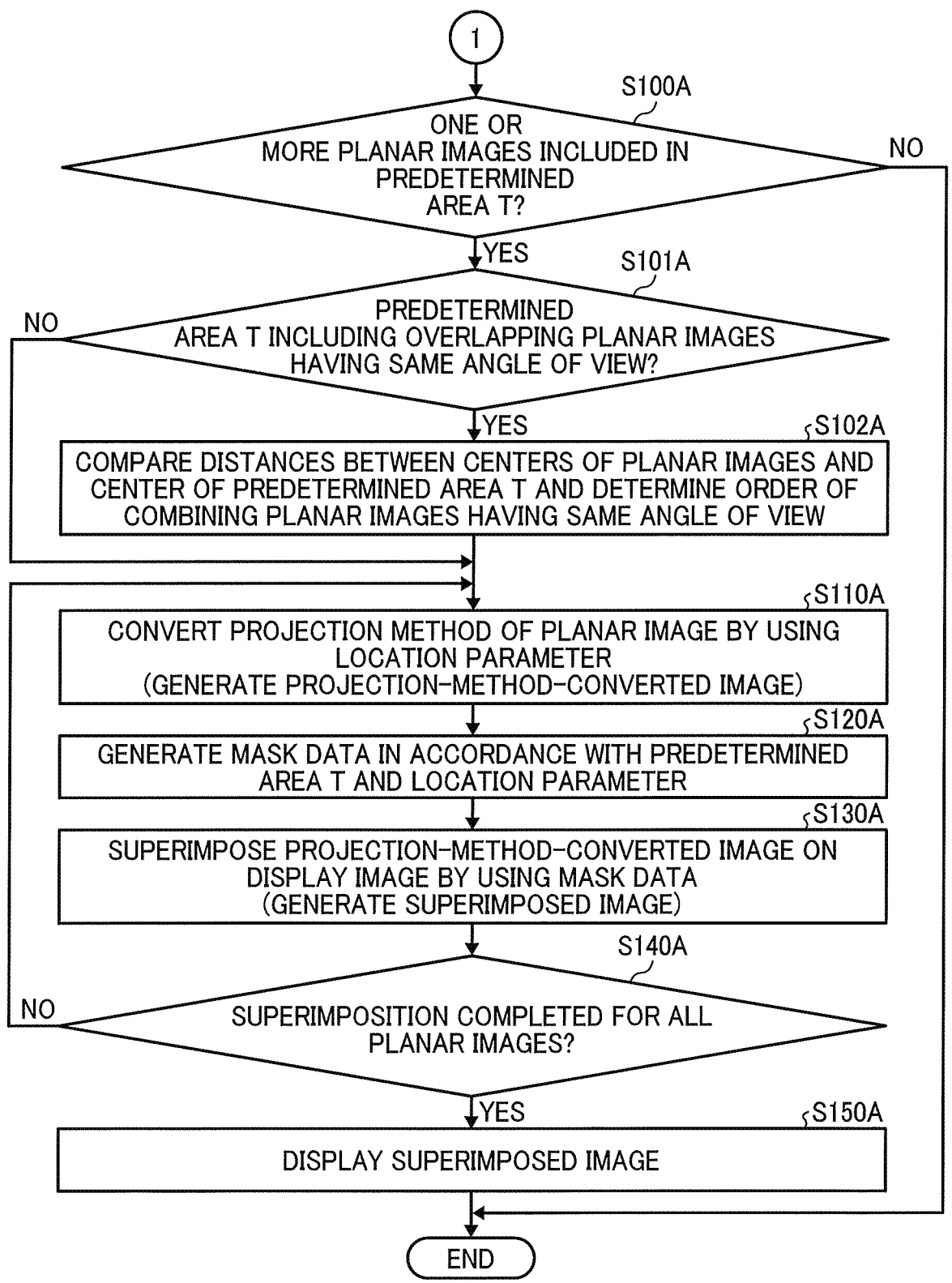

The procedure for the display apparatus 5 to superimpose the planar image P on the spherical image CE is substantially the same as that illustrated in FIG. 57, for example, and is not described repeatedly.

<Functions Related to Display Control of Frame>

Figure 67:
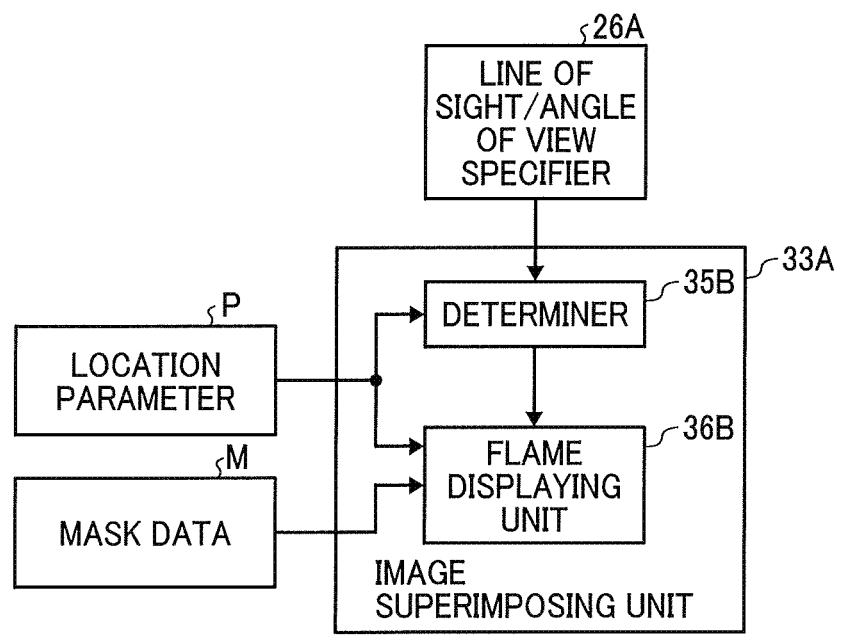
FIG. 67 is an exemplary functional block diagram illustrating a functional configuration of the image superimposing unit, according to the ninth display example.

Referring now to FIGS. 67 to 69 and 70A to 70D, a description is given of functions related to display control of the frame 40 in the superimposed image S in this display example. FIG. 67 is an exemplary functional block diagram illustrating a functional configuration of the image superimposing unit 33A. The image superimposing unit 33A includes a determiner 35B and a frame displaying unit 36B. The determiner 35B determines whether to display the frame 40 by using the current predetermined area T and the position of the planar image P (the location parameter PP), and sends the determination result (to display or remove the frame 40) to the frame displaying unit 36B. The frame displaying unit 36B displays or removes the frame 40 in accordance with the determination result.

<Determination of Whether to Display Frame 40>

As described above, when it is assumed that the user views the planar image P superimposed on the superimposed image S, the frame 40 is removed. Otherwise, the frame 40 remains displayed. Determinations regarding the predetermined conditions (i) to (iv) described above are described.

First, a description is given of a determination method "(ii) when the angle of view for the planar image P within the angle of view for the current predetermined area T is greater than or equal to a predetermined value".

FIGS. 68A to 68D are exemplary diagrams illustrating the relative position of the planar image P with respect to the predetermined area T. In FIG. 68A, the predetermined area T includes the entire portion of the planar image P. Since the predetermined area T is a portion of the spherical image CE that is displayed on the display 517, the user views the planar image P from substantially the front. The angle of view for the predetermined area T is represented by a and the angle of view for the planar image P is represented by b. When the angle of view $\alpha$ is greater than the angle of view b, i.e., a>b, the entire portion of the planar image P and a portion of the spherical image CE are visible. In the situation illustrated in FIG. 68A, it is assumed that the user desires to view the planar image P.

When the spherical image CE is larger than the planar image P to some extent, the determiner 35B may not necessarily determine that the user desires to view the planar image P. For example, when the angle of view a is larger than 1.2 times the angle of view b, the determiner 35B determines that the frame 40 is displayed. That is, when the angle of view a is larger than 1.2 times the angle of view b, the determiner 35B determines that the angle of view for the planar image P within the angle of view for the current predetermined area T is less than the predetermined value. When the angle of view a is less than or equal to 1.2 times the angle of view b, the determiner 35B determines that the frame 40 is not displayed. That is, when the angle of view a is less than or equal to 1.2 times the angle of view b, the determiner 35B determines that the angle of view for the planar image P within the angle of view for the current predetermined area T is greater than or equal to the predetermined value.

The predetermined area T is known. The latitude and longitude of the planar image P are registered in the location parameter PP. Accordingly, the angle of view b is determined from the location parameter PP. The details are described with reference to FIGS. 7 and 69.

In FIG. 68B, the predetermined area T is narrower than the planar image P. That is, the user views only the planar image P. In this case, the frame 40 is not displayed, as a matter of course.

In FIG. 68C, an upper portion of the planar image P corresponds to the predetermined area T. That is, the user views the upper portion of the planar image P. Since the predetermined area T is fully included in the planar image P (the angle of view $\alpha$ is less than or equal to 1.2 times the angle of view b), the determiner 35B determines that the frame 40 is not displayed.

In FIG. 68D, the shift (angle) between the center of the predetermined area T and the center of the planar image P is large, and a portion of the predetermined area T lies outside the planar image P. In this case, the planar image P within the predetermined area T is small (the angle of view a is more than 1.2 times the angle of view b). Thus, the determiner 35B determines that the frame 40 is displayed.

The threshold used to determine whether to display the frame 40 is set to 1.2, by way of example, and may be set to any value larger than 1.0. For example, the threshold may be set to a value in the range from 1.1 to 1.5. The user may set a threshold.

FIG. 7 is an exemplary diagram illustrating how the angle of view α and the angle of view b are determined. The angle of view a, or the angle of view a, is obtained from the predetermined area T, which is determined by the user performing an operation. When the distance from the virtual camera IC to the predetermined area T is represented by f and the length of a diagonal line of the predetermined area T is represented by 2L, the angle of view α, the distance f, and the length L have a relationship given by Equation 1.

$$L/f = \tan(\alpha/2) \quad \text{(Equation 1)}$$

Since the coordinates of diagonally opposite vertices of the predetermined area T are found through the operation performed by the user, the length of the diagonal line, i.e., 2L, can easily be calculated. The distance f is found from the radius of the sphere or from the operation performed by the user. Therefore, the angle of view α can be calculated using Equation 1.

Figure 69:
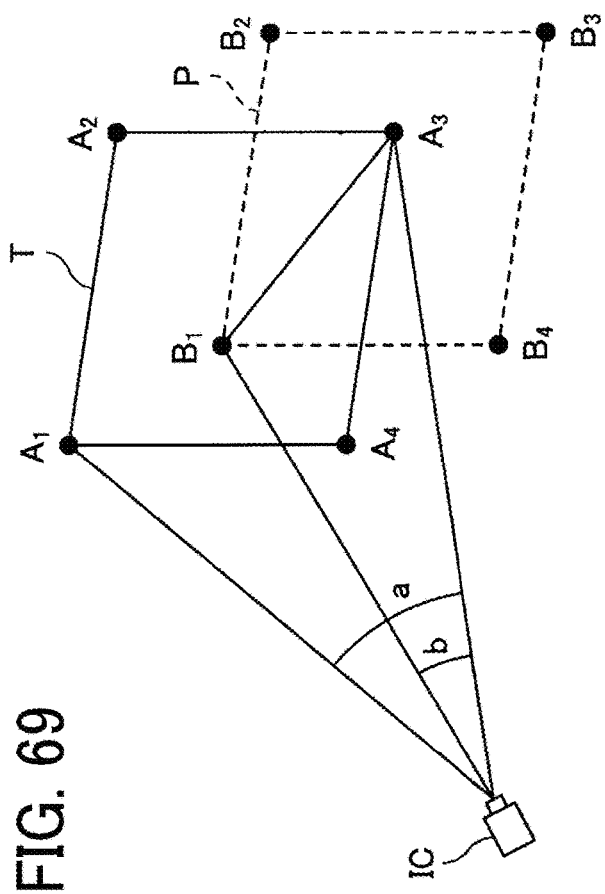
FIG. 69 is an exemplary diagram illustrating a relation between the diagonally opposite vertices of a predetermined area and the diagonally opposite vertices of a planar image, according to the ninth display example.

The angle of view b can also be calculated in a similar way. It is desirable that the angle of view b be calculated when at least a portion of the planar image P is included in the predetermined area T. FIG. 69 is a diagram illustrating a relation between the predetermined area T and the planar image P. The determiner 35B determines whether the planar image P is included in the predetermined area T based on four vertices. The predetermined area T has four vertices $A_1$ to $A_4$ and the planar image P has four vertices $B_1$ to $B_4$. The vertices $B_1$ to $B_4$ are specified by, for example, the longitudes and latitudes of corresponding points on the sphere or may be specified by the coordinates of corresponding points on the display 517.

For example, the vertex $B_1$ is determined in the following way.

Longitude of vertex $A_1$ ≤ longitude of vertex $B_1$ ≤ longitude of vertex $A_2$, and Latitude of vertex $A_1$ ≥ latitude of vertex $B_1$ ≥ latitude of vertex $A_4$ The vertices $B_2$, $B_3$, and $B_4$ can also be determined in a similar way. If diagonally opposite vertices ($B_1$ and $B_3$, and $B_2$ and $B_4$) are included in the predetermined area T, the angle of view b can be calculated from the location parameter PP by using Equation 1. As illustrated in FIG. 69, when not all of the diagonally opposite vertices $B_1$ to $B_4$ of the planar image P are included in the predetermined area T, the angle of view b is calculated from the vertex $B_1$ included in the predetermined area T and the vertex $A_3$ of the predetermined area T. The display apparatus 5 includes settings indicating that the vertex diagonally opposite the vertex $B_1$ is the vertex $A_3$, the vertex diagonally opposite the vertex $B_2$ is the vertex $A_4$, the vertex diagonally opposite the vertex $B_3$ is the vertex $A_1$, and the vertex diagonally opposite the vertex $B_4$ is the vertex $A_2$.

<Method for Displaying Frame>

The location (the corresponding area CA) of the planar image P in the spherical image CE is represented by the location parameter PP. Grids having a value of x=0.5 or y=0.5 in the location parameter PP illustrated in FIG. 51C define the outer edge of the planar image P. The latitudes and longitudes of the grids having a value of x=0.5 or y=0.5 are set in the location parameter PP. The frame displaying unit 36B draws dotted lines of the latitudes and longitudes of the grids to generate the frame 40.

Alternatively, projection transformation may be performed in a way similar to that in the projection transformation performed by the first and second projection converters 28A and 29A. A rectangular shape indicating the outer edge of the planar image P is subjected to projection transformation to obtain the frame 40.

FIG. 61 is an exemplary diagram schematically illustrating how the frame 40 is displayed. The frame displaying unit 36B uses a transparent layer 308A having the same size (the same number of pixels) as the spherical image CE in equirectangular projection. The frame displaying unit 36B further draws dotted lines of the latitudes and longitudes of grids having values of x=0.5 and −0.5 or y=0.5 and −0.5 in the location parameter PP to generate the frame 40.

The frame displaying unit 36B uses mask data and extracts an area corresponding to white pixels in the mask data from the transparent layer 308A. The extracted area of the transparent layer 308A is superimposed on the superimposed image S to display a frame 40 indicating the outer edge of the planar image P.

In order to hide the frame 40, the frame displaying unit 36B may hide the transparent layer 308A.

Display Examples

Figure 70A:
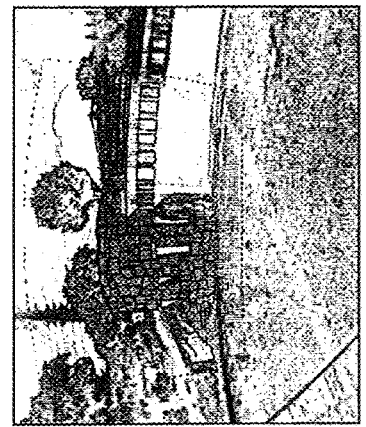
FIGS. 70A to 70D are exemplary diagrams illustrating examples of a frame displayed in a spherical image, according to the ninth display example.

FIGS. 70A to 70D are exemplary diagrams illustrating examples of the frame 40 displayed in the spherical image CE. FIGS. 70A to 70D illustrate how the user gradually enlarges the spherical image CE by operating the display apparatus 5. In FIG. 70A, substantially the entire portion of the spherical image CE is included in the predetermined area T. In the state illustrated in FIG. 70A, the angle of view a is larger than 1.2 times the angle of view b, and thus the frame 40 is displayed. Instead of the ratio of angles of view, the distance between the center of the planar image P and the central point CP of the predetermined area T may be used such that the frame 40 is displayed when the distance is less than a threshold (where the threshold is ¼ of the length of the distance, for example).

Figure 70B:
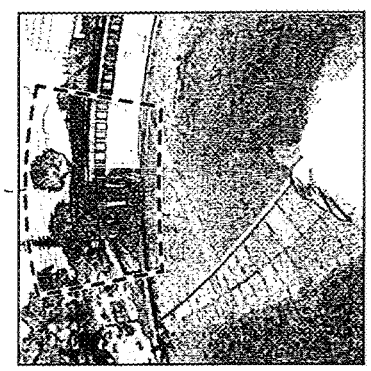
Figure 70C:
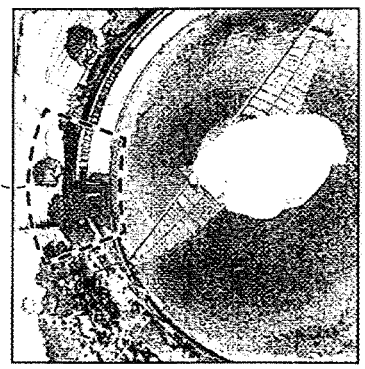
Figure 70D:
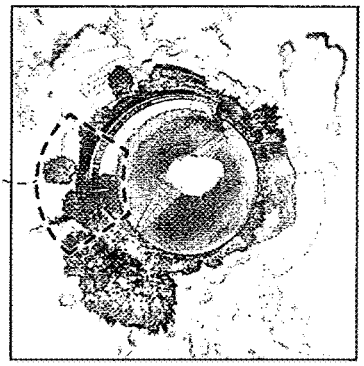

As illustrated in FIGS. 70B and 70C, if the spherical image CE is gradually enlarged, the angle of view a is larger than 1.2 times the angle of view b, and thus the frame 40 is displayed. In FIG. 70D, the angle of view a becomes less than or equal to 1.2 times the angle of view b, and thus the frame 40 is not displayed.

<Operation Procedure>

Figure 71:
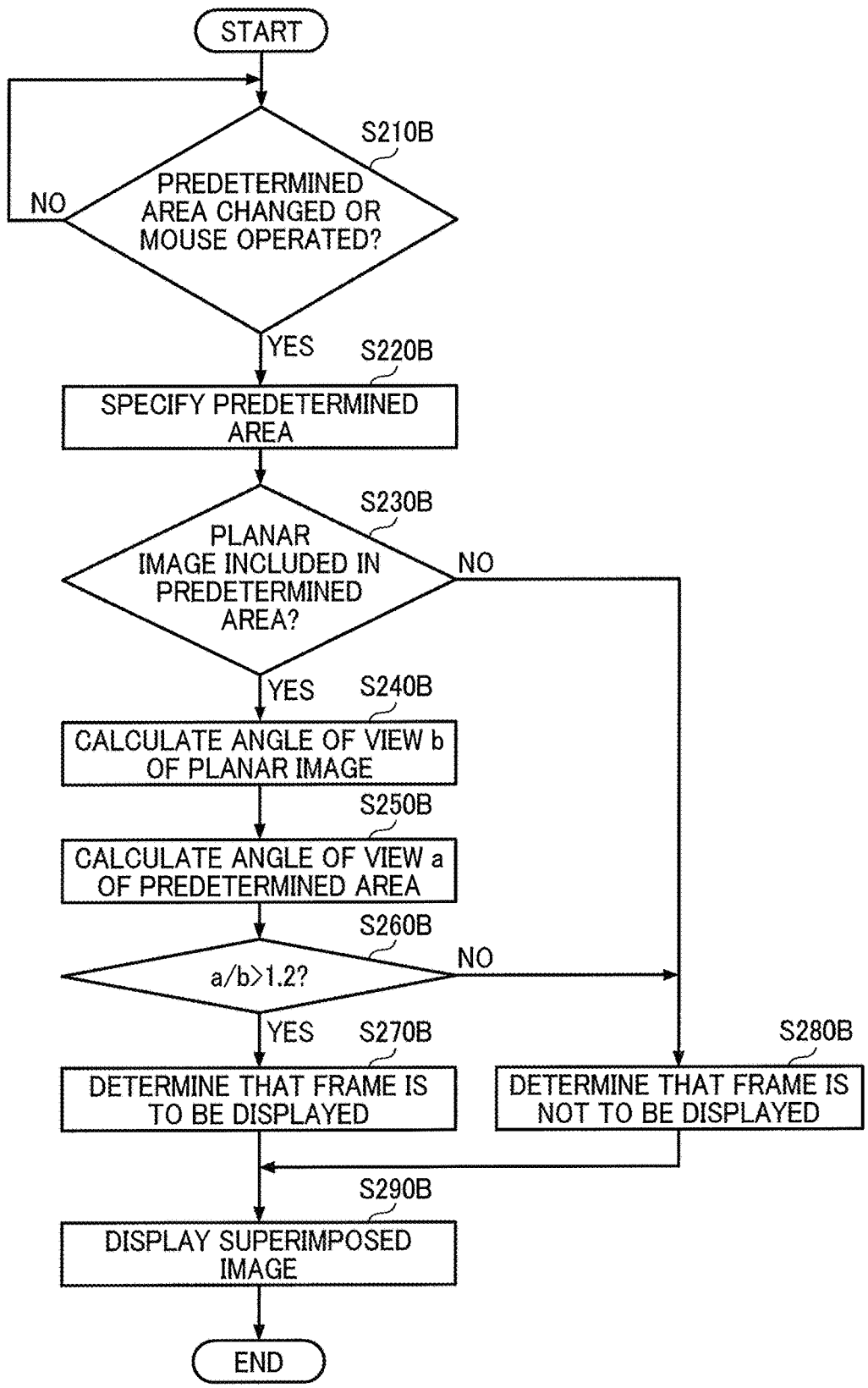
FIG. 71 is an exemplary flowchart illustrating a procedure for the display apparatus to control whether to display a frame when displaying a planar image, according to the ninth display example.

FIG. 71 is an exemplary flowchart illustrating a procedure for the display apparatus 5 to control whether to display the frame 40 when displaying the planar image P. The procedure illustrated in FIG. 71 starts when the display apparatus 5 displays the spherical image CE. It is assumed that the planar image P has been superimposed on the spherical image CE.

The determiner 35B determines whether the predetermined area T is changed or whether a mouse operation is performed (S210B). The phrase "the predetermined area T is changed" is used to indicate that the user has changed the line of sight or has enlarged or reduced the size of the predetermined area T. Specifically, the line of sight/angle of view specifier 26A converts an operation of the user to the line of sight direction and the angle of view and delivers the line of sight direction and the angle of view to the image superimposing unit 33A. Alternatively, the determiner 35B may simply determine whether a mouse operation is performed. Accordingly, upon a mouse event, the process proceeds to S220B and subsequent processing is performed if the predetermined area T is not changed.

The image superimposing unit 33A specifies the predetermined area T by using the line of sight direction and the angle of view (S220B). That is, the range of latitudes and longitudes of a portion of the spherical image CE that corresponds to the predetermined area T is specified.

Then, the determiner 35B determines whether at least a portion of the planar image P is included in the predetermined area T (S230B). If the planar image P is not included at all in the predetermined area T, the frame 40 need not be displayed, and thus the process proceeds to S280B.

If at least a portion of the planar image P is included in the predetermined area T (YES in S230B), the determiner 35B calculates the angle of view b of the planar image P (S240B). The determiner 35B further calculates the angle of view a of the predetermined area T (S250B).

Then, the determiner 35B compares the ratio of the angle of view a to the angle of view b, i.e., a/b, with a threshold of 1.2 and determines whether the ratio a/b is larger than a threshold of 1.2 (S260B).

If YES is determined in S260B, it is not assumed that the user views the planar image P, and thus the determiner 35B determines that the frame 40 is displayed (S270B). The frame displaying unit 36B extracts a portion of a layer for the frame 40 that corresponds to the predetermined area T by using mask data. This allows the user to know the location and size of the planar image P.

If NO is determined in S260B, it is assumed that the user views the planar image P, and thus the determiner 35B determines that the frame 40 is not displayed (S280B). The frame displaying unit 36B hides the layer for the frame 40. This allows the user to view the planar image P without being interfered with by the frame 40.

The image displaying unit 31A displays the superimposed image S on the display 517 in such a manner that the planar image P is superimposed on the spherical image CE and the frame 40 is displayed or not on the superimposed image S (S290B).

<Determination Method for (i)>

A description is now given of a determination method "(i) when the user clicks the planar image P". When the user clicks the planar image P, the user clearly desires to view the planar image P. Thus, the frame displaying unit 36B no longer displays the frame 40 even if the condition (ii) is not satisfied. In addition, since the user clearly desires to view the planar image P, the second projection converter 29A displays the planar image P over an entire portion of the predetermined area T, which eliminates the need for the user to perform an operation to make the planar image P positioned in front of the user's eyes, which is convenient to the user. In this method, specifically, the user clicks the planar image P indicated by the frame 40 illustrated in FIG. 70A, thereby allowing the predetermined area T illustrated in FIG. 70A to change to that illustrated in FIG. 70D. This display method is referred to as automatic enlargement of the planar image P and is described. A device having a touch panel may be used for display such that, when the planar image P is touched, a similar operation is performed.

Figure 72:
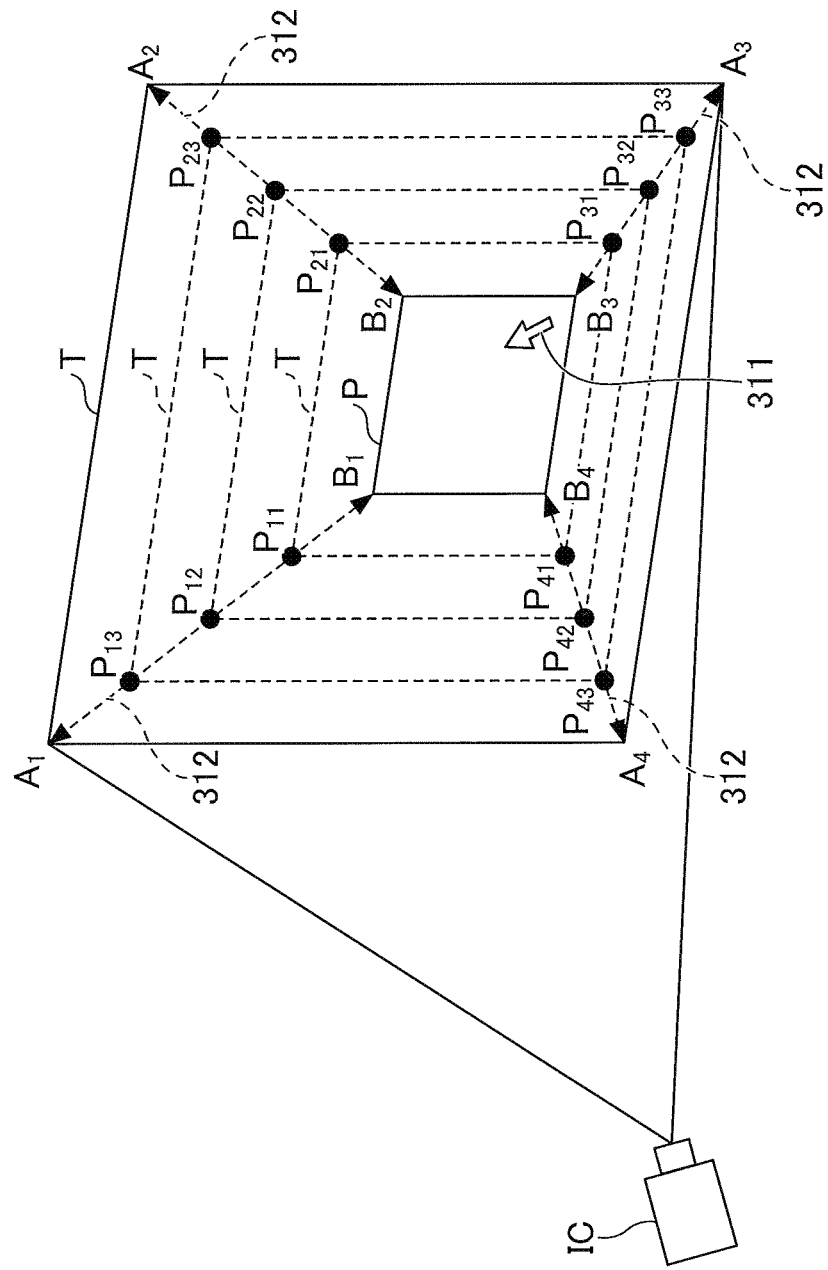
FIG. 72 is an exemplary diagram illustrating operation of automatically enlarging a planar image in a predetermined area, according to the ninth display example.

The automatic enlargement of the planar image P is described with reference to FIG. 72. FIG. 72 is an exemplary diagram illustrating operation of automatically enlarging the planar image P to make the planar image P match the predetermined area T. It is assumed that the user performs a click operation when a mouse cursor MC is over the planar image P. When a touch panel is used, the click operation corresponds to an operation in which the user taps the planar image P with their finger. The mouse cursor and the touch panel are referred to as pointing devices. In the following description, for brevity, the mouse cursor MC is used, by way of example.

The line of sight/angle of view specifier 26A converts the coordinates of the position of the mouse cursor MC on the display 517 when the user performs a click operation to three-dimensional coordinates of a corresponding position in the spherical image CE. The conversion corresponds to the reverse of perspective projection transformation. The determiner 35B converts the three-dimensional coordinates of the position of the mouse cursor MC to latitude and longitude coordinates and determines whether the position of the mouse cursor MC is included in the planar image P. The determination is performed in the following way.

Longitude of vertex $B_1 \leq$ longitude of mouse cursor position $\leq$ longitude of vertex $B_2$, and Latitude of vertex $B_1 \geq$ latitude of mouse cursor position $\geq$ latitude of vertex $B_4$ If the position of the mouse cursor MC is included in the planar image P, the determiner 35B determines that the planar image P is clicked.

In this case, the second projection converter 29A automatically enlarges the planar image P. The second projection converter 29A performs image processing to gradually enlarge the planar image P to make the planar image P match the predetermined area T. Specifically, a line 312A joining the vertices $A_1$ and $B_1$, a line 312A joining the vertices $A_2$ and $B_2$, a line 312A joining the vertices $A_3$ and $B_3$, and a line 312A joining the vertices $A_4$ and $B_4$ are each equally divided into segments. In FIG. 72, each of the lines 312A is divided into four segments. Interpolation produces points along each of the lines 312A, and the points are referred to as interpolation points $P_{1i}$ to $P_{4i}$, where i is an integer of 1 to 3.

The process for automatically enlarging the planar image P is a process for reducing the angle of view a of the predetermined area T. The image displaying unit 31A reduces the size of the predetermined area T to match the size of an area defined by lines joining the interpolation points $P_{13}$, $P_{23}$, $P_{33}$, and $P_{43}$ (i.e., reduces the angle of view a). The image displaying unit 31A then reduces the size of the predetermined area T to match the size of an area defined by lines joining the interpolation points $P_{12}$, $P_{22}$, $P_{32}$, and $P_{42}$. The image displaying unit 31A then reduces the size of the predetermined area T to match the size of an area defined by lines joining the interpolation points $P_{11}$, $P_{21}$, $P_{31}$, and $P_{41}$. The image displaying unit 31A then reduces the size of the predetermined area T to match the size of an area defined by lines joining the vertices $B_1$, $B_2$, $B_3$, and $B_4$ of the planar image P.

The image processing described above allows the user to view the planar image P gradually enlarged. The predetermined area T is subjected to perspective projection transformation and is then displayed on an entire screen of the display 517 (on a screen created by using display software), which allows the user to view the planar image P enlarged.

Figure 73:
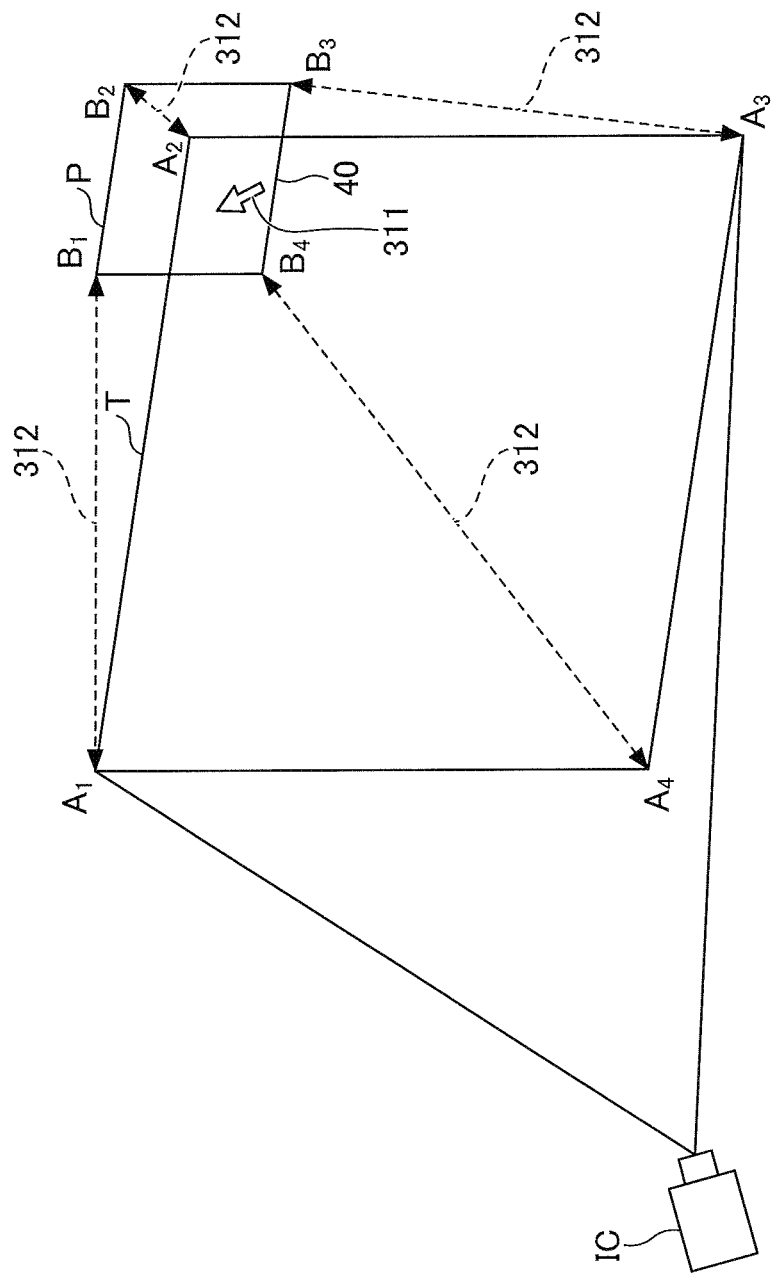
FIG. 73 is an exemplary diagram illustrating operation of automatically enlarging a planar image when an entire portion of the planar image is not included in a predetermined area, according to the ninth display example.

The planar image P whose entire portion is not included in the predetermined area T can also be subjected to automatic enlargement. FIG. 73 is an exemplary diagram illustrating operation of automatically enlarging the planar image P when an entire portion of the planar image P is not included in the predetermined area T. In FIG. 73, only the vertex $B_4$ of the planar image P is included in the predetermined area T. However, the coordinates of the vertices $B_1$ to $B_3$ of the planar image P, which are not displayed in the predetermined area T, are also known, and the planar image P can thus be automatically enlarged in a way similar to that illustrated in FIG. 72.

<Operation Procedure>

Figure 74:
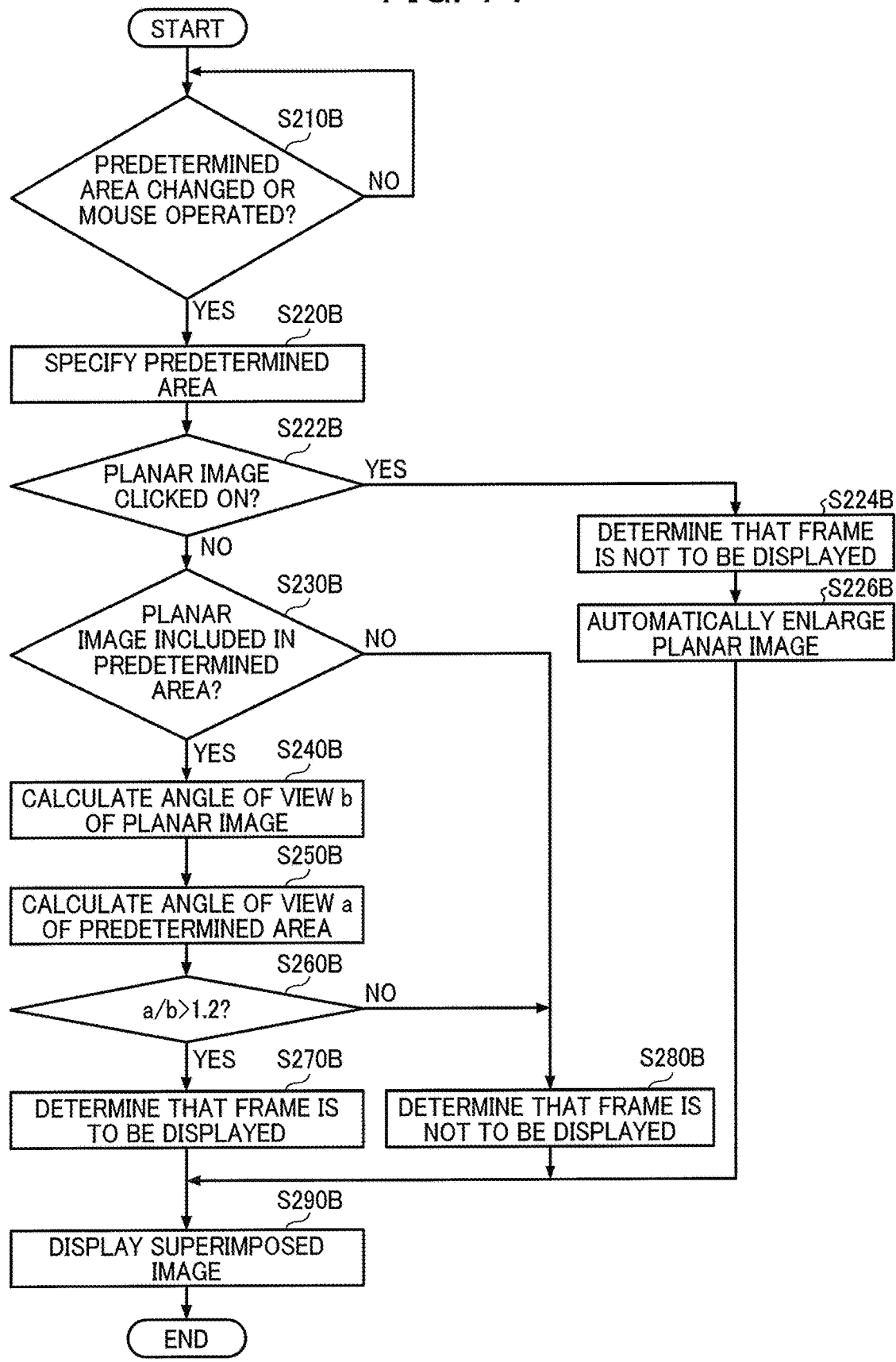
FIG. 74 is an exemplary flowchart illustrating a procedure for the display apparatus to control whether to display a frame when displaying a planar image, according to the ninth display example.

FIG. 74 is an exemplary flowchart illustrating a procedure for the display apparatus 5 to control whether to display the frame 40 when displaying the planar image P. Referring to FIG. 74, a description is given, focusing on the difference from FIG. 71.

The processing of S210B and S220B may be similar to that in FIG. 71. Then, the determiner 35B determines whether the planar image P is clicked (S222B). If NO is determined in S222B, the subsequent processing is similar to that in FIG. 71.

If YES is determined in S222B, the determiner 35B determines that the frame 40 is not displayed (S224B).

Then, the second projection converter 29A automatically enlarges the planar image P (S226B). The process described above eliminates the need for the user to perform an operation to display the planar image P so that the planar image P is positioned in front of the user's eyes.

<Display Control of Frame 40 Based on Position of Mouse Cursor>

A description is now given of a determination method "(iii) when the mouse cursor is not over the planar image P". When the mouse cursor is over the planar image P, the determiner 35B determines that the frame 40 is displayed. When the mouse cursor is not over the planar image P, the determiner 35B determines that the frame 40 is not displayed. The determination as to whether the mouse cursor is over the planar image P has been described above.

Figure 75A:
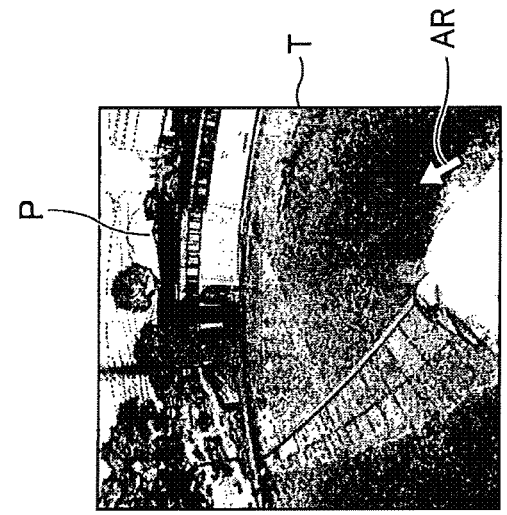
FIGS. 75A and 75B (FIG. 75) are exemplary diagrams illustrating the display and non-display of a frame, according to the ninth display example.
Figure 75B:
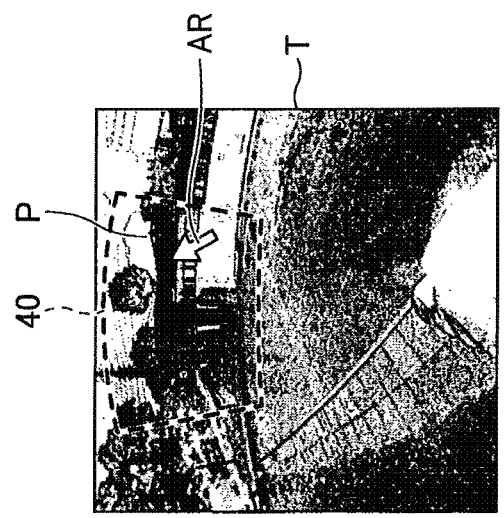

FIGS. 75A and 75B are exemplary diagrams illustrating the display and non-display of the frame 40. In FIG. 75A, the mouse cursor MC is over the planar image P, and thus the frame 40 is displayed. In FIG. 75B, the mouse cursor MC is not over the planar image P, and thus the frame 40 is not displayed.

Figure 76:
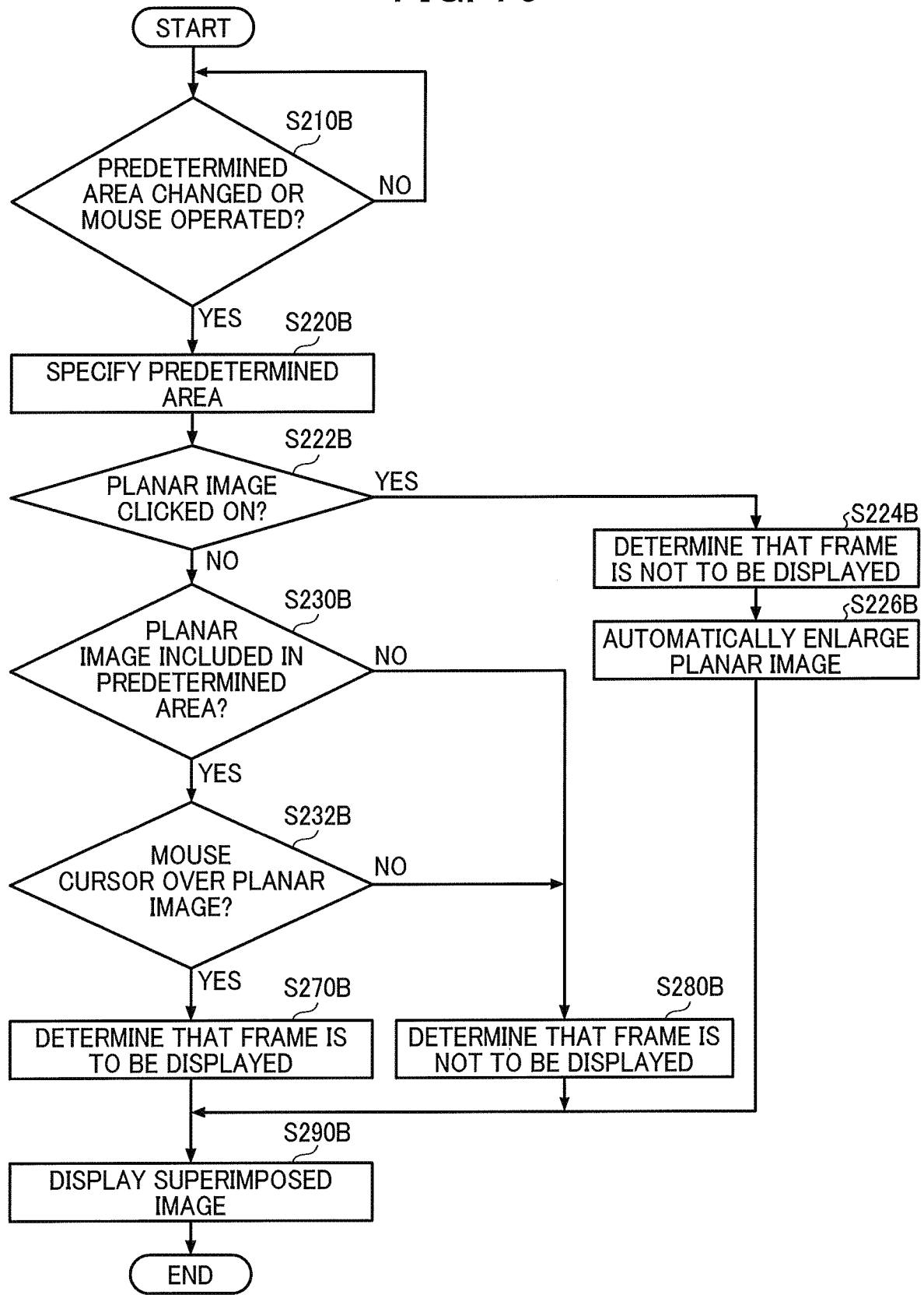
FIG. 76 is an exemplary flowchart illustrating a procedure for the display apparatus to control whether to display a frame when displaying a planar image, according to the ninth display example.

FIG. 76 is an exemplary flowchart illustrating a procedure for the display apparatus 5 to control whether to display the frame 40 when displaying the planar image P. Referring to FIG. 76, a description is given, focusing on the difference from FIG. 74.

The processing of S210B to S230B may be similar to that in FIG. 74. If YES is determined in S230B, the determiner 35B determines whether the mouse cursor is over the planar image P (S232B).

If the mouse cursor is over the planar image P (YES in S232B), the determiner 35B determines that the frame 40 is displayed (5270B). If the mouse cursor is not over the planar image P (NO in S232B), the determiner 35B determines that the frame 40 is not displayed (S280B).

Accordingly, the display apparatus 5 displays the frame 40 only when the user places the mouse cursor over the planar image P, which makes the spherical image CE more visible to the user. In addition, when the user moves the mouse cursor and places the mouse cursor over the planar image P, the frame 40 is displayed, which allows the user to easily find where the planar image P is located.

Conversely to FIG. 76, when the mouse cursor is over the planar image P, the determiner 35B may determine that the frame 40 is not displayed, and when the mouse cursor is not over the planar image P, the determiner 35B may determine that the frame 40 is displayed. In this case, the time period over which the frame 40 is displayed is usually longer than the time period over which the frame 40 is not displayed. Thus, the user is able to easily find the planar image P. Additionally, once placing the mouse cursor over the planar image P, the user is able to view the planar image P from which the frame 40 is removed.

<Display Control of Frame 40 Based on Rotation of Spherical Image CE>

A description is now given of a determination method "(iv) after a predetermined time period has elapsed since the predetermined area T in the spherical image CE was changed". Immediately after the rotation of the spherical image CE, the determiner 35B determines that the frame 40 is displayed over a predetermined time period.

Figure 77:
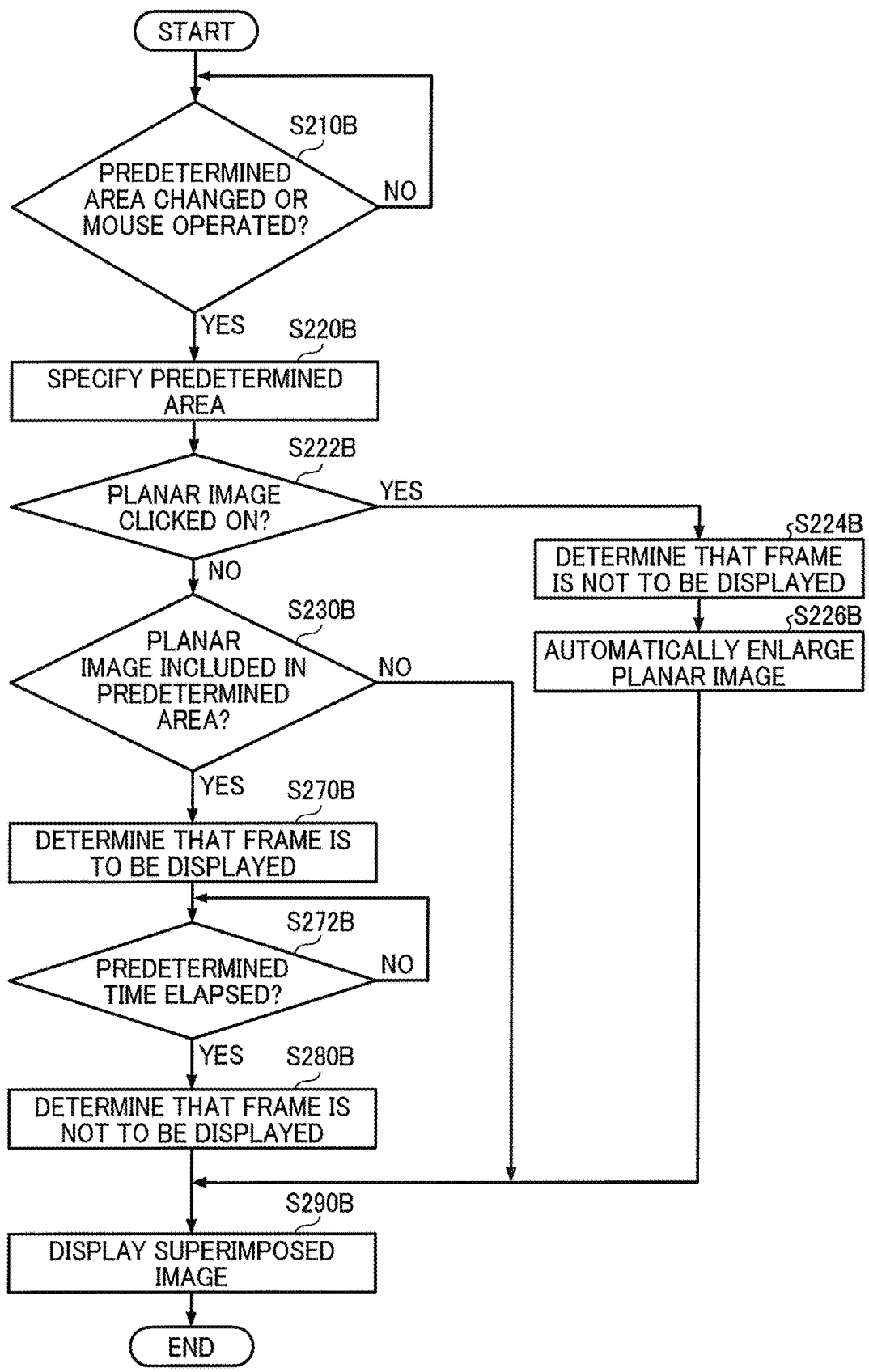
FIG. 77 is an exemplary flowchart illustrating a procedure for the display apparatus to control whether to display a frame when displaying a planar image, according to the ninth display example.

FIG. 77 is an exemplary flowchart illustrating a procedure for the display apparatus 5 to control whether to display the frame 40 when displaying the planar image P. Referring to FIG. 77, a description is given, focusing on the difference from FIG. 76.

The processing of S210B to S230B may be similar to that in FIG. 76. If YES is determined in S230B, the determiner 35B determines that the frame 40 is displayed (S270B). That is, if the predetermined area T is changed in S210B (if the spherical image CE is rotated), the frame displaying unit 36B displays the frame 40 when the planar image P is included in the predetermined area T.

Then, the determiner 35B determines whether a predetermined time period has elapsed since the frame 40 was displayed (5272B). The predetermined time period is several seconds, for example. The predetermined time period may be a time period enough for the user to recognize the frame 40, and may be set by the user.

If the predetermined time period has elapsed, the determiner 35B determines that the frame 40 is not displayed (S280B). That is, if a predetermined time period has elapsed since the predetermined area T was rotated or enlarged or reduced, the frame 40 can be removed. This can make the planar image P noticeable to the user and can help the user view the planar image P.

<Display Example of Frame>

The frame 40 is an image element used to inform the user of the location of the planar image P or to draw the user's attention to the planar image P. Any type of image element capable of informing the user of the location of the planar image P or drawing the user's attention to the planar image P may be used. The color or luminance of the frame 40 may be changed as desired.

Figure 78A:
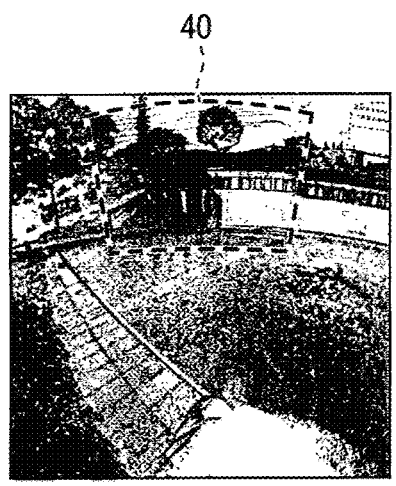
FIGS. 78A to 78C are views illustrating display examples of a frame, according to the ninth display example.

FIG. 78A illustrates one example of the frame 40. The frame 40 illustrated in FIG. 78A is displayed as white pixels. In the case of white pixels, the user is able to easily find the location of the planar image P when the spherical image CE is dark. As illustrated in FIGS. 70A to 70C or the like, in the case of black pixels, the user is able to easily find the location of the planar image P when the spherical image CE is bright. The frame displaying unit 36B may automatically switch between white pixels and black pixels in accordance with the average of the pixel values of the planar image P. Any display effect such as blinking the frame 40 or rotating dotted lines defining the frame 40 may be used.

Figure 78B:
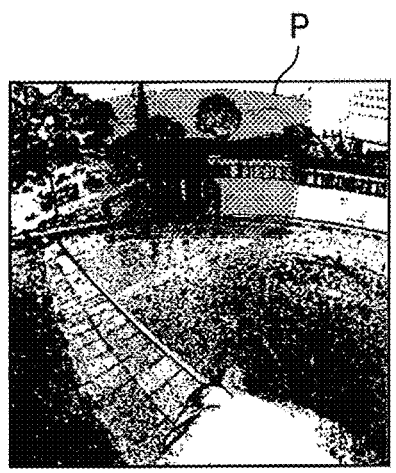

As illustrated in FIG. 78B, the frame displaying unit 36B may change the color of an area surrounded by the frame 40. For example, if the spherical image CE is a color image, the frame displaying unit 36B converts the planar image P into a black and white (monochrome) image. This eliminates the need to display the frame 40.

Similarly, the planar image P may be converted to a sepia toned image or a subtractive color image. When the spherical image CE is a black and white (monochrome) image, the planar image P may be a color image. In this case, it is desirable that the planar image P be originally a color image.

The frame displaying unit 36B converts the spherical image CE into a black and white (monochrome) image.

The planar image P may be subjected to luminance inversion. The luminance of the planar image P is calculated in accordance with "Y=0.299R+0.587G+0.114B". When RGB values are in a range of 0 to 255, luminance values are also in a range of 0 to 255. Luminance inversion is a process for transforming a luminance value in one of the ranges of 0 to 127 and 128 to 255 to the corresponding value in the other range.

Inverted value=|original value before inversion−255|

With this process, the luminance values of the planar image P are different from those of the surroundings, which can make the planar image P noticeable to the user at a glance. Instead of luminance inversion, any other type of inversion such as gradation inversion, lightness inversion, or hue inversion may be performed.

Alternatively, the frame displaying unit 36B may blink the planar image P. Blinking is a process for alternately switching the display state of the planar image P between a color-changed state and a normal state. For example, the frame displaying unit 36B alternately switches between the color-changed state and the normal state at intervals of several seconds. This can make the planar image P more noticeable to the user.

Figure 78C:
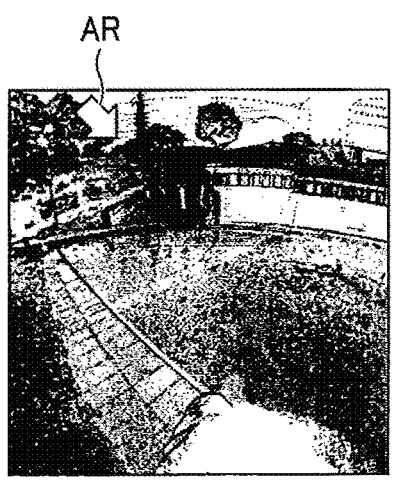

As illustrated in FIG. 78C, the frame displaying unit 36B may display an icon AR pointing to the planar image P. The user can predict the planar image P within an area pointed by the icon AR. Enlarging the area pointed by the icon AR so that the area is positioned in front of the user's eyes allows the user to view the planar image P.

As described above, the image capturing system according to this embodiment superimposes the planar image P on the spherical image CE to compensate for the spherical image CE having low quality by using the planar image P. The position of the planar image P is represented by the frame 40, which enables the user to easily understand where the planar image P is present. When the user views the planar image P, the frame 40 is removed, which allows the user to view the planar image P without being interfered with by the frame 40.

Display Example 10

In display example 9, the conditions (i) to (iv) given above trigger control the display or non-display of the frame 40. In this display example, several other events that may trigger control the display or non-display of the frame 40 are described.

In this display example, elements identified with the same numerals as those in display example 9 achieve similar functions, and only elements specific to this display example may be described mainly.

A. Clicking or Tapping of Planar Image P

In display example 9, as described above, in the condition (i), when a click or touch operation is performed, a frame is not displayed. A frame may or may not be displayed when the user clicks or touches the planar image P.

Figure 79A:
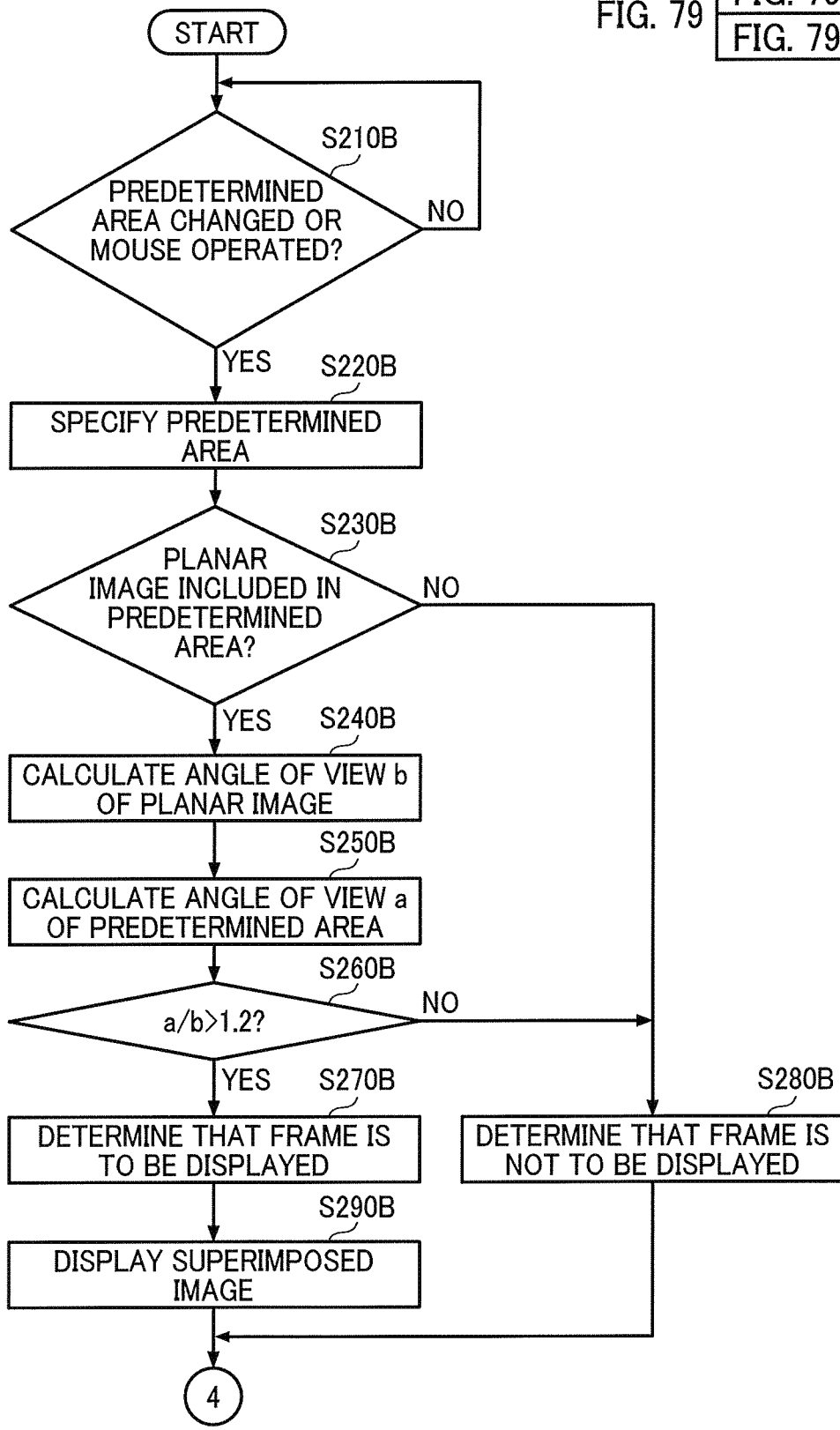
FIGS. 79A and 79B (FIG. 79) are an exemplary flowchart illustrating a procedure for the display apparatus control whether to display a frame when displaying a planar image in response to a click or touch operation, according to the ninth display example.
Figure 79B:
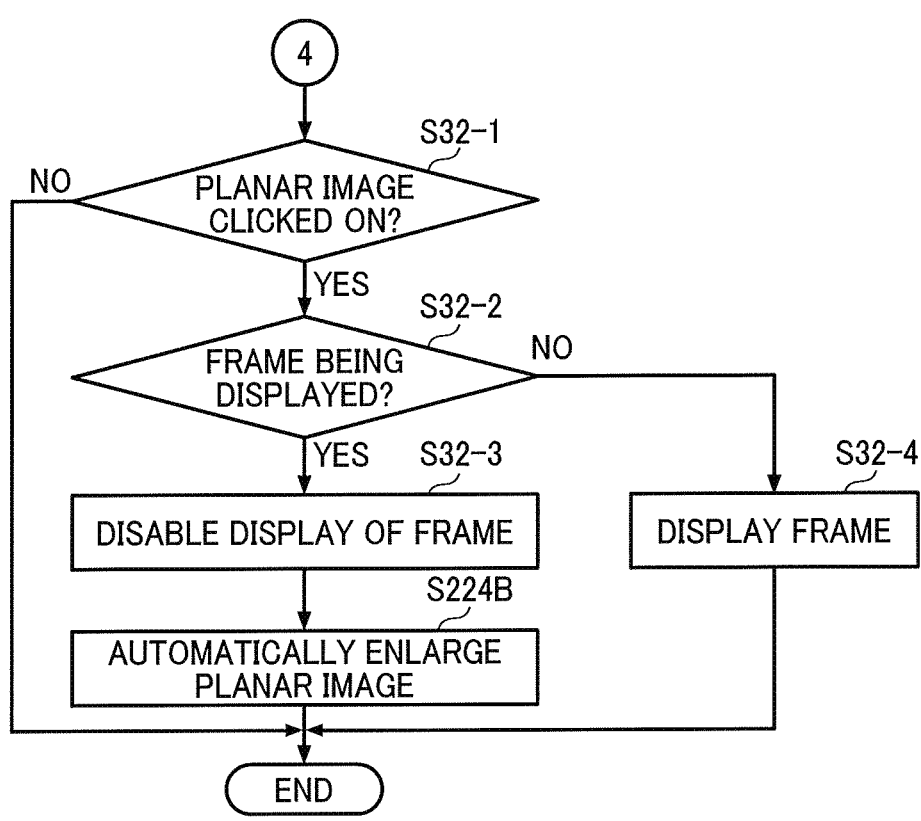

FIG. 79 is an exemplary flowchart illustrating a procedure for the display apparatus 5 to control whether to display a frame when displaying the planar image P. Referring to FIG. 79, a description is given, focusing on the difference from FIG. 71. The processing of S210B to S290B may be the same as that in FIG. 71.

After S290B, the frame displaying unit 36B determines whether the planar image P is clicked or tapped (S32-1). The frame displaying unit 36B determines whether a clicked or tapped point is over the planar image P by using mask data regardless of whether a frame is being displayed.

If YES is determined in S32-1, the frame displaying unit 36B determines whether a frame is currently being displayed (S32-2).

If a frame is being displayed, the frame displaying unit 36B hides the frame (S32-3). If no frame is being displayed, the frame displaying unit 36B displays a frame (S32-4).

If the planar image P is clicked or touched when a frame is being displayed, the second projection converter 29A automatically enlarges the planar image P (S226B).

Accordingly, even when the ratio of the angle of view a to the angle of view b, i.e., a/b, is less than 1.2 and no frame is being displayed, a frame can be displayed in response to clicking or tapping the planar image P. When a frame is being displayed, the frame is hidden in response to clicking or tapping the planar image P and the planar image P can be automatically enlarged. This allows the user to switch between the display and non-display of a frame in accordance with their preference.

In the process illustrated in FIG. 79, a frame is displayed when the ratio of the angle of view a to the angle of view b, i.e., a/b, is larger than 1.2. Display and non-display of a frame may be switched simply by a click or tap operation performed by the user.

Figure 80:
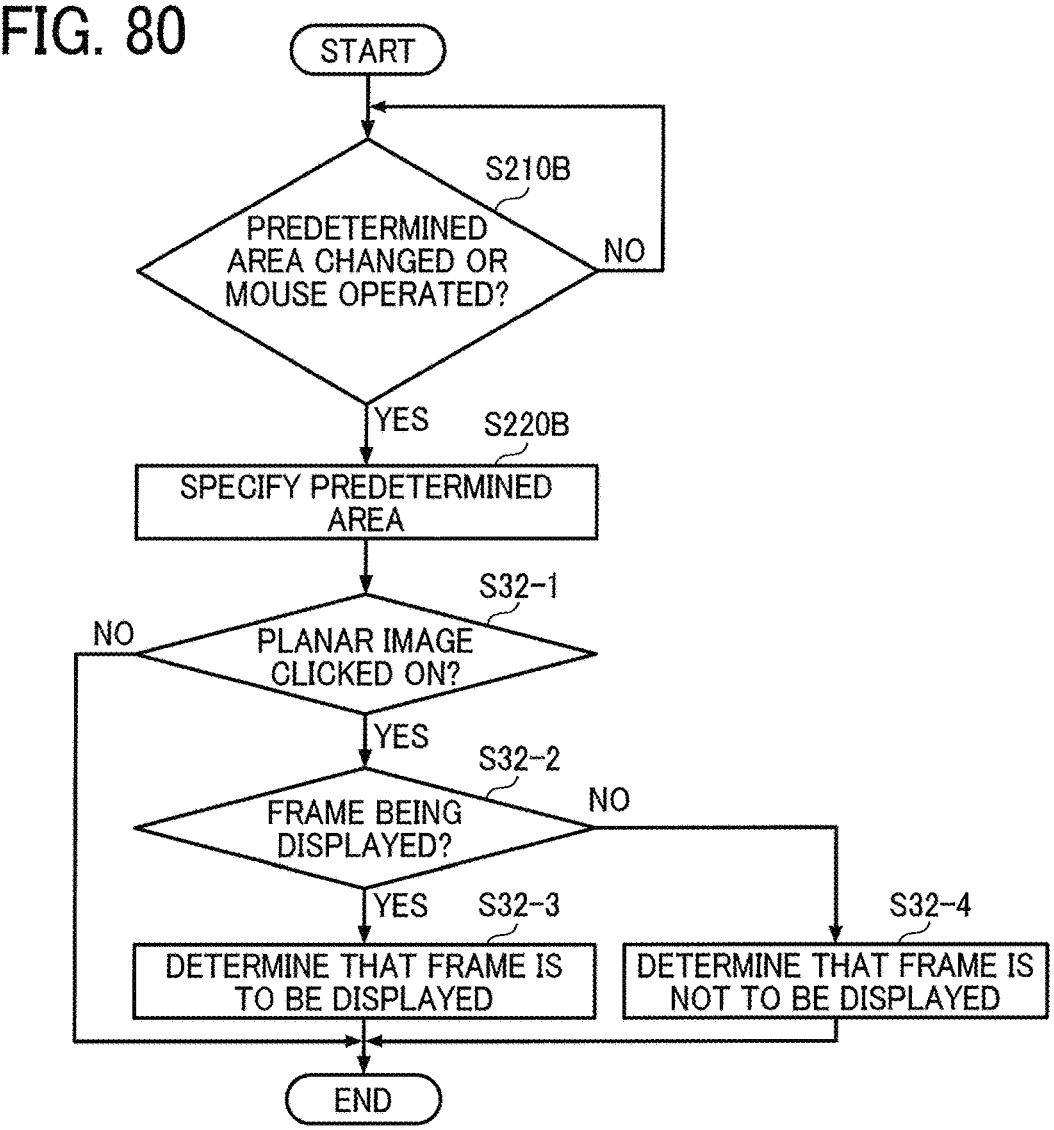
FIG. 80 is an exemplary flowchart illustrating a procedure for the display apparatus to control whether to display a frame when displaying a planar image in response to a click or touch operation, according to the ninth display example.

FIG. 80 is an exemplary flowchart illustrating a procedure for the display apparatus 5 to control whether to display a frame when displaying the planar image P. In the process illustrated in FIG. 80, no frame is displayed even if the planar image P is included in a predetermined area.

After S220B, the frame displaying unit 36B determines whether the planar image P is clicked or tapped (S32-1).

If the planar image P is clicked or tapped, the frame displaying unit 36B determines whether a frame is currently being displayed (S32-2).

If a frame is being displayed, the frame displaying unit 36B hides the frame (S32-3). If no frame is being displayed, the frame displaying unit 36B displays a frame (S32-4).

This process allows the user to switch between the display and non-display of a frame by clicking or tapping the planar image P. In this process, the display and non-display of a frame are switched in response to a click or tap operation, which may make it difficult to automatically enlarge the planar image P when the planar image P is clicked. However, automatic enlargement may be performed using a menu displayed when the user performs a right-click operation, for example, or may be performed in response to any other operation such as double-clicking.

As a modification, the frame displaying unit 36B may automatically display a frame in a planar image that fits in a predetermined area, and may automatically remove the frame after a certain time has elapsed since the display of the frame. The user is able to understand the presence of the planar image and to view a spherical image on which no frame appears. In addition, the display and non-display of a frame can be switched in response to a click or tap operation.

B. Switching Between Display and Non-Display of Frame Using Line-of-Sight Detection The display and non-display of a frame may be switched using line-of-sight detection instead of a click or touch operation.

Figure 81:
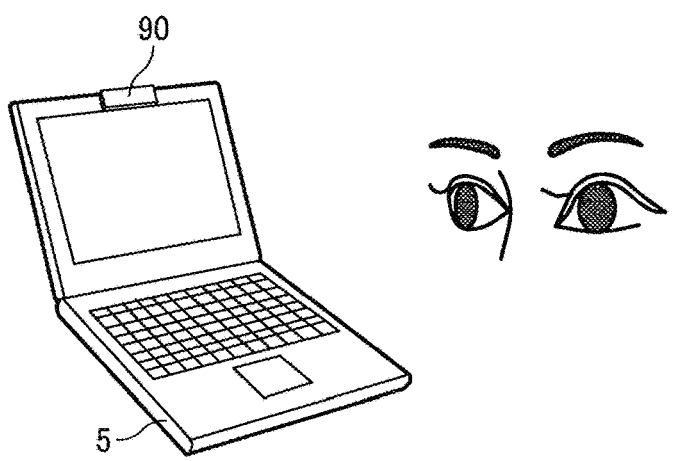
FIG. 81 is an exemplary diagram illustrating line-of-sight detection using the display apparatus, according to the ninth display example.

FIG. 81 is an exemplary diagram illustrating line-of-sight detection using the display apparatus 5. In an embodiment, the display apparatus 5 includes a line-of-sight detection device 90. The line-of-sight detection device 90 has a camera. The line-of-sight detection device 90 captures a face image of a user, including at least the eyes. The line-of-sight detection device 90 analyzes image data of the face image and detects the line of sight of the user. The line of sight is detected based on the relative position of a reference point and a moving point. As an example, the reference point and the moving point may respectively be an eye corner and an iris. Alternatively, the reference point and the moving point may respectively be a corneal reflex and a pupil. When a corneal reflex is used, the line-of-sight detection device 90 emits light as a point source. The line-of-sight detection device 90 specifies a face portion from the image data, specifies characteristic components such as eyebrows, nostrils, eyes, and a lip from the face portion, and specifies the position of the eyes from the arrangement of these components. When the position of the eyes is specified, the eye corner, iris, corneal reflection, and pupil can be detected. The line-of-sight detection device 90 refers to a table including relative positions between reference points and moving points and lines of sight in association with each other and detects a line of sight. The line of sight is represented by, for example, a vector in a three-dimensional coordinate system whose origin is the center of an imaging element of the line-of-sight detection device 90. If the relative position of a predetermined area with respect to the imaging element of the line-of-sight detection device 90 is identified, the coordinates of a point at which the line of sight direction lies (line-of-sight position) on the display (predetermined area) of the display apparatus 5 are specified. The frame displaying unit 36B periodically obtains the coordinates of the line-of-sight position and determines whether the line-of-sight position is in the planar image P.

Figure 82A:
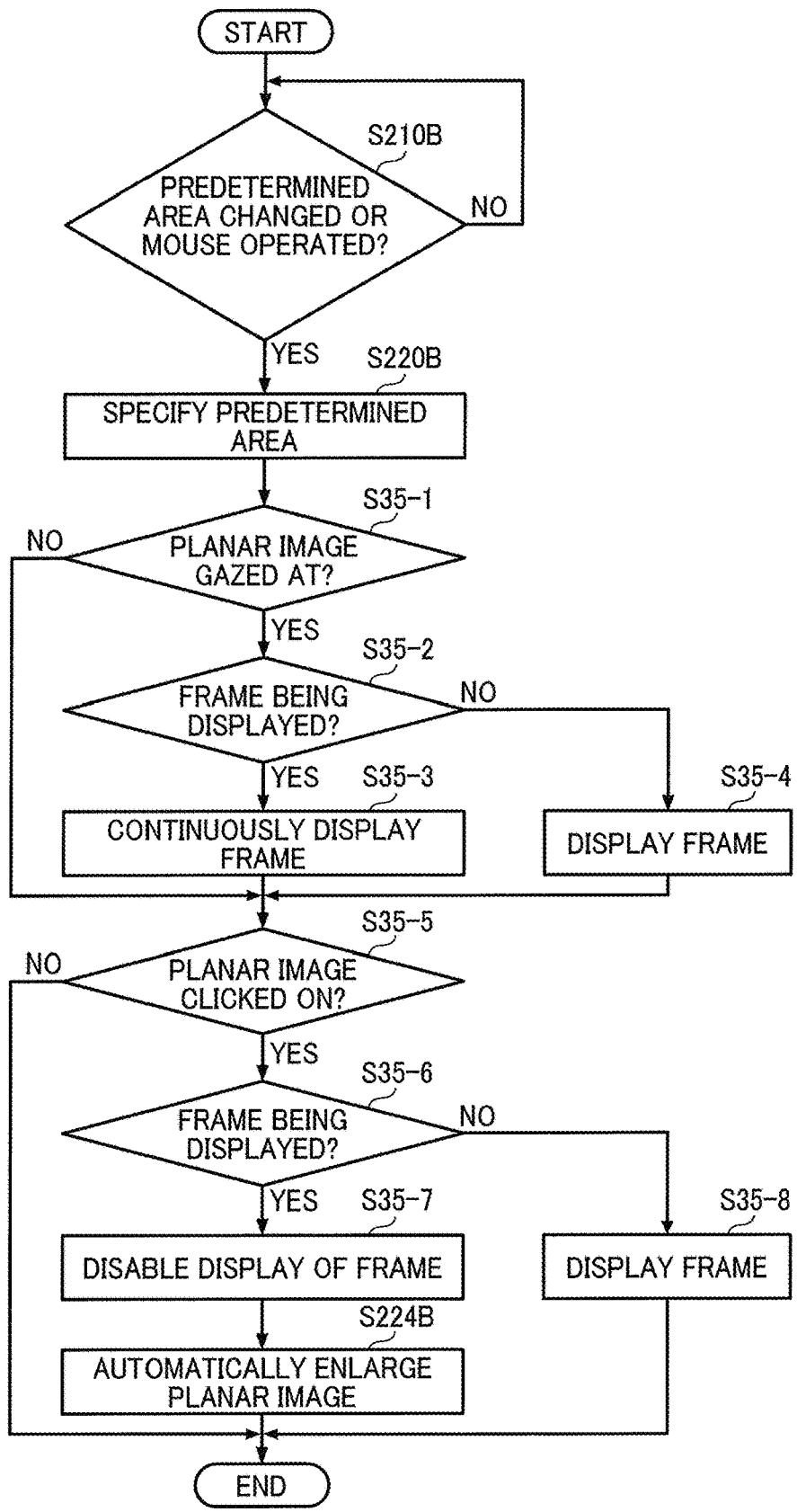
FIGS. 82A and 82B (FIG. 82) are exemplary flowcharts illustrating a procedure for the display apparatus to control whether to display a frame when displaying a planar image in accordance with a line-of-sight position, according to the ninth display example.

FIG. 82A is an exemplary flowchart illustrating a procedure for the display apparatus 5 to control whether to display a frame when displaying the planar image P. Referring to FIG. 82A, a description is given, focusing on the difference from FIG. 79.

The frame displaying unit 36B determines, based on the line-of-sight position, whether the planar image P is gazed at (S35-1). A frame may or may not be being displayed. When a frame is being displayed, as described below, the line-of-sight position is not used for display control of the frame. The frame displaying unit 36B determines whether the line-of-sight position is in the planar image P by using mask data.

If YES is determined in S35-1, the frame displaying unit 36B determines whether a frame is currently being displayed (S35-2).

If a frame is being displayed, the frame displaying unit 36B continuously displays the frame (S35-3). If no frame is being displayed, the frame displaying unit 36B displays a frame (S35-4).

When the planar image P is clicked (S35-5), if a frame is being displayed (S35-6), the frame displaying unit 36B hides the frame (S35-7), and the second projection converter 29A automatically enlarges the planar image P (S226B). If no frame is being displayed, the frame displaying unit 36B displays a frame (S35-8).

Accordingly, even if no frame is being displayed, a frame is displayed once the user gazes at the planar image P. This allows the user to find the planar image P when the line-of-sight position is in the planar image P. When a frame is being displayed, the frame remains displayed if the user gazes at the planar image P, which can prevent hunting of the frame. When the planar image P is clicked, the planar image P can be automatically enlarged when a frame is being displayed, or a frame is displayed if no frame is being displayed.

When the user desires to remove a frame, a conceivable method may be to press a button for removing a frame or to perform a clicking or tapping operation as illustrated in FIG. 80. Alternatively, a frame may be automatically removed after a certain time has elapsed since the display of the frame.

Figure 82B:
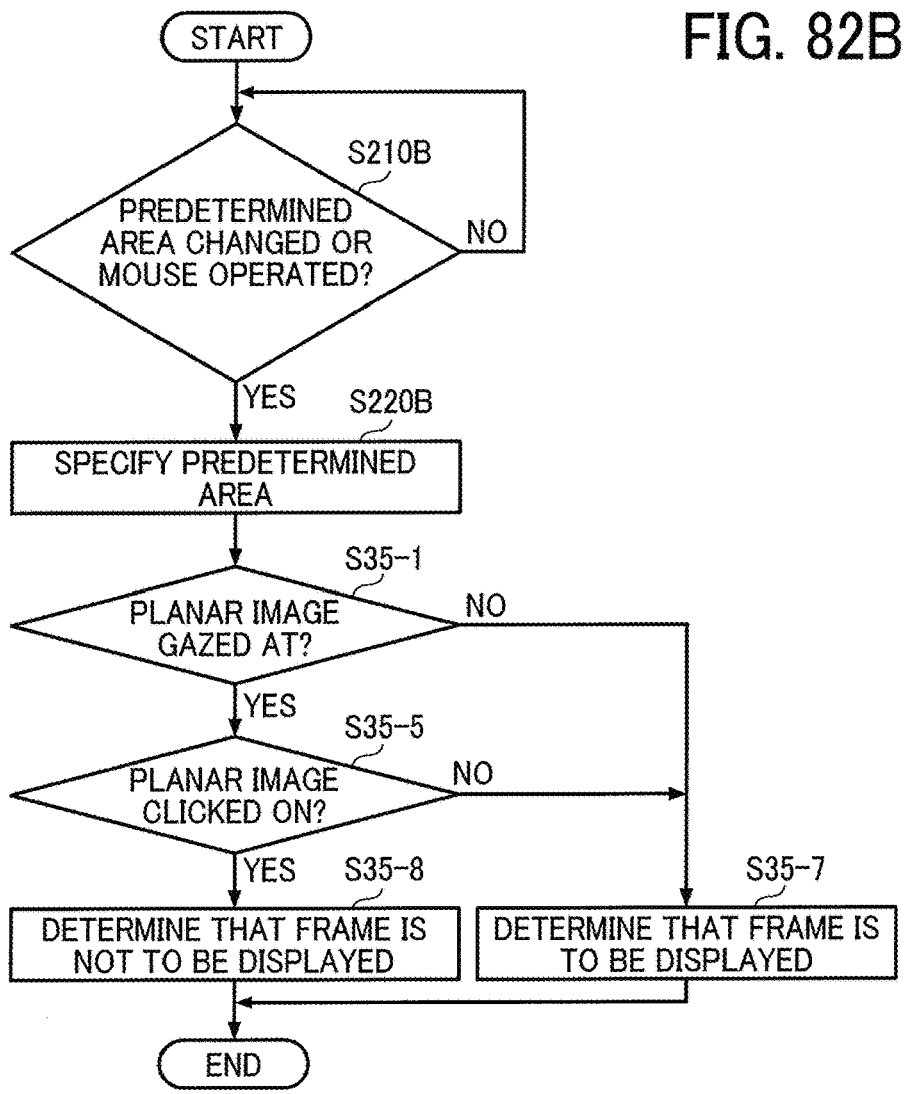

As illustrated in FIG. 82B, a frame may be displayed when the user gazes at and clicks or taps the planar image P.

In FIG. 82B, the frame displaying unit 36B determines, based on the line-of-sight position, whether the planar image P is gazed at (S35-1).

If YES is determined in S35-1, when the planar image P is clicked (S35-5), the frame displaying unit 36B displays a frame (S35-8). If the planar image P is not clicked, the frame displaying unit 36B does not display a frame (S35-9).

In this process, no frame is displayed merely when the user gazes at the planar image P, which may make the user feel comfortable. If the user does not gaze at the planar image P, no frame is displayed.

C. Display of Frame in Presence of Planar Image P in Vicinity of Center of Predetermined Area When the planar image P is in the vicinity of the center of a predetermined area, it is assumed that the user has interest in an object appearing in the planar image P. Thus, a frame is displayed to inform the user of the presence of the planar image P.

Figure 83A:
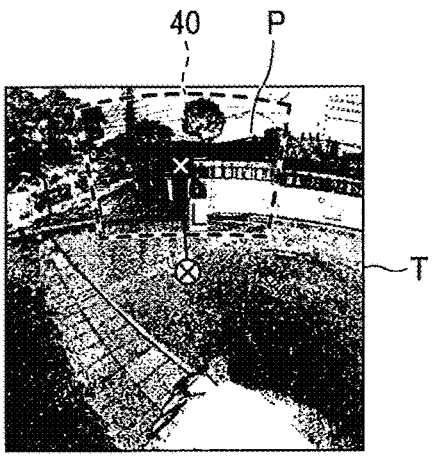
FIGS. 83A and 83B are exemplary diagrams illustrating a distance between the center of a predetermined area and the center of a planar image, according to the ninth display example.
Figure 83B:
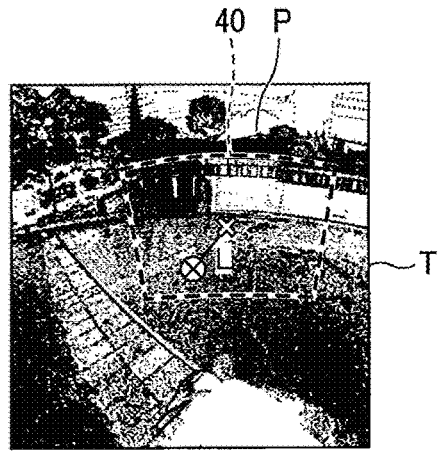

FIGS. 83A and 83B are diagrams illustrating a distance between the center of a predetermined area T and the center of the planar image P. The frame displaying unit 36B calculates a distance L between the center of the predetermined area T and the center of the planar image P and compares the distance L with a threshold to determine whether to display a frame. In FIG. 83A, the distance L is greater than or equal to the threshold, and thus no frame is displayed. In FIG. 83B, the distance L is less than the threshold, and thus a frame is displayed.

Figure 84:
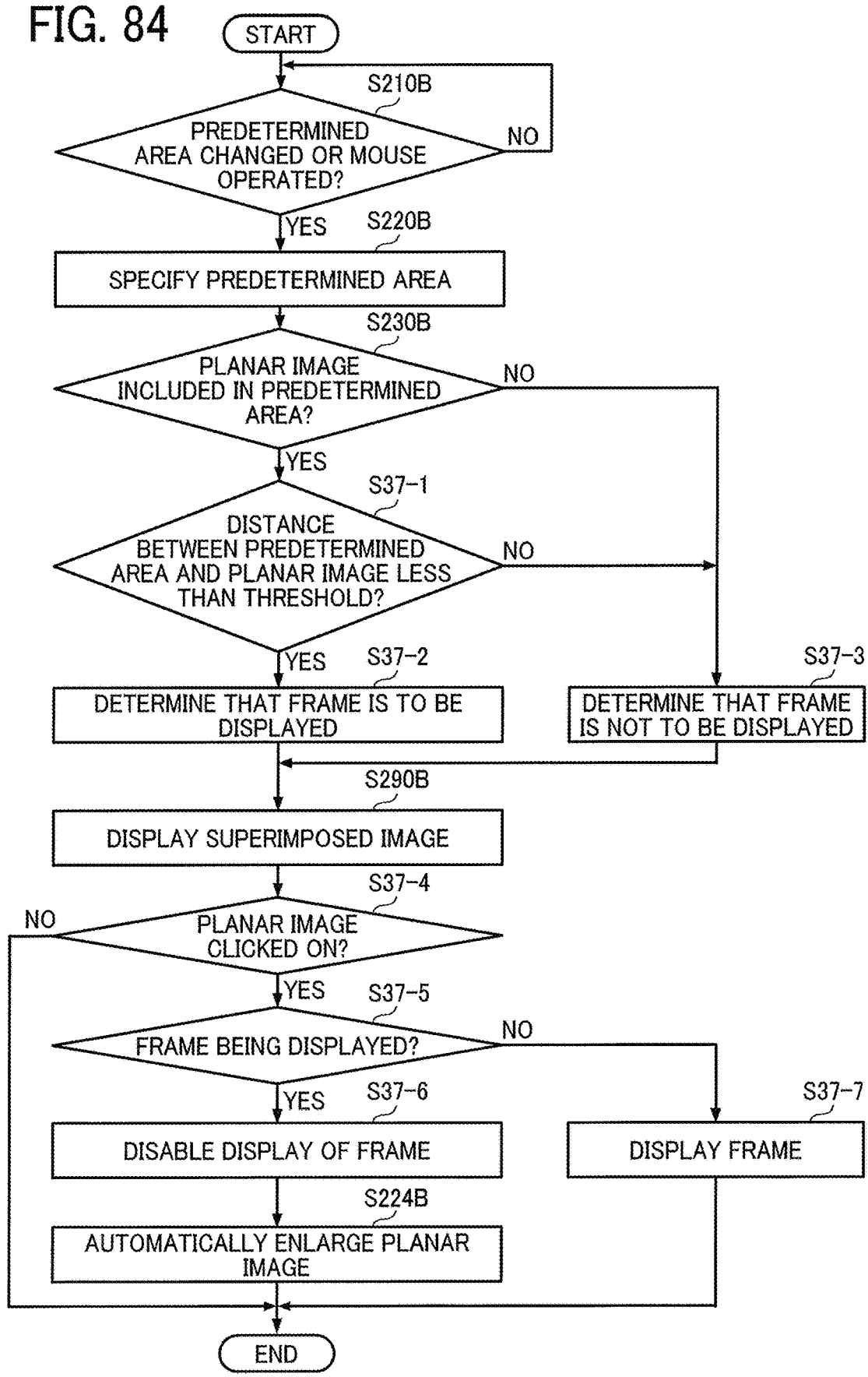
FIG. 84 is an exemplary flowchart illustrating a procedure for the display apparatus to control whether to display a frame when displaying a planar image in accordance with a distance between the center of a predetermined area and the center of a planar image, according to the ninth display example.

FIG. 84 is an exemplary flowchart illustrating a procedure for the display apparatus 5 to control whether to display a frame when displaying the planar image P. Referring to FIG. 84, a description is given, focusing on the difference from FIG. 79.

If it is determined in S230B that the planar image P is included in the predetermined area T, the frame displaying unit 36B calculates a distance between the center of the predetermined area T and the center of the planar image P and determines whether the distance is less than a threshold (S37-1). The threshold may be determined experimentally. For example, the threshold is ⅓, ¼, or the like of the number of pixels along a diagonal of the predetermined area T.

If the distance between the center of the predetermined area T and the center of the planar image P is less than the threshold, the frame displaying unit 36B determines that a frame is displayed (S37-2). If the distance is greater than or equal to the threshold, the frame displaying unit 36B determines that no frame is displayed (S37-3). The subsequent processing is similar to that in FIG. 79.

Accordingly, when an object that the user desires to view appears in the vicinity of the center of the predetermined area T, a frame is displayed. This allows the user to recognize the presence of the planar image P.

D. No Display of Frame when Mouse Cursor is Over Planar Image P and Display of Frame when Mouse Cursor is not Over Planar Image P In display example 9, a frame is displayed when the mouse cursor is over the planar image P, and no frame is displayed when the mouse cursor is not over the planar image P. Conversely, no frame may be displayed when the mouse cursor is over the planar image P, and a frame may be displayed when the mouse cursor is not over the planar image P. This allows the user, when placing the mouse cursor over the planar image P, to view the planar image P without a frame.

Figure 85:
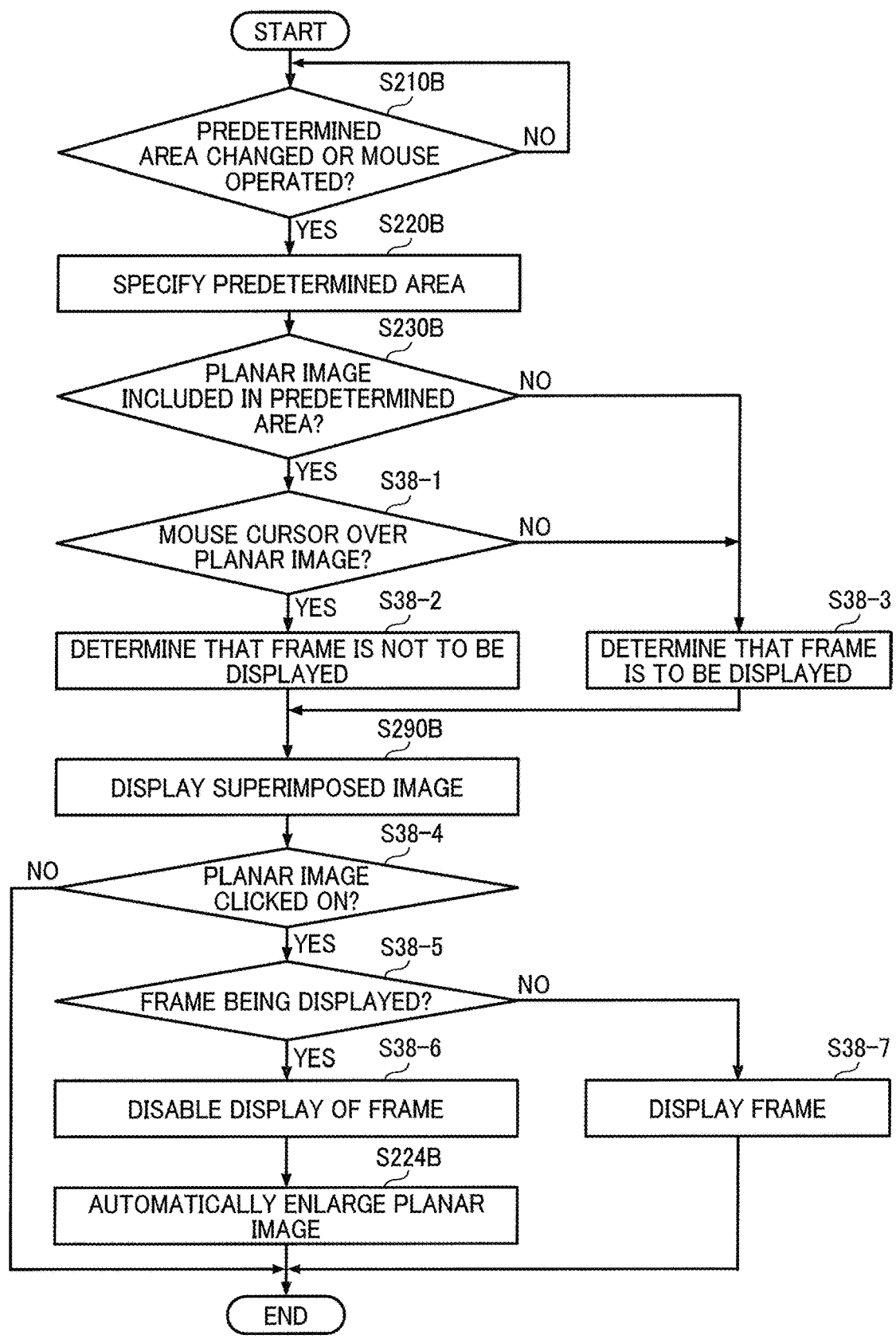
FIG. 85 is an exemplary flowchart illustrating a procedure for the display apparatus to control whether to display a frame when displaying a planar image in accordance with the position of a mouse cursor, according to the ninth display example.

FIG. 85 is an exemplary flowchart illustrating a procedure for the display apparatus 5 to control whether to display a frame when displaying the planar image P. Referring to FIG. 85, a description is given, focusing on the difference from FIG. 84.

After S230B, the frame displaying unit 36B determines whether the mouse cursor is over the planar image P (S38-1).

If the mouse cursor is over the planar image P, the frame displaying unit 36B determines that no frame is displayed (S38-2). If the mouse cursor is not over the planar image P, the frame displaying unit 36B determines that a frame is displayed (S38-3). The subsequent processing may be similar to that in FIG. 84.

Accordingly, when the mouse cursor is not over the planar image P, a frame is displayed. This allows the user to recognize the location of the planar image P. When the mouse cursor is over the planar image P, the user is able to view the planar image P without a frame.

As described above, the display apparatus 5 in this display example can control the display and non-display of the frame 40 by using a variety of events as triggers.

The configurations of the display examples 9 and 10 described above are not limited to those described above.

For example, in the conditions (i) to (iv) described above, the display and non-display of the frame 40 are automatically switched. Alternatively, the user may control the display and non-display of the frame 40.

Additionally, the display and non-display of the frame 40 are switched when the planar image P is being displayed. Alternatively, the image superimposing unit 33A may display the planar image P only when the frame 40 is displayed, and may hide the planar image P if the frame 40 is not displayed.

Further, in alternative to the frame 40, any information may be displayed to indicate the presence of the second image, for example, in any desired form, as long as it is visually recognizable. For example, such information may be displayed in the form of a graphical image such as an icon, mark, line, etc.

The spherical image CE may be displayed by using browser software or by using application software for displaying the spherical image CE.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functional configurations in the embodiments described above are examples. For example, the functional blocks of each device or apparatus may be divided into more units of processing in accordance with the content of processing. The functional blocks of each device or apparatus may be divided such that a single unit of processing includes more processing operations.

Any one of the above-described embodiments may be implemented in various other ways. For example, as illustrated in FIG. 14, the equirectangular projection image data, planar image data, and superimposed display metadata, may not be stored in a memory of the smart phone 5. For example, any of the equirectangular projection image data, planar image data, and superimposed display metadata may be stored in any server on the network.

In any of the above-described embodiments, the planar image P is superimposed on the spherical image CE. Alternatively, the planar image P to be superimposed may be replaced by a part of the spherical image CE. In another example, after deleting a part of the spherical image CE, the planar image P may be embedded in that part having no image.

Furthermore, in the second embodiment, the image processing server 7 performs superimposition of images (S45). For example, the image processing server 7 may transmit the superimposed display metadata to the smart phone 5, to instruct the smart phone 5 to perform superimposition of images and display the superimposed images. In such case, at the image processing server 7, the metadata generator 75a illustrated in FIG. 34 generates superimposed display metadata. At the smart phone 5, the superimposing unit 75b illustrated in FIG. 34 superimposes one image on other image, in a substantially similar manner in the case of the superimposing unit 55b in FIG. 16. The display control 56 illustrated in FIG. 14 processes display of the superimposed images.

In another example, the generic image capturing device 3 may be provided with a function of displaying. In such case, the special image capturing device 1 and the generic image capturing device 3 communicate with each other using USB, Bluetooth, wireless LAN, etc. The special image capturing device 1 transmits the spherical image CE of surroundings of a target object, to the generic image capturing device 3. The generic image capturing device 3 captures the planar image of the target object. The generic image capturing device 3 superimposes the planar image P on the spherical image CE for display.

In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, and integrating one image with other image. That is, as long as the user can perceive a plurality of images (such as the spherical image and the planar image) being displayed on a display as they were one image, processing to be performed on those images for display is not limited to the above-described examples.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An apparatus for controlling display, comprising circuitry configured to:
   obtain a first image and a second image, the second image being superimposed on the first image;
   control a display to display an image of a predetermined area of the first image, such that the predetermined area of the first image matches a display area of the display; and
   in response to an instruction to start displaying the first image superimposed with the second image, control the display to display the image of the predetermined area of the first image, such that the second image being superimposed on the first image is displayed within the predetermined area of the first image, wherein the circuitry determines whether the second image is viewed by a user, and wherein based on a determination indicating whether the second image is viewed by the user, the circuitry switches between display and undisplay of information indicating presence of the second image.

2. The apparatus of claim 1, wherein the information indicating presence of the second image includes a graphical image indicating a location or a size of the second image.

3. The apparatus of claim 2, wherein, based on a determination that the second image is viewed by the user, the circuitry causes the graphical image to be not displayed, and based on a determination that the second image is not viewed by the user, the circuitry causes the graphical image to be displayed.

4. The apparatus of claim 1, wherein the circuitry determines that the second image is viewed by the user, according to an area of the second image in the predetermined area with respect to the predetermined area.

5. The apparatus of claim 2, wherein, in response to an instruction for changing the predetermined area in the first image, the circuitry is further configured to display the graphical image at least for a predetermined time period counted from a time when the instruction for changing is accepted.

6. An image capturing system comprising:

the image processing apparatus of claim 1;

a first image capturing device configured to capture surroundings of a target object to obtain the first image in a first projection and transmit the first image in the first projection to the image processing apparatus; and a second image capturing device configured to capture the target object to obtain the second image in a second projection and transmit the second image in the second projection to the image processing apparatus.

7. A method of controlling display, comprising:

obtaining a first image and a second image, the second image being superimposed on the first image;

controlling a display to display an image of a predetermined area of the first image, such that the predetermined area of the first image matches a display area of the display; and in response to an instruction to start displaying the first image superimposed with the second image, controlling the display to display the image of the predetermined area of the first image, such that the second image being superimposed on the first image is displayed within the predetermined area of the first image, wherein the method further includes determining whether the second image is viewed by a user, and wherein based on a determination indicating whether the second image is viewed by the user, the method further performs switching between display and undisplay of information indicating presence of the second image.

8. The method of claim 7, wherein the information indicating presence of the second image includes a graphical image indicating a location or a size of the second image.

9. The method of claim 8, wherein, based on the determination that the second image is viewed by the user, the method causes the graphical image to be not displayed, and based on the determination that the second image is not viewed by the user, the method causes the graphical image to be displayed.

10. The method of claim 7, wherein:

the determination determines that the second image is viewed by the user, according to an area of the second image in the predetermined area with respect to the predetermined area.

11. The method of claim 8, wherein:

in response to an instruction for changing the predetermined area in the first image, the method further performs displaying the graphical image at least for a predetermined time period counted from a time when the instruction for changing is accepted.

12. A non-transitory computer-readable medium for controlling display which when executed by a computer causes performing a method, comprising:

obtaining a first image and a second image, the second image being superimposed on the first image;

controlling a display to display an image of a predetermined area of the first image, such that the predetermined area of the first image matches a display area of the display; and in response to an instruction to start displaying the first image superimposed with the second image, controlling the display to display the image of the predetermined area of the first image, such that the second image being superimposed on the first image is displayed within the predetermined area of the first image, wherein the method further includes determining whether the second image is viewed by a user, and wherein based on a determination indicating whether the second image is viewed by the user, the method further performs switching between display and undisplay of information indicating presence of the second image.

13. The non-transitory computer-readable medium of claim 12, wherein the information indicating presence of the second image includes a graphical image indicating a location or a size of the second image.

14. The non-transitory computer-readable medium of claim 13, wherein:

based on the determination that the second image is viewed by the user, the method causes the graphical image to be not displayed, and based on the determination that the second image is not viewed by the user, the method causes the graphical image to be displayed.

15. The non-transitory computer-readable medium of claim 12, wherein:

the determination determines that the second image is viewed by the user, according to an area of the second image in the predetermined area with respect to the predetermined area.

16. The non-transitory computer-readable medium of claim 13, wherein:

in response to an instruction for changing the predetermined area in the first image, the method further performs displaying the graphical image at least for a predetermined time period counted from a time when the instruction for changing is accepted.

* * * * *